US012578200B2

(12) United States Patent
Chao et al.

(10) Patent No.: US 12,578,200 B2
(45) Date of Patent: Mar. 17, 2026

(54) NAVIGATIONAL USER INTERFACES

(71) Applicant: Apple Inc., Cupertino, CA (US)

(72) Inventors: Edward Chao, Palo Alto, CA (US); Kevin W. Chen, Cupertino, CA (US); Yeobeen Chung, San Jose, CA (US); Todd R. Grooms, Nashville, TN (US)

(73) Assignee: Apple Inc., Cupertino, CA (US)

( * ) Notice: Subject to any disclaimer, the term of this patent is extended or adjusted under 35 U.S.C. 154(b) by 189 days.

(21) Appl. No.: 18/239,014

(22) Filed: Aug. 28, 2023

(65) Prior Publication Data

US 2024/0159554 A1 May 16, 2024

Related U.S. Application Data

(60) Provisional application No. 63/470,374, filed on Jun. 1, 2023, provisional application No. 63/404,114, filed on Sep. 6, 2022.

(51) Int. Cl.

| | |
|---|---|
| ***G01C 21/36*** | (2006.01) |
| ***G01C 21/34*** | (2006.01) |
| ***H04W 4/024*** | (2018.01) |

(52) U.S. Cl.
CPC ..... *G01C 21/3682* (2013.01); *G01C 21/3484* (2013.01); *H04W 4/024* (2018.02)

(58) Field of Classification Search
CPC ....................... G01C 21/3484; G01C 21/3682; H04W 4/024
See application file for complete search history.

(56) References Cited

U.S. PATENT DOCUMENTS

| | | | |
|---|---|---|---|
| 5,801,700 | A | 9/1998 | Ferguson |
| 6,002,402 | A | 12/1999 | Schacher |
| 6,014,429 | A | 1/2000 | Laporta et al. |
| 6,191,807 | B1 | 2/2001 | Hamada et al. |
| 6,362,842 | B1 | 3/2002 | Tahara et al. |
| 6,721,784 | B1 | 4/2004 | Leonard et al. |
| 7,113,451 | B1 | 9/2006 | Matthey |
| 7,149,893 | B1 | 12/2006 | Leonard et al. |
| 7,197,122 | B2 | 3/2007 | Vuori |
| 7,365,736 | B2 | 4/2008 | Marvit et al. |
| 7,789,225 | B2 | 9/2010 | Whiteis |
| 7,797,390 | B2 | 9/2010 | Hagale et al. |

(Continued)

FOREIGN PATENT DOCUMENTS

| | | | |
|---|---|---|---|
| AU | 2022201622 | A1 | 3/2022 |
| CN | 1831681 | A | 9/2006 |

(Continued)

OTHER PUBLICATIONS

Applicant-Initiated Interview Summary received for U.S. Appl. No. 17/885,807, mailed on Oct. 10, 2023, 2 pages.

(Continued)

*Primary Examiner* — Seth A Silverman
(74) *Attorney, Agent, or Firm* — YHE Law LLP

(57) ABSTRACT

The present disclosure generally relates to navigational user interfaces, including displaying indications of locations, transitioning from displaying a watch face user interface in a first mode to displaying the watch face user interface in a second mode, displaying a navigational complication for an application, and displaying different views of indications of locations.

48 Claims, 40 Drawing Sheets

(56) References Cited

U.S. PATENT DOCUMENTS 7,834,861 B2 11/2010 Lee
7,908,219 B2 3/2011 Abanami et al.
8,036,901 B2 10/2011 Mozer
8,121,586 B2 2/2012 Araradian et al.
8,150,930 B2 4/2012 Satterfield et al.
8,180,382 B1 5/2012 Graefen
8,255,830 B2 8/2012 Ording et al.
8,456,297 B2 6/2013 Van Os
8,479,122 B2 7/2013 Hotelling et al.
8,488,752 B1 7/2013 Wiesen
8,572,493 B2 10/2013 Qureshi
8,648,799 B1 2/2014 Lloyd
8,848,932 B2 9/2014 Poulsen et al.
8,922,485 B1 12/2014 Lloyd
9,021,709 B2 5/2015 Oliver et al.
9,112,984 B2 8/2015 Sejnoha et al.
9,185,062 B1 11/2015 Yang et al.
9,207,835 B1 12/2015 Yang et al.
9,483,529 B1 11/2016 Pasoi et al.
9,578,160 B2 2/2017 Kim et al.
9,653,067 B2 5/2017 Brooks et al.
9,886,953 B2 2/2018 Lemay et al.
9,998,888 B1 6/2018 Chang et al.
10,003,938 B2 6/2018 Chang et al.
10,157,040 B2 12/2018 Ballinger et al.
10,341,826 B2 7/2019 Chang et al.
10,416,844 B2 9/2019 Yang et al.
10,515,623 B1 12/2019 Grizzel
10,630,795 B2 4/2020 Aoki et al.
10,684,140 B2 6/2020 Annen et al.
11,133,008 B2 9/2021 Piernot et al.
2002/0057284 A1 5/2002 Dalby et al.
2002/0120869 A1 8/2002 Engstrom
2002/0126135 A1 9/2002 Ball et al.
2002/0167488 A1 11/2002 Hinckley et al.
2003/0003897 A1 1/2003 Hyon
2003/0229722 A1 12/2003 Beyda
2004/0070511 A1 4/2004 Kim
2004/0225502 A1 11/2004 Bear et al.
2004/0233788 A1 11/2004 Plancon et al.
2005/0138552 A1 6/2005 Venolia
2005/0198128 A1 9/2005 Anderson et al.
2005/0266884 A1 12/2005 Marriott et al.
2006/0005156 A1 1/2006 Korpipää et al.
2006/0019639 A1 1/2006 Adams et al.
2006/0044283 A1 3/2006 Eri et al.
2006/0161629 A1 7/2006 Cohen et al.
2006/0195787 A1 8/2006 Topiwala et al.
2006/0203617 A1 9/2006 Matthey
2007/0004461 A1 1/2007 Bathina et al.
2007/0037605 A1 2/2007 Logan et al.
2007/0073823 A1 3/2007 Cohen
2007/0085157 A1 4/2007 Fadell et al.
2007/0117549 A1 5/2007 Arnos
2007/0150834 A1 6/2007 Muller et al.
2007/0150836 A1 6/2007 Deggelmann et al.
2007/0173233 A1 7/2007 Vander Veen et al.
2007/0211042 A1 9/2007 Kim et al.
2007/0216659 A1 9/2007 Amineh
2007/0236475 A1 10/2007 Wherry
2008/0014989 A1 1/2008 Sandegard et al.
2008/0052945 A1 3/2008 Matas et al.
2008/0055264 A1 3/2008 Anzures et al.
2008/0057926 A1 3/2008 Forstall et al.
2008/0070593 A1 3/2008 Altman et al.
2008/0094370 A1 4/2008 Ording et al.
2008/0122796 A1 5/2008 Jobs et al.
2008/0146289 A1 6/2008 Korneluk et al.
2008/0151697 A1 6/2008 Giauque et al.
2008/0165136 A1 7/2008 Christie et al.
2008/0172174 A1 7/2008 Okeya
2008/0216022 A1 9/2008 Lorch et al.
2008/0228386 A1 9/2008 Geelen et al.
2009/0003552 A1 1/2009 Goldman et al.
2009/0003620 A1 1/2009 Mckillop et al.
2009/0005011 A1 1/2009 Christie et al.
2009/0015514 A1 1/2009 Suzuki et al.
2009/0037536 A1 2/2009 Braam
2009/0049502 A1 2/2009 Levien et al.
2009/0051648 A1 2/2009 Shamaie et al.
2009/0055383 A1 2/2009 Zalewski
2009/0085881 A1 4/2009 Keam
2009/0088204 A1 4/2009 Culbert et al.
2009/0164219 A1 6/2009 Yeung et al.
2009/0172599 A1 7/2009 Nezu
2009/0175425 A1 7/2009 Lee
2009/0177981 A1 7/2009 Christie et al.
2009/0187842 A1 7/2009 Collins et al.
2009/0199130 A1 8/2009 Tsem et al.
2009/0209293 A1 8/2009 Louch
2009/0248751 A1 10/2009 Myman et al.
2009/0254840 A1 10/2009 Churchill et al.
2009/0265643 A1 10/2009 Jachner et al.
2009/0313582 A1 12/2009 Rupsingh et al.
2010/0094809 A1 4/2010 Consul et al.
2010/0121636 A1 5/2010 Burke et al.
2010/0124906 A1 5/2010 Hautala
2010/0125785 A1 5/2010 Moore et al.
2010/0162138 A1 6/2010 Pascal et al.
2010/0235746 A1 9/2010 Anzures et al.
2010/0251158 A1 9/2010 Geppert et al.
2010/0277579 A1 11/2010 Cho et al.
2010/0279663 A1 11/2010 Wang et al.
2010/0280983 A1 11/2010 Cho et al.
2010/0287249 A1 11/2010 Yigang et al.
2010/0309149 A1 12/2010 Blumenberg et al.
2010/0325194 A1 12/2010 Williamson et al.
2010/0332518 A1 12/2010 Song et al.
2011/0012919 A1 1/2011 Tai et al.
2011/0018708 A1 1/2011 Piltonen et al.
2011/0054830 A1 3/2011 Logan
2011/0080356 A1 4/2011 Kang et al.
2011/0092190 A1 4/2011 Willey et al.
2011/0164058 A1 7/2011 Lemay
2011/0202272 A1 8/2011 Feyereisen et al.
2011/0276901 A1 11/2011 Zambetti et al.
2011/0279323 A1 11/2011 Hung et al.
2011/0304648 A1 12/2011 Kim et al.
2011/0316769 A1 12/2011 Boettcher et al.
2012/0008526 A1 1/2012 Borghei et al.
2012/0022872 A1 1/2012 Gruber et al.
2012/0038546 A1 2/2012 Cromer et al.
2012/0054655 A1 3/2012 Kang et al.
2012/0060077 A1 3/2012 Mate et al.
2012/0131458 A1 5/2012 Hayes et al.
2012/0143361 A1 6/2012 Kurabayashi et al.
2012/0149405 A1 6/2012 Bhat
2012/0157114 A1 6/2012 Alameh et al.
2012/0185547 A1 7/2012 Hugg et al.
2012/0218177 A1 8/2012 Pang et al.
2012/0233571 A1 9/2012 Wever et al.
2012/0254324 A1 10/2012 Majeti et al.
2012/0254325 A1 10/2012 Majeti et al.
2012/0302256 A1 11/2012 Pai et al.
2012/0306770 A1 12/2012 Moore et al.
2012/0313847 A1 12/2012 Boda et al.
2013/0026293 A1 1/2013 Schneider et al.
2013/0035942 A1 2/2013 Kim et al.
2013/0053007 A1 2/2013 Cosman et al.
2013/0067027 A1 3/2013 Song et al.
2013/0091298 A1 4/2013 Ozzie et al.
2013/0091443 A1 4/2013 Park et al.
2013/0093833 A1 4/2013 Al-asaaed et al.
2013/0212470 A1 8/2013 Karunamuni et al.
2013/0222230 A1 8/2013 Choi et al.
2013/0234924 A1 9/2013 Janefalkar et al.
2013/0243924 A1 9/2013 Bhandari et al.
2013/0254714 A1 9/2013 Shin et al.
2013/0259247 A1 10/2013 Kim
2013/0262298 A1 10/2013 Morley et al.
2013/0275924 A1 10/2013 Weinberg et al.
2013/0282844 A1 10/2013 Logan et al.
2013/0301482 A1 11/2013 Katis et al.
2013/0310089 A1 11/2013 Gianoukos et al.

(56) References Cited

U.S. PATENT DOCUMENTS

| | | | | |
|---|---|---|---|---|
| 2014/0012927 | A1 | 1/2014 | Gertzfield et al. | |
| 2014/0032682 | A1 | 1/2014 | Prado et al. | |
| 2014/0045463 | A1 | 2/2014 | Hsieh et al. | |
| 2014/0055552 | A1 | 2/2014 | Song et al. | |
| 2014/0059448 | A1 | 2/2014 | Lee | |
| 2014/0066105 | A1 | 3/2014 | Bridge et al. | |
| 2014/0082501 | A1 | 3/2014 | Bae et al. | |
| 2014/0085487 | A1 | 3/2014 | Park et al. | |
| 2014/0136989 | A1 | 5/2014 | Choi | |
| 2014/0136990 | A1 | 5/2014 | Gonnen et al. | |
| 2014/0155123 | A1 | 6/2014 | Lee et al. | |
| 2014/0171156 | A1 | 6/2014 | Pattikonda et al. | |
| 2014/0222933 | A1 | 8/2014 | Stovicek et al. | |
| 2014/0240122 | A1 | 8/2014 | Roberts et al. | |
| 2014/0274211 | A1 | 9/2014 | Sejnoha et al. | |
| 2014/0278086 | A1* | 9/2014 | San Filippo | G01C 21/3492 701/527 |
| 2014/0278435 | A1 | 9/2014 | Ganong, III et al. | |
| 2014/0344687 | A1 | 11/2014 | Durham et al. | |
| 2014/0344711 | A1 | 11/2014 | Sjostedt et al. | |
| 2014/0354527 | A1 | 12/2014 | Chen et al. | |
| 2014/0365226 | A1 | 12/2014 | Sinha | |
| 2014/0365934 | A1 | 12/2014 | Moore et al. | |
| 2014/0365935 | A1 | 12/2014 | Moha et al. | |
| 2014/0365944 | A1 | 12/2014 | Moore et al. | |
| 2015/0032457 | A1 | 1/2015 | Koo et al. | |
| 2015/0040029 | A1 | 2/2015 | Koum et al. | |
| 2015/0042852 | A1 | 2/2015 | Lee et al. | |
| 2015/0078135 | A1 | 3/2015 | Fattah | |
| 2015/0089660 | A1 | 3/2015 | Song et al. | |
| 2015/0092520 | A1 | 4/2015 | Robison et al. | |
| 2015/0094951 | A1 | 4/2015 | Gepner et al. | |
| 2015/0100537 | A1 | 4/2015 | Grieves et al. | |
| 2015/0143391 | A1* | 5/2015 | Ozawa | H04N 21/4524 725/10 |
| 2015/0169893 | A1 | 6/2015 | Desai | |
| 2015/0172393 | A1 | 6/2015 | Oplinger et al. | |
| 2015/0172584 | A1 | 6/2015 | Park et al. | |
| 2015/0188869 | A1 | 7/2015 | Smilak et al. | |
| 2015/0264303 | A1 | 9/2015 | Chastney et al. | |
| 2015/0271120 | A1 | 9/2015 | Langholz | |
| 2015/0312184 | A1 | 10/2015 | Langholz et al. | |
| 2015/0312185 | A1 | 10/2015 | Langholz et al. | |
| 2015/0326510 | A1 | 11/2015 | Tomlinson et al. | |
| 2015/0331881 | A1 | 11/2015 | Myles | |
| 2015/0347086 | A1 | 12/2015 | Liedholm et al. | |
| 2015/0348548 | A1 | 12/2015 | Piernot et al. | |
| 2015/0350141 | A1 | 12/2015 | Yang et al. | |
| 2016/0018872 | A1 | 1/2016 | Tu et al. | |
| 2016/0018899 | A1 | 1/2016 | Tu et al. | |
| 2016/0018900 | A1 | 1/2016 | Tu et al. | |
| 2016/0036996 | A1 | 2/2016 | Midholt et al. | |
| 2016/0041597 | A1 | 2/2016 | Graham et al. | |
| 2016/0054841 | A1 | 2/2016 | Yang et al. | |
| 2016/0066277 | A1 | 3/2016 | Yang et al. | |
| 2016/0073223 | A1 | 3/2016 | Woolsey et al. | |
| 2016/0077794 | A1 | 3/2016 | Kim et al. | |
| 2016/0080552 | A1 | 3/2016 | Keating et al. | |
| 2016/0088146 | A1 | 3/2016 | Ying et al. | |
| 2016/0165600 | A1 | 6/2016 | Choi et al. | |
| 2016/0260436 | A1 | 9/2016 | Lemay et al. | |
| 2016/0261790 | A1 | 9/2016 | Lee et al. | |
| 2016/0277885 | A1 | 9/2016 | Shan et al. | |
| 2016/0294958 | A1 | 10/2016 | Zhang et al. | |
| 2016/0295384 | A1 | 10/2016 | Shan et al. | |
| 2016/0320849 | A1 | 11/2016 | Koo | |
| 2016/0379633 | A1 | 12/2016 | Lehman et al. | |
| 2017/0010127 | A1 | 1/2017 | Annen et al. | |
| 2017/0048686 | A1 | 2/2017 | Chang et al. | |
| 2017/0082983 | A1 | 3/2017 | Katzer et al. | |
| 2017/0083189 | A1 | 3/2017 | Yang et al. | |
| 2017/0083202 | A1 | 3/2017 | Yang et al. | |
| 2017/0220212 | A1 | 8/2017 | Yang et al. | |
| 2017/0357319 | A1 | 12/2017 | Chaudhri et al. | |
| 2017/0357320 | A1 | 12/2017 | Chaudhri et al. | |
| 2018/0012596 | A1 | 1/2018 | Piernot et al. | |
| 2018/0062691 | A1 | 3/2018 | Barnett, Jr. | |
| 2018/0146349 | A1 | 5/2018 | Chang et al. | |
| 2018/0181185 | A1 | 6/2018 | Graham et al. | |
| 2018/0270627 | A1 | 9/2018 | Chang et al. | |
| 2018/0329672 | A1 | 11/2018 | Sadak et al. | |
| 2019/0013018 | A1 | 1/2019 | Rekstad | |
| 2019/0158645 | A1 | 5/2019 | Yang et al. | |
| 2019/0187787 | A1 | 6/2019 | White et al. | |
| 2019/0234741 | A1* | 8/2019 | Nieminen | G01C 21/20 |
| 2019/0263487 | A1 | 8/2019 | Cort et al. | |
| 2019/0320301 | A1 | 10/2019 | Chang et al. | |
| 2019/0339784 | A1 | 11/2019 | Lemay et al. | |
| 2019/0354252 | A1 | 11/2019 | Badr | |
| 2020/0098362 | A1 | 3/2020 | Piernot et al. | |
| 2020/0098368 | A1 | 3/2020 | Lemay et al. | |
| 2020/0193997 | A1 | 6/2020 | Piernot et al. | |
| 2020/0348807 | A1 | 11/2020 | Garcia et al. | |
| 2020/0371577 | A1 | 11/2020 | Graham et al. | |
| 2020/0408521 | A1* | 12/2020 | Lyons | G04G 21/04 |
| 2021/0141437 | A1 | 5/2021 | Graham et al. | |
| 2021/0366480 | A1 | 11/2021 | Lemay et al. | |
| 2021/0390955 | A1 | 12/2021 | Piernot et al. | |
| 2022/0019292 | A1 | 1/2022 | Lemay et al. | |
| 2022/0147135 | A1 | 5/2022 | Graham et al. | |
| 2022/0386085 | A1 | 12/2022 | Chang et al. | |
| 2023/0035941 | A1 | 2/2023 | Herman et al. | |
| 2023/0040703 | A1 | 2/2023 | Lemay et al. | |
| 2023/0079965 | A1 | 3/2023 | Garcia et al. | |
| 2023/0152958 | A1 | 5/2023 | Lyons et al. | |
| 2023/0393705 | A1 | 12/2023 | Krenn | |
| 2024/0176441 | A1 | 5/2024 | Yang et al. | |
| 2024/0406686 | A1 | 12/2024 | Chang et al. | |
| 2025/0036261 | A1 | 1/2025 | Yang et al. | |
| 2025/0044924 | A1 | 2/2025 | Lyons et al. | |

FOREIGN PATENT DOCUMENTS

| | | | |
|---|---|---|---|
| CN | 101046721 | A | 10/2007 |
| CN | 101180585 | A | 5/2008 |
| CN | 101231506 | A | 7/2008 |
| CN | 101276255 | A | 10/2008 |
| CN | 101374090 | A | 2/2009 |
| CN | 101535940 | A | 9/2009 |
| CN | 101853132 | A | 10/2010 |
| CN | 102215374 | A | 10/2011 |
| CN | 102414755 | A | 4/2012 |
| CN | 103119968 | A | 5/2013 |
| CN | 103207674 | A | 7/2013 |
| CN | 103309606 | A | 9/2013 |
| CN | 103399703 | A | 11/2013 |
| CN | 103440247 | A | 12/2013 |
| CN | 103473004 | A | 12/2013 |
| CN | 103581544 | A | 2/2014 |
| CN | 103583031 | A | 2/2014 |
| CN | 103685729 | A | 3/2014 |
| CN | 103809905 | A | 5/2014 |
| CN | 103959751 | A | 7/2014 |
| CN | 104205785 | A | 12/2014 |
| CN | 105278681 | A | 1/2016 |
| CN | 103583031 | B | 2/2016 |
| CN | 205263700 | U | 5/2016 |
| CN | 105900376 | A | 8/2016 |
| CN | 106383437 | A | 2/2017 |
| CN | 106843711 | A | 6/2017 |
| CN | 107408012 | A | 11/2017 |
| CN | 305032066 | S | 2/2019 |
| EP | 2490432 | A1 | 8/2012 |
| EP | 2582120 | A1 | 4/2013 |
| EP | 3227771 | A1 | 10/2017 |
| JP | 11-98249 | A | 4/1999 |
| JP | 2002-163217 | A | 6/2002 |
| JP | 2003-141050 | A | 5/2003 |
| JP | 2006-72489 | A | 3/2006 |
| JP | 2006-135667 | A | 5/2006 |
| JP | 2008-526156 | A | 7/2008 |
| JP | 2008-546069 | A | 12/2008 |
| JP | 2010-503126 | A | 1/2010 |
| JP | 2010-503332 | A | 1/2010 |

(56) References Cited

FOREIGN PATENT DOCUMENTS

| | | | | |
|---|---|---|---|---|
| JP | 2011-65654 A | | 3/2011 | |
| JP | 2011-107823 A | | 6/2011 | |
| JP | 2012-508530 A | | 4/2012 | |
| JP | 2013-37688 A | | 2/2013 | |
| JP | 2013-542522 A | | 11/2013 | |
| JP | 2014-135000 A | | 7/2014 | |
| JP | 2017-54256 A | | 3/2017 | |
| JP | 2017-537361 A | | 12/2017 | |
| KR | 10-2004-0089329 A | | 10/2004 | |
| KR | 10-2017-0107058 A | | 9/2017 | |
| TW | 201629750 A | | 8/2016 | |
| WO | 2006/104967 A2 | | 10/2006 | |
| WO | 2008/030972 A1 | | 3/2008 | |
| WO | 2009/071112 A1 | | 6/2009 | |
| WO | 2010/054373 A2 | | 5/2010 | |
| WO | 2011/011224 A1 | | 1/2011 | |
| WO | 2011/127457 A1 | | 10/2011 | |
| WO | 2011/163350 A1 | | 12/2011 | |
| WO | 2012/166277 A1 | | 12/2012 | |
| WO | 2013/021385 A2 | | 2/2013 | |
| WO | 2013/048880 A1 | | 4/2013 | |
| WO | 2013/169875 A2 | | 11/2013 | |
| WO | 2014/046475 A1 | | 3/2014 | |
| WO | 2014/143776 A2 | | 9/2014 | |
| WO | 2014/159581 A1 | | 10/2014 | |
| WO | 2015/183755 A1 | | 12/2015 | |
| WO | 2016/039992 A1 | | 3/2016 | |
| WO | 2016/140705 A1 | | 9/2016 | |
| WO | 2016/144983 A1 | | 9/2016 | |
| WO | 2017/027632 A1 | | 2/2017 | |
| WO | WO-2017192881 A1 | * | 11/2017 | ............... H01Q 1/24 |
| WO | WO-2018009404 A1 | * | 1/2018 | ......... G01C 21/3896 |

OTHER PUBLICATIONS

Applicant-Initiated Interview Summary received for U.S. Appl. No. 17/971,464, mailed on Dec. 18, 2023, 4 pages.
Applicant-Initiated Interview Summary received for U.S. Appl. No. 17/971,464, mailed on Feb. 21, 2024, 4 pages.
Applicant-Initiated Interview Summary received for U.S. Appl. No. 18/237,341, mailed on Mar. 22, 2024, 4 pages.
Corrected Notice of Allowance received for U.S. Appl. No. 17/885,807, mailed on Aug. 9, 2024, 2 pages.
Final Office Action received for U.S. Appl. No. 17/971,464, mailed on Jan. 24, 2024, 13 pages.
Final Office Action received for U.S. Appl. No. 18/237,341, mailed on Apr. 23, 2024, 15 pages.
Grothaus Michael, "WhatsApp Introduces Major New Audio Features", Engadget, Available at <http://www.engadget.com/2013/08/07/whatsapp-introduces-major-new-audio-features/>, Aug. 7, 2013, 4 pages.
Intention to Grant received for European Patent Application No. 20721052.7, mailed on Jan. 27, 2025, 9 pages.
International Search Report and Written Opinion received for PCT Patent Application No. PCT/US2023/031984, mailed on Mar. 13, 2024, 21 pages.
International Search Report and Written Opinion received for PCT Patent Application No. PCT/US2023/031984, mailed on May 21, 2024, 21 pages.
Invitation to Pay Additional Fees and Partial International Search Report received for PCT Patent Application No. PCT/US2023/031984, mailed on Jan. 9, 2024, 16 pages.
Non-Final Office Action received for U.S. Appl. No. 17/885,807, mailed on Dec. 20, 2023, 39 pages.
Non-Final Office Action received for U.S. Appl. No. 17/971,464, mailed on Nov. 20, 2023, 16 pages.
Non-Final Office Action received for U.S. Appl. No. 18/237,341, mailed on Feb. 14, 2024, 13 pages.
Notice of Allowance received for Chinese Patent Application No. 202110744146.7, mailed on Jul. 9, 2024, 2 pages (1 page of English Translation and 1 page of Official Copy).
Notice of Allowance received for Chinese Patent Application No. 202110744381.4, mailed on Jul. 15, 2024, 2 pages (1 page of English Translation and 1 page of Official Copy).
Notice of Allowance received for U.S. Appl. No. 17/885,807, mailed on Jul. 29, 2024, 16 pages.
Notice of Allowance received for U.S. Appl. No. 17/885,807, mailed on Mar. 27, 2024, 16 pages.
Notice of Allowance received for U.S. Appl. No. 17/971,464, mailed on Jun. 21, 2024, 16 pages.
Office Action received for Chinese Patent Application No. 202080035979.X, mailed on Dec. 9, 2023, 36 pages (22 pages of English Translation and 14 pages of Official Copy).
Office Action received for Chinese Patent Application No. 202110744146.7, mailed on Apr. 1, 2024, 13 pages (6 pages of English Translation and 7 pages of Official Copy).
Office Action received for Chinese Patent Application No. 202110744381.4, mailed on Mar. 25, 2024, 17 pages (6 pages of English Translation and 11 pages of Official Copy).
SAMSUNG,"SM-G900F User Manual", English (EU). Rev. 1.0, Mar. 2014, 249 pages.
Sony Ericsson Mobile Comm., "User guide SmartWatch MN2", Available online at: https://manualzz.com/doc/23127468/sony-smartwatch-mn2-user-guide, Dec. 2011, 19 pages.
Sony, "Sony Smartwatch 3 SWR50", User Guide, Jul. 2014, 31 pages.
User Manual, Available online at < http://www.manualslib.com/download/754923/Samsung-Gear-2.html>, Apr. 9, 2014, 97 pages.
International Preliminary Report on Patentability received for PCT Patent Application No. PCT/US2023/031984, mailed on Mar. 20, 2025, 16 pages.
Decision to Grant received for European Patent Application No. 20721052.7, mailed on May 30, 2025, 3 pages.
Office Action received for Chinese Patent Application No. 202411158521.X, mailed on Apr. 10, 2025, 13 pages (7 pages of English Translation and 6 pages of Official Copy).
"How to use popular SNS confidence (WeChat) in China 2 _ voice message, press together, shake function etc.", Available at "http://seechina365.com/2014/04/05/wechat02/", Apr. 5, 2014, 27 pages (14 pages of English Translation and 13 pages of Official Copy).
"WhatsApp" users over 400 million people! I tried to investigate the most used messaging application in the world, Available at "http://www.appps.jp/2128786/", Jan. 24, 2014, 10 pages (2 pages of English Translation and 8 pages of Official Copy).
Advisory Action received for U.S. Appl. No. 16/454,884, mailed on Jan. 1, 2021, 6 pages.
Ambrogi Robert, "Send Secure, Self-Destructing Messages with Wickr", Lawsites Blog, Available online at: https://www.lawsitesblog.com/2013/11/send-secure-self-destructing-messages-wickr.html, Nov. 5, 2013, 3 pages.
Applicant initiated interview summary received for U.S. Appl. No. 15/488,093, mailed on Jan. 14, 2020, 4 pages.
Applicant-Initiated Interview Summary received for U.S. Appl. No. 16/454,884, mailed on Dec. 4, 2020, 4 pages.
Applicant-Initiated Interview Summary received for U.S. Appl. No. 16/454,884, mailed on Jun. 2, 2020, 3 pages.
Applicant-Initiated Interview Summary received for U.S. Appl. No. 16/737,044, mailed on Mar. 10, 2022, 3 pages.
Applicant-Initiated Interview Summary received for U.S. Appl. No. 16/936,164, mailed on Aug. 23, 2022, 5 pages.
Applicant-Initiated Interview Summary received for U.S. Appl. No. 16/936,164, mailed on Mar. 22, 2022, 4 pages.
Applicant-Initiated Interview Summary received for U.S. Appl. No. 17/885,807, mailed on May 26, 2023, 4 pages.
Board Decision received for Chinese Patent Application No. 201580029071.7, mailed on Jul. 13, 2021, 2 pages (1 page of English Translation and 1 page of Official Copy).
Brief Communication Regarding Oral Proceedings received for European Patent Application No. 17167629.9, mailed on Nov. 12, 2020, 2 pages.
Communication of the Board of Appeal received for European Patent Application No. 15728307.8, mailed on Sep. 14, 2022, 9 pages.

(56) References Cited

OTHER PUBLICATIONS

Communication of the Board of Appeal received for European Patent Application No. 15729286.3, mailed on Oct. 6, 2022, 8 pages.
Corrected Notice of Allowance received for U.S. Appl. No. 14/928,865, mailed on Aug. 5, 2019, 2 pages.
Corrected Notice of Allowance received for U.S. Appl. No. 14/928,865, mailed on May 16, 2019, 2 pages.
Corrected Notice of Allowance received for U.S. Appl. No. 15/366,763, mailed on Jan. 2, 2020, 5 pages.
Corrected Notice of Allowance received for U.S. Appl. No. 15/366,890, mailed on Feb. 12, 2020, 2 pages.
Corrected Notice of Allowance received for U.S. Appl. No. 15/488,093, mailed on Jun. 15, 2020, 2 pages.
Corrected Notice of Allowance received for U.S. Appl. No. 15/488,093, mailed on Jun. 30, 2020, 2 pages.
Corrected Notice of Allowance received for U.S. Appl. No. 16/936,164, mailed on Oct. 13, 2022, 3 pages.
Corrected Notice of Allowance received for U.S. Appl. No. 16/936,164, mailed on Oct. 28, 2022, 3 pages.
Corrected Notice of Allowance received for U.S. Appl. No. 17/989,086, mailed on Aug. 7, 2023, 2 pages.
Corrected Notice of Allowance received for U.S. Appl. No. 17/989,086, mailed on Jun. 22, 2023, 2 pages.
Decision of Board of Appeal received for European Patent Application No. 15728307.8, mailed on Dec. 8, 2022, 17 pages.
Decision on Appeal received for U.S. Appl. No. 14/503,355, mailed on Aug. 25, 2020, 10 pages.
Decision on Appeal received for U.S. Appl. No. 16/454,884, mailed on Feb. 16, 2022, 12 pages.
Decision to Refuse received for European Patent Application No. 15728307.8, mailed on Dec. 18, 2019, 14 pages.
Decision to Refuse received for European Patent Application No. 15729286.3, mailed on Dec. 18, 2019, 13 pages.
Decision to Refuse received for European Patent Application No. 17167629.9, mailed on Nov. 24, 2020, 2 pages.
Decision to Refuse received for European Patent Application No. 22209306.4, mailed on Mar. 20, 2023, 2 pages.
Examiner's Answer to Appeal Brief received for U.S. Appl. No. 14/503,355, mailed on Apr. 17, 2020, 17 pages.
Examiner's Answer to Appeal Brief received for U.S. Appl. No. 16/454,884, mailed on Sep. 17, 2021, 33 pages.
Extended European Search Report Received for European Patent Application No. 17167629.9, mailed on Jun. 2, 2017, 7 pages.
Final Office Action received for U.S. Appl. No. 14/503,355, mailed on May 20, 2019, 27 pages.
Final Office Action received for U.S. Appl. No. 14/503,355, mailed on Sep. 8, 2017., 25 pages.
Final Office Action received for U.S. Appl. No. 14/928,865, mailed on Dec. 5, 2018, 15 pages.
Final Office Action received for U.S. Appl. No. 16/454,884, mailed on Sep. 11, 2020, 28 pages.
Final Office Action received for U.S. Appl. No. 16/936,164, mailed on Jul. 6, 2022, 21 pages.
Final Office Action received for U.S. Appl. No. 17/885,807, mailed on Aug. 25, 2023, 36 pages.
International Preliminary Report on Patentability received for PCT Patent Application No. PCT/US2015/032305, mailed on Dec. 15, 2016, 8 pages.
International Preliminary Report on Patentability received for PCT Patent Application No. PCT/US2015/032309, mailed on Dec. 15, 2016, 8 pages.
International Preliminary Report on Patentability received for PCT Patent Application No. PCT/US2016/046828, mailed on Mar. 1, 2018, 19 pages.
International Preliminary Report on Patentability received for PCT Patent Application No. PCT/US2020/025682, mailed on Jan. 6, 2022, 9 pages.
International Search Report and Written Opinion received for PCT Patent Application No. PCT/US2015/032305, mailed on Sep. 10, 2015, 10 pages.
International Search Report and Written Opinion received for PCT Patent Application No. PCT/US2015/032309, mailed on Sep. 2, 2015, 10 pages.
International Search Report and Written Opinion received for PCT Patent Application No. PCT/US2016/046828, mailed on Dec. 15, 2016, 22 pages.
International Search Report and Written Opinion received for PCT Patent Application No. PCT/US2020/025682, mailed on Jul. 7, 2020, 13 pages.
Invitation to Pay Additional Fees received for PCT Patent Application No. PCT/US2016/046828, mailed on Sep. 23, 2016, 2 pages.
Minutes of Oral Proceedings received for European Patent Application No. 15728307.8, mailed on Dec. 13, 2019, 4 pages.
Minutes of Oral Proceedings received for European Patent Application No. 15728307.8, mailed on Nov. 11, 2022, 4 pages.
Minutes of Oral Proceedings received for European Patent Application No. 15729286.3, mailed on Dec. 13, 2019, 4 pages.
Minutes of the Oral Proceedings received for European Patent Application No. 15729286.3, mailed on Dec. 6, 2022, 5 pages.
Mobile How To, "How to Send a Picture Message/MMS—Samsung Galaxy Note 3", Online Available at: https://www.youtube.com/watch?v=-3d0z8-KeDw, Published on Nov. 3, 2013, 1 page.
Non-Final Office Action received for U.S. Appl. No. 14/503,386, mailed on Jan. 7, 2015, 19 pages.
Non-Final Office Action received for U.S. Appl. No. 14/503,355, mailed on Dec. 30, 2016, 23 pages.
Non-Final Office Action received for U.S. Appl. No. 14/503,355, mailed on Sep. 4, 2018, 25 pages.
Non-Final Office Action received for U.S. Appl. No. 14/503,376, mailed on Dec. 22, 2014, 21 pages.
Non-Final Office Action received for U.S. Appl. No. 14/928,865, mailed on Mar. 27, 2018, 15 pages.
Non-Final Office Action received for U.S. Appl. No. 15/142,661, mailed on Jan. 25, 2017, 29 pages.
Non-Final Office Action received for U.S. Appl. No. 15/366,763, mailed on Mar. 8, 2019, 14 pages.
Office Action received for U.S. Appl. No. 15/366,890, mailed on May 8, 2019, 16 pages.
Office Action received for U.S. Appl. No. 15/488,093, mailed on Oct. 4, 2019, 18 pages.
Office Action received for U.S. Appl. No. 15/985,570, mailed on Aug. 16, 2018, 23 pages.
Non-Final Office Action received for U.S. Appl. No. 16/454,884, mailed on Jan. 14, 2020, 41 pages.
Non-Final Office Action received for U.S. Appl. No. 16/737,044, mailed on Jan. 26, 2022, 16 pages.
Non-Final Office Action received for U.S. Appl. No. 16/936,164, mailed on Jan. 18, 2022, 18 pages.
Non-Final Office Action received for U.S. Appl. No. 17/885,807, mailed on May 12, 2023, 50 pages.
Non-Final Office Action received for U.S. Appl. No. 17/989,086, mailed on Apr. 12, 2023, 21 pages.
Norman Don, "Affordances and Design", Jng.org, Available at <http://jnd.org/dn.mss/affordances_and.html>, Jan. 14, 2006, 5 pages.
Notice of Acceptance received for Australian Patent Application No. 2015267259, mailed on Jan. 30, 2018., 3 pages.
Notice of Acceptance received for Australian Patent Application No. 2015267260, mailed on Jan. 30, 2018, 3 pages.
Notice of Acceptance received for Australian Patent Application No. 2018203215, mailed on Nov. 20, 2019, 3 pages.
Notice of Acceptance received for Australian Patent Application No. 2020201575, mailed on Mar. 15, 2021, 3 pages.
Notice of Acceptance received for Australian Patent Application No. 2021202815, mailed on Jun. 16, 2022, 3 pages.
Notice of Allowance received for Chinese Patent Application No. 201510290133.1, mailed on Jan. 9, 2019, 2 pages (1 page of English Translation and 1 page of Official copy).
Notice of Allowance received for Chinese Patent Application No. 201510291012.9, mailed on Jan. 9, 2019, 2 pages (1 page of English Translation and 1 page of Official Copy).

(56) References Cited

OTHER PUBLICATIONS

Notice of Allowance received for Chinese Patent Application No. 201520365358.4, mailed on Nov. 20, 2015, 4 pages (2 pages of English Translation and 2 pages of Official Copy).
Notice of Allowance received for Chinese Patent Application No. 201520365843.1, issued on Feb. 15, 2016, 5 pages (3 pages of English Translation and 2 pages of official Copy).
Notice of Allowance received for Chinese Patent Application No. 201580029071.7, mailed on Aug. 19, 2021, 5 pages (1 page of English Translation and 4 pages of Official Copy).
Notice of Allowance received for Chinese Patent Application No. 201710267617.3, mailed on May 8, 2021, 2 pages (1 page of English Translation and 1 page of Official Copy).
Notice of Allowance received for Japanese Patent Application No. 2017-514992, mailed on Feb. 15, 2019, 4 pages (1 page of English Translation and 3 pages of Official Copy).
Notice of Allowance received for Japanese Patent application No. 2017-514993, mailed on Jan. 12, 2018, 4 pages (1 page of English Translation and 3 pages of Official copy).
Notice of Allowance received for Japanese Patent Application No. 2018-018497, mailed on Jun. 21, 2019, 4 pages (1 page of English Translation and 3 pages of Official Copy).
Notice of Allowance received for Japanese Patent Application No. 2019-050138, mailed on Jun. 15, 2020, 5 pages (1 page of English Translation and 4 pages of Official Copy).
Notice of Allowance received for Japanese Patent Application No. 2020-118723, mailed on Oct. 16, 2020, 4 pages (1 page of English Translation and 3 pages of Official Copy).
Notice of Allowance received for Japanese Patent Application No. 2020-187397, mailed on Sep. 10, 2021, 4 pages (1 page of English Translation and 3 pages of Official Copy).
Notice of Allowance received for Japanese Patent Application No. 2021-166451, mailed on Jun. 5, 2023, 4 pages (1 pages of English Translation and 3 pages of Official Copy).
Notice of Allowance received for U.S. Appl. No. 12/789,440, mailed on Jan. 14, 2013, Jan. 14, 2013, 7 pages.
Notice of Allowance received for U.S. Appl. No. 12/789,440, mailed on Jun. 26, 2012, Jun. 26, 2012, 9 pages.
Notice of Allowance received for U.S. Appl. No. 14/503,376, mailed on Jul. 29, 2015, 13 pages.
Notice of Allowance received for U.S. Appl. No. 14/503,376, mailed on Sep. 2, 2015, 2 pages.
Notice of Allowance received for U.S. Appl. No. 14/503,376, mailed on Sep. 24, 2015, 5 pages.
Notice of Allowance received for U.S. Appl. No. 14/503,386, mailed on Jul. 30, 2015, 12 pages.
Notice of Allowance received for U.S. Appl. No. 14/503,386, mailed on Sep. 24, 2015, 5 pages.
Notice of Allowance received for U.S. Appl. No. 14/928,865, mailed on Apr. 3, 2019, 7 pages.
Notice of Allowance received for U.S. Appl. No. 14/928,865, mailed on Jul. 22, 2019, 7 pages.
Notice of Allowance received for U.S. Appl. No. 17/989,086, mailed on Feb. 15, 2018, 9 pages.
Notice of Allowance received for U.S. Appl. No. 17/989,086, mailed on Oct. 4, 2017, 22 pages.
Notice of Allowance received for U.S. Appl. No. 17/989,086, mailed on Oct. 8, 2019, 10 pages.
Notice of Allowance received for U.S. Appl. No. 17/989,086, mailed on Nov. 14, 2019, 9 pages.
Notice of Allowance received for U.S. Appl. No. 17/989,086, mailed on Apr. 22, 2020, 8 pages.
Notice of Allowance received for U.S. Appl. No. 17/989,086, mailed on May 4, 2018, 27 pages.
Notice of Allowance received for U.S. Appl. No. 17/989,086, mailed on Mar. 13, 2019, 22 pages.
Notice of Allowance received for U.S. Appl. No. 17/989,086, mailed on May 18, 2022, 9 pages.
Notice of Allowance received for U.S. Appl. No. 17/989,086, mailed on Jun. 13, 2022, 11 pages.
Notice of Allowance received for U.S. Appl. No. 16/936,164, mailed on Sep. 21, 2022, 9 pages.
Notice of Allowance received for U.S. Appl. No. 17/989,086, mailed on Jun. 9, 2023, 8 pages.
Office Action received for Australian Patent Application No. 2015100711, issued on Jul. 27, 2015, 7 pages.
Office Action Received for Australian Patent Application No. 2015100711, mailed on Nov. 19, 2015, 6 pages.
Office Action received for Australian Patent Application No. 2015267259, mailed on Jun. 2, 2017., 2 pages.
Office Action received for Australian Patent Application No. 2015267260, mailed on Jun. 2, 2017, 2 pages.
Office Action received for Australian Patent Application No. 2016102028, mailed on Feb. 13, 2017, 4 pages.
Office Action received for Australian Patent Application No. 2016102029, mailed on Feb. 22, 2017, 4 pages.
Office Action received for Australian Patent Application No. 2018203215, mailed on Mar. 29, 2019, 3 pages.
Office Action received for Australian Patent Application No. 2020201575, mailed on Dec. 22, 2020, 3 pages.
Office Action received for Australian Patent Application No. 2021202815, mailed on Apr. 11, 2022, 2 pages.
Office Action received for Chinese Patent Application No. 201510290133.1, mailed on Feb. 9, 2018, 10 pages (5 pages of English Translation and 5 pages of Official Copy).
Office Action Received for Chinese Patent Application No. 201510291012.9, mailed on Feb. 8, 2018, 10 pages (5 pages of English Translation and 5 pages of Official Copy).
Office Action received for Chinese Patent Application No. 201520365358.4, mailed on Aug. 11, 2015, 4 pages (2 pages of English Translation and 2 pages of Official Copy).
Office Action received for Chinese Patent Application No. 201520365843.1, mailed on Aug. 25, 2015, 4 pages (2 pages of English Translation and 2 pages of Official Copy).
Office Action Received for Chinese Patent Application No. 201520365843.1, mailed on Nov. 16, 2015, 3 pages (2 pages of English Translation and 1 page of Official Copy).
Office Action received for Chinese Patent Application No. 201580029071.7, mailed on Apr. 2, 2021, 19 pages (3 pages of English Translation and 16 pages of Official Copy).
Office Action received for Chinese Patent Application No. 201580029071.7, mailed on Apr. 9, 2020, 33 pages (9 pages of English Translation and 24 pages of Official Copy).
Office Action received for Chinese Patent Application No. 201580029071.7, mailed on Jul. 2, 2019, 29 pages (8 pages of English Translation and 21 pages of Official Copy).
Office Action received for Chinese Patent Application No. 201580029071.7, mailed on Oct. 29, 2020, 20 pages (5 pages of English Translation and 15 pages of Official Copy).
Office Action received for Chinese Patent Application No. 201620393549.6, mailed on Aug. 18, 2016, 2 pages (1 page of English Translation and 1 page of Official copy).
Office Action received for Chinese Patent Application No. 201620393549.6, mailed on Jan. 13, 2017, 2 Pages (Official Copy only) {(See Communication under Rule 37 CFR § 1.98(a) (3))}.
Office Action received for Chinese Patent Application No. 201620393748.7, mailed on Aug. 18, 2016, 2 pages (1 page of English Translation and 1 page of Official Copy).
Office Action received for Chinese Patent Application No. 201620393748.7, mailed on Jan. 13, 2017, 2 Pages (Official Copy only) {(See Communication under Rule 37 CFR § 1.98(a) (3))}.
Office Action received for Chinese Patent Application No. 201710267617.3, mailed on Apr. 17, 2020, 23 pages (7 pages of English Translation and 16 pages of Official Copy).
Office Action received for Chinese Patent Application No. 201710267617.3, mailed on Jul. 10, 2019, 18 pages (4 pages of English Translation and 14 pages of Official copy).
Office Action received for Chinese Patent Application No. 201710267617.3, mailed on Nov. 2, 2020, 6 pages (3 pages of English Translation and 3 pages of Official Copy).
Office Action received for European Patent Application No. 15729286.3, mailed on Feb. 7, 2018., 7 pages.

(56) References Cited

OTHER PUBLICATIONS

Office Action received for European Patent Application No. 15728307.8, mailed on Feb. 8, 2018, 7 pages.
Office Action received for European Patent Application No. 17167629.9, mailed on Jan. 25, 2019, 7 pages.
Office Action received for European Patent Application No. 20721052.7, mailed on Jul. 5, 2023, 5 pages.
Office Action received for Japanese Patent Application No. 2017-514992, mailed on Apr. 6, 2018, 11 pages (6 pages of English Translation and 5 Page of Official Copy).
Office Action received for Japanese Patent Application No. 2018-018497, mailed on Dec. 10, 2018, 8 pages (4 pages of English Translation and 4 pages of Official Copy).
Office Action received for Japanese Patent Application No. 2019-050138, mailed on Jan. 27, 2020, 9 pages (4 pages of English Translation and 5 pages of Official Copy).
Office Action received for Japanese Patent Application No. 2020-187397, mailed on Mar. 12, 2021, 8 pages (4 pages of English Translation and 4 pages of Official Copy).
Office Action received for Japanese Patent Application No. 2021-166451, mailed on Jan. 5, 2023, 6 pages (3 pages of English Translation and 3 pages of Official Copy).
Olson Parmy, "Delete by Default: Why More Snapchat-Like Messaging is on Its Way", Forbes.com, Available Online at https://www.forbes.com/sites/parmyolson/2013/11/22/delete-by-default-why-more-snapchat-like-messaging-is-on-its-way, Nov. 22, 2013, 6 pages.
Record of Oral Hearing received for U.S. Appl. No. 16/454,884, mailed on Feb. 14, 2022, 13 pages.
Result of Consultation received for European Patent Application No. 15728307.8, mailed on Nov. 21, 2019, 7 pages.
Result of Consultation received for European Patent Application No. 15729286.3, mailed on Nov. 21, 2019, 6 pages.
Result of Consultation received for European Patent Application No. 17167629.9, mailed on Nov. 10, 2020, 3 pages.
Softonic, "Beginners Guide to WhatsApp", Retrieved from the Internet: https://www.youtube.com/watch?v=1YN36kYDgrk, Apr. 29, 2013, 2 pages.
Summons to Attend Oral Proceedings received for European Patent Application No. 15728307.8, mailed on Jun. 28, 2019, 10 pages.
Summons to Attend Oral Proceedings received for European Patent Application No. 15728307.8, mailed on Mar. 7, 2022, 4 pages.
Summons to Attend Oral Proceedings received for European Patent Application No. 15729286.3, mailed on Jun. 27, 2019, 9 pages.
Summons to Attend Oral Proceedings received for European Patent Application No. 15729286.3, mailed on Mar. 10, 2022, 3 pages.
Summons to Attend Oral Proceedings received for European Patent Application No. 17167629.9, mailed on Jun. 3, 2020, 11 pages.
Supplemental Notice of Allowance received for U.S. Appl. No. 12/789,440, mailed on Apr. 23, 2013, 2 pages.
Symons Mick, "How to use the Compass on iPhone", Available online at : https://www.imore.com/compass-app, Sep. 1, 2016, 9 pages.
Techniqued, "How to Sent Voice Messages in WhatsApp", Published on YouTube.com, Available at: https://www.youtube.com/watch?v=mkJqYO984v0, Aug. 12, 2013, 1 page.
Wechat Philippines, "WeChat TVC—Hold to Talk", available at <https://www.youtube.com/watch?v=E_UxteOWVSo>, May 11, 2013, 1 page.
WeChat Wiki, available on <http://web.archive.org/web/20130514131044/http://wechat.wikia.com/wiki/WeChat_Wiki>, May 14, 2013, 12 pages.
You can use LINE perfectly if you just read this!!, How to use & set up LINE, LINE convenience book for 50 million people, Japan, El Publishing Co., Ltd., Mar. 10, 2014, pp. 16-55 (official copy only) {(See Communication under Rule 37 CFR § 1.98(a) (3))}.
Yundanfengqingdeqing,"A light cloud and light breeze; How to upload multiple pictures on Sina Weibo", Baidu Experience, Available Online at: <https://jingyan.baidu.com/article/6181c3e074ad0d152ff15353.html>, Jan. 13, 2014, 12 pages (6 pages of English Translation and 6 pages of Official Copy).
Notice of Allowance received for Chinese Patent Application No. 202411158521.X, mailed on Aug. 22, 2025, 2 pages (1 page of English Translation and 1 page of Official Copy).

* cited by examiner

Portable Multifunction Device 100

210

212

Speaker 111

Optical Sensor 164

Proximity Sensor 166

208

206

200

208

210 is SIM card slot
212 is headphone jack

202

Touch Screen 112

Contact Intensity Sensor(s) 165

Tactile Output Generator(s) 167

203

Microphone 113

Home 204

Accelerometer(s) 168

External Port 124

700

702
Without displaying a calculated route, concurrently displaying, via the display generation component:

704
One or more indications of a plurality of historic locations of the computer system.

706
An indication of a current location of the computer system.

708
An indication of a current location of the computer system.

Figure 9:
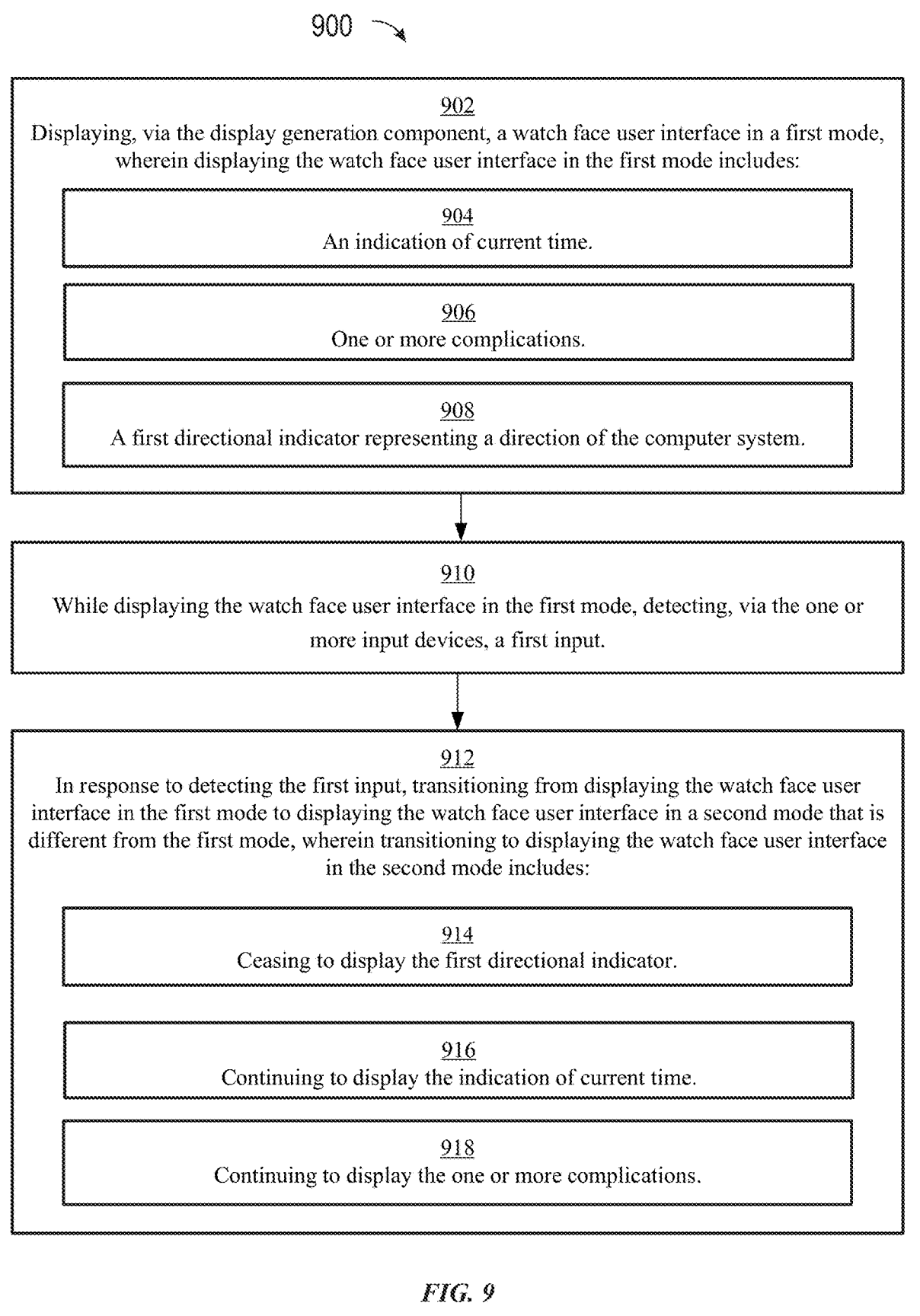

900

902
Displaying, via the display generation component, a watch face user interface in a first mode, wherein displaying the watch face user interface in the first mode includes:

904
An indication of current time.

906
One or more complications.

908
A first directional indicator representing a direction of the computer system.

910
While displaying the watch face user interface in the first mode, detecting, via the one or more input devices, a first input.

912
In response to detecting the first input, transitioning from displaying the watch face user interface in the first mode to displaying the watch face user interface in a second mode that is different from the first mode, wherein transitioning to displaying the watch face user interface in the second mode includes:

914
Ceasing to display the first directional indicator.

916
Continuing to display the indication of current time.

918
Continuing to display the one or more complications.

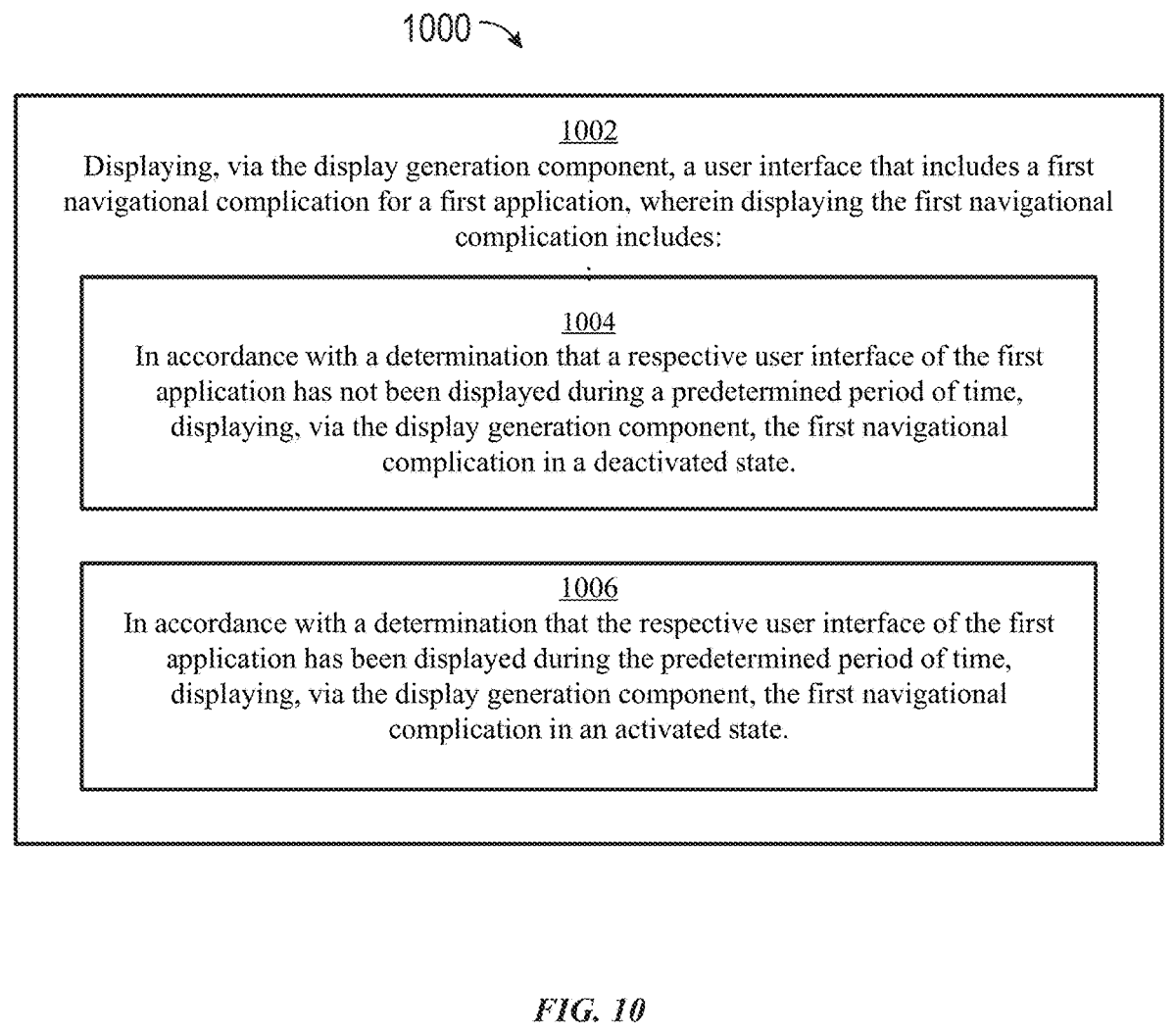

1002
Displaying, via the display generation component, a user interface that includes a first navigational complication for a first application, wherein displaying the first navigational complication includes:

1004
In accordance with a determination that a respective user interface of the first application has not been displayed during a predetermined period of time, displaying, via the display generation component, the first navigational complication in a deactivated state.

1006
In accordance with a determination that the respective user interface of the first application has been displayed during the predetermined period of time, displaying, via the display generation component, the first navigational complication in an activated state.

*FIG. 10*

NAVIGATIONAL USER INTERFACES

CROSS-REFERENCE TO RELATED APPLICATIONS

This application claims priority to U.S. Patent Application Ser. No. 63/470,374, entitled "NAVIGATIONAL USER INTERFACES," filed Jun. 1, 2023, and U.S. Patent Application Ser. No. 63/404,114, entitled "NAVIGATIONAL USER INTERFACES," filed Sep. 6, 2022. The contents of each of these applications are incorporated herein by reference in their entirety.

FIELD

The present disclosure relates generally to computer user interfaces, and more specifically to techniques for managing navigational user interfaces.

BACKGROUND

Devices optionally provide navigational information for a physical environment based on a location of the device.

BRIEF SUMMARY

Some techniques for managing navigational information using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing navigational information. Such methods and interfaces optionally complement or replace other methods for managing navigational user interfaces. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with a display generation component is described. The method comprises: without displaying a calculated route, concurrently displaying, via the display generation component: one or more indications of a plurality of historic locations of the computer system; an indication of a current location of the computer system; and an indication of a direction of the computer system, wherein displayed relationships among the one or more indications of the plurality of historic locations and the indication of the current location corresponds to geographical relationships among the plurality of historic locations and the current location of the computer system.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: without displaying a calculated route, concurrently displaying, via the display generation component: one or more indications of a plurality of historic locations of the computer system; an indication of a current location of the computer system; and an indication of a direction of the computer system, wherein displayed relationships among the one or more indications of the plurality of historic locations and the indication of the current location corresponds to geographical relationships among the plurality of historic locations and the current location of the computer system.

In accordance with some embodiments, a transitory computer-readable storage medium is described. The transitory computer-readable storage medium stores one or more programs configured to be executed by one or more processors of a computer system that is configured to communicate with a display generation component, the one or more programs including instructions for: without displaying a calculated route, concurrently displaying, via the display generation component: one or more indications of a plurality of historic locations of the computer system; an indication of a current location of the computer system; and an indication of a direction of the computer system, wherein displayed relationships among the one or more indications of the plurality of historic locations and the indication of the current location corresponds to geographical relationships among the plurality of historic locations and the current location of the computer system.

In accordance with some embodiments, a computer system that is configured to communicate with a display generation component is described. The computer system comprises: one or more processors; and memory storing one or more programs configured to be executed by the one or more processors, the one or more programs including instructions for: without displaying a calculated route, concurrently displaying, via the display generation component: one or more indications of a plurality of historic locations of the computer system; an indication of a current location of the computer system; and an indication of a direction of the computer system, wherein displayed relationships among the one or more indications of the plurality of historic locations and the indication of the current location corresponds to geographical relationships among the plurality of historic locations and the current location of the computer system.

In accordance with some embodiments, a computer system that is configured to communicate with a display generation component is described. The computer system comprises: means for, without displaying a calculated route, concurrently displaying, via the display generation component: one or more indications of a plurality of historic locations of the computer system; an indication of a current location of the computer system; and an indication of a direction of the computer system, wherein displayed relationships among the one or more indications of the plurality of historic locations and the indication of the current location corresponds to geographical relationships among the plurality of historic locations and the current location of the computer system.

In accordance with some embodiments, a computer program product is described. The computer program product comprises one or more programs configured to be executed by one or more processors of a computer system that is in communication with a display generation component and one or more input devices. The one or more programs include instructions for: without displaying a calculated route, concurrently displaying, via the display generation component: one or more indications of a plurality of historic locations of the computer system; an indication of a current location of the computer system; and an indication of a direction of the computer system, wherein displayed relationships among the one or more indications of the plurality of historic locations and the indication of the current location corresponds to geographical relationships among the plurality of historic locations and the current location of the computer system.

In accordance with some embodiments, a method performed at a computer system that is in communication with a display generation component and one or more input devices is described. The method comprises: displaying, via the display generation component, a watch face user interface in a first mode, wherein displaying the watch face user interface in the first mode includes: an indication of current time; one or more complications; and a first directional indicator representing a direction of the computer system; while displaying the watch face user interface in the first mode, detecting, via the one or more input devices, a first input; and in response to detecting the first input, transitioning from displaying the watch face user interface in the first mode to displaying the watch face user interface in a second mode that is different from the first mode, wherein transitioning to displaying the watch face user interface in the second mode includes: ceasing to display the first directional indicator; continuing to display the indication of current time; and continuing to display the one or more complications.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a watch face user interface in a first mode, wherein displaying the watch face user interface in the first mode includes: an indication of current time; one or more complications; and a first directional indicator representing a direction of the computer system; while displaying the watch face user interface in the first mode, detecting, via the one or more input devices, a first input; and in response to detecting the first input, transitioning from displaying the watch face user interface in the first mode to displaying the watch face user interface in a second mode that is different from the first mode, wherein transitioning to displaying the watch face user interface in the second mode includes: ceasing to display the first directional indicator; continuing to display the indication of current time; and continuing to display the one or more complications.

In accordance with some embodiments, a transitory computer-readable storage medium is described. The transitory computer-readable storage medium stores one or more programs configured to be executed by one or more processors of a computer system that is configured to communicate with a display generation component and one or more input devices, the one or more programs including instructions for: displaying, via the display generation component, a watch face user interface in a first mode, wherein displaying the watch face user interface in the first mode includes: an indication of current time; one or more complications; and a first directional indicator representing a direction of the computer system; while displaying the watch face user interface in the first mode, detecting, via the one or more input devices, a first input; and in response to detecting the first input, transitioning from displaying the watch face user interface in the first mode to displaying the watch face user interface in a second mode that is different from the first mode, wherein transitioning to displaying the watch face user interface in the second mode includes: ceasing to display the first directional indicator; continuing to display the indication of current time; and continuing to display the one or more complications.

In accordance with some embodiments, a computer system that is configured to communicate with a display generation component and one or more input devices is described. The computer system comprises: one or more processors; and memory storing one or more programs configured to be executed by the one or more processors, the one or more programs including instructions for: displaying, via the display generation component, a watch face user interface in a first mode, wherein displaying the watch face user interface in the first mode includes: an indication of current time; one or more complications; and a first directional indicator representing a direction of the computer system; while displaying the watch face user interface in the first mode, detecting, via the one or more input devices, a first input; and in response to detecting the first input, transitioning from displaying the watch face user interface in the first mode to displaying the watch face user interface in a second mode that is different from the first mode, wherein transitioning to displaying the watch face user interface in the second mode includes: ceasing to display the first directional indicator; continuing to display the indication of current time; and continuing to display the one or more complications.

In accordance with some embodiments, a computer system that is configured to communicate with a display generation component and one or more input devices is described. The computer system comprises: means for displaying, via the display generation component, a watch face user interface in a first mode, wherein displaying the watch face user interface in the first mode includes: an indication of current time; one or more complications; and a first directional indicator representing a direction of the computer system; means for, while displaying the watch face user interface in the first mode, detecting, via the one or more input devices, a first input; and means for, in response to detecting the first input, transitioning from displaying the watch face user interface in the first mode to displaying the watch face user interface in a second mode that is different from the first mode, wherein transitioning to displaying the watch face user interface in the second mode includes: ceasing to display the first directional indicator; continuing to display the indication of current time; and continuing to display the one or more complications.

In accordance with some embodiments, a computer program product is described. The computer program product comprises one or more programs configured to be executed by one or more processors of a computer system that is in communication with a display generation component and one or more input devices. The one or more programs include instructions for: displaying, via the display generation component, a watch face user interface in a first mode, wherein displaying the watch face user interface in the first mode includes: an indication of current time; one or more complications; and a first directional indicator representing a direction of the computer system; while displaying the watch face user interface in the first mode, detecting, via the one or more input devices, a first input; and in response to detecting the first input, transitioning from displaying the watch face user interface in the first mode to displaying the watch face user interface in a second mode that is different from the first mode, wherein transitioning to displaying the watch face user interface in the second mode includes:

ceasing to display the first directional indicator; continuing to display the indication of current time; and continuing to display the one or more complications.

In accordance with some embodiments, a method performed at a computer system that is in communication with a display generation component is described. The method comprises: displaying, via the display generation component, a user interface that includes a first navigational complication for a first application, wherein displaying the first navigational complication includes: in accordance with a determination that a respective user interface of the first application has not been displayed during a predetermined period of time, displaying, via the display generation component, the first navigational complication in a deactivated state; and in accordance with a determination that the respective user interface of the first application has been displayed during the predetermined period of time, displaying, via the display generation component, the first navigational complication in an activated state.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: displaying, via the display generation component, a user interface that includes a first navigational complication for a first application, wherein displaying the first navigational complication includes: in accordance with a determination that a respective user interface of the first application has not been displayed during a predetermined period of time, displaying, via the display generation component, the first navigational complication in a deactivated state; and in accordance with a determination that the respective user interface of the first application has been displayed during the predetermined period of time, displaying, via the display generation component, the first navigational complication in an activated state.

In accordance with some embodiments, a transitory computer-readable storage medium is described. The transitory computer-readable storage medium stores one or more programs configured to be executed by one or more processors of a computer system that is configured to communicate with a display generation component, the one or more programs including instructions for: displaying, via the display generation component, a user interface that includes a first navigational complication for a first application, wherein displaying the first navigational complication includes: in accordance with a determination that a respective user interface of the first application has not been displayed during a predetermined period of time, displaying, via the display generation component, the first navigational complication in a deactivated state; and in accordance with a determination that the respective user interface of the first application has been displayed during the predetermined period of time, displaying, via the display generation component, the first navigational complication in an activated state.

In accordance with some embodiments, a computer system that is configured to communicate with a display generation component is described. The computer system comprises: one or more processors; and memory storing one or more programs configured to be executed by the one or more processors, the one or more programs including instructions for: displaying, via the display generation component, a user interface that includes a first navigational complication for a first application, wherein displaying the first navigational complication includes: in accordance with a determination that a respective user interface of the first application has not been displayed during a predetermined period of time, displaying, via the display generation component, the first navigational complication in a deactivated state; and in accordance with a determination that the respective user interface of the first application has been displayed during the predetermined period of time, displaying, via the display generation component, the first navigational complication in an activated state.

In accordance with some embodiments, a computer system that is configured to communicate with a display generation component is described. The computer system comprises: means for displaying, via the display generation component, a user interface that includes a first navigational complication for a first application, wherein displaying the first navigational complication includes: in accordance with a determination that a respective user interface of the first application has not been displayed during a predetermined period of time, displaying, via the display generation component, the first navigational complication in a deactivated state; and in accordance with a determination that the respective user interface of the first application has been displayed during the predetermined period of time, displaying, via the display generation component, the first navigational complication in an activated state.

In accordance with some embodiments, a computer program product is described. The computer program product comprises one or more programs configured to be executed by one or more processors of a computer system that is in communication with a display generation component. The one or more programs include instructions for: displaying, via the display generation component, a user interface that includes a first navigational complication for a first application, wherein displaying the first navigational complication includes: in accordance with a determination that a respective user interface of the first application has not been displayed during a predetermined period of time, displaying, via the display generation component, the first navigational complication in a deactivated state; and in accordance with a determination that the respective user interface of the first application has been displayed during the predetermined period of time, displaying, via the display generation component, the first navigational complication in an activated state.

In accordance with some embodiments, a method is described. The method comprises: at a computer system that is in communication with a display generation component and one or more input devices: displaying, via the display generation component, a first view that concurrently includes one or more indications of one or more locations and an indication of a current location of the computer system, wherein displayed relationships in the first view among the one or more indications of the one or more locations and the indication of the current location correspond to distance relationships and relative position relationships among the one or more locations and the current location of the computer system without the displayed relationships in the first view corresponding to elevation relationships among the one or more locations and the current location of the computer system; while displaying the first view, detecting, via the one or more input devices, a first input; and in response to detecting the first input, transitioning from displaying the first view to displaying, via the display generation component, a second view that concurrently includes the one or more indications of the one or more locations and the indication of the current location of the computer system, wherein displayed relationships in the second view among the one or more indications of the one or more locations and the indication of the current location correspond to distance relationships, relative position relationships, and elevation relationships among the one or more locations and the current location of the computer system.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a first view that concurrently includes one or more indications of one or more locations and an indication of a current location of the computer system, wherein displayed relationships in the first view among the one or more indications of the one or more locations and the indication of the current location correspond to distance relationships and relative position relationships among the one or more locations and the current location of the computer system without the displayed relationships in the first view corresponding to elevation relationships among the one or more locations and the current location of the computer system; while displaying the first view, detecting, via the one or more input devices, a first input; and in response to detecting the first input, transitioning from displaying the first view to displaying, via the display generation component, a second view that concurrently includes the one or more indications of the one or more locations and the indication of the current location of the computer system, wherein displayed relationships in the second view among the one or more indications of the one or more locations and the indication of the current location correspond to distance relationships, relative position relationships, and elevation relationships among the one or more locations and the current location of the computer system.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: displaying, via the display generation component, a first view that concurrently includes one or more indications of one or more locations and an indication of a current location of the computer system, wherein displayed relationships in the first view among the one or more indications of the one or more locations and the indication of the current location correspond to distance relationships and relative position relationships among the one or more locations and the current location of the computer system without the displayed relationships in the first view corresponding to elevation relationships among the one or more locations and the current location of the computer system; while displaying the first view, detecting, via the one or more input devices, a first input; and in response to detecting the first input, transitioning from displaying the first view to displaying, via the display generation component, a second view that concurrently includes the one or more indications of the one or more locations and the indication of the current location of the computer system, wherein displayed relationships in the second view among the one or more indications of the one or more locations and the indication of the current location correspond to distance relationships, relative position relationships, and elevation relationships among the one or more locations and the current location of the computer system.

In accordance with some embodiments, a computer system is described. The computer system is configured to communicate with a display generation component and one or more input devices and comprises: one or more processors; and memory storing one or more programs configured to be executed by the one or more processors, the one or more programs including instructions for: displaying, via the display generation component, a first view that concurrently includes one or more indications of one or more locations and an indication of a current location of the computer system, wherein displayed relationships in the first view among the one or more indications of the one or more locations and the indication of the current location correspond to distance relationships and relative position relationships among the one or more locations and the current location of the computer system without the displayed relationships in the first view corresponding to elevation relationships among the one or more locations and the current location of the computer system; while displaying the first view, detecting, via the one or more input devices, a first input; and in response to detecting the first input, transitioning from displaying the first view to displaying, via the display generation component, a second view that concurrently includes the one or more indications of the one or more locations and the indication of the current location of the computer system, wherein displayed relationships in the second view among the one or more indications of the one or more locations and the indication of the current location correspond to distance relationships, relative position relationships, and elevation relationships among the one or more locations and the current location of the computer system.

In accordance with some embodiments, a computer system is described. The computer system is configured to communicate with a display generation component and one or more input devices and comprises: mean for displaying, via the display generation component, a first view that concurrently includes one or more indications of one or more locations and an indication of a current location of the computer system, wherein displayed relationships in the first view among the one or more indications of the one or more locations and the indication of the current location correspond to distance relationships and relative position relationships among the one or more locations and the current location of the computer system without the displayed relationships in the first view corresponding to elevation relationships among the one or more locations and the current location of the computer system; means, while displaying the first view, for detecting, via the one or more input devices, a first input; and means, responsive to detecting the first input, for transitioning from displaying the first view to displaying, via the display generation component, a second view that concurrently includes the one or more indications of the one or more locations and the indication of the current location of the computer system, wherein displayed relationships in the second view among the one or more indications of the one or more locations and the indication of the current location correspond to distance relationships, relative position relationships, and elevation relationships among the one or more locations and the current location of the computer system.

In accordance with some embodiments, a computer program product is described. The computer program product comprises one or more programs configured to be executed by one or more processors of a computer system that is in communication with a display generation component and one or more input devices, the one or more programs including instructions for: displaying, via the display generation component, a first view that concurrently includes one or more indications of one or more locations and an indication of a current location of the computer system, wherein displayed relationships in the first view among the one or more indications of the one or more locations and the indication of the current location correspond to distance relationships and relative position relationships among the one or more locations and the current location of the computer system without the displayed relationships in the first view corresponding to elevation relationships among the one or more locations and the current location of the computer system; while displaying the first view, detecting, via the one or more input devices, a first input; and in response to detecting the first input, transitioning from displaying the first view to displaying, via the display generation component, a second view that concurrently includes the one or more indications of the one or more locations and the indication of the current location of the computer system, wherein displayed relationships in the second view among the one or more indications of the one or more locations and the indication of the current location correspond to distance relationships, relative position relationships, and elevation relationships among the one or more locations and the current location of the computer system.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing navigational information, thereby increasing the effectiveness, efficiency, and user satisfaction with such devices. Such methods and interfaces may complement or replace other methods for managing navigational user interfaces.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 9 is a flow diagram illustrating methods of transitioning from displaying a watch face user interface in a first mode to displaying the watch face user interface in a second mode, in accordance with some embodiments.

FIG. 10 is a flow diagram illustrating methods of displaying a navigational complication for an application, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing navigational user interfaces. Location and direction information is optionally displayed differently based on the mode of the electronic device and in response to user input. Such techniques can reduce the cognitive burden on a user who manages navigational user interfaces, thereby enhancing productivity. Further, such techniques can reduce processor and battery power otherwise wasted on redundant user inputs.

Figures 6A, 6B, 6C:
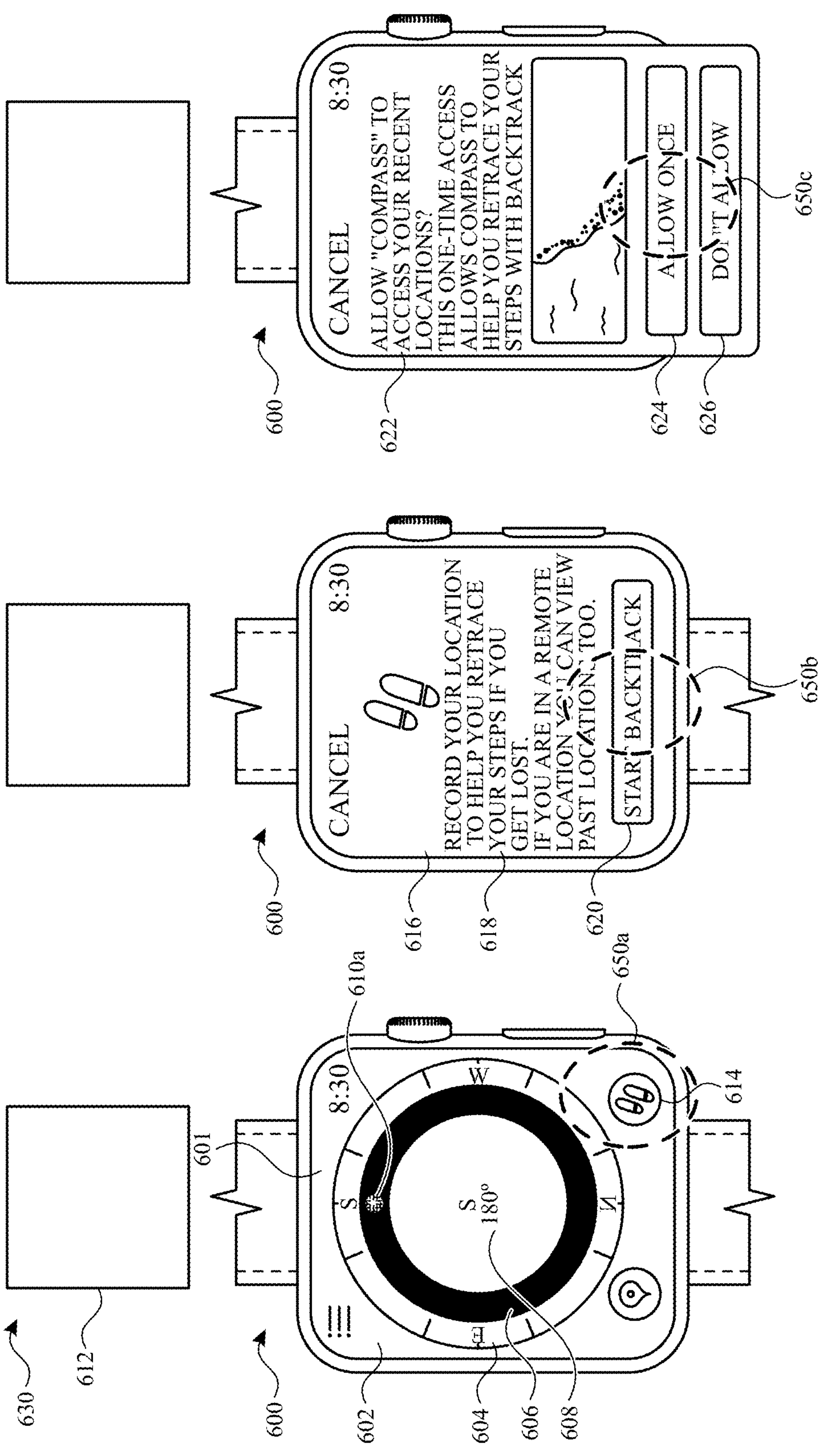
FIGS. 6A-6AA illustrate exemplary user interfaces for displaying indications of historic locations, in accordance with some embodiments.
Figure 7:
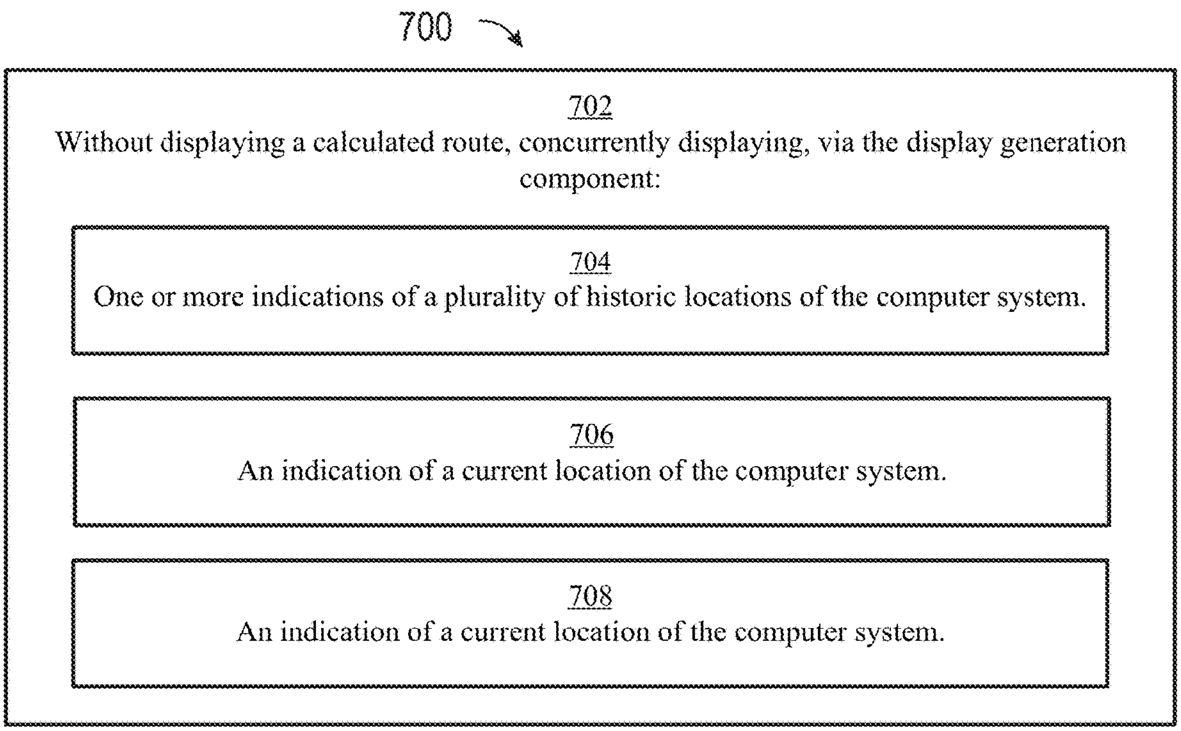
FIG. 7 is a flow diagram illustrating methods of displaying indications of historic locations, in accordance with some embodiments.
Figure 11A:
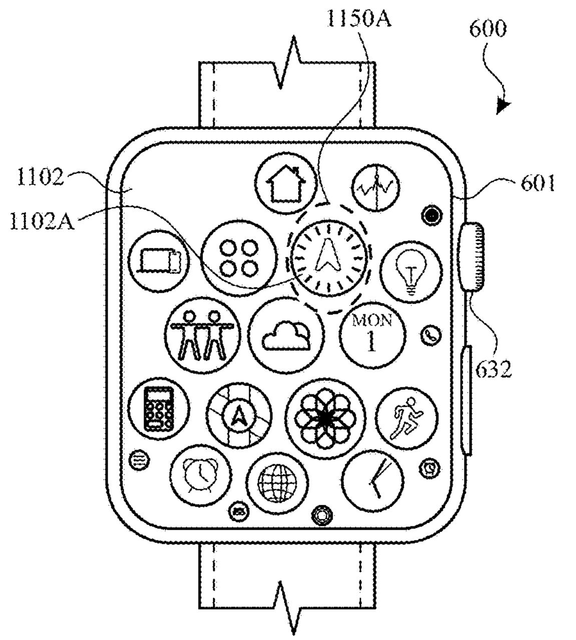
FIGS. 11A-11Q illustrate exemplary user interfaces for transitioning among different views of indications of locations, in accordance with some embodiments.
Figure 11Q:
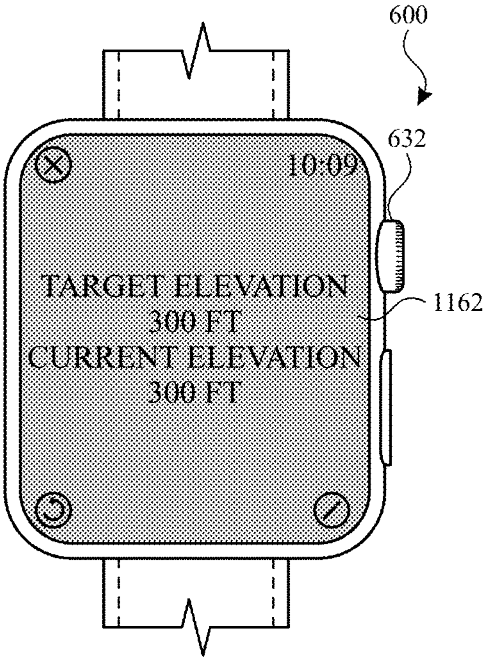
Figure 12:
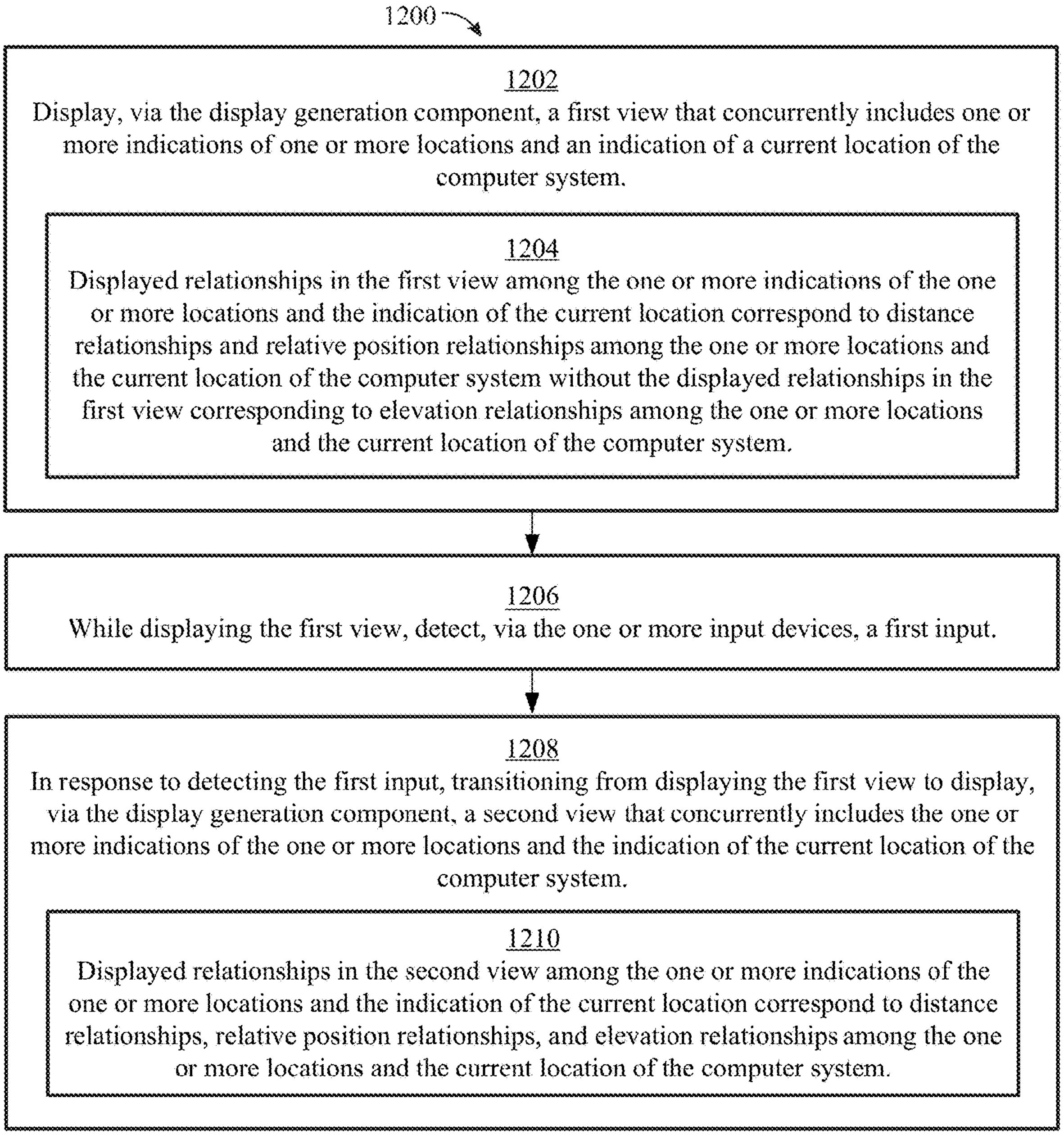
FIG. 12 is a flow diagram illustrating methods of transitioning among different views of indications of locations, in accordance with some embodiments.

Below, FIGS. 1A-1B, 2, 3, 4A-4B, and 5A-5B provide a description of exemplary devices for performing the techniques for managing navigational user interfaces. FIGS. 6A-6AA illustrate exemplary user interfaces for displaying indications of historic locations. FIG. 7 is a flow diagram illustrating methods of displaying indications of historic locations in accordance with some embodiments. The user interfaces in FIGS. 6A-6AA are used to illustrate the processes described below, including the processes in FIG. 7. FIGS. 8A-8U illustrate exemplary user interfaces for managing navigational information on a watch face user interface. FIG. 9 is a flow diagram illustrating methods of transitioning from displaying a watch face user interface in a first mode to displaying the watch face user interface in a second mode in accordance with some embodiments. FIG. 10 is a flow diagram illustrating methods of displaying a navigational complication for an application in accordance with some embodiments. The user interfaces in FIGS. 8A-8U are used to illustrate the processes described below, including the processes in FIGS. 9-10. FIGS. 11A-11Q illustrate exemplary user interfaces for transitioning among different views of indications of locations, in accordance with some embodiments. FIG. 12 is a flow diagram illustrating methods of transitioning among different views of indications of locations, in accordance with some embodiments. The user interfaces in FIGS. 11A-11Q are used to illustrate the processes described below, including the processes in FIG. 12.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, provide navigational information, display historic locations of an electronic device, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms “first,” “second,” etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms “a,” “an,” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

The term “if” is, optionally, construed to mean “when” or “upon” or “in response to determining” or “in response to detecting,” depending on the context. Similarly, the phrase “if it is determined” or “if [a stated condition or event] is detected” is, optionally, construed to mean “upon determining” or “in response to determining” or “upon detecting [the stated condition or event]” or “in response to detecting [the stated condition or event],” depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, “displaying” content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
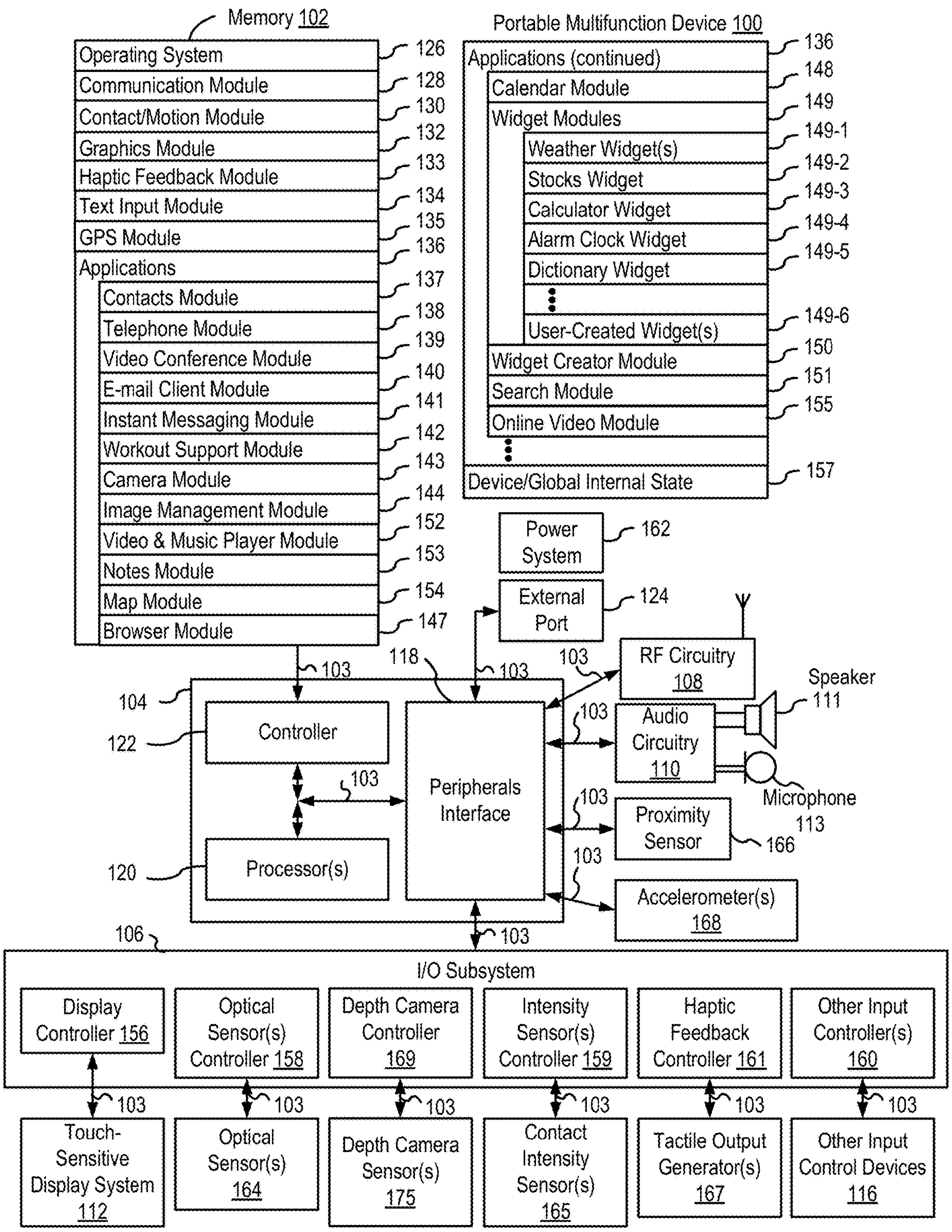
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture made using a portion of the user's body (e.g., a hand of the user) that is detected without the portion of the user's body touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
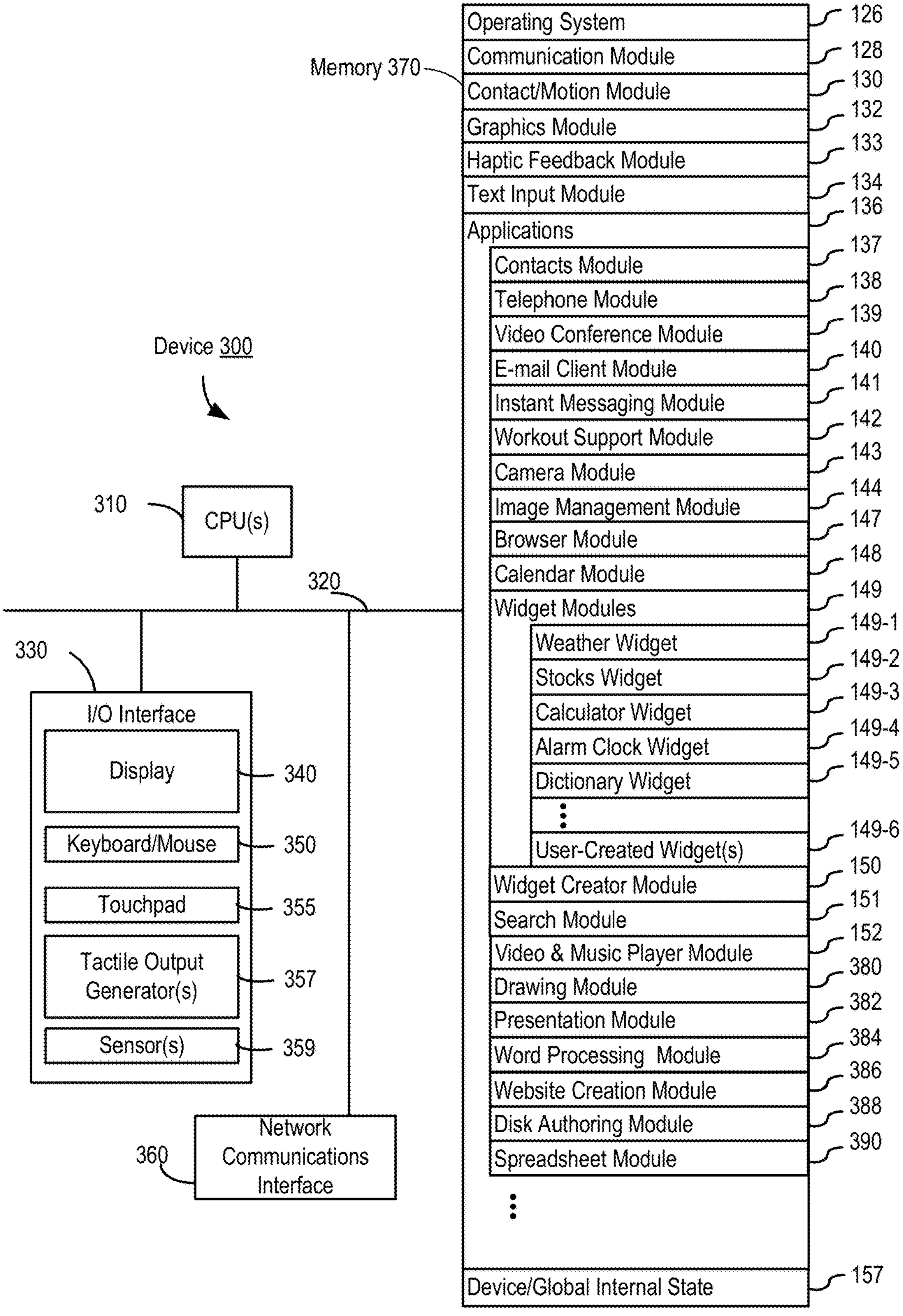
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6; Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
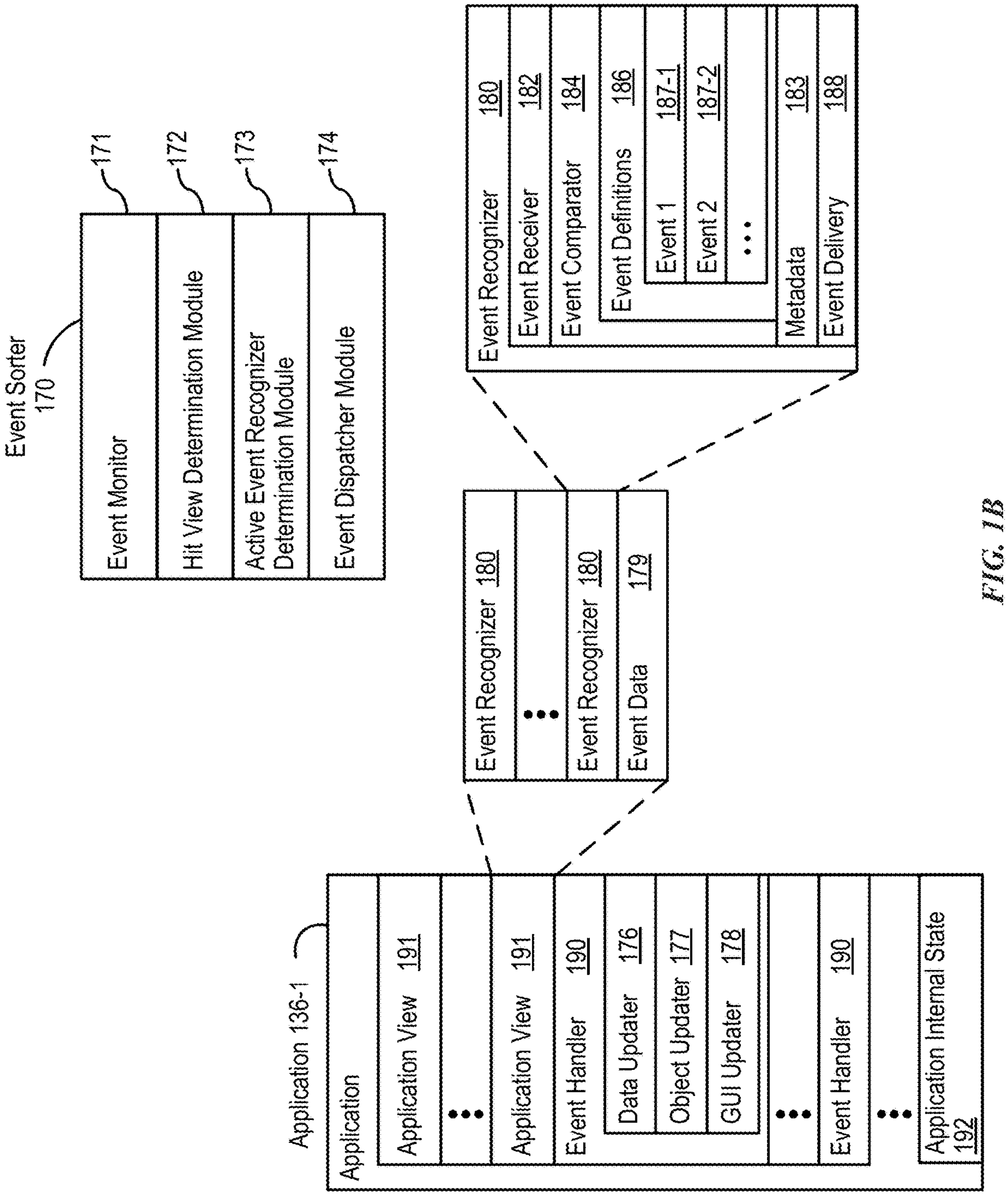
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
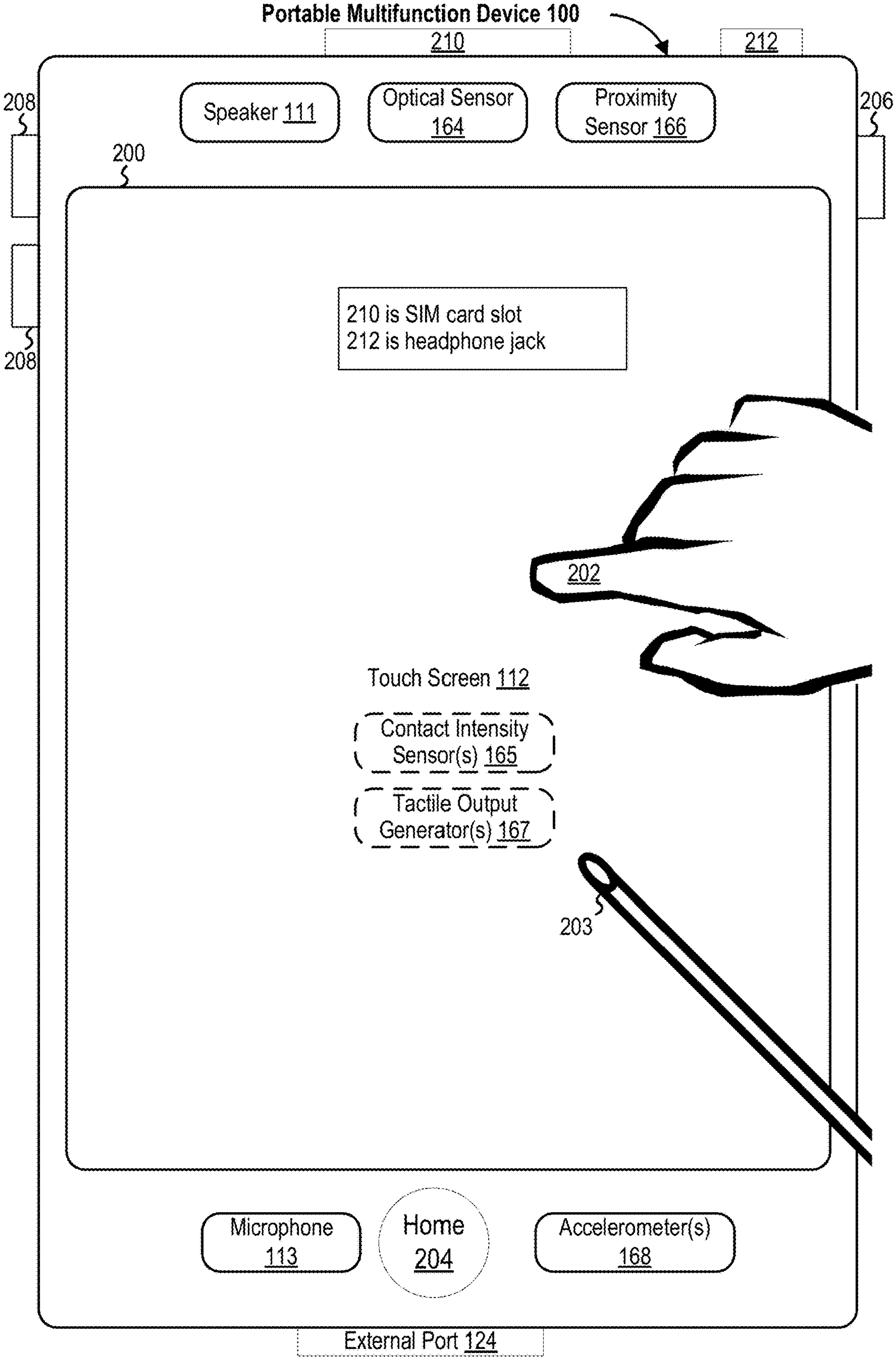
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
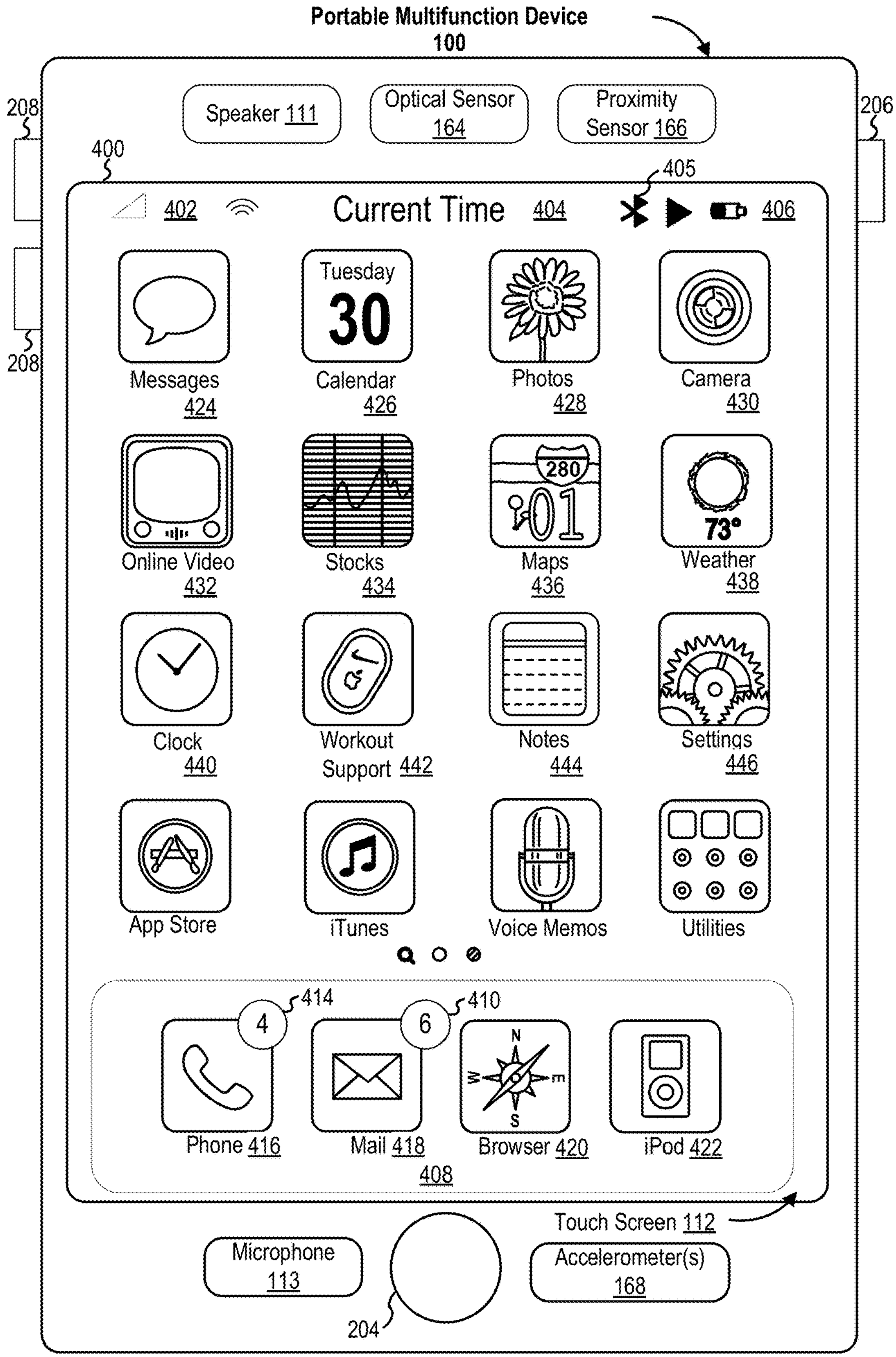
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
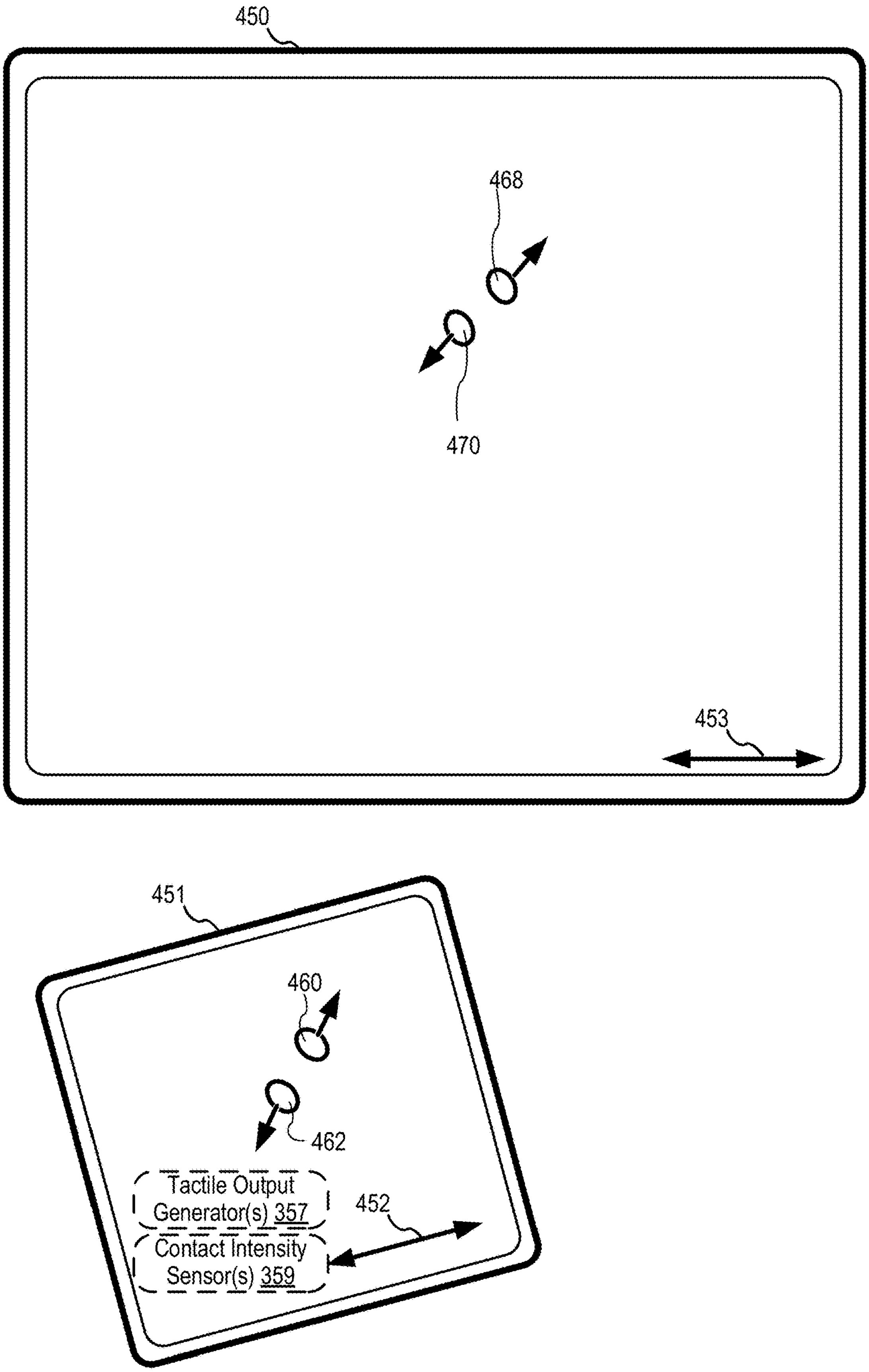
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
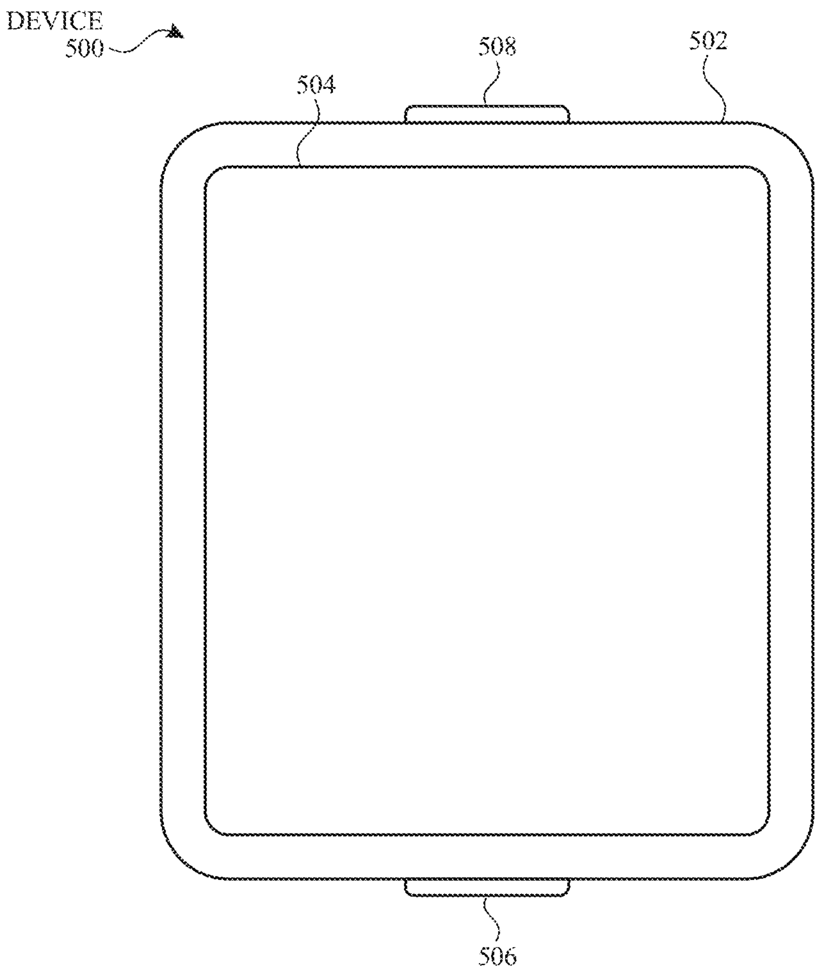
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive component 522, hereafter touch screen 522. Alternatively, or in addition to touch screen 522, device 500 has a display and a touch-sensitive surface. As with devices 100 and 300, in some embodiments, touch screen 522 (or the touch-sensitive surface) optionally includes one or more intensity sensors for detecting intensity of contacts (e.g., touches) being applied. The one or more intensity sensors of touch screen 522 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
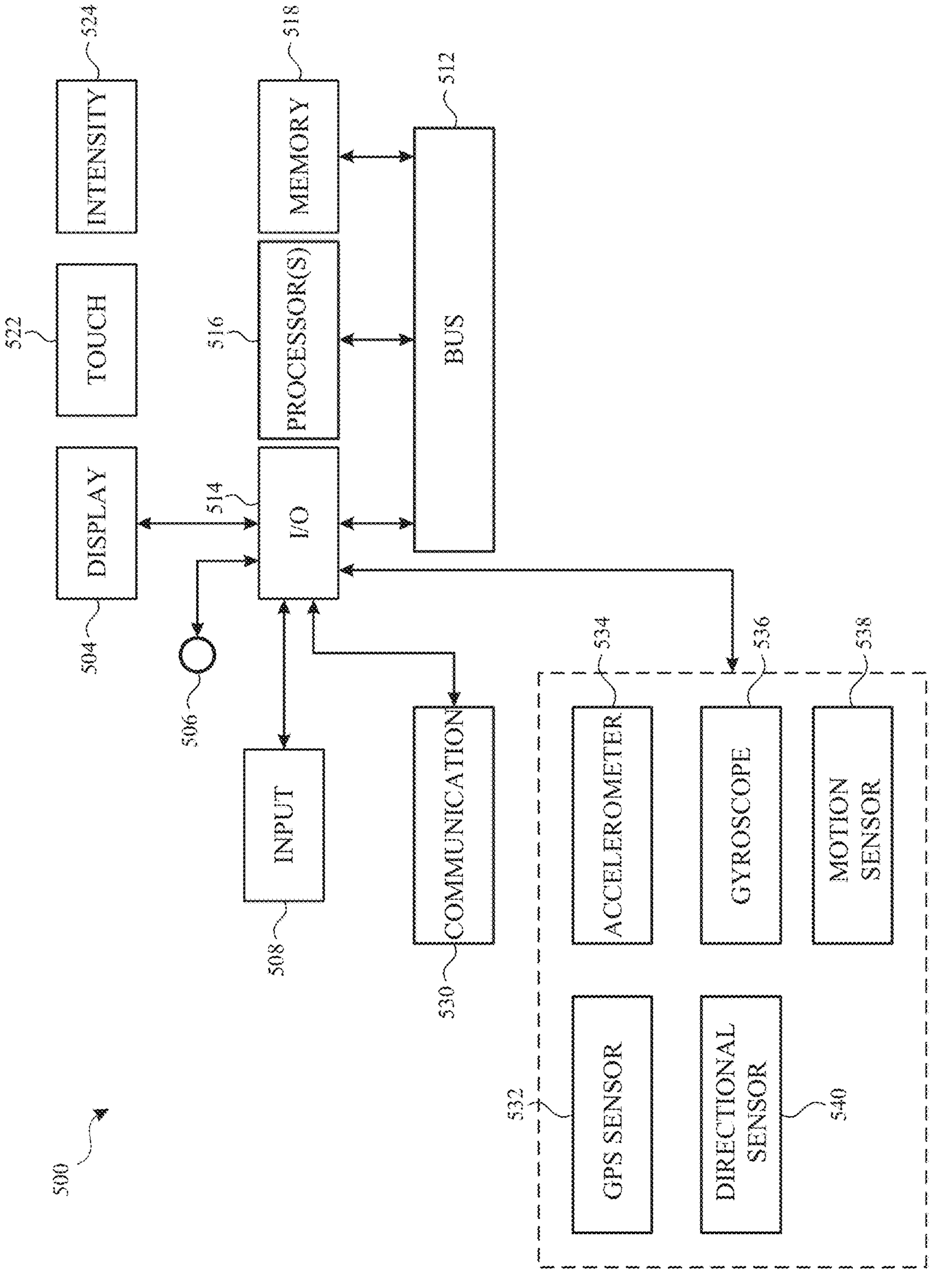
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 (FIG. 7), 900 (FIG. 9), 1000 (FIG. 10), and 1200 (FIG. 12). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UP") and associated processes that are implemented on an electronic device, such as portable multifunction device 100, device 300, or device 500.

FIGS. 6A-6AA illustrate exemplary user interfaces for displaying indications of historic locations, in accordance with some embodiments. The user interfaces in these figures are used to illustrate the processes described below, including the processes in FIG. 7.

At FIG. 6A, device 600 displays, on display 601, navigational user interface 602. Device 600 optionally includes one or more features of devices 100, 300, and/or 500. Navigational user interface 602 includes three regions, an outer compass region 604, a waypoint region 606, and an inner compass region 608. As depicted, outer compass region 604, waypoint region 606, and inner compass region 608 are concentric, circular regions. In some embodiments, outer compass region 604, waypoint region 606, and inner compass region 608 are circles and/or rings.

At FIG. 6A, outer compass region 604 and inner compass region 608 each include an indication of a current direction of device 600. Outer compass region 604 includes a compass dial that provides an indication of a current direction using cardinal directions (e.g., North, South, East, and West). Inner compass region 608 includes an indication of a current direction using a textual indication of direction (e.g., "S 180").

At FIG. 6A, waypoint region 606 includes an indication of waypoint 610*a*. Waypoint 610*a* corresponds to geographic coordinates for location 612 in environment 630. In some embodiments, a waypoint is a location that is of interest to a user of the device, such as location of a lake or a campsite. In some embodiments, location 612 corresponds to a parked car. Device 600 displays waypoint 610*a* based on a location (or direction) of device 600 and coordinates associated with location 612. As depicted, waypoint 610*a* is displayed at the top of waypoint region 606 to indication that the top of device 600 (e.g., the top of display 601) is facing location 612. In some embodiments, as the orientation of device 600 changes (e.g., rotates or angular movement), waypoint 610*a* moves circumferentially around waypoint region 606 based on the change in orientation. In some embodiments, while displaying navigational user interface 602 of FIG. 6A, as device 600 moves closer to (or further from) location 612, the radius of waypoint 610*a* (e.g., a distance from waypoint 610*a* to a predefined location on the display) is maintained (e.g., with respect to a center of waypoint region 606). However, while in other modes of navigational user interface 602 (e.g., navigational user interface 602 of FIGS. 6E-6G), device 600 optionally modifies the radius of waypoint 610*a* in response to device 600 moving closer to (or further from) location 612.

At FIG. 6A, navigational user interface 602 includes backtrack affordance 614. Backtrack affordance 614 allows for enabling and/or disabling a backtracking mode of device 600. In some embodiments, the backtracking mode allows a user to view a representation of the user's historic path so as not get lost. As depicted, backtrack affordance 614 has a first visual appearance (e.g., color and/or size) that indicates that backtracking is disabled (e.g., deactivated). As such, navigational user interface 602 does not include an indication of a previous location of device 600. In some embodiments, enabling the backtracking mode causes device 600 to display an indication of a historic location indicator of device 600, such as historic location indicator 628. In some embodiments, disabling the backtracking mode causes device 600 to not display the indication of a historic location of device 600. In some embodiments, enabling the backtracking mode causes device 600 to detect location information (e.g., using GPS sensors and/or accelerometers) associated with historic location indicator 628. In some embodiments, disabling the backtracking mode causes device 600 to not detect location information (e.g., using GPS sensors and/or accelerometers) associated with historic location indicator 628. As described in greater detail herein, device 600 optionally transitions from the backtracking mode to a retracing mode in which device 600 displays historic location indicator 628. In some embodiments, while in retracing mode, device 600 does not add (e.g., suspends adding) additional historic locations to historic location indicator 628 (e.g., so as to allow a user to retrace his or her steps if the user is lost).

At FIG. 6A, while displaying navigational user interface 602, device 600 detects input 650*a* (e.g., a touch input, air gesture, and/or other input) directed at backtrack affordance 614. In response to detecting input 650*a*, device 600 displays start backtracking interface 616, as depicted in FIG. 6B. In some embodiments, device 600 does not display start backtracking interface 616 of FIG. 6B in response to detecting input 650*a*. In some embodiments, in response to detecting input 650*a*, device 600 activates the backtracking mode without displaying backtracking interface 616. In some embodiments, device 600 conditionally displays start backtracking interface 616, as depicted in FIG. 6B. For example, in some embodiments, device 600 displays start backtracking interface 616 based on criteria being satisfied (e.g., a user has not previously launched backtracking and/or a user has not previously launch backtracking in the last month).

At FIG. 6A, in some embodiments, device 600 automatically activates the backtracking mode (e.g., and/or automatically stores location information) in response to an event and/or in response to a set of one or more criteria being satisfied. In some embodiments, the set of one or more criteria includes a location criterion (e.g., the user is in the wilderness and/or outside of a populated area). In some embodiments, the set of one or more criteria includes a wireless signal criterion (e.g., a Bluetooth wireless connection with a vehicle system is no longer detected and/or one or more local area networks are no longer detected). In some embodiments, the set of one or more criteria includes a movement criterion (e.g., a movement corresponding to a particular gesture and/or a movement corresponding an indication that a user has begun hiking). Accordingly, device 600 optionally provides backtrack instructions (e.g., historic location indicator 628) for a user to return to a starting location even when the user did not explicitly provide a request to begin the backtracking mode (e.g., and/or store location data).

At FIG. 6A, in some embodiments, device 600 automatically activates the backtracking mode in response to detecting that device 600 is not in a populated area, such as a city or town (e.g., by detecting an absence, reduced presence, and/or less than a threshold amount of certain wireless signals and/or by detecting a current location of the device). Accordingly, the backtracking mode allows a user to retrace their path to return to a populated area. In some embodiments, device 600 automatically activates the backtracking mode in response to detecting that a vehicle has been parked (e.g., by detecting an absence of certain wireless signals (e.g., a disconnect of a Bluetooth signal associated with the vehicle) and/or by detecting the vehicle has been placed in park). Accordingly, the backtracking mode allows a user to retrace their path to return to a starting location (e.g., his or her parked car). In some embodiments, device 600 automatically activates the backtracking mode in response to detecting a particular gesture (such as a handwave and/or a pointing gesture). In some embodiments, waypoint 610*a* is automatically displayed in response to a trigger (e.g., when a user parks his or her car, when a user starts a hiking exercise on the electronic device, and/or when the electronic device detects a hiking exercise being done by the user).

At FIG. 6B, start backtracking interface 616 includes information 618 about a backtracking function and start backtracking affordance 620. At FIG. 6B, while displaying start backtracking interface 616, device 600 detects input 650*b* (e.g., a touch input, air gesture, and/or other such input) directed at start backtracking affordance 620. In response to detecting input 650*b*, device 600 displays location access interface 622, as depicted in FIG. 6C. In some embodiments, device 600 does not display location access interface 622 of FIG. 6C in response to detecting input 650*b*. In some embodiments, device 600 activates the backtracking mode in response to detecting input 650*b*. In some embodiments, device 600 conditionally displays location access interface 622 of FIG. 6C. For example, in some embodiments, device 600 displays location access interface 622 based on criteria being satisfied (e.g., a user has not previously granted access for location tracking and/or a user has not previously granted access for location tracking in the last month).

At FIG. 6C, location access interface 622 includes information regarding granting permission for device 600 or an application operating on device 600 (e.g., a compass application and/or a navigational application) to access and/or store location data. As depicted, location access interface 622 includes allow affordance 624 to allow device 600 or an application operating on device 600 (e.g., a compass application and/or a navigational application) to access and/store location data. Location access interface 622 includes don't allow affordance 626 to not allow device 600 or an application (e.g., a compass application and/or a navigational application) operating on device 600 to access and/store location data.

At FIG. 6C, while displaying location access interface 622, device 600 detects input 650*c* (e.g., a touch input, gesture, and/or other input) directed at allow affordance 624. In response to detecting input 650*c*, the backtracking mode is enabled on device 600 such that device 600 will display an indication of a saved location of device 600, such as historic location indicator 628 of navigational user interface 602 as depicted in FIG. 6D.

Figure 6E:
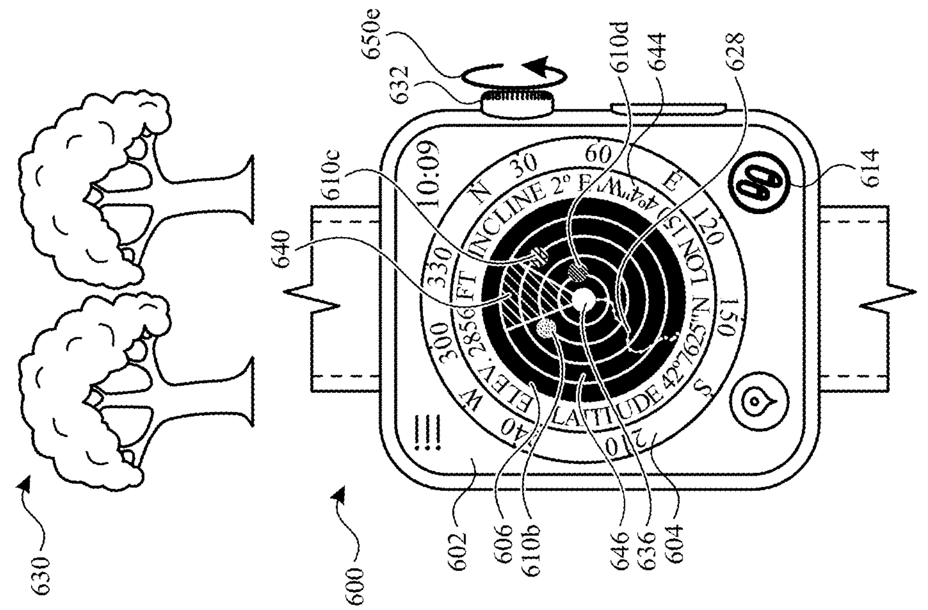
Figure 6D:
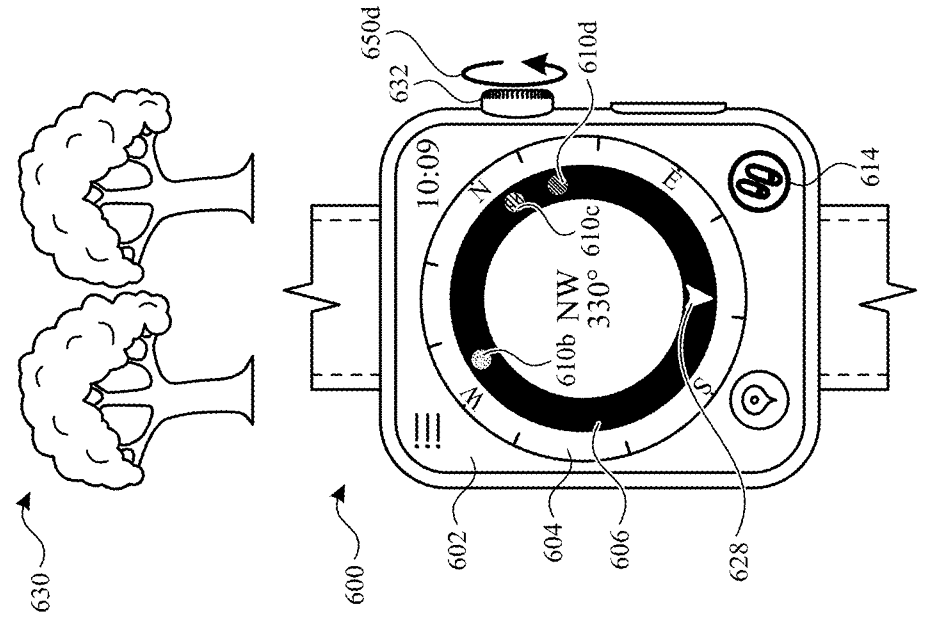

At FIG. 6D, device 600 has moved to a new location as compared to location of device 600 of FIG. 6C, as depicted by the trees in environment 630. At FIG. 6D, navigational user interface 602 is similar to navigational user interface 602 of FIG. 6A but having a different state. For example, the backtracking mode is enabled and device 600 displays historic location indicator 628 in waypoint region 606. Navigational user interface 602 of FIG. 6D also includes waypoints 610*b*, 610*c*, and 610*d* having different visual appearances (e.g., shape, size, and/or color). In some embodiments, waypoints 610*b*, 610*c*, and 610*d* have visual appearances (e.g., shape, size, and/or color) that are user-configurable (e.g., via waypoint editor interface 680 of FIG. 6O).

At FIG. 6D, in some embodiments, historic location indicator 628 corresponds to a historic location data that is captured by device 600. In some embodiments, historic location indicator 628 corresponds to data that is stored only while a backtracking mode is enabled (e.g., and/or in response to an input to enable the backtracking modes, such as 650*a*, 650*b*, and/or 650*c*). In some embodiments, historic location indicator 628 does not correspond to a geographic location that was stored prior to enabling the backtracking mode. In some embodiments, historic location indicator 628 moves as device 600 moves and/or rotates in a similar manner as what is described with respect to waypoint 610*a* of FIG. 6A. As depicted, device 600 displays historic location indicator 628 as having a visual appearance (e.g., shape, size, and/or color) that is different from waypoints 610*b*, 610*c*, and 610*d*. In some embodiments, backtrack affordance 614 has a visual appearance (e.g., shape, size, and/or color) that is different from backtrack affordance 614 of FIG. 6A. In some embodiments, backtrack affordance 614 of FIG. 6D is animated (e.g., feet walking and/or moving) when the backtracking mode is enabled. In some embodiments, waypoint region 606 of FIG. 6D does not provide an indication of a distance to a particular waypoint in relation to device 600. For example, as depicted in FIG. 6D, waypoints 610*b*, 610*c*, 610*d* are displayed as having the same distance (e.g., radius) from a center of waypoint region 606 despite being associated with waypoints that are at different distances from device 600, as depicted in FIG. 6E. In some embodiments, historic location data is deleted. In some embodiments, device 600 restricts the backtracking mode in a particular area (e.g., within city limits and/or in populated areas). For example, device 600 optionally does not provide an option to enable the backtracking mode in particular areas (e.g., by detecting a presence, increased presence, and/or greater than a threshold amount of certain wireless signals and/or by detecting a current location of the device).

At FIG. 6D, while displaying navigational user interface 602, device 600 detects input 650*d* (e.g., a rotational input on rotational element 632, gesture, and/or a touch input on a touch-sensitive display, such as a pinch and/or de-pinch) corresponding to a request to display a different navigational user interface. In response to detecting input 650*d*, device 600 displays navigational user interface 602, as depicted in FIG. 6E.

At FIG. 6E, device 600 has updated waypoint region 606 of FIG. 6D as compared to waypoint region 606 of FIG. 6B. At FIG. 6E, waypoint region 606 has been expanded as compared to waypoint region 606 of FIG. 6B. As depicted, waypoint region 606 of FIG. 6E provides a representation of a distance of particular waypoints in relation to a center of waypoint region 606. For example, waypoint 610*c* is displayed further from a center of waypoint region 606 as compared to waypoint 610*d*. Waypoint region 606 of FIG. 6E also includes device indicator 636, which is represented by a circle at the center of waypoint region 606. In some embodiments, waypoint region 606 does not include device indicator 636.

At FIG. 6E, waypoint region 606 includes distance indicators 646 of concentric circles. Distance indicators 646 optionally represent a physical distance or measurement of distance (e.g., a first concentric circle represents 10 meters from device 600 while the second concentric circle represents 20 meters from device 600). In some embodiments, waypoint region 606 does not include a topography, as depicted in FIG. 6E. In some embodiments, waypoint region 606 includes a topography, as depicted in FIG. 6E. In some embodiments, waypoint region 606 includes a three-dimensional topography. For example, waypoint region 606 optionally includes different three-dimensional graphical objects and/or visual relationships to depict different heights of a topography.

At FIG. 6E, based on movement of device 600 (e.g., the user carrying device 600 hiking through an area) device 600 has updated historic location indicator 628 of FIG. 6E as compared to historic location indicator 628 of FIG. 6D. As depicted, historic location indicator 628 of 6E has been expanded, which provides an indication of how device 600 has moved over time. Historic location indicator 628 of FIG. 6E includes dots connected by a line, but any symbols, shapes, graphical elements, and lines (including a dashed line) are optionally used to indicate how device 600 has moved over time. In some embodiments, one graphical element (e.g., the dots of 628 of FIG. 6E) represents a location that is determined based one type of sensor data (e.g., data from satellite positioning sensors). In some embodiments, a different graphical element (e.g., the line of 628 connecting the dots of 628 of FIG. 6E) represents locations that are determined based on a different type of sensor data (e.g., data from accelerometers and/or gyroscopes without data from satellite positioning sensors). Because satellite positioning sensors typically drain battery life, device 600 optionally relies on other sensors (e.g., accelerometers and/or gyroscopes) to display and/or update historic location indicator 628. As such, different graphical elements may indicate which sensor is used to determine a historic location. In some embodiments, a portion of historic location indicator 628 gradually fades over time, which optionally indicates how long it has been since the device has been at a location corresponding to that particular portion of the historic location indicator 628. In some embodiments, device 600 displays historic location indicator 628 when the backtracking function is activated. In some embodiments, device 600 does not display historic location indicator 628 when the backtracking mode is deactivated. In some embodiments, historic location indicator 628 includes a 3D representation (e.g., a 3D effect). For example, historic location indicator 628 includes different three-dimensional relationships and/or graphical objects to depict different heights that device 600 has been. In some embodiments, in response to an input corresponding to a request to display turn-by-turn directions to return to a historic location, device 600 displays turn-by-turn directions to follow the historic locations of device 600 back to a particular historic location (e.g., an original location such as when the backtracking mode was enabled).

At FIG. 6E, device 600 displays direction indicator 640 to indicate which direction device 600 is facing. As depicted, direction indicator 640 has a cone shape that extends away from device indicator 636. In some embodiments, direction indicator 640 has a visual characteristic that is different from waypoint region 606 (e.g., direction indicator 640 has a different color and/or emphasis than waypoint region 606).

At FIG. 6E, as device 600 rotates and/or moves, device 600 updates a position of one or more graphical elements in waypoint region 606 (e.g., direction indicator 640, waypoints 610*b*, 610*c*, and 610*d*, historic location indicator 628, distance indicators 646, and/or device indicator 636). In some embodiments, device 600 maintains the position of direction indicator 640 while modifying (e.g., shifting, rotating, and/or moving) the position of other elements (e.g., historic location indicator 628 and/or waypoints 610*b*, 610*c*, 610*d*). In some embodiments, device 600 maintains the position of historic location indicator 628 and/or waypoints 610*b*, 610*c*, 610*d*, while modifying the position of direction indicator 640. Turning briefly to FIG. 6D, direction indicator 640 is optionally displayed in waypoint region 606 of FIG. 6D. In such embodiments, direction indicator 640 is depicted as an arc along a portion of waypoint region 606 (e.g., a top portion of waypoint region 606) as opposed to a cone, as depicted in FIG. 6E.

At FIG. 6E, device 600 updates navigational user interface 602 to include additional navigational information that is not included in navigational user interface 602 of FIG. 6D. As depicted, navigational user interface 602 includes middle region 644 that includes an indication of latitude, longitude, and elevation of device 600. Device 600 also updates outer compass region 604 to include directional information in degrees (e.g., 30°, 90°, 120°, 150°, 210°, 240°, 300°, and/or 330°). In some embodiments, device 600 rotates outer compass region 604 to indicate a current direction of device 600.

In some embodiments, device 600 displays an animated transition between navigational user interface 602 of FIG. 6D and navigational user interface 602 of FIG. 6E. For example, device 600 displays a series of states between navigational user interface 602 of FIG. 6D and navigational user interface 602 of FIG. 6E. In some embodiments, the animated transition includes gradually modifying (e.g., shifting, expanding, shrinking, adding, and/or removing) interface elements of navigational user interface 602 in response to detecting input 650*d* (and/or based on a magnitude of an input 650*d*). For example, in response to (and/or in conjunction with) detecting input 650*d*, device 600 gradually modifies (e.g., shifts, expands, shrinks, adds, and/or removes) graphical elements of navigational user interface 602 of FIG. 6D until graphical elements of navigational user interface 602 of FIG. 6E are displayed (e.g., the more rotational input, the more modification towards the user interface of FIG. 6E).

In some embodiments, device 600 gradually modifies waypoint region 606 in response to detecting input 650*d*. In such embodiments, waypoint region 606 gradually expands inwardly in response to device 600 detecting input 650*d*. In some embodiments, device 600 gradually updates the position of waypoints 610*b*, 610*c*, and 610*d* in waypoint region 606 as device 600 detects input 650*d* (and/or while waypoint region 606 gradually expands). In some embodiments, device 600 gradually moves waypoints 610*b*, 610*c*, and 610*d* closer to (or, optionally, further from) the center of waypoint region 606. In some embodiments, in response to detecting input 650*d*, device 600 gradually shifts a position of one waypoint (e.g., waypoint 610*b*) in one direction (e.g., left, right, up, down, inward, and/or outward) while gradually shifting a position of a different waypoint (e.g., waypoint 610*c*) in a different direction (e.g., left, right, up, down, inward, and/or outward), where directionality is optionally determined with respect to the center of waypoint region 606 and/or device indicator 636.

At FIG. 6E, while displaying navigational user interface 602, device 600 detects input 650*e* (e.g., a rotational input on rotational element 632 and/or a touch input on a touch-sensitive display, such as a pinch and/or de-pinch) corresponding to a request to display a different mode of a navigational user interface. In some embodiments, input 650*e* is a continuation of input 650*d* (e.g., input 650*d* is a first portion of a rotation and/or pinch while 650*e* is a second portion of the same rotation and/or pinch). In some embodiments, input 650*e* is independent of input 650*d* (e.g., input 650*d* is a first rotation and/or first pinch while 650*e* is a second rotation and/or second pinch). As depicted, input 650*e* is in the same direction (e.g., counter-clockwise) as input 650*d*. In response to detecting input 650*e*, device 600 displays navigational user interface 602, as depicted in FIG. 6F.

Figure 6F:
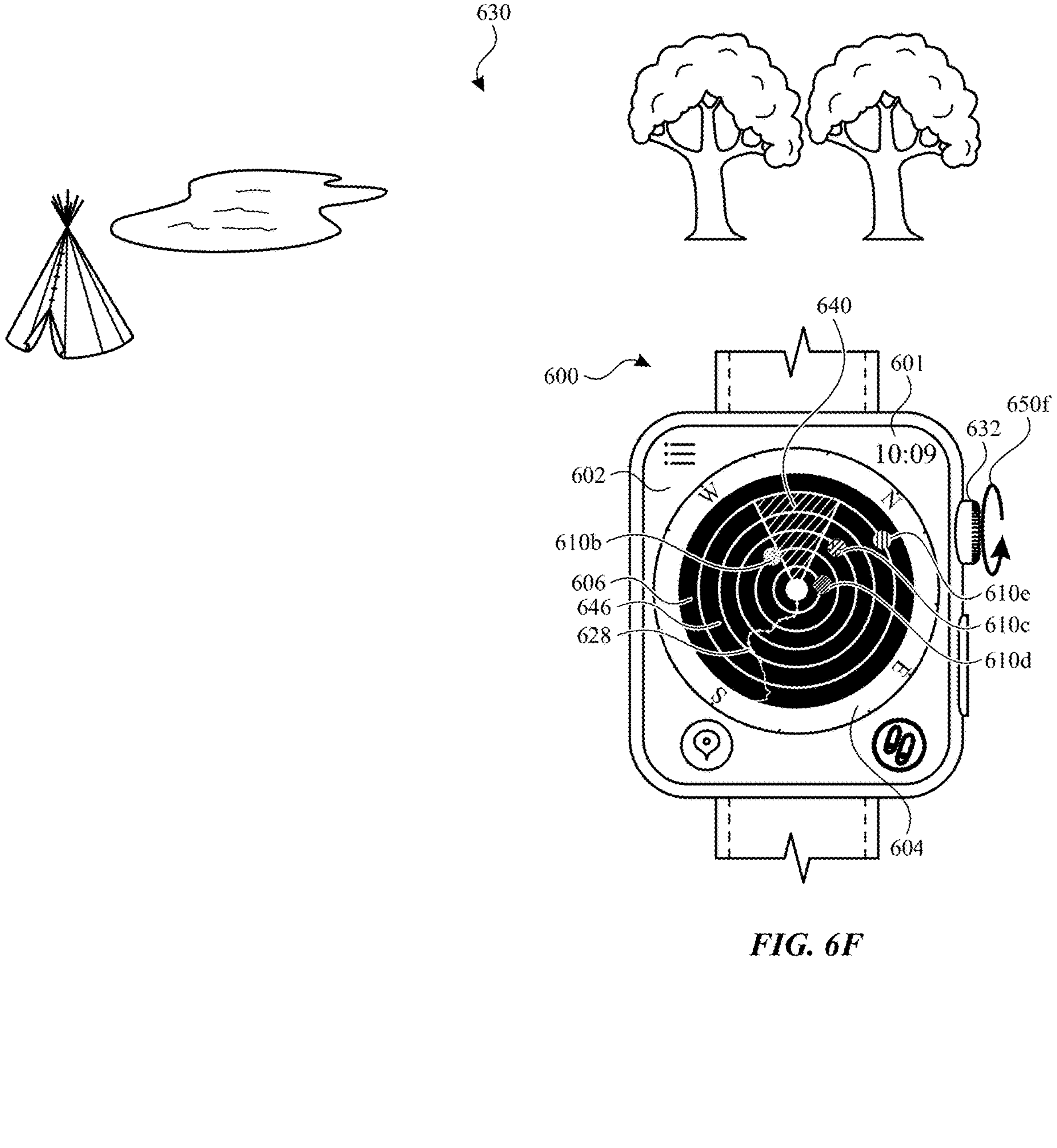

At FIG. 6F, device 600 displays an updated navigational user interface 602, including an updated waypoint region 606. As depicted, waypoint region 606 of FIG. 6F is larger than waypoint region 606 of FIG. 6E. For example, waypoint region 606 of FIG. 6F includes waypoint 610*e* that is not displayed in navigational user interface 602 of FIG. 6E. As a further example, includes waypoint region 606 of FIG. 6F includes additional distance indicators 646 that are not displayed in navigational user interface 602 of FIG. 6E. As such, waypoint region 606 of FIG. 6F includes a representation of a larger geographic region than waypoint region 606 of FIG. 6E without modifying a zoom level of waypoint region 606.

At FIG. 6F, device 600 modifies other graphical elements of navigational user interface 602 in response to detecting input 650*e*. As depicted, navigational user interface 602 of FIG. 6F does not include middle region 644 of FIG. 6E. Additionally, navigational user interface 602 of FIG. 6F does not include directional information in degrees in outer compass region 604. Additionally, device 600 displays a larger portion of historic location indicator 628 as compared to historic location indicator 628 of FIG. 6E.

At FIG. 6F, in some embodiments, device 600 displays an animated transition between navigational user interface 602 of FIG. 6E and navigational user interface 602 of FIG. 6F. For example, device 600 displays a series of states of the user interface between navigational user interface 602 of FIG. 6E and navigational user interface 602 of FIG. 6F. In some embodiments, the animated transition between navigational user interface 602 of FIG. 6E and navigational user interface 602 of FIG. 6F includes gradually modifying (e.g., shifting, expanding, shrinking, adding, and/or removing) interface elements of navigational user interface 602 in response to detecting input 650*d* (and/or based on a magnitude of an input 650*d*). For example, in response to detecting input 650*e*, device 600 gradually modifies (e.g., shifts, expands, shrinks, adds, and/or removes) graphical elements of navigational user interface 602 of FIG. 6E until graphical elements of navigational user interface 602 of FIG. 6F are displayed.

At FIG. 6F, while displaying navigational user interface 602, device 600 detects input 650*f* (e.g., a rotational input on rotational element 632 and/or a touch input on a touch-sensitive display, such as a pinch and/or de-pinch) corresponding to a request to display a different mode of navigational user interface. In some embodiments, input 650*f* is a continuation of input 650*e* (e.g., inputs 650*e*, 650*f* are portions of a continuous rotation and/or a continuous pinch). In some embodiments, input 650*f* is a continuation of both inputs 650*d*, 650*e* (e.g., inputs 650*d*, 650*e* are portions of a continuous rotation and/or a continuous pinch). In some embodiments, input 650*f* is independent of input 650*e* (e.g., input 650*f* is a first rotation and/or first pinch while 650*e* is a second rotation and/or second pinch). As depicted, input 650*f* is in the same direction (e.g., counter-clockwise) as input 650*e* and/or input 650*d*. In response to detecting input 650*f*, device 600 displays navigational user interface 602, as depicted in FIG. 6G.

Figure 6G:
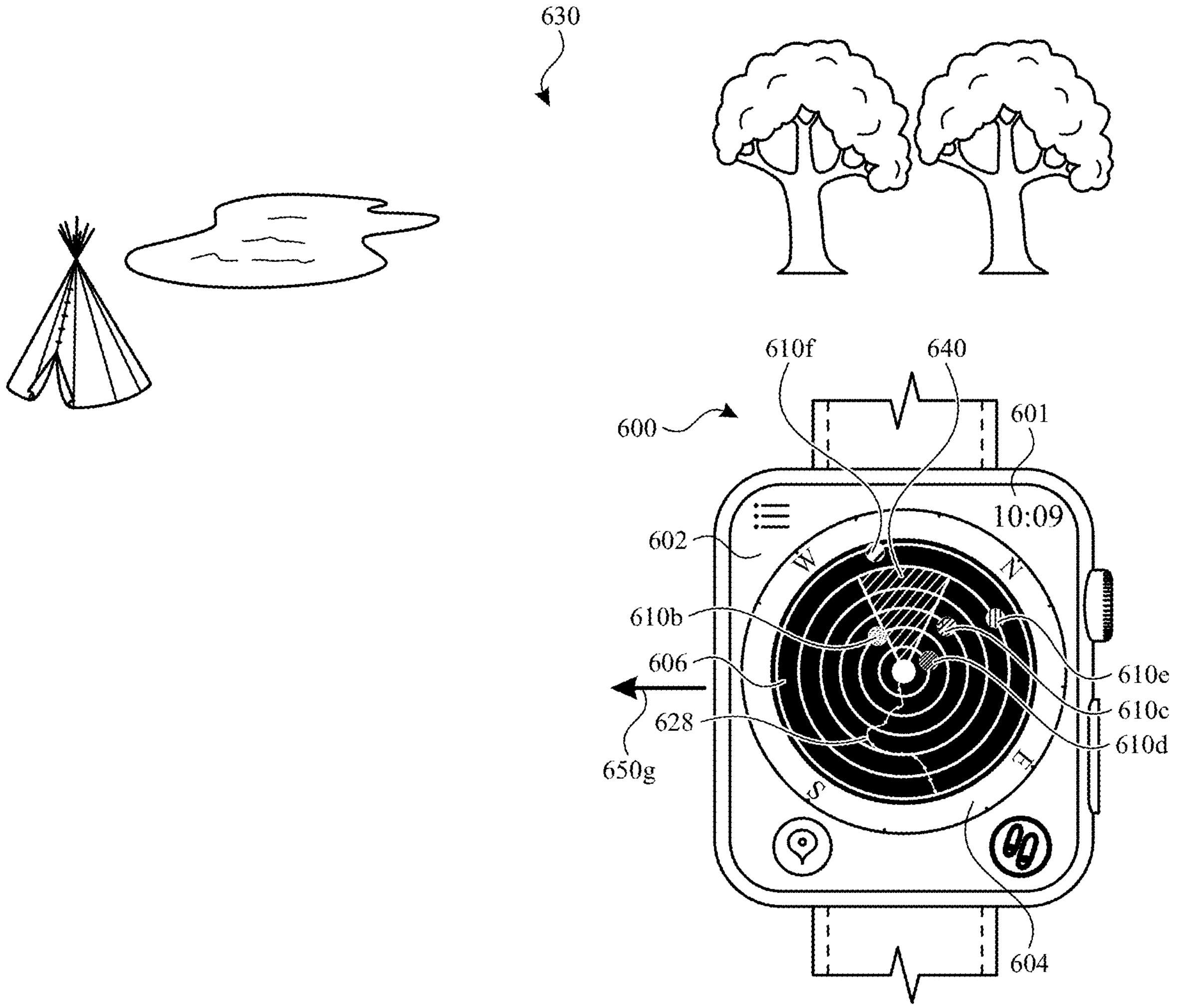

At FIG. 6G, device 600 displays an updated navigational user interface 602, including an updated waypoint region 606. Waypoint region 606 of FIG. 6G has an updated level of zoom as compared to waypoint region 606 of FIG. 6F. As depicted, waypoint region 606 is a zoomed out view as compared to waypoint region 606 of FIG. 6F, allowing device 600 to display waypoint 610*f*. Additionally, at FIG. 6G, device 600 displays a larger portion of history location indicator 638 as compared to history location indicator 638 of 6F. FIG. 6G also includes additional distance indicators 646 as compared to waypoint region 606 of FIG. 6F. As depicted, there is also less distance between distance indicators 646 of FIG. 6G as compared to the distance between distance indicators 646 of FIG. 6F, though both sets of distance indicators indicate the same distance. In some embodiments, device 600 displays navigational user interface 602 of FIG. 6F (e.g., and/or navigational user interface 602 of FIGS. 6A-6AA) without displaying an indication of a predicted route based on a user-configurable destination. For example, navigational user interface 602 includes history location indicator 638 and does not include an indication of a predicted and/or future route to a destination that was designated by a user.

At FIG. 6G, while displaying navigational user interface 602, device 600 detects a change in orientation 650*g* (e.g., rotation or change in angle). As depicted, at FIG. 6G, device 600 is facing the trees of environment 630 and, at FIG. 6H, device 600 is facing the lake in environment 630. In response to detecting the change in orientation 650*g*, device 600 displays navigational user interface 602, as depicted in FIG. 6H.

Figure 6I:
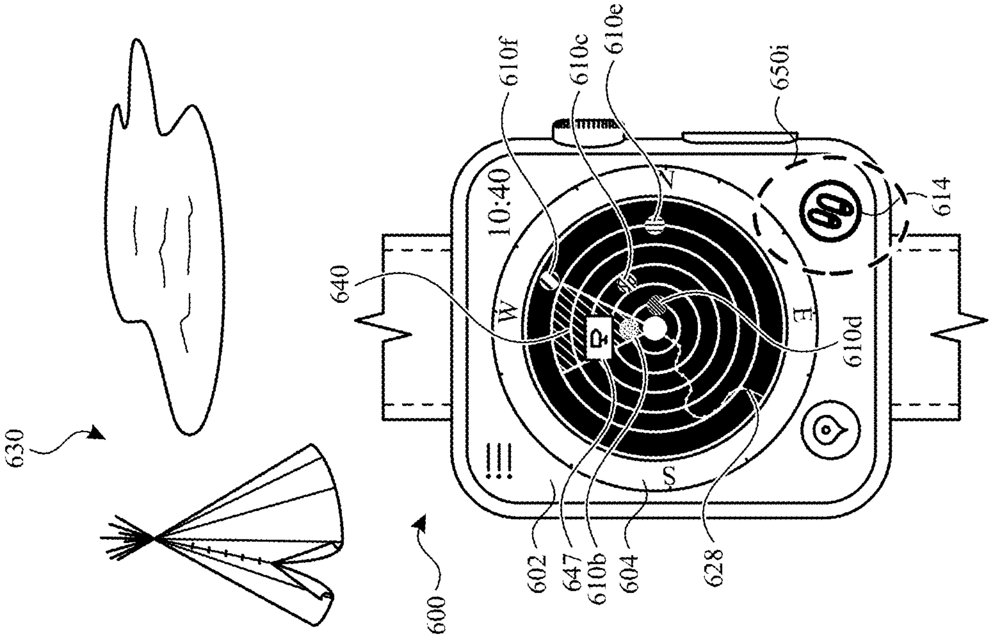
Figure 6H:
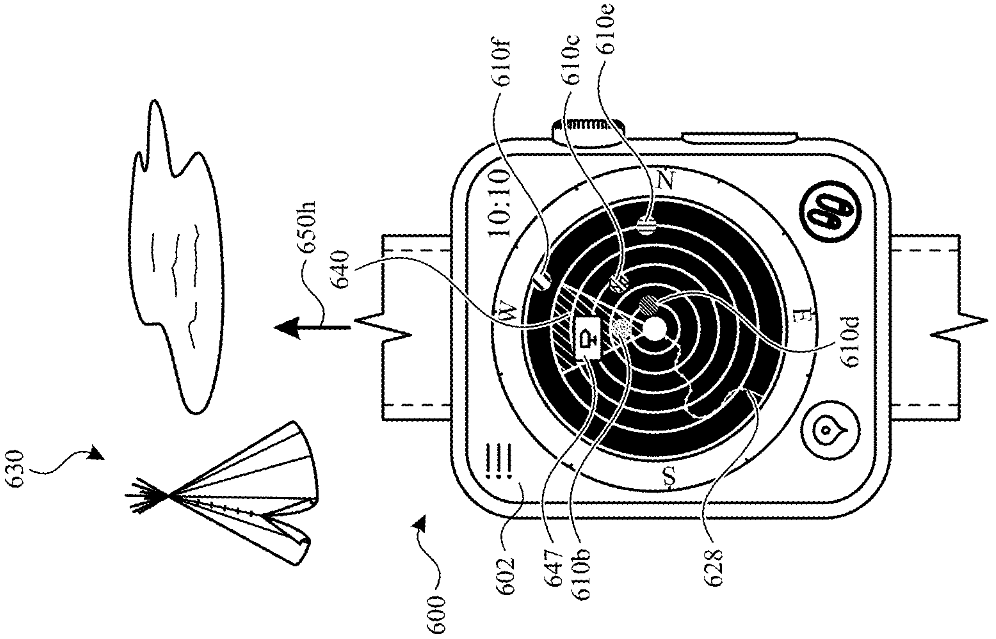

At FIG. 6H, device 600 modifies the graphical elements of navigational user interface 602 in response to detecting the change in orientation 650*g*. As depicted, direction indicator 640 overlaps onto waypoint 610*b*. As such, device 600 displays waypoint representation 647 adjacent to waypoint 610*b*. Waypoint representation 647 includes an icon of a sign. In some embodiments, waypoint representation 647 includes alphanumeric text, shapes, symbols, and/or icons. As described herein, waypoint representation 647 is optionally user-configurable (e.g., via waypoint editor interface 680). In some embodiments, waypoint representation 647 displays additional information about waypoint 610*b* (e.g., based on waypoint 610*b* overlapping with direction indicator 640).

At FIG. 6H, device 600 modifies (e.g., shifts, rotates, and/or translates) (based on change in orientation 650G) positions of waypoints 610*b*, 610*c*, 610*d*, 610*e*, and 610*f* as compared to the positions of waypoints 610*b*, 610*c*, 610*d*, 610*e*, and 610*f* in FIG. 6G. As shown in FIG. 6H, device 600 modifies (e.g., shifts, rotates, and/or translates) (based on change in orientation 650G) a position of historic location indicator 628 as compared to the position of historic location indicator 628 of FIG. 6G.

At FIG. 6H, while displaying navigational user interface 602, device 600 detects movement 650*h* (e.g., change in location and/or distance traveled). In response to detecting movement 650*h*, device 600 updates navigational user interface 602, as depicted in FIG. 6I.

At FIG. 6I, device 600 modifies the graphical elements of navigational user interface 602 in response to detecting movement 650*h*. As depicted, device 600 modifies (e.g., expands and/or adds a new portion) historic location indicator 628 so as to display a representation of movement 650*h*. Device 600 also modifies (e.g., shifts, rotates, and/or translates) (based on movement 650*h*) a position of historic location indicator 628, as compared to the position of historic location indicator 628 of FIG. 6H. Additionally, device 600 modifies (e.g., shifts and/or translates) (based on movement 650*h*) a position for each of waypoints 610*b*, 610*c*, 610*d*, 610*e*, and 610*f*, as compared to the position of waypoints 610*b*, 610*c*, 610*d*, 610*e*, and 610*f* in FIG. 6H.

At FIG. 6I, while displaying navigational user interface 602, device 600 detects input 650*i* (e.g., a touch input, air gesture, and/or other input) directed at backtrack affordance 614. In response to detecting input 650*i*, device 600 displays retrace interface 648, as depicted in FIG. 6J. In some embodiments, in response to detecting input 650*i*, device 600 deactivates the backtracking mode and ceases to display historic location indicator 628 while maintaining display of a navigational user interface similar to navigational user interface 602 of FIG. 6J.

At FIG. 6J, retrace interface 648 includes retrace affordance 652 that, when selected, activates a retracing mode on device 600. In some embodiments, the retracing mode allows a user to retrace his or her path. Retrace interface 648 also includes stop affordance 654 that, when selected, causes device 600 to stop displaying historic location indicator 628 in navigational user interface 602. In some embodiments, device 600 erases historic location data of device 600 in response to detecting a selection of stop affordance 654. In some embodiments, device 600 maintains (e.g., does not erase) historic location data of device 600 in response to detecting a selection of stop affordance 654.

At FIG. 6J, while displaying retrace interface 648, device 600 detects input 650*j* (e.g., a touch input, air gesture, and/or other input) directed at retrace affordance 652. In response to detecting input 650*j*, device 600 displays navigational user interface 602, as depicted in FIG. 6K.

Figure 6K:
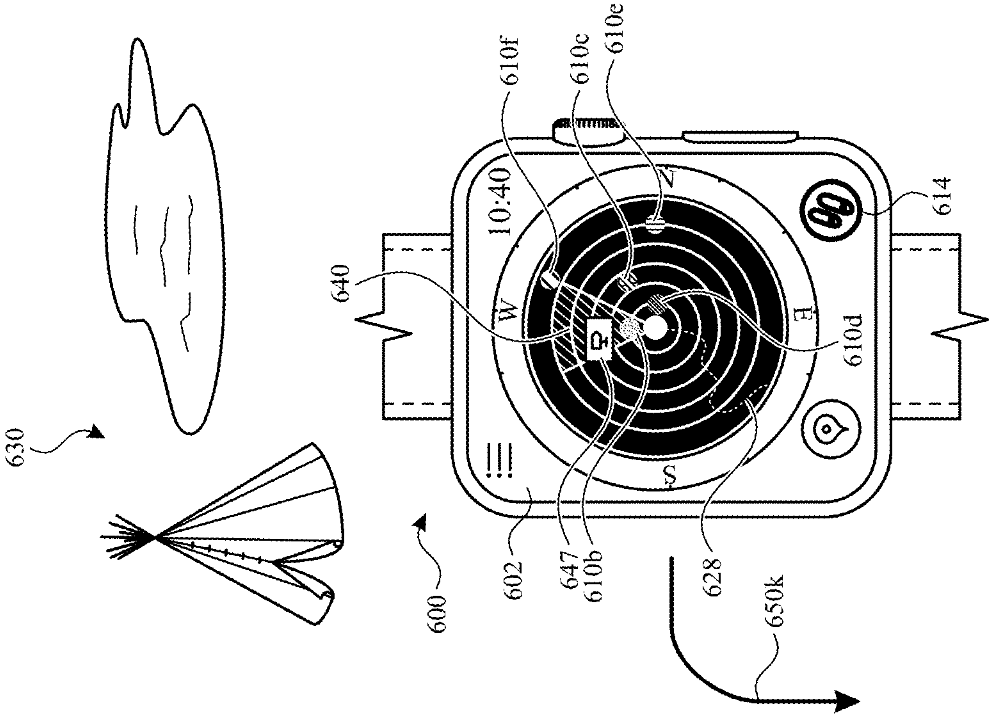
Figure 6J:
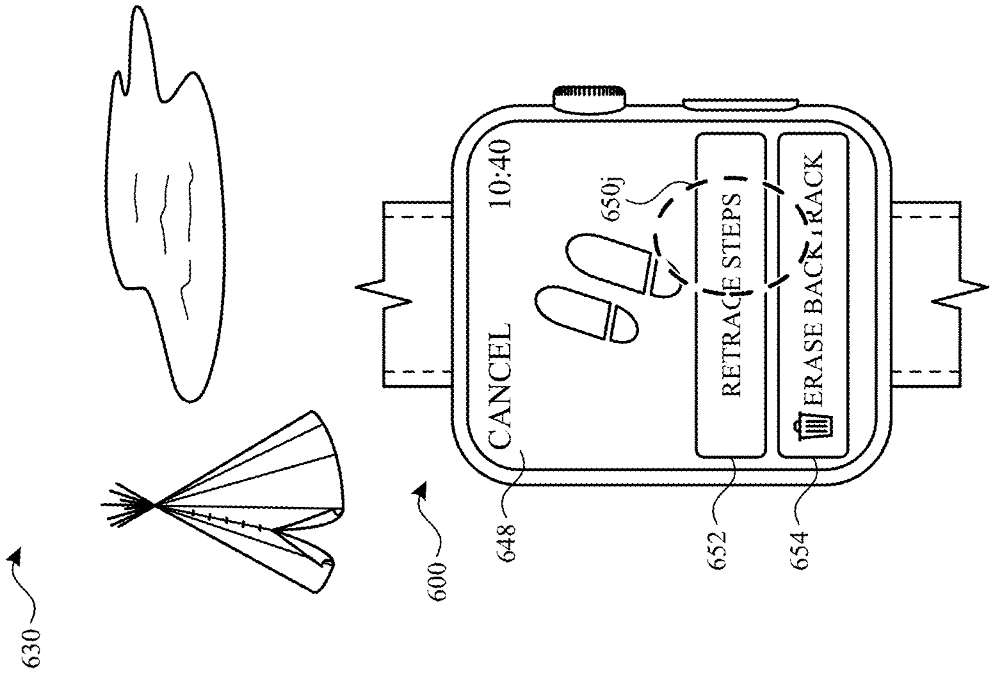

At FIG. 6K, device 600 updates navigational user interface 602 in response to the activation of the retrace mode. As depicted, historic location indicator 628 of FIG. 6K has a different appearance as compared to historic location indicator 628 of FIG. 6H. In some embodiments, historic location indicator 628 of FIG. 6K has a different color, shape, symbol, and/or size as compared to historic location indicator 628 of FIG. 6H. In some embodiments, the appearance of historic location indicator 628 of FIG. 6K does not change in response to activation of the retrace mode. In some embodiments, device 600 displays turn-by-turn directions to enable the user to follow the historic locations of device 600 back to a particular historic location (e.g., an original location such as when the backtracking mode was enabled) in response to detecting an input that enables retracing mode on device 600.

At FIG. 6K, while displaying navigational user interface 602, device 600 detects change in orientation 650*k* (e.g., rotation and/or angular movement). In response to detecting change in orientation 650*k*, device 600 updates navigational user interface 602, as depicted in FIG. 6L. At FIG. 6L, device 600 is facing a new direction as compared to the direction of device 600 at FIG. 6K (e.g., and as depicted by the change in environment 630).

At FIG. 6L, device 600 modifies the graphical elements of navigational user interface 602 in response detecting change in orientation 650*k*. As depicted, direction indicator 640 overlaps onto historic location indicator 628 to indicate device 600 is facing a direction of a previous location of device 600. A user of device 600 can now retrace his or her steps if he or she is lost or in an unknown location. In some embodiments, while in the retracing mode, device 600 ceases updating historic location indicator 628 as device 600 moves (e.g., when the user retraces his or her previous path). In some embodiments, while in the retracing mode, device 600 displays historic location indicator 628 and updates historic location indicator 628 as device 600 moves. In some embodiments, (e.g., while in the retracing mode) device 600 provides audio (e.g., spoken) output that identifies each waypoint on the trail as the user traverses the trail. In some embodiments, (e.g., while in the retracing mode) device 600 provides audio (e.g., spoken) output that provides instructions (e.g., walking instructions) for returning to a starting location (e.g., that start when device 600 began tracking the devices location/movement). In some embodiments, (e.g., while in the retracing mode) device 600 provides audio (e.g., spoken) output indicating the next waypoint and/or point of interest (e.g., including distance and/or direction) along the current path (e.g., based on a direction of travel of device 600). In some embodiments, (e.g., while in the retracing mode) device 600 provides audio (e.g., spoken) output identifying the current location of device 600 and the next waypoint and/or point of interest (e.g., including distance and/or direction) along the current path (e.g., based on a direction of travel of device 600). As depicted, backtrack affordance 614 of FIG. 6L has a different appearance (e.g., color, shape, and/or symbol) as compared to backtrack affordance 614 of FIG. 6K and/or backtrack affordance 614 of FIG. 6A to indicate that retracing mode is active. In some embodiments, backtrack affordance 614 of FIG. 6L has a different appearance (e.g., color, shape, and/or symbol) as compared to backtrack affordance 614 of FIG. 6K.

At FIG. 6L, device 600 modifies other graphical elements of navigational user interface 602 in response to detecting change in orientation 650*k*. Device 600 stops displaying waypoint representation 647 because direction indicator 640 no longer overlaps onto waypoint 610*b*. Additionally, device 600 shifts the positions of waypoints 610*b*, 610*c*, 610*d*, 610*e*, and 610*f* of FIG. 6L, as compared to the positions of waypoints 610*b*, 610*c*, 610*d*, 610*e*, and 610*f* of FIG. 6K.

At FIG. 6L, while displaying navigational user interface 602, device 600 detects input **650*l* (e.g., a touch input, air gesture, and/or other input) directed at backtrack affordance 614. In response to detecting input 650*l*, device 600 displays retrace interface 648, as depicted in FIG. 6**M.

Figure 6M:
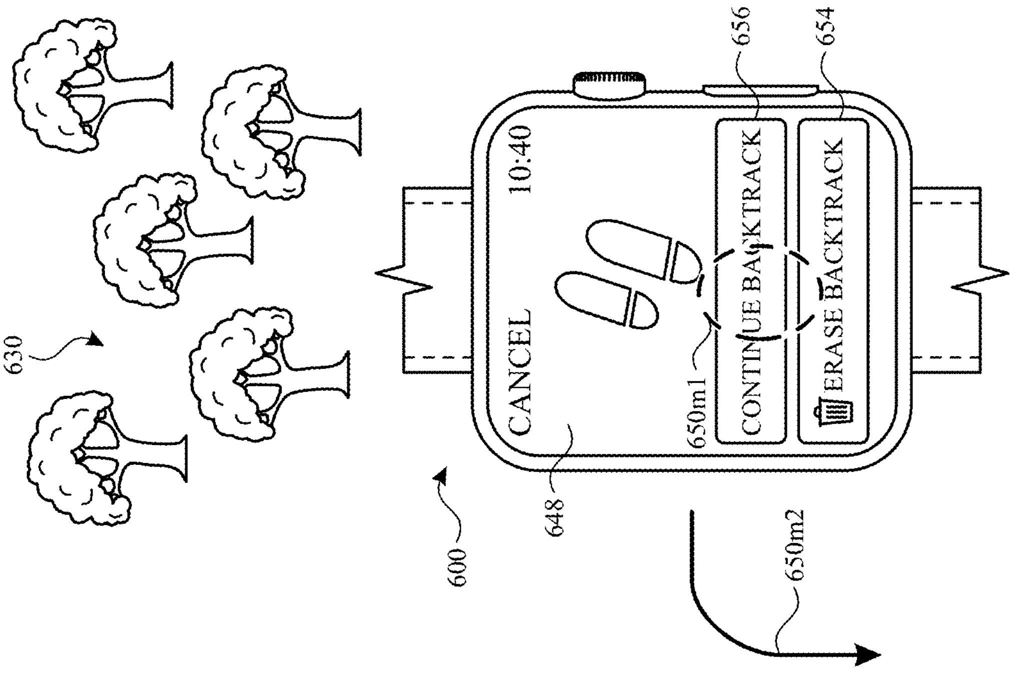
Figure 6L:
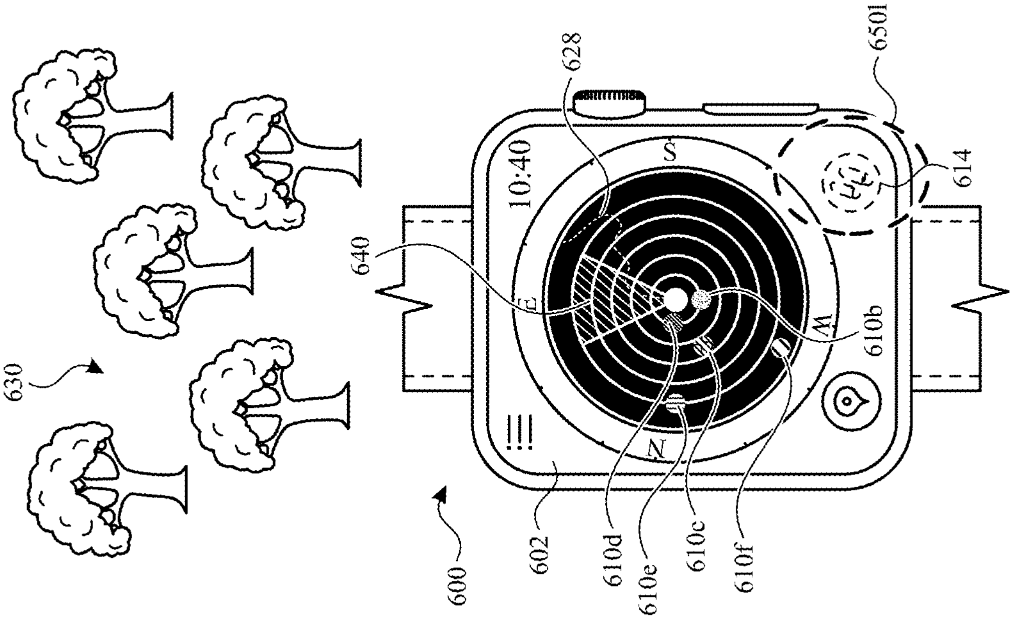
Figure 6N:
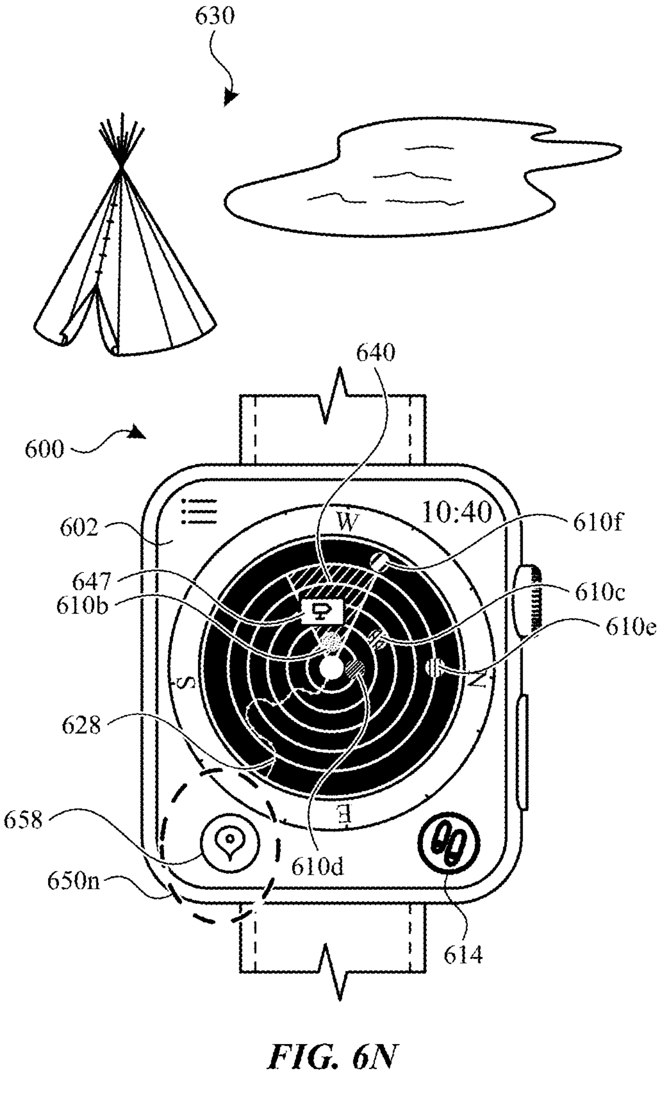
Figure 6Q:
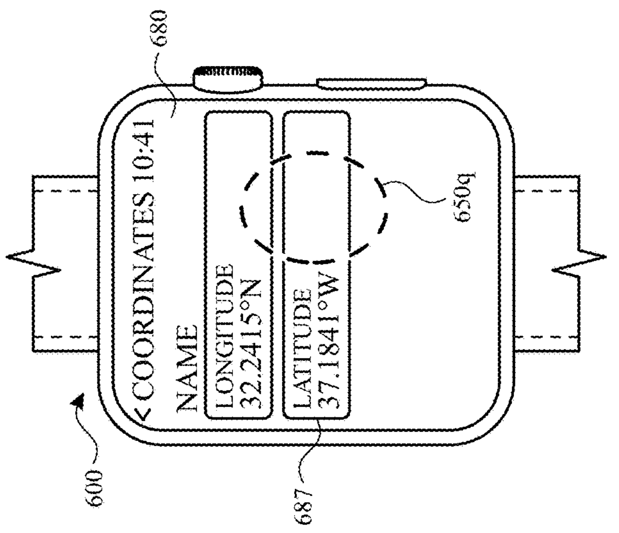
Figure 6P:
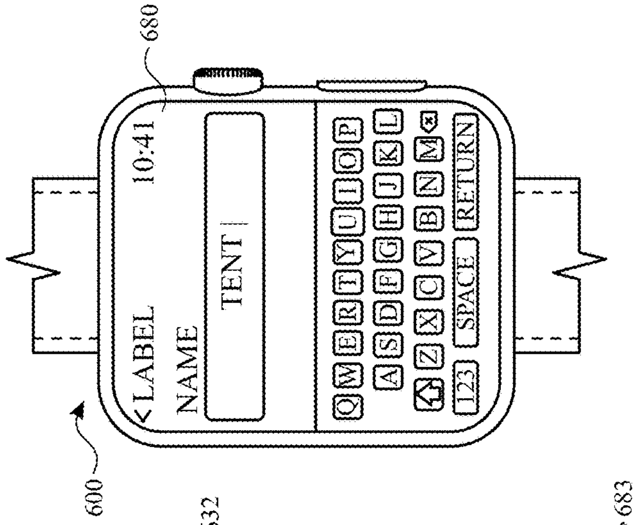

At FIG. 6M, retrace interface 648 includes continue backtracking affordance 656 that, when selected, deactivates the retracing mode. Retrace interface 648 also includes stop affordance 654, similar to stop affordance 654 of FIG. 6J. While displaying navigational user interface 602 of FIG. 6M, device 600 detects input **650*m*1 (e.g., a touch input, air gesture, and/or other input) directed at continue backtracking affordance 656. In response to detecting input 650*l*, device 600 displays navigational user interface 602, as depicted in FIG. 6N. Additionally, while displaying retrace interface 648, device 600 detects a change in orientation 650*m*2 (e.g., rotation and/or change in angle). For example, device 600 of FIG. 6N is facing a new direction as compared to the direction of device 600 of FIG. 6M (e.g., as depicted by the change in environment 630 between FIG. 6M and FIG. 6N). In response to detecting the change in orientation 650*m*2, device 600 displays navigational user interface 602, as depicted in FIG. 6**N.

At FIG. 6N, device 600 modifies graphical elements of navigational user interface 602. As depicted, navigational user interface 602 includes waypoint representation 647 because direction indicator 640 overlaps onto waypoint **610*b*. The appearance of backtrack affordance 614 of FIG. 6N has the same appearance as backtrack affordance 614 of FIG. 6K to indicate that the backtracking mode is active (e.g., and/or retracing mode is deactivated). Additionally, device 600 shifts the positions of waypoints 610*b*, 610*c*, 610*d*, 610*e*, and 610*f* (e.g., as compared to the positions of waypoints 610*b*, 610*c*, 610*d*, 610*e*, and 610*f* of FIG. 6**K).

At FIG. 6N, navigational user interface 602 includes new waypoint affordance 658 that allows a user to add a new waypoint. While displaying navigational user interface 602, device 600 detects input **650*n* (e.g., a touch input, air gesture, and/or other input) directed at new waypoint affordance 658. In response to detecting input 650*n*, device 600 displays waypoint editor interface 680, as depicted in FIG. 6**O.

Figure 6O:
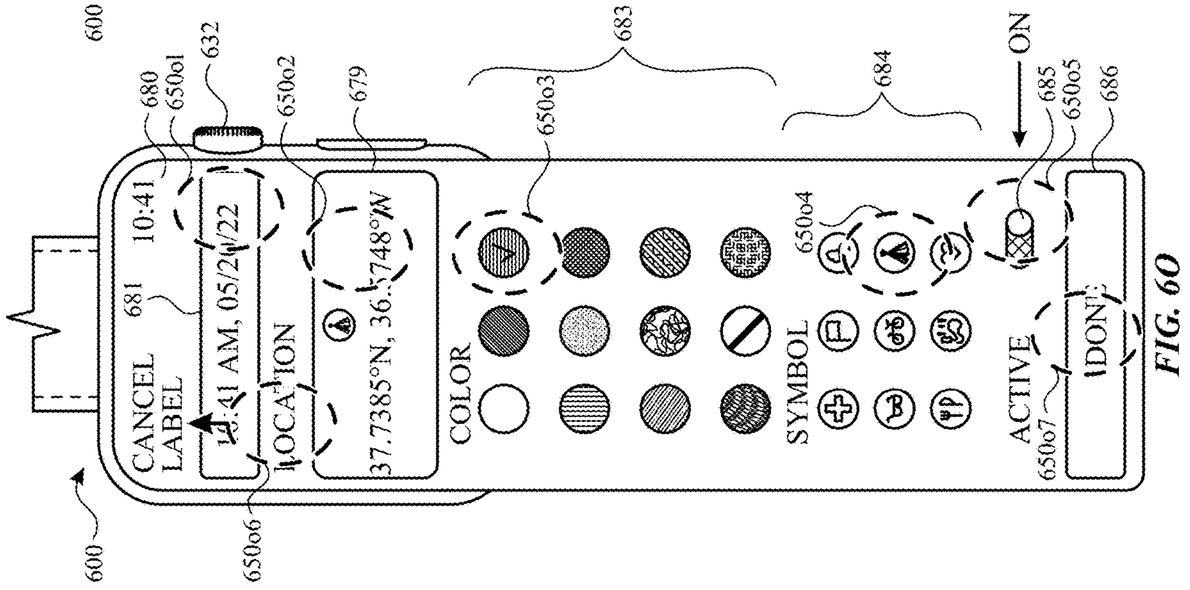

At FIG. 6O, waypoint editor interface 680 includes options to edit and/or add a waypoint. At FIG. 6O, in response to detecting input **650*o*1 (e.g., a touch input, air gesture, and/or other input) directed at label option 681, device 600 displays waypoint editor interface 680 of FIG. 6P to edit a label of a waypoint from a date and time to, for example, "Tent". At FIG. 6O, in response to detecting input 650*o*2 (e.g., a touch input, air gesture, and/or other input) directed at coordinates option 679, device 600 displays waypoint editor interface 680 of FIG. 6Q to edit coordinates (e.g., longitude and latitude) of the waypoint. At FIG. 6Q, in response to detecting input 650*q* (e.g., a touch input, air gesture, and/or other input) directed at latitude affordance 687, device 600 displays waypoint editor interface 680 of FIG. 6R to edit coordinates for a latitude of the waypoint. In some embodiments, the default coordinates for the new waypoint are the current coordinates of device 600**.

Returning to FIG. 6O, waypoint editor interface 680 also includes color affordances 683 to modify a color associated with the waypoint and/or a color for a representation of the waypoint. In response to detecting input **650*o*3 (e.g., a touch input, air gesture, and/or other input) selecting a color, device 600 designates the selected color for the waypoint. As depicted, waypoint editor interface 680 also includes icon affordances 684 to modify an icon associated with a waypoint and/or an icon for a representation of the waypoint. In response to detecting input 650*o*4 (e.g., a touch input, air gesture, and/or other input) directed at a tent icon, device 600** designates the tent icon for the waypoint.

At FIG. 6O, waypoint editor interface 680 also includes waypoint activation affordance 685. In response to detecting input **650*o*5 (e.g., a touch input, air gesture, and/or other input) directed at waypoint activation affordance 685, device 600 activates (or, in some embodiments, deactivates) the waypoint. In some embodiments, waypoints that are in an active state are eligible for display in waypoint region 606. In some embodiments, waypoints that are in a deactivated state are not eligible for display in waypoint region 606**. As depicted, a default state is that the new waypoint is in an active state.

At FIG. 6O, in response to detecting input **650*o*6 (e.g., a touch input, air gesture, and/or other input), device 600 scrolls waypoint editor interface 660. In some embodiments, input 650*o*3 is a rotation of rotational element 632. At FIG. 6O, while displaying waypoint editor interface 660, device 600 detects input 650*o*7 (e.g., a touch input, air gesture, and/or other input) directed at done affordance 686. In response to detecting input 650*o*7, device 600 displays navigational user interface 602, as depicted in FIG. 6**S.

Figure 6S:
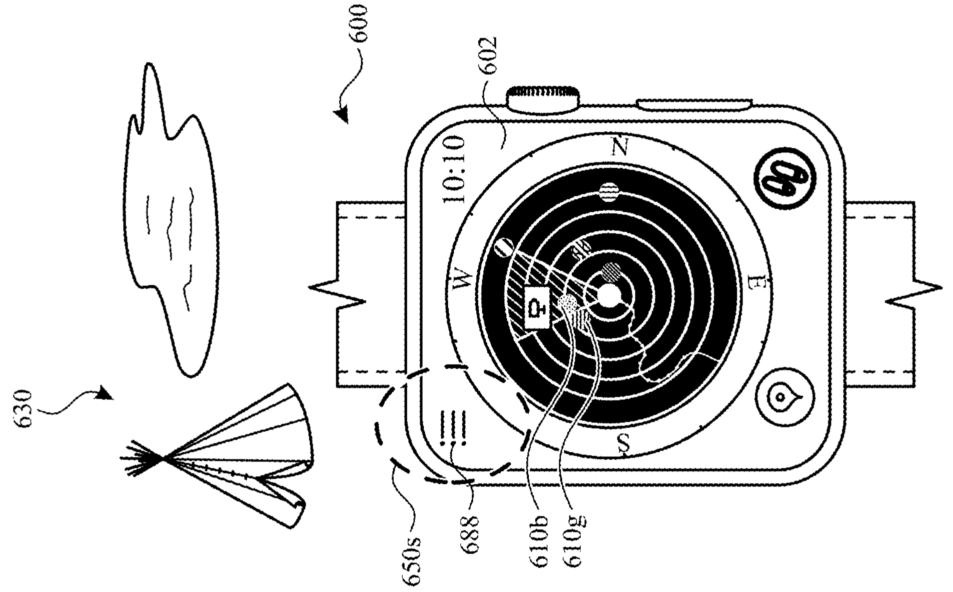
Figure 6R:
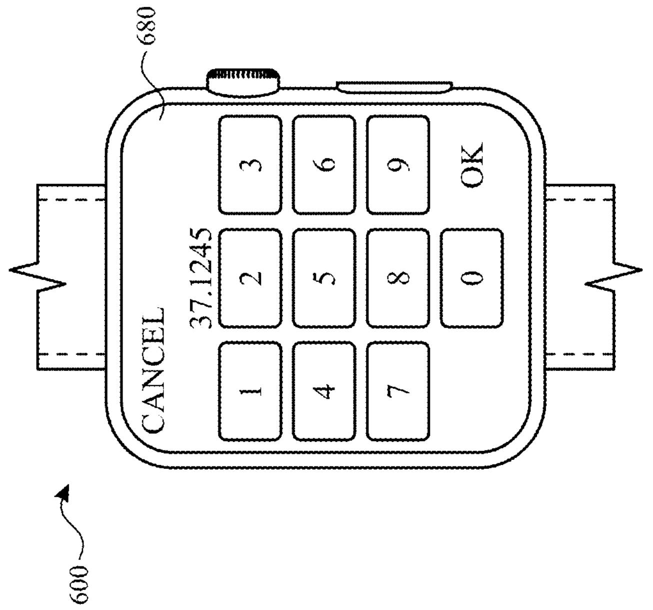

At FIG. 6S, device 600 updates navigational user interface 602 to include waypoint **610*g* for a tent in environment 630. At FIG. 6S, while displaying navigational user interface 602, device 600 detects input 650*s* (e.g., a touch input, air gesture, and/or other input) directed at waypoint menu affordance 688. In response to detecting input 650*a*, device 600 displays waypoint management interface 689, as depicted in FIG. 6**T.

Figure 6T:
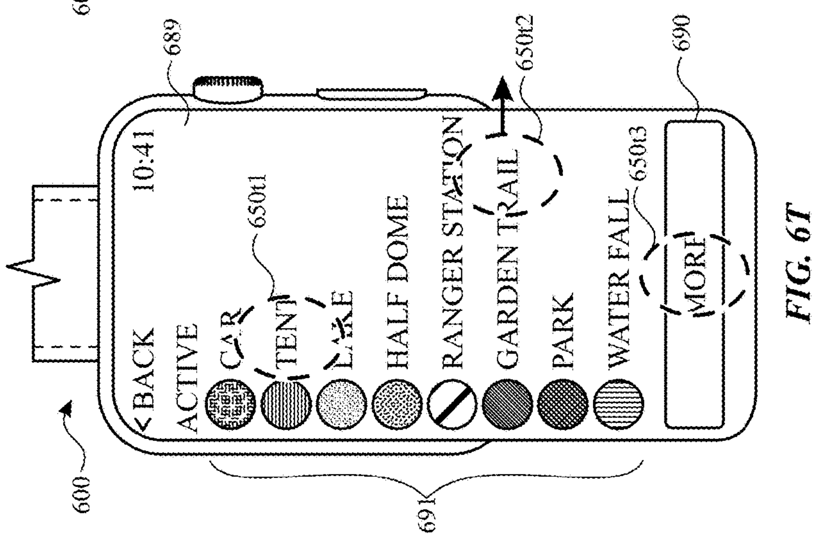

At FIG. 6T, waypoint management interface 689 includes active waypoints 691 that are in an active state. In some embodiments, an active waypoint can be edited. For example, in response to detecting input **650*t*1 (e.g., a touch input, air gesture, and/or other input) directed at the Tent waypoint, device 600 displays waypoint editor interface 680 of FIG. 6O. In some embodiments, active waypoints 691 (and/or deactivated waypoints) can be deleted. For example, in response to detecting input 650*t*2 (e.g., a swipe and/or drag) directed at waypoint activation affordance 685, device 600** deletes the Garden Trail waypoint and/or displays a delete affordance that, when selected, initiates a process to delete the Garden Trail waypoint (e.g., deletes or asks for confirmation before deleting).

At FIG. 6T, while displaying waypoint management interface 689, device 600 detects input **650*t*3 (e.g., a touch input, air gesture, and/or other input) directed at more affordance 690. In response to detecting input 650*t*3, device 600 displays waypoint management interface 689, as depicted in FIG. 6**U.

Figure 6U:
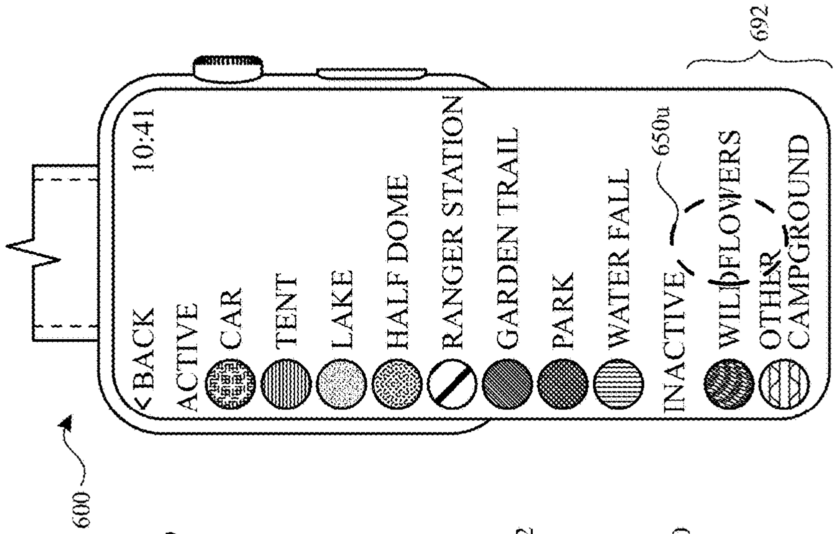

At FIG. 6U, waypoint management interface 689 includes deactivated waypoints 692. While displaying waypoint management interface 689 of FIG. 6U, device 600 detects input **650*u* (e.g., a touch input, air gesture, and/or other input) directed at Wildflowers waypoint. In response to detecting input 650*u*, device 600 displays waypoint editor interface 680, as depicted in FIG. 6**V.

Figure 6V:
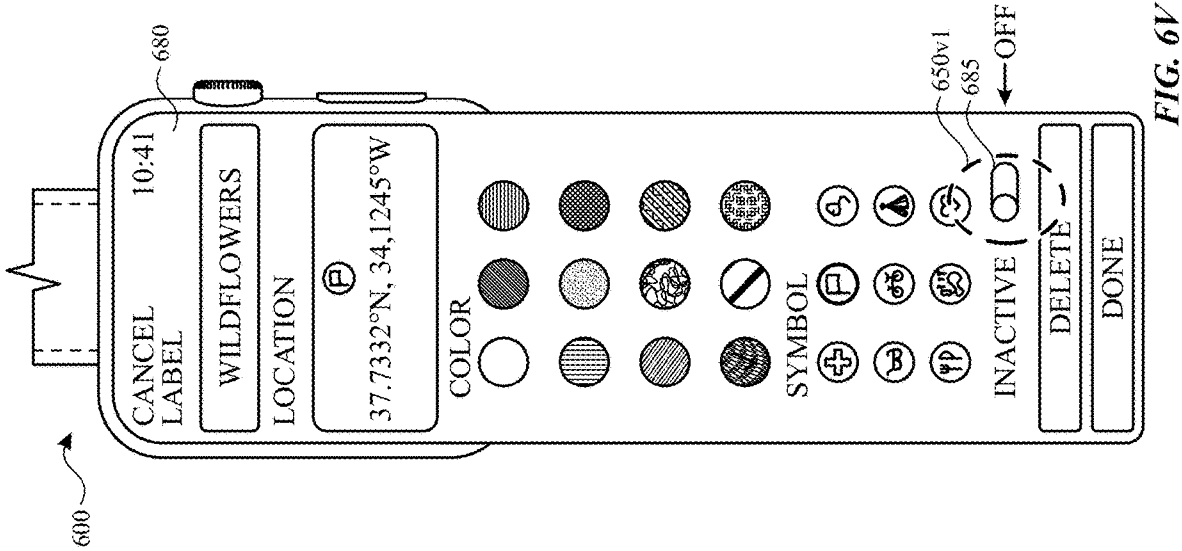

At FIG. 6V, waypoint editor interface 680 is similar to waypoint editor interface 680 of 6O but having a different state. While displaying waypoint editor interface 680, device 600 detects input **650*v* (e.g., a touch input, air gesture, and/or other input) directed at waypoint activation affordance 685. In response to detecting input 650*a*, device 600 updates Wildflowers waypoint to an active state. Accordingly, Wildflowers waypoint is now displayed as waypoint 610***h* in waypoint region 606 of FIG. 6W.

Figure 6W:
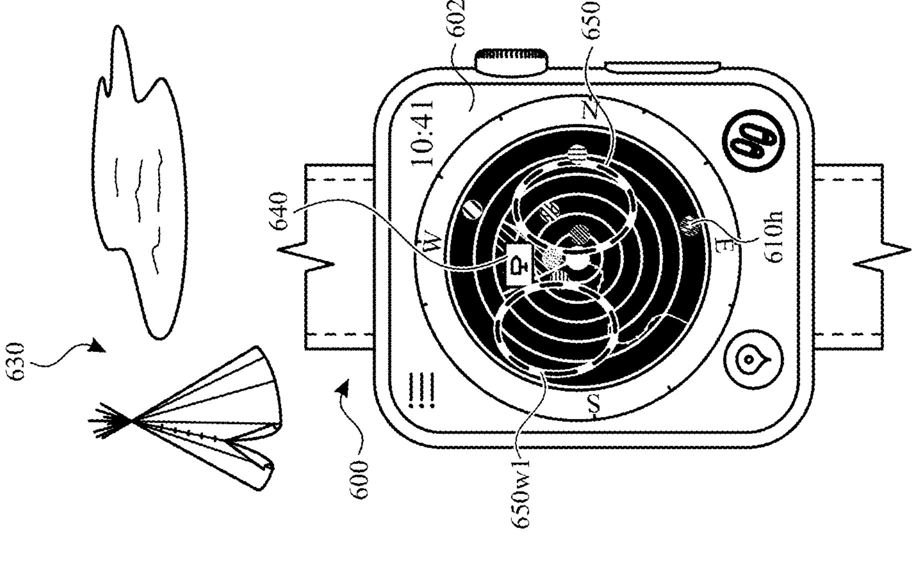

At FIG. 6W, a user has navigated back to navigational user interface 602 so as to target a specific waypoint. While displaying navigational user interface 602, device 600 detects input 650*w*1 (e.g., a touch input, air gesture, and/or other input) directed at waypoint region 606. Alternatively, while displaying navigational user interface 602, device 600 detects input 650*w*2 (e.g., a touch input, air gesture, and/or other input) directed at waypoint region 606. In response to detecting input 650*w*1 and/or in response to detecting input 650*w*2, device 600 displays waypoint interface 693, as depicted in FIG. 6X.

Figure 6X:
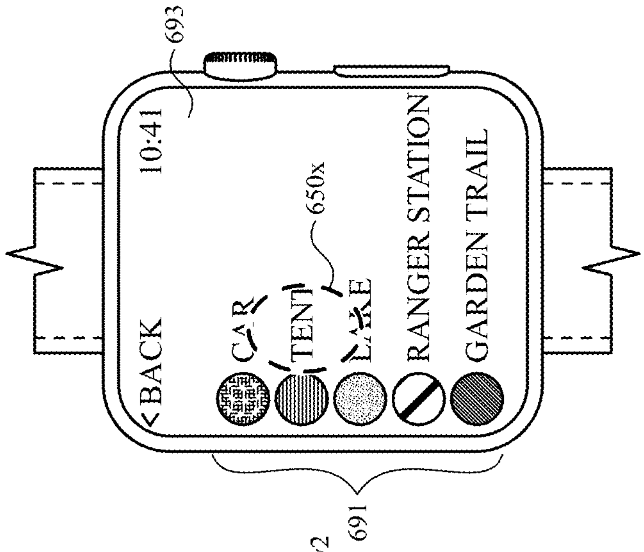

At FIG. 6X, waypoint interface 693 includes waypoints 691. In some embodiments, waypoint interface 693 includes active waypoints, similar to active waypoints 691 of FIG. 6T. In some embodiments, waypoint interface 693 includes nearby waypoints, such as waypoints that are within a threshold distance (e.g., 10 miles, 50 miles, and/or 100 miles) of a current location of device 600, without including waypoints that are not nearby. In some embodiments, waypoint interface 693 includes all active waypoints regardless of a distance to the respective waypoints from the current location of device 600. In some embodiments, (e.g., while displaying waypoint interface 693) device 600 provides audio (e.g., spoken) output that identifies waypoints 691.

At FIG. 6X, while displaying waypoint interface 693, device 600 detects input 650*x* (e.g., a touch input, air gesture, and/or other input) directed at the Tent waypoint. In response to detecting input 650*x*, device 600 displays targeted navigational interface 694, as depicted in FIG. 6Y.

Figure 6Y:
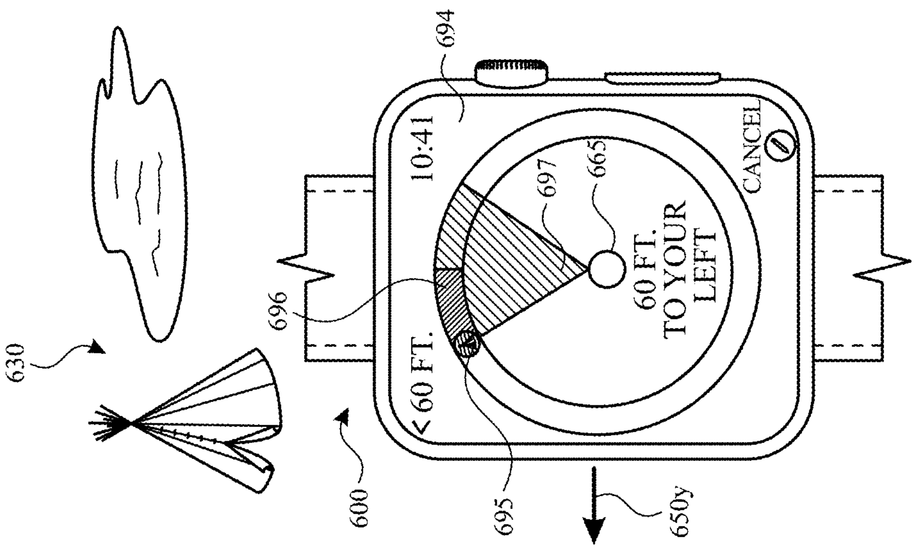
Figure 6A:
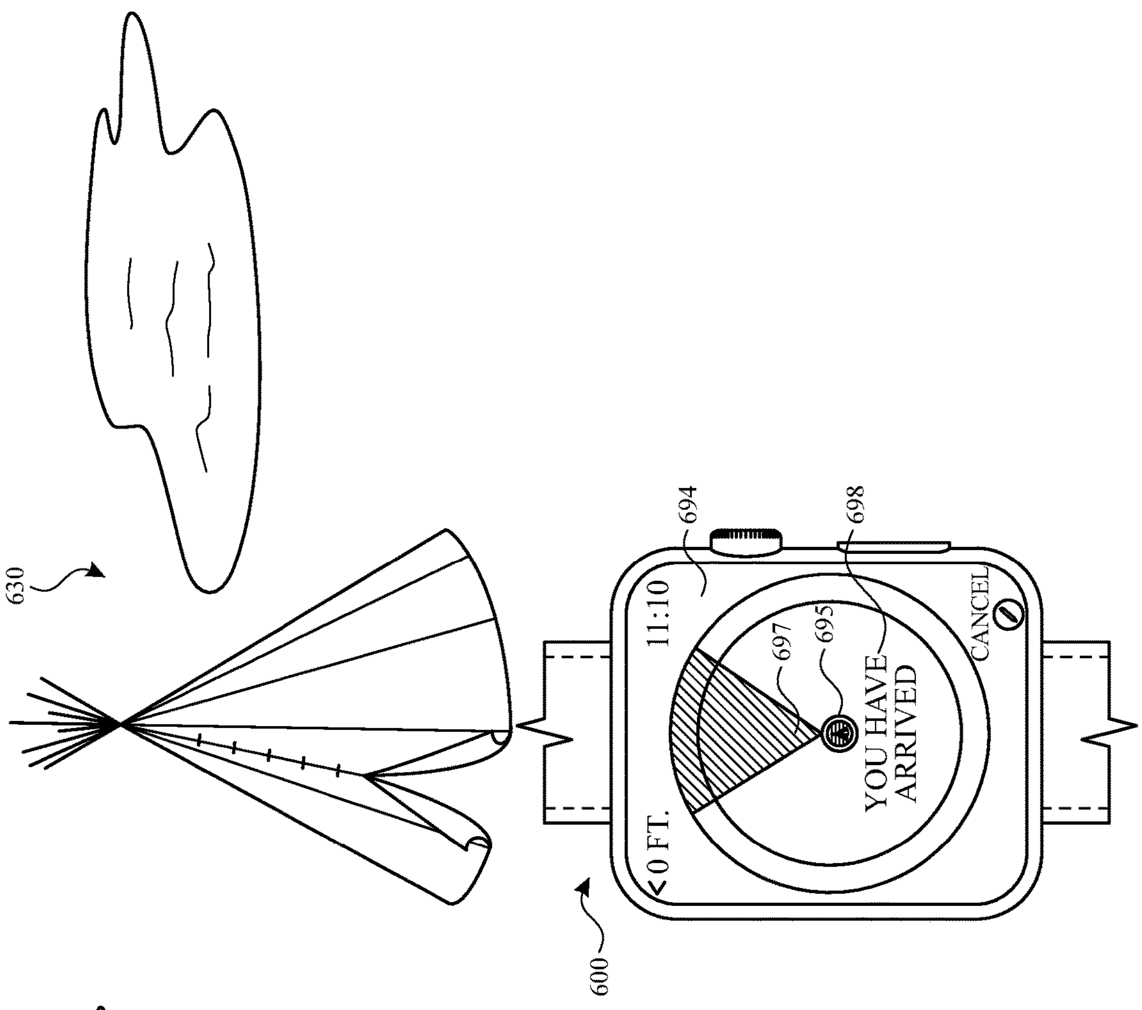

At FIG. 6Y, targeted navigational interface 694 incudes navigational information (e.g., provides a bearing information) for a selected waypoint with respect to a current location of device 600. As depicted, targeted navigational interface 694 includes device indicator 665 to depict a position of device 600 with respect to representation 695 of the Tent waypoint. Targeted navigational interface 694 includes targeted directional indicator 697 to indicate a direction device 600 is facing.

At FIG. 6Y, targeted navigational interface 694 also includes navigational information to the Tent waypoint. As depicted, navigational information for other waypoints are optionally not displayed. The navigational information of targeted navigational interface 694 includes off-bearing indicator 696 to indicate the physical location of the Tent is not straight ahead. In some embodiments, off-bearing indicator 696 has a different visual characteristic (e.g., color, shading, and/or shape) as compared to targeted directional indicator 697 when device 600 is not facing the physical location of the tent. The navigational information also includes an indication of a distance to the physical location of the tent (e.g., "60 FT"). In some embodiments, targeted navigational interface 694 is a user interface that provides a bearing for a particular waypoint.

At FIG. 6Y, while displaying targeted navigational interface 694, device 600 detects a change in orientation 650*y* (e.g., rotation and/or change in angle) of device 600. In response to detecting the change in orientation 650*y*, device 600 updates targeted navigational interface 694, as depicted in FIG. 6Z.

Figure 6Z:
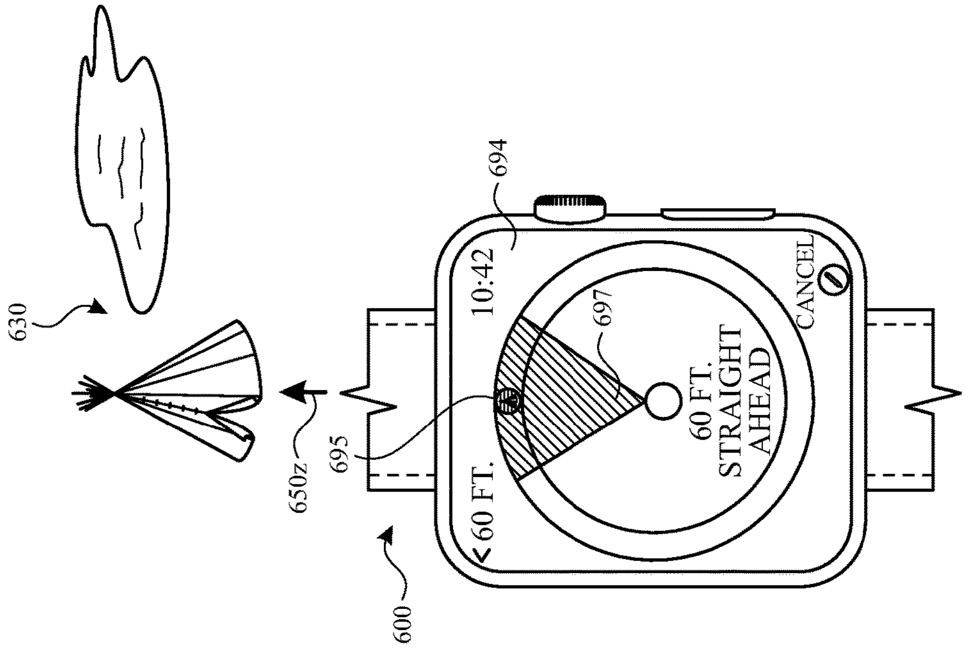

At FIG. 6Z, representation 695 of the Tent waypoint in targeted navigational interface 694 has been modified (e.g., shifted and/or translated) as compared to representation 695 of the Tent waypoint of FIG. 6Y. Additionally, because device 600 is facing the tent of environment 630, device 600 no longer displays off-bearing indicator 696. While displaying targeted navigational interface 694, device 600 detects movement 650*z* (e.g., change in location and/or distance traveled) of device 600. In response to detecting movement 650*z*, device 600 updates targeted navigational interface 694, as depicted in FIG. 6AA.

At FIG. 6AA, representation 695 of the Tent waypoint in targeted navigational interface 694 has been modified (e.g., shifted and/or translated) as compared to representation 695 of the Tent waypoint of FIG. 6Y. Additionally, because device 600 has arrived at the tent of environment 630 (as depicted by the change in size of the tent in environment 630), device 600 displays arrival notification 698 indicating that device 600 has arrived at the tent and/or, optionally, the physical location associated with representation 695 of the Tent waypoint. In some embodiments, device 600 increases a frequency of detecting location data (e.g., GPS data and/or accelerometer data) as device 600 approaches a physical location associated with a waypoint (e.g., the tent waypoint).

FIG. 7 is a flow diagram illustrating a method for displaying indications of historic locations using a computer system in accordance with some embodiments. Method 700 is performed at a computer system (e.g., 100, 300, 500, and/or 600) (e.g., a smartwatch, a smartphone, a tablet, a laptop computer, and/or a head mounted device (e.g., a head mounted augmented reality and/or extended reality device)) that is in communication with a display generation component (e.g., 601) (e.g., a display controller, a touch-sensitive display system, a monitor, and/or a head mounted display system) and, optionally, one or more input devices (e.g., a touch-sensitive surface, a keyboard, a controller, a rotatable input device, and/or a mouse). Some operations in method 700 are, optionally, combined, the orders of some operations are, optionally, changed, and some operations are, optionally, omitted.

As described below, method 700 provides an intuitive way for displaying indications of historic locations. The method reduces the cognitive burden on a user to view and/or manage indications of historic locations, thereby creating a more efficient human-machine interface. For battery-operated computing devices, enabling a user to view and/or manage indications of historic locations faster and more efficiently conserves power and increases the time between battery charges.

Without displaying (702) a calculated route (e.g., navigational user interface 602 of FIGS. 6A-6AA does not include an indication of a route to a destination, as described with reference to FIG. 6F) (e.g., walking and/or driving directions, and/or a calculated route based on a destination), the computer system concurrently displays (704), via the display generation component, one or more indications of a plurality of historic locations (e.g., 628) of the computer system. In some embodiments, the one or more indications of the plurality of historic locations correspond to one or more geographical locations (estimated or detected) that the computer system has been (e.g., since being enabled or turned on). In some embodiments, in accordance with a determination that a setting (e.g., a backtrack setting) for location tracking (e.g., for a navigational application (e.g., as opposed to a system-wide setting that disables location tracking for the entire computer system)) is enabled (e.g., active), the computer system displays (e.g., begins to display) the one or more indications of the plurality of historic locations while in a first mode. In some embodiments, in accordance with a determination that a setting for location tracking is disabled (e.g., inactive), the computer system forgoes displaying the one or more indications of the plurality of historic locations. In some embodiments, in response to detecting that the computer system is at a new geographic location (e.g., estimated or actual), the computer system updates the one or more indications of the plurality of historic locations of the computer system to include an indication for (e.g., a path taken to) the new geographic location. In some embodiments, the computer system displays (e.g., concurrently displays) an affordance for initiating a process to manage the setting (e.g., backtrack setting) for location tracking.

Without displaying a calculated route, the computer system also concurrently displays (706) with the one or more indication of the plurality of history locations of the computer system, via the display generation component, an indication of a current location (e.g., 636) (e.g., a symbol, a shape (e.g., circle, square, or triangle), or text (e.g., letters or numbers)) of the computer system. In some embodiments, the indication of the currently location is different from (e.g., has a different appearance (e.g., shape, size, symbol, text)) the one or more indications of the plurality of historic locations.

Without displaying a calculated route, the computer system also concurrently displays (708) with the one or more indication of the plurality of history locations of the computer system and indication of a current location, via the display generation component, an indication of a direction (e.g., 608, 604, and/or 640) (e.g., orientation, such as with respect to cardinal directions, and/or degrees) of the computer system (e.g., an orientation of the computer system or a direction the computer system is facing) (e.g., an indication of a cardinal point (e.g., North, East, West, or South), a magnetic needle, degrees, and/or a bearing). In some embodiments, the indication of direction includes a graphical object (e.g., shape, shading, and/or arrow) that is adjacent to the indication of the current location. In some embodiments, displayed relationships (e.g., distances between and/or relative positions of) among the one or more indications of the plurality of historic locations and the indication of the current location corresponds to (e.g., is based on and/or is to scale with) geographical relationships (e.g., distances between and/or relative positions of) (e.g., based on location data (e.g., geographic location data, either estimated (e.g., based on data from one sensor type (e.g., gyroscope or accelerometer sensors)) or actual (e.g., based a different sensor type (e.g., GPS sensor)))) among the plurality of historic locations and the current location of the computer system (e.g., the displayed relationship of 628 and 636, as depicted in FIG. 6E). In some embodiments, in response to detecting a change in the current location of the computing system, the computer system modifies the spatial relationship between the indication of the current location of the computer system (and/or the indication of the direction of the computer system) and the one or more indications of the plurality of historic locations of the computer system. In some embodiments, in accordance with a determination that a current location (e.g., estimated or actual) of the computer system corresponds to a geographic location (e.g., estimated or actual) of a respective historic location of the plurality of historic locations (e.g., when a user backtracks over a previously traveled route), the computer system displays the indication of the current location of the computer system as overlapping (e.g., overlaying or touching) an indication of the respective historic location. In accordance with a determination that the current location (e.g., estimated or detected) of the computer system does not correspond to the geographic location (e.g., estimated or detected) of the respective historic location of the plurality of historic locations (e.g., when a user does not backtrack over the previously traveled route), the computer system displays the indication of the current location of the computer system as not overlapping (e.g., not overlaying on or not touching) the indication of the respective historic location. Displaying a current location of the computer system along with historic locations of the computer system enhances the user's interaction with the computer system by allowing a user to view where the computer system has been and what direction the user has to go to return to the historic location if the user is lost, thereby improving visual feedback of the computer system's movement over time.

In some embodiments, the one or more indications of the plurality of historic locations of the computer system are discrete (e.g., visually discrete) indicators (e.g., 628 includes dots and/or a dashed line as described in reference to FIG. 6E) (e.g., spaced apart, different colors, and/or different sizes). In some embodiments, the one or more indications of the plurality of historic locations is not a continuous line (e.g., is a dashed line or a dotted line). Displaying historic locations as discrete indicators enhances the user's interaction with the computer system by allowing a user to view a dashed and/or dotted line indicating where the computer system has been and/or how often a historic location has been detected, thereby improving visual feedback of the computer system's movement over time and how often the computer system has detected movement.

In some embodiments, displaying the one or more indications of the plurality of historic locations of the computer system includes in accordance with a determination that a first indication (e.g., a portion of 628 in FIG. 6E) of the one or more indications of the plurality of historic locations is based on a first data type (e.g., as described with reference to FIG. 6E) (e.g., data detected from a first sensor type (e.g., accelerometer sensors, gyroscope, magnetometer) and/or estimated positioning data), displaying, via the display generation component, a graphical object (e.g., the dot of 628 as described with reference to FIG. 6E) with a first visual characteristic for the first indication. In some embodiments, displaying the one or more indications of the plurality of historic locations of the computer system includes in accordance with a determination that the first indication of the one or more indications of the plurality of historic locations is based on a second data type different from the first data type (e.g., as described with reference to FIG. 6E) (e.g., data detected from a second sensor type (e.g., real-time positioning sensor (e.g., GPS sensor and/or GLONASS sensor))), displaying, via the display generation component, a graphical object with a second visual characteristic (e.g., the line of 628 as described with reference to FIG. 6E), different from the first visual characteristic, for the first indication. In some embodiments, the first visual characteristic is used based on the indication corresponding to a historic location that is based on the first data type and the second visual characteristic is used based on the indication corresponding to a historic location that is based on the second data type. Displaying historic locations differently based on whether the computer system has estimated the location (e.g., using one sensor) or received a real-time positioning (e.g., using a different sensor) enhances the user's interaction with the computer system by allowing a user to view what type of data/sensor is used to provide the indication of the historic location, thereby improving visual feedback of how the computer system determined movement over time.

In some embodiments, in accordance with a determination that the direction (e.g., orientation and/or heading) of the computer system is toward (e.g., is facing and/or is pointing towards) a geographic location (e.g., a previous physical location of device 600) (e.g., estimated or actual, such as the most recent geographic location represented by an indication of a geographic location) of a respective historic location of the plurality of historic locations (and/or in accordance with a determination that the geographic location of the respective historic location is within a threshold distance of the current location of the computing system), the computer system displays, via the display generation component, the indication of the direction of the computer system as visually overlapping (e.g., 640 overlaps 628 as depicted in FIG. 6L) (e.g., overlaying or touching) an indication of the respective historic location (e.g., 628 of FIG. 6L) (e.g., when the computer system is facing a direction of a previously traveled/recorded route). In some embodiments, in accordance with a determination that the direction of the computer system is not toward (e.g., is not facing and/or is not pointing towards) the geographic location (e.g., estimated or actual) of the respective historic location of the plurality of historic locations (e.g., as depicted in FIG. 6K) (e.g., when a user is not facing a direction of the previously traveled route) (and/or in accordance with a determination that the geographic location of the respective historic location is not within the threshold distance of the current location of the computing system), the computer system displays, via the display generation component, the indication of the direction of the computer system as not overlapping (e.g., not overlaying or not touching) the indication of the respective historic location (e.g., 640 does overlap 628 as depicted in FIG. 6K). In some embodiments, as the orientation of the computer system changes, the displayed indication of the direction of the computer system is maintained (e.g., the location of indication is maintained) and the locations of the indications of the plurality of historic locations change (e.g., based on the change in the orientation of the computer system) such that at least one indication of a historic location that previously overlapped the indication of the direction of the computer system no longer overlaps and at least one indication of a historic location that previously did not overlap the indication of the direction of the computer system overlaps. Conditionally displaying a directional indicator as overlapping a portion of the historic path based on the direction the computer system is facing enhances the user's interaction with the computer system by allowing a user to view what direction he or she needs to go in order to backtrack when lost, thereby improving visual feedback of the direction the computer system facing with respect to a previously traveled path, and improves the computer system as it performs an operation when a set of conditions has been met without requiring further user input.

In some embodiments, the plurality of historic locations are not known locations (e.g., data for 628 is not stored prior do enabling the backtracking mode as described with reference to FIG. 6D) (e.g., not previously stored and/or not previously determined by the computer system) to the computer system prior to enabling a backtracking setting (e.g., the backtracking mode of FIGS. 6A-6AA) (and/or the user/computer system traversing the plurality of history locations). In some embodiments, the plurality of historic locations are not locations for landmarks and/or addresses. The user's interaction with the computer system is enhanced when the historic locations are not previously known locations because it allows a user to view a recently traveled path, thereby improving visual feedback of a recent movement of the computer system and/or improves how the computer provides navigational capabilities.

In some embodiments, in accordance with a determination that a first type of wireless signal (e.g., a WiFi signal and/or a Bluetooth signal) is not detected, the computer system automatically determines and stores current locations of the computer system (e.g., the backtracking mode is automatically enabled as described with reference to FIG. 6A) (e.g., for use to display (e.g., now or at a later time) corresponding indications of historic locations of the computer system). In some embodiments, in accordance with a determination that the first type of wireless signal is detected, the computer system forgoes storing (and optionally determining) current locations of the computer system (e.g., the backtracking mode is not enabled as described with reference to FIG. 6A). In some embodiments, in accordance with a determination that a local area network (e.g., WiFi and/or not WiFi) is detected (e.g., in accordance with a determination that a router signal is detected) (e.g., when a user is home and/or when a user is in a populated area (e.g., city/town)), the computer system forgoes displaying the one or more indications of the plurality of historic locations (and/or the computer system disables a location tracking setting (e.g., for a particular application as opposed to a system-wide setting)). In some embodiments, in accordance with a determination that a local area network (e.g., Wi-Fi and/or not Wi-Fi) is not detected (e.g., in accordance with a determination that a router signal is not detected) (e.g., when a user is hiking or camping and/or outside a populated area (e.g., city/town)), the computer system displays, via the display generation component, the one or more indications of the plurality of historic locations (and/or enables a location tracking setting (e.g., for a particular application as opposed to a system-wide setting)). In some embodiments, in accordance with a determination that a local area network (e.g., WiFi and/or not WiFi) is detected, the computer system disables (and/or forgoes displaying) an affordance for activating a location tracking setting. In some embodiments, in accordance with a determination that a local area network (e.g., LAN and/or Wi-Fi) is not detected, the computer system enables and/or displays an affordance for activating a location tracking setting. Conditionally storing current locations of the computer system based on whether a wireless signal is detected enhances the user's interaction with the computer system since it allows the computer system to determine whether it is away from a known location (e.g., a user's home and/or populated area), thereby reducing the number of inputs needed to perform an action.

In some embodiments, respective indications of the one or more indications of the plurality of history locations are displayed with a visual property (e.g., opacity, brightness, size, and/or color) that is updated (e.g., change in opacity, brightness, size, and/or color) based on a recency of having detected respective locations corresponding to the respective indications (e.g., a portion of 628 fades, as described with reference to FIG. 6E). In some embodiments, as a detected respective location of the computer system ages, the visual property of the respective indication corresponding to the detected respective location changes. In some embodiments, as the detected location ages, the corresponding indication fades, thereby providing the user with an indication of how long ago the location was detected/determined and/or which indications are newer/older than other indications, thereby providing the user with improved visual feedback. In some embodiments, the computer system detects a threshold period of time has been satisfied (e.g., at least one of the one or more indications of the plurality of historic locations has been displayed for a threshold amount of time and/or a threshold amount of time has passed since location data (e.g., estimated or actual) for the at least one of the one or more indications of the plurality of historic locations was detected). In some embodiments, in response to detecting that the threshold period of time has been satisfied, the computer system modifies a visual property of (e.g., fading, graying out, change a color of, and/or change transparency of) at least one of the one or more indications of the plurality of historic locations. In some embodiments, the visual property of the at least one of the one or more indications of the plurality of historic locations is maintained in response to not satisfying the threshold amount of time (e.g., the at least one of the one or more indications of the plurality of historic locations has not been displayed for a threshold amount of time and/or a threshold amount of time has not passed since location data (e.g., estimated or actual) for the at least one of the one or more indications of the plurality of historic locations was detected). Displaying respective indications with an updated a visual property that is based on a recency of having detected respective locations corresponding to the respective indications enhances the user's interaction with the computer system because a user is able to tell how long it has been since the user was at that particular location, thereby improving visual feedback of how long it has been since the historic location of the computer system was detected and/or displayed.

In some embodiments, the plurality of historic locations are not associated with a calculated route to a destination (e.g., navigational user interface 602 does not include a route to a destination, as described with reference to FIG. 6G) (e.g., a route determined based on a destination). In some embodiments, the plurality of historic locations are displayed without displaying a predicted route and/or a user-defined destination. In some embodiments, the plurality of history locations are not determined during a navigation process. The user's interaction with the computer system is enhanced when the historic locations are not a route calculated by the computer system because it allows a user to view a digital path in which the user has traveled when there is no actual physical path, thereby improving visual feedback of a movement of the computer system in an unknown topography.

In some embodiments, the one or more indications of the plurality of historic locations of the computer system, the indication of the current location, and the indication of the direction of the computer system are concurrently displayed without displaying elements of a map (e.g., navigational user interface 602 does not include topographical features as depicted in FIGS. 6E-6G) (e.g., a map including one or more a topographical features (e.g., roads, buildings, land, and/or water)). In some embodiments, the one or more indications of the plurality of history locations are not overlaid on a map that shows streets, paths, and/or topography. Not displaying an underlying map and/or topography improves the computer system since a back tracking feature can be utilized without generating a synthetic map (e.g., when the map cannot be determined by the computer system), thereby preserving processing power of the computer system and decluttering the user interface.

In some embodiments, the computer system detects a change in the current location (e.g., estimated or actual) of the computer system (e.g., 650) (e.g., as a user hikes across an unknown terrain). In response to detecting the change in the current location of the computer system, the computer system modifies the displayed relationship (e.g., distances between and/or relative positions of) among the one or more indications of the plurality of historic locations and the indication of the current location of the computer system (e.g., as depicted in FIGS. 6H-6I).

In some embodiments, in accordance with a determination that the computer system moves away from a historic geographic location (e.g., estimated or actual) associated with a respective indication of the one or more indications of the plurality of historic locations, the computer system displays the indication of the current location as being further away from the respective indication. In accordance with a determination that the computer system moves closer to the historic geographic location, the computer system displays the indication of the current location as being closer to the respective indication. Modifying the displayed relationship among the historic location indicators and a current location of the computer system enhances the user's interaction with the computer system because the user interface depicts how a user's current position compares to the user's previous position, thereby improving visual feedback of the movement of the computer system over time.

In some embodiments, the computer system detects a change in an orientation (e.g., 650*k* and/or 650*m*2) (e.g., direction and/or rotation) of the computer system. In response to detecting the change in the orientation of the computer system, the computer system maintains the displayed relationship (e.g., distances between and/or relative positions of) among at least two indications of the one or more indications of the plurality of historic locations (e.g., as depicted by 602 during the transition of FIGS. 6K-6L and the transition between FIGS. 6L and 6N). In some embodiments, the relative distance between the plurality of indications is maintained as the orientation of the computer system changes. Maintaining the displayed relationship among historic location indicators enhances the user's interaction with the computer system because it provides visual feedback of the change in orientation of the computer system.

In some embodiments, the computer system detects a change in an orientation (e.g., 650*k* and/or 650*m*2) (e.g., direction and/or rotation) of the computer system. In response to detecting the change in the orientation of the computer system, the computer system maintains a display position (e.g., via the display generation component) of the indication of the direction of the computer system (e.g., as depicted by 602 during the transition of FIGS. 6K-6L and the transition between FIGS. 6L and 6N). In response to detecting the change in the orientation of the computer system, the computer system moves (e.g., rotates and/or translates) a position of the one or more indications of the plurality of historic locations (e.g., as depicted by 628 during the transition of FIGS. 6K-6L and the transition between FIGS. 6L and 6N). Maintaining a position of the directional indicator while one or more of the historic location indicators move enhances the user's interaction with the computer system because it depicts the computer system's change in orientation, thereby improving visual feedback.

In some embodiments, the computer system detects a change in an orientation (e.g., 650*k* and/or 650*m*2) (e.g., direction and/or rotation) of the computer system. In response to detecting the change in the orientation of the computer system, the computer system maintains a position (e.g., on the display) of the one or more indications of the plurality of historic locations (e.g., 628 maintains a position during the transition of FIGS. 6K-6L and the transition between FIGS. 6L and 6N). In response to detecting the change in the orientation of the computer system, the computer system moves (e.g., rotates and/or translates) a position (e.g., on the display generation component) of the indication of the direction of the computer system (e.g., 640 and/or 604 moves during the transition of FIGS. 6K-6L and the transition between FIGS. 6L and 6N). Displaying the directional indicator in the same position while the historic location indicators move enhances the user's interaction with the computer system because it depicts the computer system's change in orientation, thereby improving visual feedback.

In some embodiments, the computer system determines current locations of the computer system at a defined frequency (e.g., location of device 600 is detected every 5 seconds, 10 seconds, and/or 30 seconds). In some embodiments, the computer system determines the location of the computer system at the defined frequency and displays a corresponding indication as part of the plurality of history indications. In some embodiments, the one or more indications of the plurality of historic locations are based on a first type of location data (e.g., estimated location data) (e.g., based on data from a first sensor type (e.g., accelerometer sensors)) and a second type of location data (e.g., actual location data) (e.g., based on data from a second sensor type (e.g., GPS sensor)) different from the first type of location data. In some embodiments, the computer system detects the first type of location data at a first frequency (e.g., every 5 seconds, every 15 seconds, and/or every 30 seconds). In some embodiments, the computer system detects the second type of location data at a second frequency (e.g., different that the first frequency and/or the same as the first frequency). In some embodiments, the second frequency is every 5 minutes, every 10 minutes, and/or every 15 minutes. Capturing historic locations using a defined frequency enhances the computer system because data generated by power-hungry sensors (e.g., satellite-based location sensor) be captured at defined frequencies, thereby improving the battery life of the computer system.

In some embodiments, location data of the plurality of historic locations is captured (e.g., begins to be captured, automatically captured without user input, and/or a back-track setting is automatically enabled) based on satisfying a set of criteria. In some embodiments, the set of criteria includes a first criterion that is satisfied based on a location of the computer system being outside of a defined area (e.g., data for 628 is captured based on device 600 being outside of a populated area and/or city limits) (e.g., whether the computer system is outside of or not near a known location (e.g., a user's home or near a populated area (e.g., a city/town))). In some embodiments, the predefined area is defined by a set of geocoordinates and/or a presence of a predefined set wireless signals (e.g., GPS, LAN, and/or Wi-Fi). In some embodiments, the one or more indications of the plurality of historic locations of the computer system (and/or a user interface including the one or more indications of the plurality of historic locations) are displayed in response to detecting a predefined hand gesture (e.g., raising a hand above user's head and/or waiving the user's hand). In some embodiments, in response to detecting the predefined hand gesture, the computer system launches (and/or displays) a user interface including the one or more indications of the plurality of historic locations of the computer system while a different user interface ceases to be displayed. In some embodiments, the computer system detects that a location tracking setting is enabled (e.g., automatically (e.g., based on detecting a triggering event (e.g., a parked car, a lack of a local area network (e.g., WiFi), a lack of GPS data) or manually (e.g., detecting a user input via the one or more inputs)) at a first point in time. In some embodiments, in response to detecting the location tracking setting is enabled at the first point in time, the computer system detects the location data for the plurality of historic locations. In some embodiments, while detecting the location data, the computer system detects an input. In some embodiments, in response to detecting the input, the computer system displays the one or more indications of the plurality of historic locations. Capturing historic locations based on a criterion that is satisfied based on a location of the computer system being outside of a defined area enhances the user's interaction with the computer system since the historic location data is not tracked when the computer system is in a known location (such as within city limits), thereby improving visual feedback of the computer system's movement over time and improving the security of the computer system by not allowing a bad actor to secretly activate and view historic locations of the computer system so as to view where the user has been.

In some embodiments, the set of criteria includes a second criterion that is satisfied when one or more wireless signals (e.g., one or more global navigation satellite system signals (e.g., GPS, BeiDou, Galileo, GLONASS, IRNSS, NavIC, and/or QZSS) and/or one or more LAN networks) are unavailable (e.g., data for 628 is captured based on device 600 not detecting a Wi-Fi network) (e.g., not detected). In some embodiments, when the one or more wireless signals are not available, the computer system uses an accelerometer and and/or magnetometer of the computer system to determine (e.g., estimate) a direction of travel, a distance of travel, and/or a current location. In some embodiments, the location tracking setting is enabled based on the computer system detecting one or more wireless signals (e.g., one or more global navigation satellite system signals (e.g., GPS, BeiDou, Galileo, GLONASS, IRNSS, NavIC, and/or QZSS) and/or one or more LAN networks) are unavailable. Using a criterion that is satisfied when one or more wireless signals are unavailable in the set of criteria enhances the user's interaction with the computer system since historic locations can be captured when there is a lack of connectivity, which improves how the computer system provides navigational capabilities in the wilderness or locations that do not have one or more wireless signals.

In some embodiments, the computer system displays, via the display generation component, an indication of a first waypoint (e.g., 610*a*, 610*b*, 610*c*, 610*d*, 610*e*, 610*f*, 610*g*, and/or 610*h*) (e.g., a defined location and/or a location corresponding to one or more coordinates), wherein displayed relationships (e.g., distances between and/or relative positions of) among the indication of the first waypoint, the one or more indications of the plurality of historic locations, and the indication of the current location corresponds to geographical relationships (e.g., distances between and/or relative positions of) (e.g., based on location data (e.g., geographic location data, either estimated (e.g., based on data from one sensor type (e.g., accelerometer sensors)) or actual (e.g., based a different sensor type (e.g., GPS sensor)))) among the first waypoint, the plurality of historic locations, and the current location of the computer system (e.g., as depicted in FIGS. 6E-6G). In some embodiments, the first waypoint is user-defined (e.g., added and/or edited) and/or automatically defined (e.g., marking a position of a car in response to detecting a car has been parked). Displaying an indication of a waypoint along with historic locations of the computer system enhances the user's interaction with the computer system by allowing a user to view where the computer system has been and what direction the user has to go to find a particular location (e.g., a campsite or lake), thereby improving visual feedback as to the location of the computer system in an unknown environment.

In some embodiments, the computer system detects an update to the current location (e.g., 650*h*) (e.g., estimated or actual) of the computer system. In response to detecting the update to the current location of the computer system, the computer system modifies the displayed relationship (e.g., distances between and/or relative positions of) among the indication of the first waypoint, the indication of the current location of the computer system, and the one or more indications of the plurality of historic locations of the computer system (e.g., as depicted in FIG. 6H). Modifying the displayed relationship among a waypoint, a current location of the computer system, and the one or more indications of the plurality of historic locations of the computer system enhances the user's interaction with the computer system because the user interface depicts how a user's position has changed with respect to a particular location, thereby improving visual feedback of the movement of the computer system over time.

In some embodiments, the computer system modifies an appearance of the indication of the first waypoint (e.g., enlarging the indication, adding a visual element (e.g., icon and/or description of the first waypoint), and/or changing the indicator to a different indicator) based on a direction (e.g., orientation and/or heading) of the computer system (e.g., 647 appears during the transition between FIGS. 6G-6H) (e.g., when the computer system is toward (e.g., is facing and/or is pointing towards) a geographic location (e.g., estimated or actual) of the indication of the first waypoint and/or in accordance with a determination that the geographic location of the indication of the first waypoint is within a threshold distance of the current location of the computing system). In some embodiments, in accordance with a determination that the computer system is facing and/or is pointing towards a geographic location (e.g., estimated or actual) of the indication of the first waypoint (and/or in accordance with a determination that the geographic location of the indication of the first waypoint is within a threshold distance of the current location of the computing system), the computer system modifies an appearance the indication of the first waypoint. In some embodiments is facing and/or is pointing towards a geographic location (e.g., estimated or actual) of the indication of the first waypoint (and/or in accordance with a determination that the geographic location of the indication of the first waypoint is within a threshold distance of the current location of the computing system) (and/or in accordance with a determination that the geographic location of the indication of the first waypoint is not within a threshold distance of the current location of the computing system), the computer system forgoes modifying the appearance the indication of the first waypoint. Modifying the visual property of a waypoint based on the direction of the computer system enhances the user's interaction with the computer system because it indicates the user is heading in a direction of the waypoint, thereby improving visual feedback of the orientation of the computer system.

In some embodiments, while concurrently displaying the indication of the first waypoint, the one or more indications of the plurality of historic locations of the computer system, and the indication of the current location of the computer system, the computer system detects, via one or more input devices, an input (e.g., a depress on rotating input element 632 at FIG. 6F) (e.g., a series of inputs) (e.g., a swipe, tap, and/or input on a rotatable device (e.g., rotational input and/or depression of the rotatable device)). In some embodiments, in response to detecting the input, the computer system ceases to display the one or more indications of the plurality of history locations (and, optionally, ceasing to display the indication of the first waypoint and/or the indication of the current location). In some embodiments, in response to detecting the input, the computer system displays, via the display generation component, a watch face user interface (e.g., 802 of FIG. 8J) (e.g., including an analog and/or digital indicators for a time) including (e.g., concurrently including) one or more complications, wherein the one or more complications includes a first complication (e.g., 832 and/or 834) having a directional indicator (e.g., 838*a* and/or 838*b*) (e.g., symbol and/or graphical object) pointing toward (and that updates to point toward) the first waypoint (e.g., as described with respect to FIG. 9). Displaying a watch face that includes a complication having a directional indicator pointing toward the first waypoint enhances the user's interaction with the computer system because it provides an indication of a direction of the first waypoint while giving the user access to the watch face (e.g., which might include other complications), thereby improving visual feedback of the orientation of the computer system while a watch face is displayed.

In some embodiments, the one or more complications include a second complication (e.g., 832 and/or 834) for a second waypoint (e.g., 610*a*, 610*b*, 610*c*, 610*d*, 610*e*, 610*f*, 610*g*, and/or 610*h*) different from the first waypoint (e.g., as described with respect to FIG. 9), the second complication including a directional indicator (e.g., 838*a* and/or 838*b*) pointing toward the second waypoint. Displaying different complications for different waypoints enhances the user's interaction with the computer system because it provides directional indicators for each waypoint while giving the user access to user's watch face (e.g., which might include other complications), thereby improving visual feedback of the orientation of the computer system while a watch face is displayed.

In some embodiments, the one or more complications (e.g., the first complication, the second complication, and/or a third complication) include an indication of a distance (e.g., 840*a* and/or 840*b*) to a respective waypoint (e.g., as described with respect to FIG. 9) (e.g., 610*a*, 610*b*, 610*c*, 610*d*, 610*e*, 610*f*, 610*g*, and/or 610*h*). Displaying an indication of a distance to the waypoint in the complication enhances the user's interaction with the computer system because the user does not have to open the application to navigate to determine how far a waypoint is from the user's current location, which reduces the number of inputs needed to perform an operation and provides access to other applications and/or functions of a smart watch while location information is displayed.

In some embodiments, while concurrently displaying the indication of the first waypoint, the one or more indications of the plurality of historic locations of the computer system, and the indication of the current location of the computer system, the computer system detects, via the one or more input devices, an input (e.g., 650*w*1 and/or 650*w*2) (e.g., tap, swipe, input on a rotatable input device). In some embodiments, the input is at an area of the display (e.g., an inner-dial) that includes the indication of the first waypoint with the one or more indications of the plurality of historic locations of the computer system and/or the indication of the current location of the computer system. In some embodiments, in response to detecting the input, the computer system displays, via the display generation component, a first graphical user interface (e.g., 693) including a plurality of affordances (e.g., 691) for a plurality of waypoints that, when selected, causes display of a second graphical user interface (e.g., 694) for a respective (e.g., selected) waypoint (e.g., the tent waypoint associated with 695) (e.g., without including a directional indicator for a non-selected waypoint and/or without including a directional indicator the first waypoint). In some embodiments, the plurality of waypoints satisfies (e.g., is within) a threshold distance of the current location of the computer system (e.g., and does not include a waypoint that exceeds a threshold distance). Displaying a graphical user interface including a plurality of affordances for a plurality of waypoints that, when selected, causes display of a graphical user interface including a directional indicator for a respective waypoint enhances the user's interaction with the computer system because the user view and/or select different waypoints so as to display a directional indicator for the selected waypoint, which reduces the number of inputs needed to perform an operation and improves how the computer system provides navigational functionality.

In some embodiments, the second graphical user interface includes navigational information (e.g., 696, 697, 665, 696 and/or "60 FT to your left" as depicted in FIG. 6Y) (e.g., bearing information, distance to waypoint, and/or position with respect to current device location) for the respective waypoint. In some embodiments, the navigational information for the respective waypoint includes a directional indicator (e.g., bearing information or position information of the waypoint with respect to a current location of the computer system). Including navigational information to the respective waypoint in the graphical user interface enhances the user's interaction with the computer system because the user does not have to navigate through a navigational application display a navigational user interface for a specific a waypoint, which reduces the number of inputs needed to perform an operation.

In some embodiments, the plurality of affordances for the plurality of waypoints are scrolled in response to detecting an input (e.g., waypoint interface 693 of FIG. 6X can be scrolled to view other waypoints) (e.g., swipe or rotatable input (e.g., via a rotatable input device)). Scrolling a set of waypoints enhances the user's interaction with the computer system because the user view multiple waypoints so as to select a specific waypoint to target in the targeting navigational user interface, which provides additional control options without cluttering the user interface.

In some embodiments, the one or more indications of the plurality of historic locations of the computer system, the indication of the current location of the computer system, and the indication of the direction of the computer system are concurrently displayed in a first navigational graphical user interface (e.g., as depicted by 602 in FIG. 6E). In some embodiments, while displaying the first navigational graphical user interface, the computer system detects, via a rotatable input device (e.g., 632) (e.g., a hardware knob and/or a watch crown of the computer system), a rotational input (e.g., 650*e*) (and/or detecting, via one or more input devices, a swipe and/or drag input) in a first direction (as described with respect to FIG. 6E) (e.g., clockwise or counter-clockwise) (e.g., left, right, up, and/or down). In some embodiments, in response to detecting the rotational input (and/or swipe and/or drag input) in the first direction, the computer system ceases display of the first navigational graphical user interface. In some embodiments, in response to detecting the rotational input (and/or swipe and/or drag input) in the first direction, the computer system displays, via the display generation component, a second navigational graphical user interface (e.g., as depicted by 602 in FIG. 6F) different from the first navigational graphical user interface, the second navigational graphical user interface including (e.g., concurrently including) the one or more indications of the plurality of historic locations of the computer system, the indication of the current location of the computer system, and the indication of the direction of the computer system. In some embodiments, the second navigational graphical user interface includes one or more navigational graphical elements (e.g., one or more directional indicators, one or more historic locations of the computer system, one or more waypoints) that are not included in the first navigational graphical user interface. In some embodiments, the first navigational graphical user interface includes one or more navigational graphical elements that are not included in the second navigational graphical user interface. In some embodiments, a first area (e.g., an inner dial and/or an outer dial) of the first navigational graphical user interface is different from (e.g., larger and/or smaller) the first area of the second navigational graphical user interface. Displaying different navigational user interfaces in response to an input enhances the user's interaction with the computer system because different navigational features are displayed while still maintaining display of a user interface that depicts the user's previously traveled route, which provides additional control options without cluttering the user interface and/or provides improved visual feedback that input was received.

In some embodiments, in response to detecting the rotational input (e.g., 650*d* and/or 650*e*) (and/or a swipe or drag input) in the first direction, the computer system modifies (e.g., expanding into one or more larger graphical object(s) (e.g., a line, a solid line, a dashed line, and/or dotted line) or collapsing in one or more (e.g., a single) smaller graphical object(s) (e.g., triangle, circle, and/or square)) the one or more indications of the plurality of historic locations of the computer system (e.g., 628 transitions between an arrow to a line from FIGS. 6D-6E and/or additionally portions are added to 628 during the transition between FIGS. 6E to 6F) (e.g., without zooming in or out). In some embodiments, after modifying, the one or more indications of the plurality of historic locations of the computer system are displayed in a larger portion of the display. In some embodiments, after modifying, the one or more indications of the plurality of historic locations of the computer system are displayed in a smaller portion of the display. Modifying the display of historic locations across different navigational user interfaces in response to an input enhances the user's interaction with the computer system because it provides visual feedback of detecting user input and/or provides visual feedback that a computer system has moved over time, which provides improved visual feedback.

In some embodiments, the computer system detects a second rotational input (e.g., 650*e* and/or 650*f*) (e.g., continuing to detect the first rotational input) (and/or a swipe input and/or a drag input) in the first direction. In some embodiments, in response to detecting the second rotational input (and/or swipe input and/or drag input) in the first direction, the computer system ceases display of the second navigational graphical user interface and displays, via the display generation component, a third navigational graphical user interface (e.g., 602 of FIG. 6E and/or 602 of FIG. 6F) different from the first navigational graphical user interface and the second navigational graphical user interface, the third navigational graphical user interface including (e.g., concurrently including) the one or more indications of the plurality of historic locations of the computer system, the indication of the current location of the computer system, and the indication of the direction of the computer system. In some embodiments, the third navigational graphical user interface does not include one or more navigational graphical elements included in the first navigational graphical user interface and/or the second navigational graphical user interface. In some embodiments, a first area (e.g., an inner dial and/or an outer dial) of the third navigational graphical user interface is different from (e.g., larger and/or smaller) the first area of the first navigational graphical user interface and/or second navigational graphical user interface. Modifying the display of historic locations across different navigational user interfaces in response to an input enhances the user's interaction with the computer system because it provides visual feedback of detecting user input and/or provides visual feedback of how the computer system has moved over time, which provides improved visual feedback.

In some embodiments, the one or more indications of the plurality of historic locations of the computer system includes an indication of a first historic location and an indication of a second historic location (e.g., a first portion and a second portion of 628 of FIG. 6F). In some embodiments, the computer system displays, via the display generation component, a first visual relationship (e.g., a visual relationship between a first portion and a second portion of 628 of FIG. 6F) between the indication of the first historic location and the indication of the second historic location (e.g., the indications being spaced apart a first distance on the display). In some embodiments, while displaying the first visual relationship between the indication of the first historic location and the indication of the second historic location, the computer system detects an input (e.g., tap, swipe, and/or rotational input) corresponding to a request to change a zoom level (e.g., **650*f*). In some embodiments, in response to detecting the input corresponding to the request to change the zoom level, the computer system displays, via the display generation component, a second visual relationship (e.g., a visual relationship between the first portion and the second portion of 628 of FIG. 6**G) between the indication of the first historic location and the indication of the second historic location, wherein the second visual relationship is different from the first visual relationship (e.g., the indications being spaced apart a second distance (different from the first distance) on the display and/or the second visual relationship includes a greater amount and/or lessor amount of distance between the indication of the first historic location and the indication of the second historic location). Modifying the visual relationship between historic location indicators in response to an input enhances the user's interaction with the computer system because it provides visual feedback of detecting user input and/or allows a user to zoom into (or out of) locations that the computer system has been.

In some embodiments, the computer system displays, via the display generation component, a scale (e.g., 646) (e.g., concentric circles or gridlines) having a first visual characteristic (e.g., distance between distance indicators 646 of FIG. 6E) (e.g., distance between concentric circles and/or gridlines). In some embodiments, while displaying the scale, the computer system detects, via the one or more input devices, an input (e.g., **650*f*) (e.g., tap, swipe, and/or rotational input) corresponding to a request to change a zoom level. In some embodiments, in response to detecting the input corresponding to the request to change the zoom level, the computer system displays the scale as having a second visual characteristic (e.g., distance between distance indicators 646 of FIG. 6**E) different from the first visual characteristic (e.g., increasing and/or decreasing a distance between the concentric circles or gridlines). In some embodiments, the scale is concurrently displayed with the one or more indications of the plurality of historic locations of the computer system, the indication of the current location of the computer system, and the indication of the direction of the computer system. Displaying the scale as having the second visual characteristic in response to detecting an input to change the zoom level enhances the user's interaction with the computer system because it provides visual feedback of detecting user input and/or provides an appropriate scale based on the zoom level, which provides improved visual feedback.

Note that details of the processes described above with respect to method 700 (e.g., FIG. 7) are also applicable in an analogous manner to the methods described herein. For example, methods 900, 1000, and/or 1200 optionally include one or more of the characteristics of the various methods described above with reference to method 700. For example, methods 900 and/or 1000 provides navigational user interfaces and navigational information for waypoints described above with reference to method 700, for example, including targeted navigational user interfaces, historic location information, and/or waypoint navigational information. For brevity, these details are not repeated herein.

FIGS. 8A-8U illustrate exemplary user interfaces for navigation, in accordance with some embodiments. The user interfaces in these figures are used to illustrate the processes described below, including the processes in FIGS. 9 and 10.

At FIG. 8A, device 600 displays, on display 601, watch user interface 802 of a smartwatch including an analog indication (e.g., hour hand and/or minute hand) of a current time. In some embodiments, device 600 is a smartphone, tablet, or laptop computer and, as such, watch user interface is a user interface for a smartphone, tablet, or laptop. Watch user interface 802 also includes complications from different applications, including air-quality complication 804 from a weather application, calendar complication 805 from a calendar application, heart-rate complication 806 from a health application, and navigational complication 808 from a navigation application. As depicted, navigational complication 808 includes a directional indicator (e.g., arrow) to indicate which direction is North. At FIG. 8A, while displaying watch user interface 802, device 600 detects input **850*a* (e.g., a touch input, air gesture, and/or other input) corresponding to a request to edit watch user interface 802. In response to detecting input 850*a*, device 600 displays watch face selection menu 810, as depicted in FIG. 8**B.

Figure 8B:
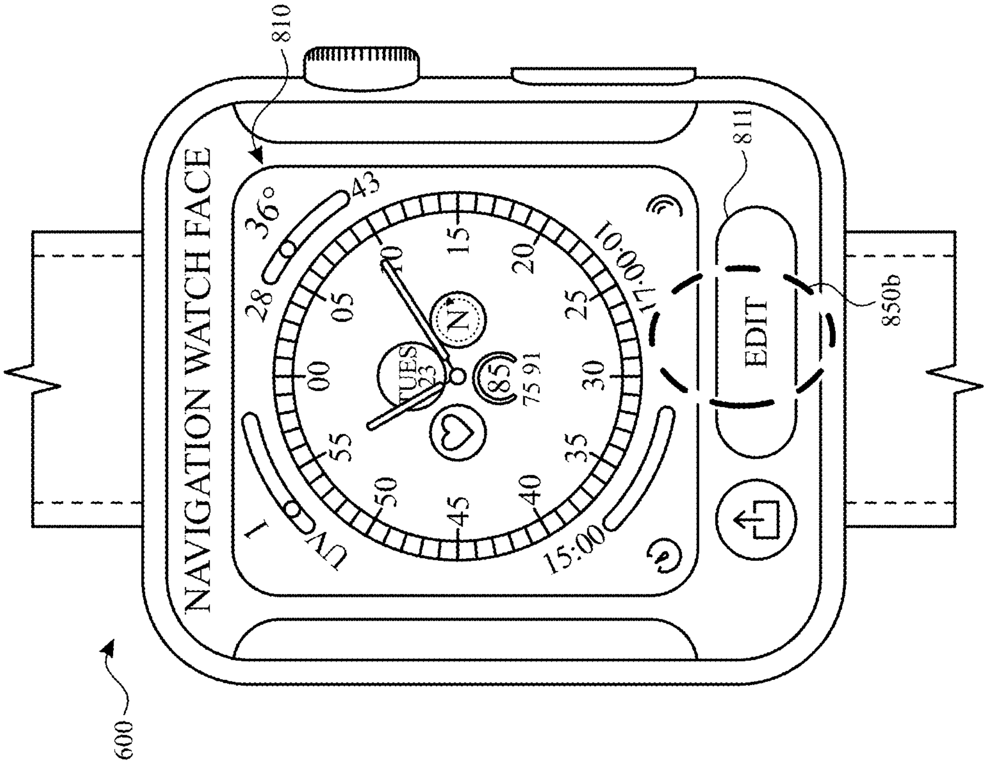
FIGS. 8A-8U illustrate exemplary user interfaces for managing navigational information on a watch face, in accordance with some embodiments.
Figure 8A:
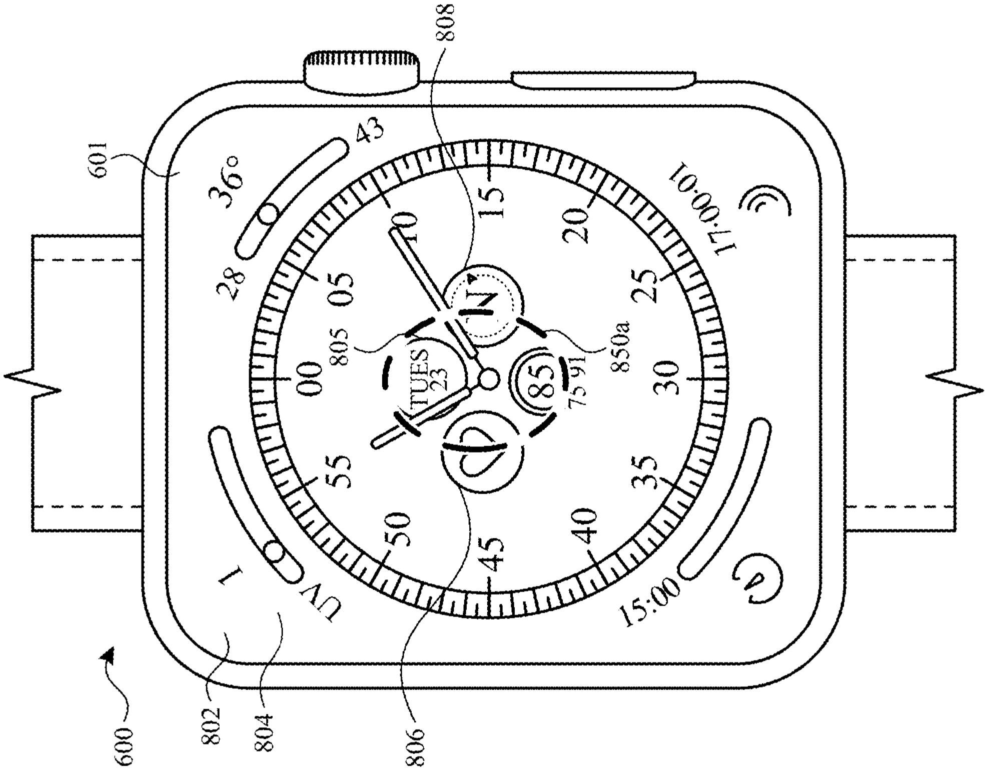

At FIG. 8B, watch face selection menu 810 includes a representation of watch user interface 802 and edit affordance 811 to edit watch user interface 802. At FIG. 8B, while displaying watch face selection menu 810, device 600 detects input **850*b* (e.g., a touch input, air gesture, and/or other input) directed at edit affordance 811. In response to detecting input 850*b*, device 600 displays complication edit interface 812, as depicted in FIG. 8**C.

Figure 8C:
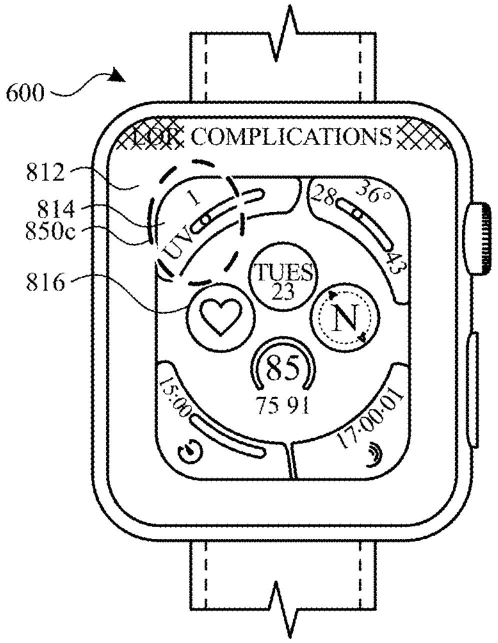

At FIG. 8C, complication edit interface 812 is a user interface that enables a user to edit a complication of watch user interface 802. Complication edit interface 812 includes representation 814 of air-quality complication 804 and representation 816 of heart-rate complication 806. While displaying complication edit interface 812, device 600 detects input **850*c* (e.g., a touch input, air gesture, and/or other input) directed at representation 814. In response to detecting input 850*c*, device 600 displays complication menu 820, as depicted in FIG. 8**D.

Figure 8D:
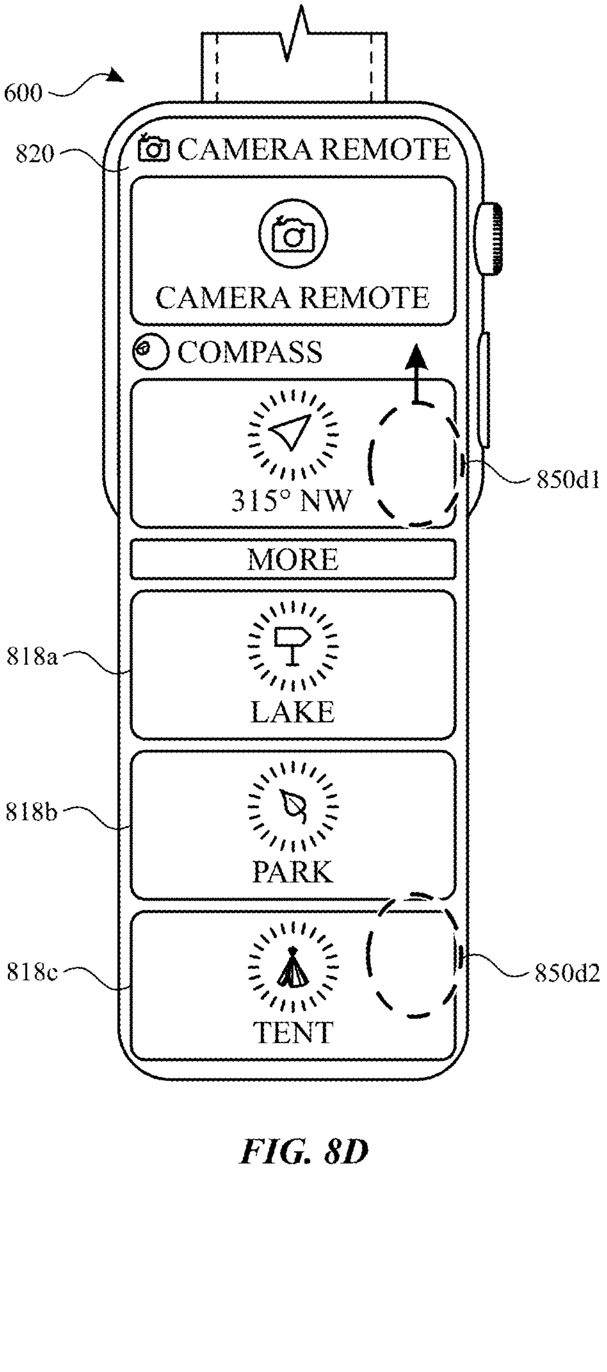

At FIG. 8D, complication menu 820 includes complications from different applications. As depicted, complication menu 820 includes affordances **818*a*, 818*b*, and 818*c* for selecting a particular waypoint for a static waypoint complication. In some embodiments, complication menu 820** includes affordances for the activated and/or deactivated waypoints described with respect to FIGS. 6A-6AA. Affordances 818*a*, 818*b*, and 818*c* each designate a particular waypoint, such as a Lake waypoint, a Park waypoint, or Tent waypoint, for the static waypoint complication. As described in greater detail herein, device 600 maintains a selected waypoint for the static waypoint complication (as compared to a dynamic waypoint complication which changes a waypoint in response to displaying a targeted navigational interface, as described in greater detail with respect to FIGS. 8L-8N). For example, device 600 does not change the selected waypoint for a static waypoint complication to a different waypoint in response to detecting the display of a targeted navigational interface.

At FIG. 8D, while displaying complication menu 820, in response to detecting input 850*d*1 (e.g., a touch input, air gesture, and/or other input), device 600 scrolls through options of different waypoints to add as the static waypoint complication. While displaying complication menu 820, device 600 detects input 850*d*2 (e.g., a touch input, air gesture, and/or other input) directed at affordance 818*c* corresponding to the Tent waypoint (e.g., the Tent waypoint described in reference to FIGS. 6A-6AA). In response to detecting input 850*d*2, device 600 displays complication edit interface 812, as depicted in FIG. 8E.

Figure 8E:
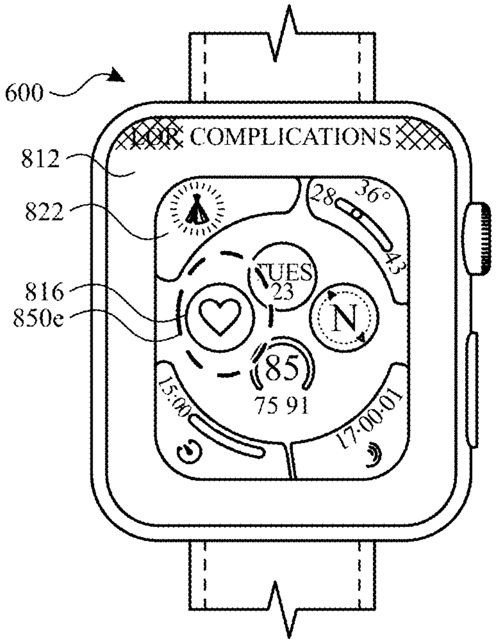

At FIG. 8E, complication edit interface 812 includes representation 822 for the static waypoint complication. While displaying complication edit interface 812, device 600 detects input 850*e* (e.g., a touch input, air gesture, and/or other input) directed at representation 816. In response to detecting input 850*e*, device 600 displays complication menu 820, as depicted in FIG. 8F.

Figure 8F:
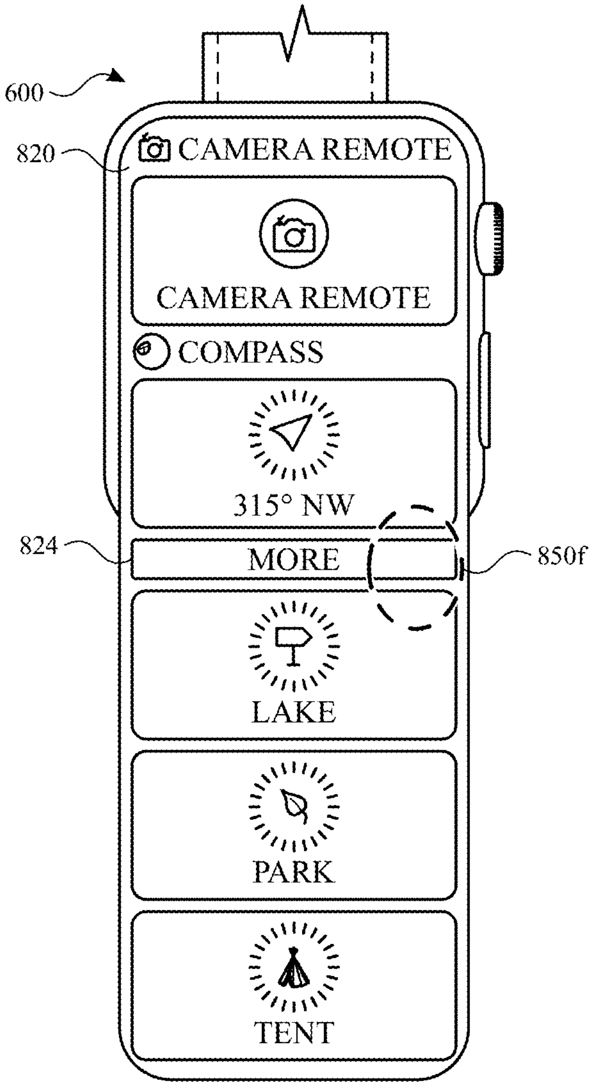
Figure 8H:
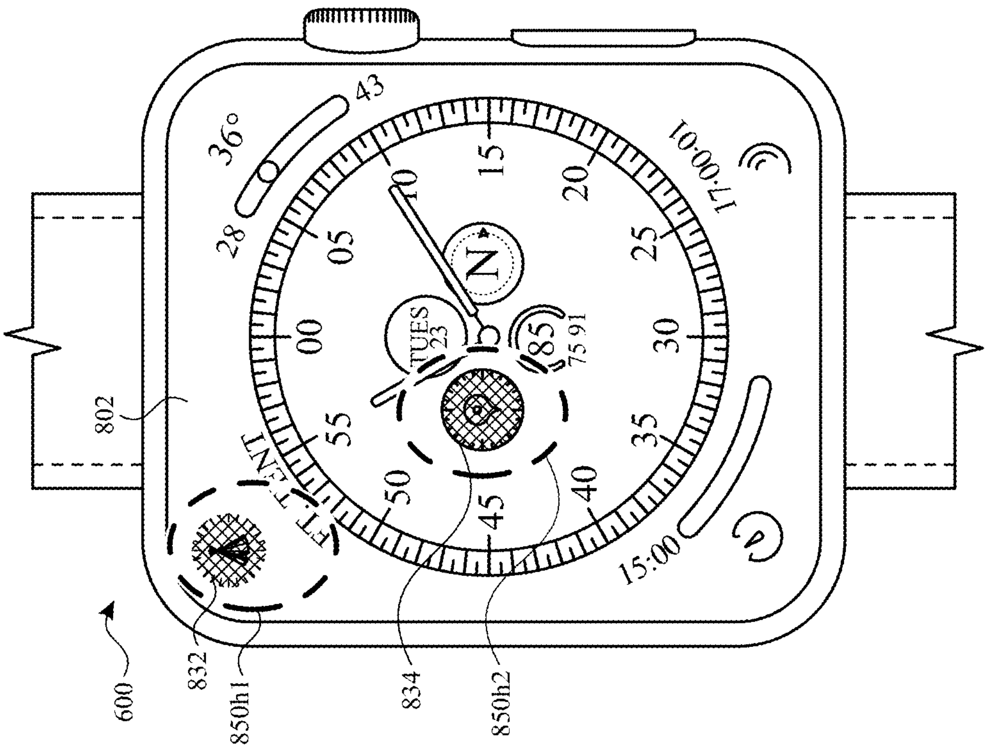

At FIG. 8F, while displaying complication menu 820, device 600 detects input 850*f* (e.g., a touch input, air gesture, and/or other input) directed at more affordance 824. In response to detecting input 850*f*, device 600 displays menu 830, as depicted in FIG. 8G.

Figure 8G:
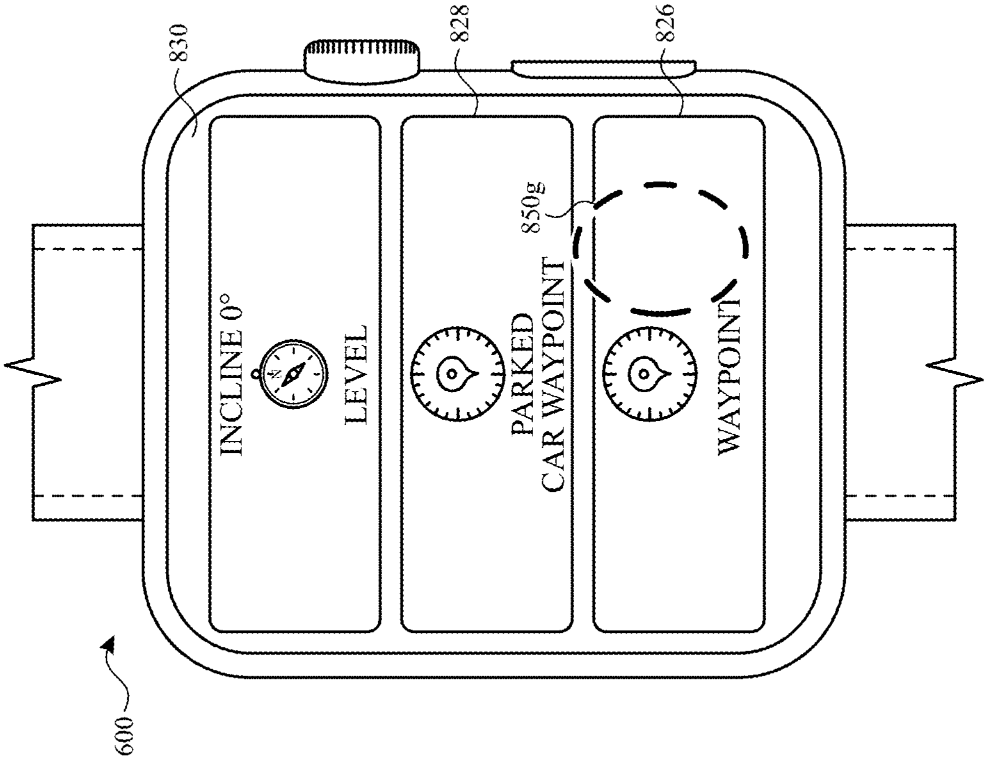

At FIG. 8G, menu 830 includes dynamic waypoint affordance 826 and event waypoint affordance 828. As described in greater detail herein, the waypoint of a dynamic waypoint complication changes among different waypoints in response to a trigger. In some embodiments, the trigger includes detecting that targeted navigational interface 694 for a particular waypoint has been displayed.

At FIG. 8G, in some embodiments, event waypoint affordance 682 is associated with a waypoint that is automatically saved to device 600 in response to detecting an event. As depicted, event waypoint affordance 682 corresponds to a waypoint for a parked vehicle. In some embodiments, device 600 detects an event (e.g., detecting a lack of Bluetooth signal from computer system associated with the vehicle and/or detecting that transmission of the vehicle has been placed in park) and stores a physical location for the event (e.g., the current location of device 600). In some embodiments, device 600 communicates with applications (e.g., a map application, a calendar application, a health application, and/or other applications) and/or other computer systems for detecting an event.

At FIG. 8G, while displaying menu 830, device 600 detects input 850*g* (e.g., a touch input, air gesture, and/or other input) directed at dynamic waypoint affordance 826. In response to detecting input 850*d*, device 600 replaces heart-rate complication 806 with a dynamic waypoint complication.

At FIG. 8H, device 600 has updated watch user interface 802 to include static waypoint complication 832 and dynamic waypoint complication 834 (e.g., in response to user input requesting display of watch user interface 802). As depicted, static waypoint complication 832 includes an icon of the Tent waypoint, which is optionally user-configurable (e.g., via waypoint editor interface 680). Dynamic waypoint complication 834 does not include an icon of the Tent waypoint. In some embodiments, a visual characteristic (e.g., shading and/or size) of static waypoint complication 832 and dynamic waypoint complication 834 indicates that static waypoint complication 832 and dynamic waypoint complication 834 are in a deactivated state. In some embodiments, static waypoint complication 832 and dynamic waypoint complication 834 do not include navigational information (and/or distance information) while in the deactivated state. As depicted, other complications of watch user interface 802 are optionally active and providing information from their respective applications while static waypoint complication 832 and dynamic waypoint complication 834 are in a deactivated state. In some embodiments, device 600 at FIG. 8H is in a first mode (e.g., non-low power mode and/or a non-dimmed state based on detecting a wrist raise) while static waypoint complication 832 and dynamic waypoint complication 834 are in the deactivated state.

At FIG. 8H, while displaying watch user interface 802, device 600 detects input 850*h*1 (e.g., a touch input, air gesture, and/or other input) directed at static waypoint complication 832. In response to detecting input 850*h*, device 600 displays targeted navigational interface 694, as depicted in FIG. 8I. In some embodiments, device 600 detects an input 850*h*2 (e.g., a touch input, air gesture, and/or other input) directed at dynamic waypoint complication 834. In response to detecting the input 850*h*2 directed at dynamic waypoint complication 834, device 600 displays a waypoint menu similar to waypoint menu 841, as depicted in FIG. 8K.

At FIG. 8I, targeted navigational interface 694 incudes navigational information for the waypoint associated with static waypoint complication 832. As depicted, targeted navigational interface 694 includes navigational information for the Tent waypoint, which is depicted in representation 695. Targeted navigational interface 694 of FIG. 8I is similar to and is described in greater detail in reference to targeted navigational interface 694 of FIG. 6Y.

At FIG. 8I, while displaying targeted navigational interface 694, device 600 detects input 850*i* (e.g., a depress of a button or a rotational input device, a touch input, air gesture, and/or other input), which optionally corresponds to a request to display watch user interface 802. In response to detecting input 850*i*, device 600 displays watch user interface 802, as depicted in FIG. 8J.

Figure 8J:
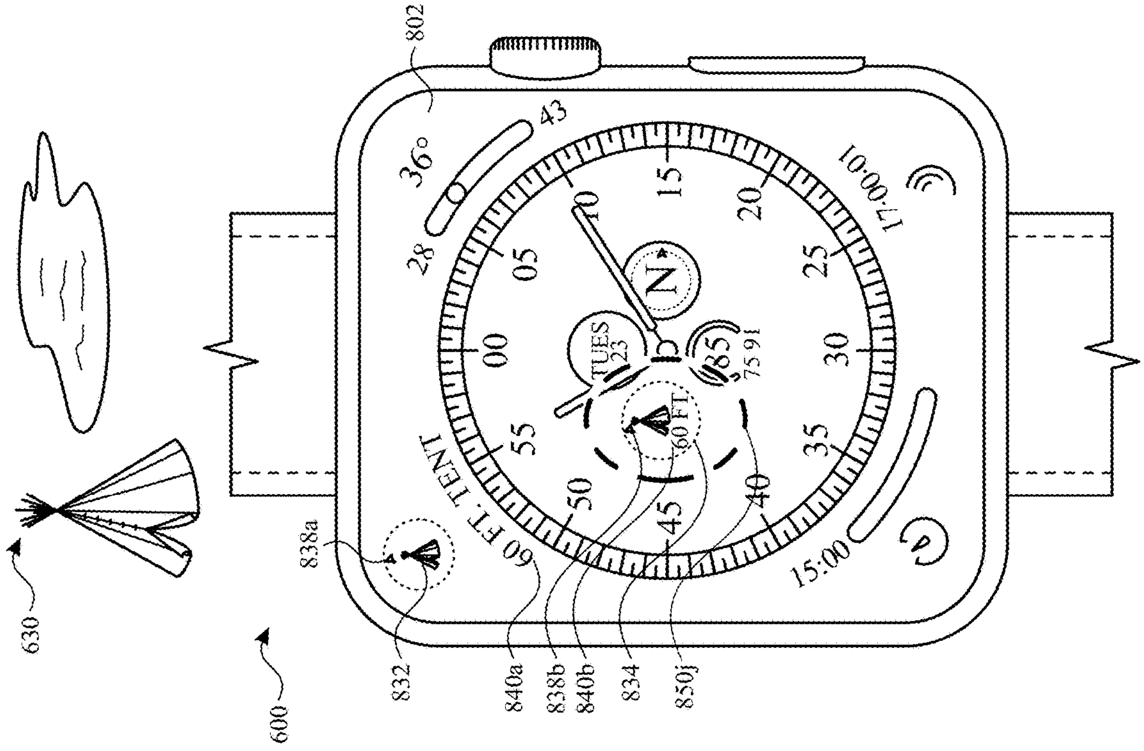
Figure 8I:
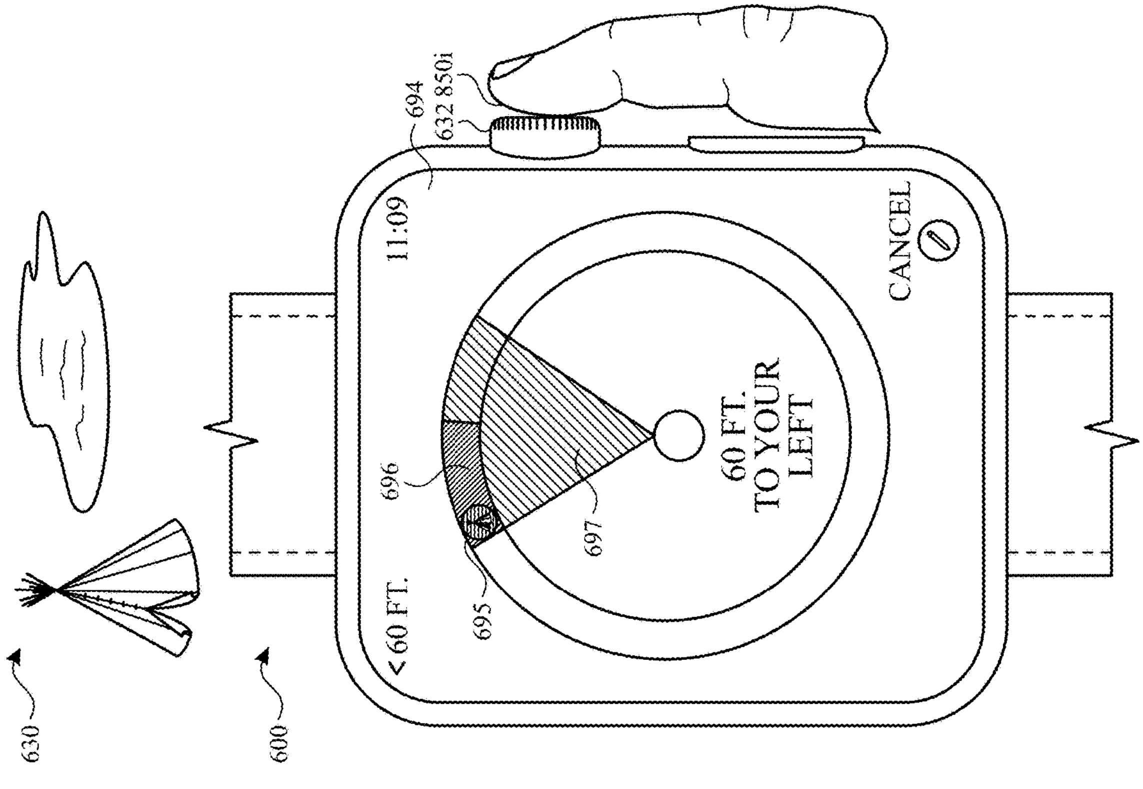

At FIG. 8J, device 600 has activated the waypoint complications of watch user interface 802 based on the earlier display of targeted navigational interface 694. As depicted, when activated, static waypoint complication 832 includes navigational information to the Tent in environment 630 and the icon of the Tent waypoint. For example, static waypoint complication 832 includes waypoint directional indicator 838*a* pointing in the direction of the Tent in environment 630. As described herein, device 600 updates waypoint directional indicator 838*a* (e.g., waypoint directional indicator 838*a* rotates) based on a change in orientation of device 600 so as to point in the direction of the tent in environment 630. In some embodiments, device 600 provides an animation (e.g., a gradual change in position over time) of waypoint directional indicator 838*a* as the orientation of device 600 changes. In some embodiments, device 600 moves (e.g., rotates) waypoint directional indicator 838*a* with respect to other graphical elements of watch user interface 802 (e.g., watch hands and/or other complications) as device 600 moves. Additionally, static waypoint complication 832 includes distance indicator 840*a* (e.g., "60 FT") indicating a distance to the Tent. As described herein, device 600 updates distance indicator 840*a* based on a change in location of device 600 so as to indicate an updated distance to the Tent with respect to movement of device 600. Static waypoint complication 832 of FIG. 8J also has a different visual appearance (e.g., different color, different shading, and/or different size) than static waypoint complication 832 of FIG. 8H. In some embodiments, in response to activating the waypoint complications, device 600 detects location information (e.g., using GPS sensors and/or accelerometers) at regular intervals. In some embodiments, while detecting location using GPS, device 600 detects location at one interval (e.g., 1 minutes, 5 minutes, 10 minutes, and/or 15 minutes) and while detecting location using accelerometer sensors, device 600 detects location at another interval (e.g., 5 seconds, 10 seconds, and/or 1 minute), which is optionally the same or different than the interval for detecting location using GPS sensors. In some embodiments, when the waypoint complications are deactivated, device 600 ceases to detect location information (e.g., using GPS sensors and/or accelerometers) to use to display location information within the waypoint complication (e.g., though device 600 may detect location information for other purposes or other applications).

At FIG. 8J, device 600 has also activated dynamic waypoint complication 834 based on the earlier display of targeted navigational interface 694. Notably, device 600 has configured dynamic waypoint complication 834 to correspond to the Tent waypoint in response to the most recently displayed targeted navigational interface 694 having been for the Tent waypoint (as described with respect to FIG. 8I). Because dynamic waypoint complication 834 has been activated, dynamic waypoint complication 834 includes navigational information for the Tent in environment 630. For example, dynamic waypoint complication 834 includes waypoint directional indicator 838*b* and distance indicator 840*b*, which are similar to waypoint directional indicator 838*a* and distance indicator 840*a*. Dynamic waypoint complication 834 of FIG. 8J also has a different visual appearance (e.g., different color, different shading, and/or different size) as compared to dynamic waypoint complication 834 of FIG. 8H. For example, dynamic waypoint complication 834 of FIG. 8J has been updated with a representation (e.g., an icon and/or image) associated with the Tent waypoint (e.g., the last waypoint targeted in the targeted navigational interface 694).

In some embodiments, device 600 automatically deactivates static waypoint complication 832 and dynamic waypoint complication 834. For example, device 600 optionally deactivates static waypoint complication 832 and dynamic waypoint complication 834 at a particular time(s) during the day (e.g., 12:00 AM or 12:00 PM) and/or after a set amount of time (e.g., 15 minutes, 30 minutes, 1 hour, and/or 2 hours). In some embodiments, static waypoint complication 832 and dynamic waypoint complication 834 are still active when device 600 is in a second mode (e.g., low power mode and/or has a dimmed display based on detecting a lowering of a user's wrist), though the visual appearance of the static waypoint complication 832 and dynamic waypoint complication 834 is optionally changed (e.g., directional indicators 838*a*, 838*b* are not displayed, distance indicators 840*a*, 840*b* are not displayed, and/or the color of the representation of the waypoint changes and/or is shaded).

At FIG. 8J, while displaying watch user interface 802, device 600 detects input 850*j* (e.g., a touch input, air gesture, and/or other input) directed at dynamic waypoint complication 834. In response to detecting input 850*j*, device 600 displays waypoint menu 841, as shown in FIG. 8K. In some embodiments, waypoint menu 841 is conditionally displayed based on the state of dynamic waypoint complication 834. For example, when dynamic waypoint complication 834 is in the deactivated state when input 850*j* is detected, device 600 displays waypoint menu 841. However, when dynamic waypoint complication 834 is in the active state when input 850*j* is detected, device 600 displays targeted navigational interface 694 for the Tent waypoint. In some embodiments, a user can navigate to navigational user interface 602 from targeted navigational interface 694 by selecting a cancel affordance in targeted navigational interface 694 and then target a waypoint as described in reference to FIGS. 6W-6Y.

At FIG. 8K, waypoint menu 841 includes waypoints that can be targeted using waypoint affordances 842*a*, 842*b*, and 842*b*. In some embodiments, waypoint menu 841 is similar to or the same as waypoint interface 693 of FIG. 6X. For example, waypoint menu 841 optionally includes the same waypoints as waypoint interface 693. In some embodiments, waypoint menu 841 is not the same as waypoint interface 693 of FIG. 6X. For example, waypoint menu 841 optionally does not include the same waypoints as waypoint interface 693. In some embodiments, waypoint menu includes all active waypoints. In some embodiments, waypoint menu includes a subset of the (e.g., less than all) active waypoints (e.g., active waypoints within a threshold distance for a location of device 600).

At FIG. 8K, while displaying waypoint menu 841, device 600 detects input 850*k* (e.g., a touch input, air gesture, and/or other input) directed at waypoint affordance 842*c* that corresponds to a Lake waypoint. In response to detecting input 850*k*, device 600 displays targeted user interface 694 for the Lake waypoint, as depicted in FIG. 8L.

Figure 8L:
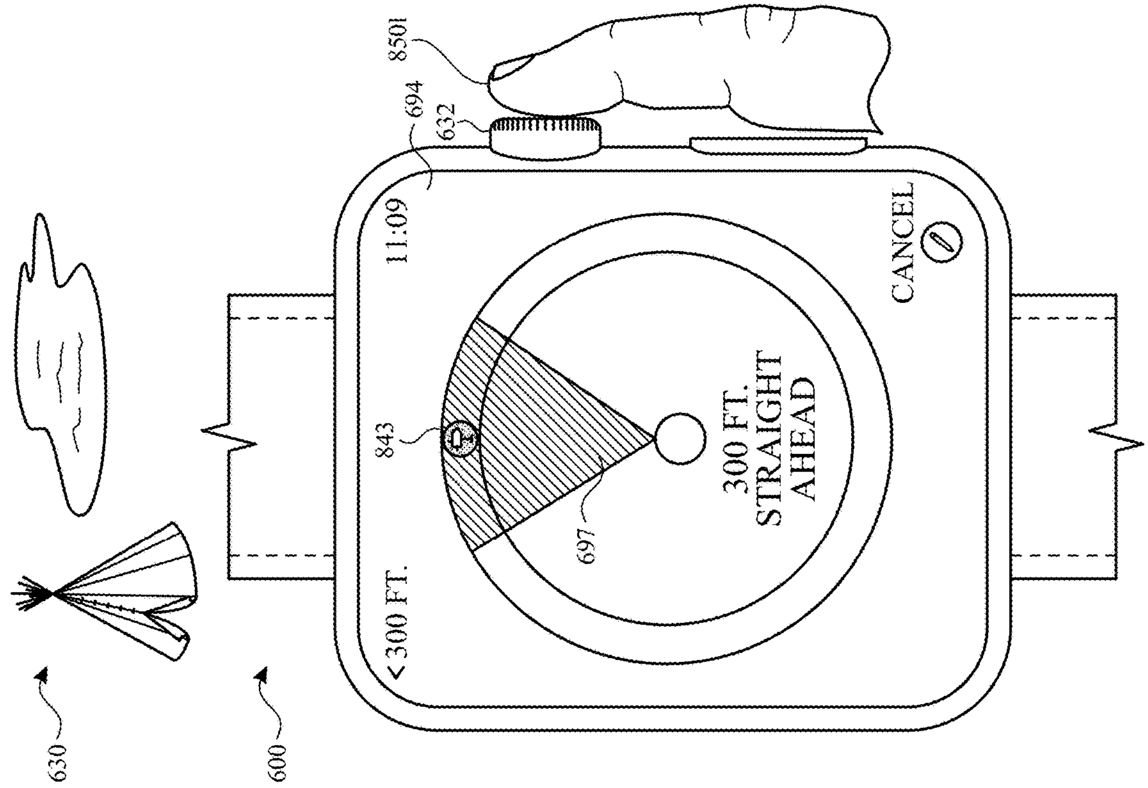
Figure 8K:
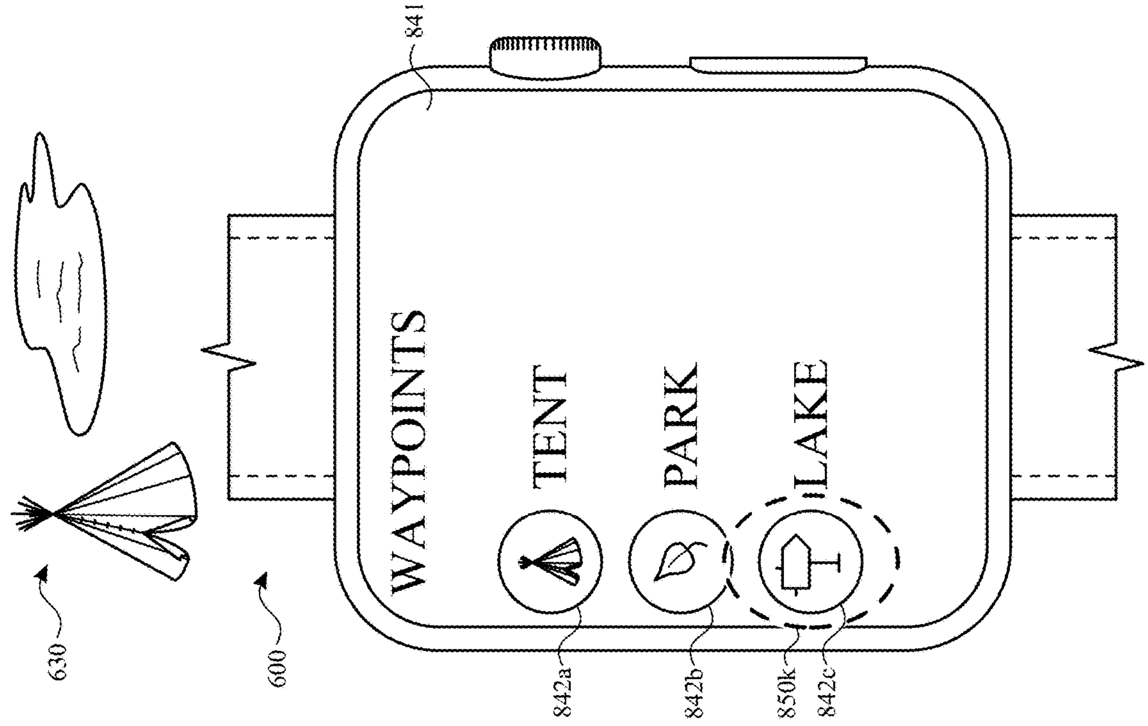

At FIG. 8L, targeted user interface 694 of FIG. 8L is similar to targeted user interface 694 of FIG. 6Y (e.g., includes similar graphical elements) but has a different state. For example, targeted user interface 694 of FIG. 8L includes representation 843 of the Lake waypoint, targeted directional indicator 697, and navigational information. At FIG. 8L, while displaying targeted user interface 694, device 600 detects input 850*l* (e.g., a depress of rotational element 632 and/or a touch input on a touch-sensitive display, such as a swipe gesture) corresponding to a request to display watch user interface 802. In response to detecting input 850*l*, device 600 displays watch user interface 802, as depicted in FIG. 8M.

Figure 8M:
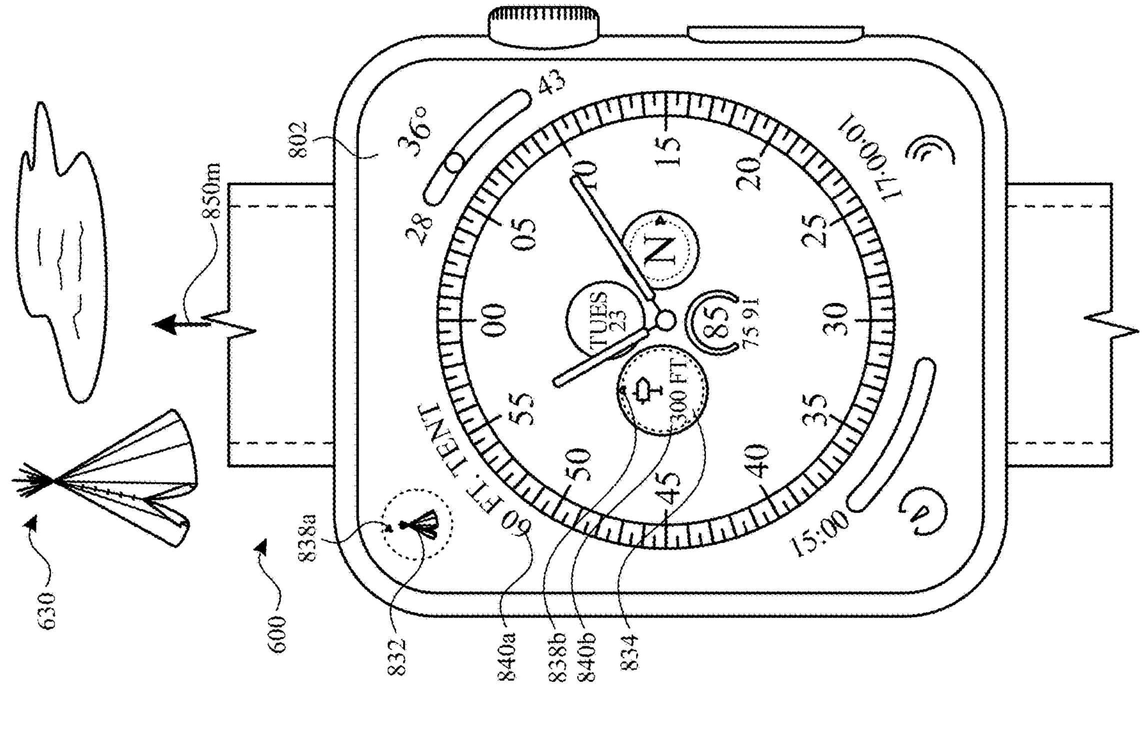

At FIG. 8M, device 600 updates dynamic waypoint complication 834 of watch user interface 802 in response to the most recently displayed targeted user interface 694 having been for the Lake waypoint, as depicted in FIG. 8L. Notably, static waypoint complication 832 is still associated with the Tent waypoint and, as such, has not changed to represent a different waypoint. Dynamic waypoint complication 834 of FIG. 8M includes similar features as dynamic waypoint complication 834 of FIG. 8J, but dynamic waypoint complication 834 of FIG. 8M is associated with the Lake waypoint instead of the Tent waypoint. For example, dynamic waypoint complication 834 of FIG. 8M includes waypoint directional indicator 838*b* pointing in the direction of the lake in environment 630. Additionally, dynamic waypoint complication 834 includes distance indicator 840*b* (e.g., “300 FT”) indicating a distance to the lake in environment 630.

At FIG. 8M, while displaying watch user interface 802, device 600 detects movement 850*m* (e.g., change in location and/or distance traveled) of device 600, where device 600 moves past the tent and closer to the lake in environment 630. In response to detecting movement 850*m*, device 600 updates watch user interface 802 of FIG. 8N.

Figure 8N:
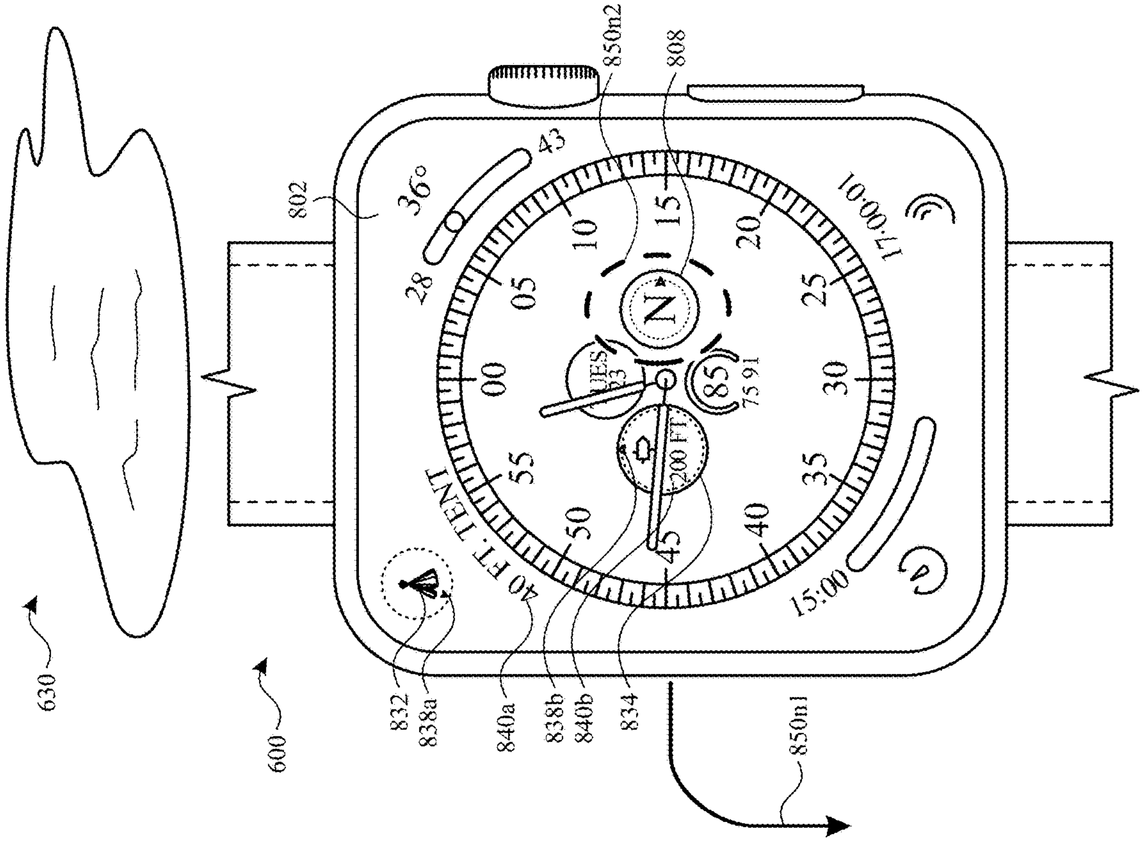
Figure 8Q:
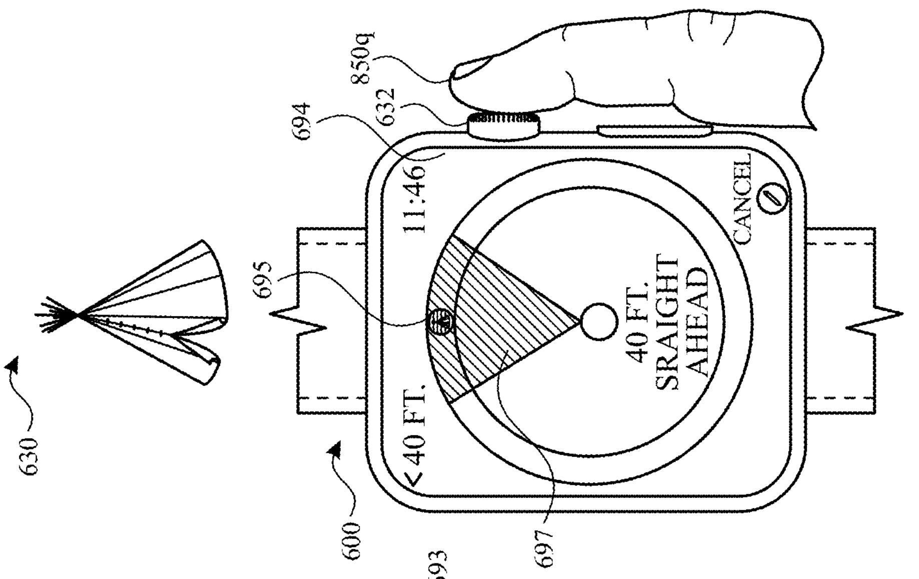

At FIG. 8N, device 600 updates navigational information of static waypoint complication 832 and dynamic waypoint complication 834. As depicted, waypoint directional indicator 838*a* is updated to indicate that the tent of environment 630 in FIG. 8M is in a different direction (e.g., since the user has walked passed the tent). Additionally, distance indicator 840*a* is modified to indicate that device 600 is 40 FT away from the tent. Waypoint directional indicator 838*c* continues to indicate that the lake of environment 630 is in the same forward direction (e.g., since the user has walked toward the lake). Additionally, distance indicator 840*b* is modified to indicate that device 600 is 200 feet away from the lake.

At FIG. 8N, while displaying watch user interface 802, device 600 detects change in orientation 850*n*1 (e.g., rotation and/or angular movement) of device 600, where device 600 turns around to face the tent of environment 630. Additionally, at FIG. 8N, while displaying watch user interface 802, device 600 detects a set of one or more inputs corresponding to a request to display navigational user interface 602 (of FIG. 8O). As depicted, the set of one or more inputs optionally includes an input 850*n*2 (e.g., a touch input, air gesture, and/or other input) directed at navigation complication 808 to open the navigation application. After detecting the change in orientation 850*n*1 and in response to detecting the set of one or more inputs that includes input 850*n*2, device 600 displays watch user interface 802, as depicted in FIG. 8O.

Figure 8P:
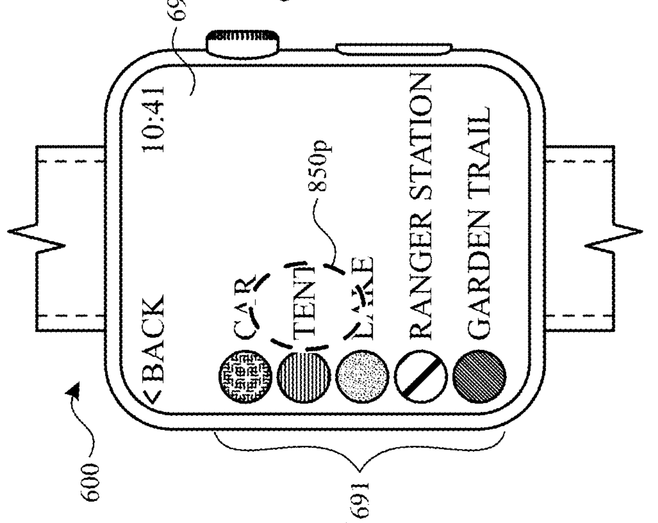
Figure 8O:
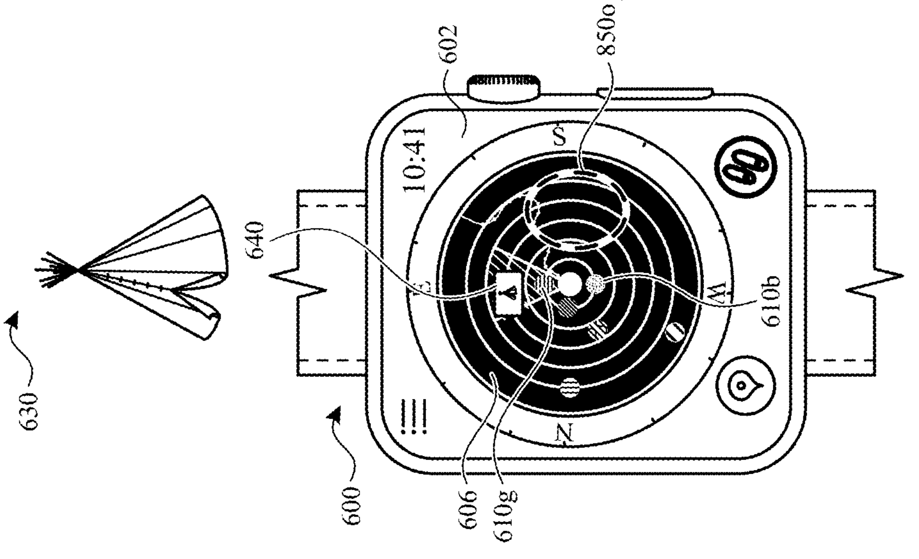
Figure 8S:
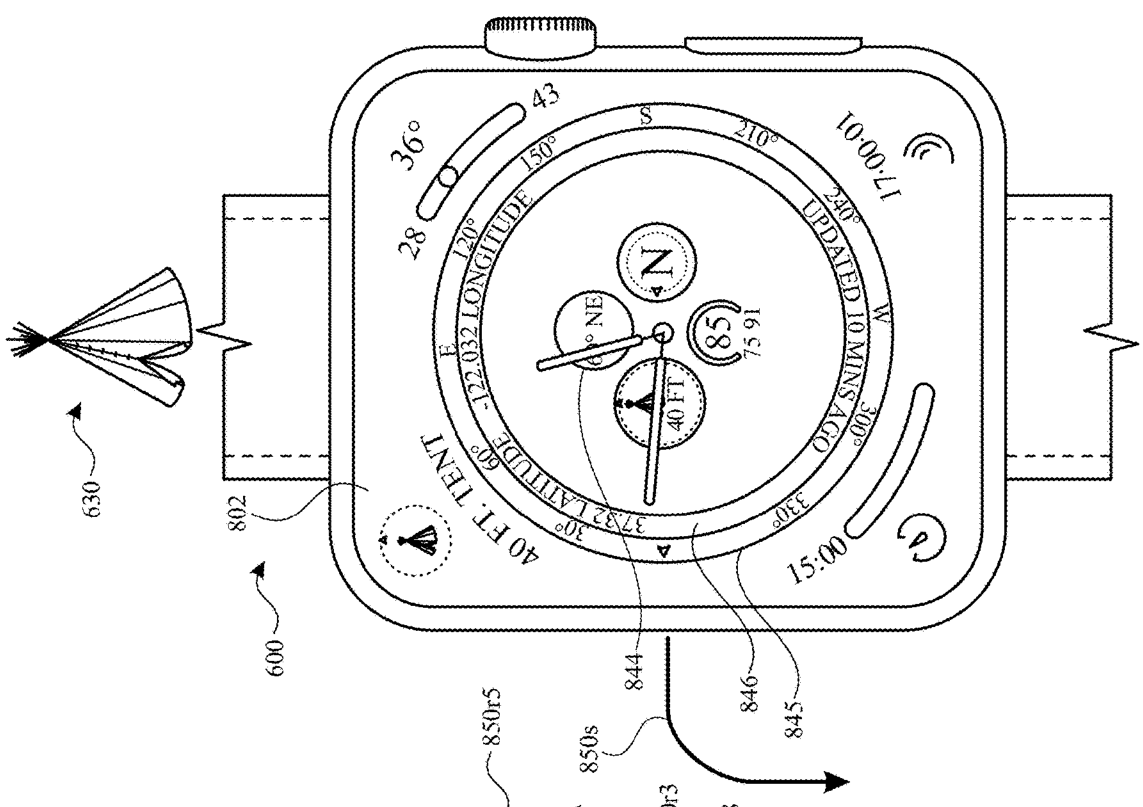

At FIG. 8O, navigational user interface 602 is similar to navigational user interface 602 described in FIGS. 6A-6AA, including waypoint region 606 that includes waypoint 610*b* for the tent and waypoint 610*g* for the lake. While displaying navigational user interface 602, device 600 detects input 850*o* (e.g., a touch input, air gesture, and/or other input) directed at waypoint region 606. In response to detecting input 850*o*, device 600 displays waypoint interface 693, as depicted in FIG. 8P.

At FIG. 8P, waypoint interface 693 includes active waypoints 691 including similar features as waypoint interface 693 of FIG. 6X but having a different state. While displaying waypoint interface 693 of FIG. 8P, device 600 detects input 850*p* (e.g., a touch input, air gesture, and/or other input) directed at the Tent waypoint. In response to detecting input 850*p*, device 600 displays targeted navigational interface 694 for the Tent waypoint, as shown in FIG. 8Q.

At FIG. 8Q, device 600 displays targeted navigational interface 694 for the Tent waypoint. While displaying targeted navigational interface 694, device 600 detects input 850*q* (e.g., a depress of a button or of a rotational input device, a touch input, air gesture, and/or other input) corresponding to a request to display watch user interface 802. In response to detecting input 850*q*, device 600 displays watch user interface 802, as depicted in FIG. 8R.

Figure 8R:
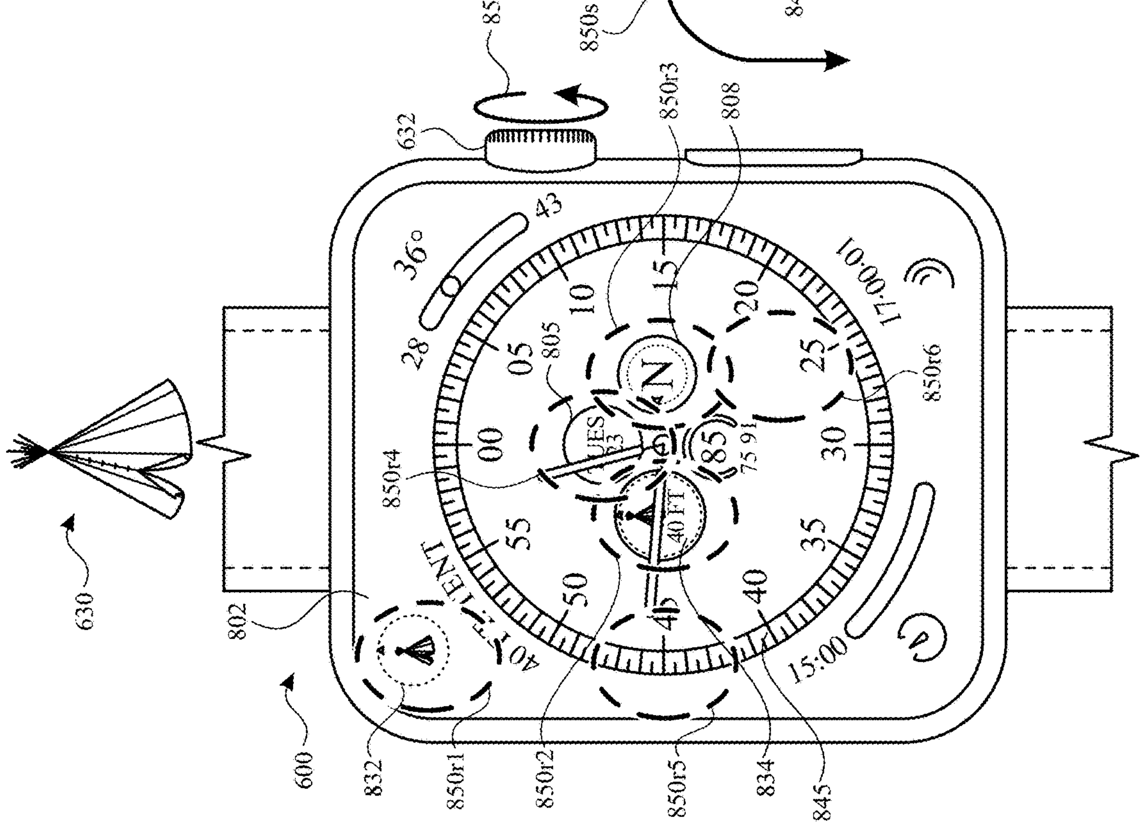
Figure 8U:
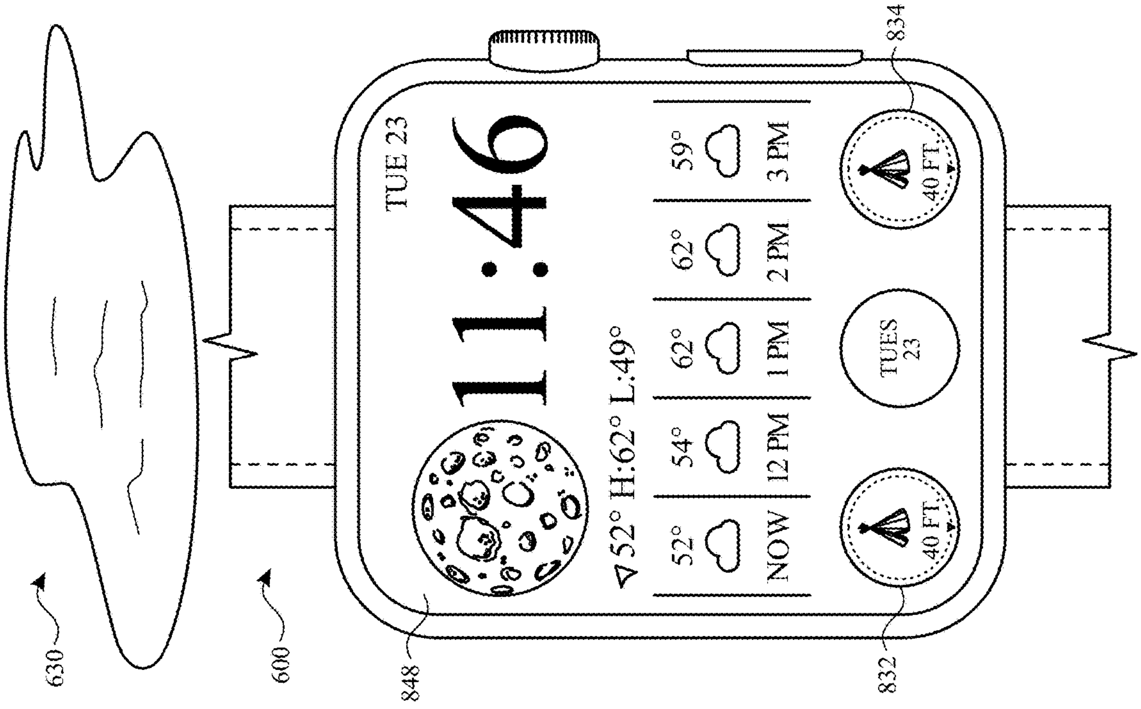

At FIG. 8R, device 600 updates dynamic waypoint complication 834 of watch user interface 802 based on the display of targeted navigational interface 694 at FIG. 8Q. As depicted, dynamic waypoint complication 834 is associated with the Tent waypoint based on the most recently displayed targeted navigational interface 694 having been for the Tent waypoint (as described with respect to FIG. 8Q), similar to static waypoint complication 832.

At FIG. 8R, device 600 optionally detects different inputs while displaying watch user interface 802, resulting in various interfaces being displayed. In some embodiments, in response to detecting input 850*r*1 (a touch input, air gesture, and/or other input) directed at static waypoint complication 832, device 600 displays targeted navigational interface 694 for the Tent waypoint. In some embodiments, in response to detecting input 850*r*2 (a touch input, air gesture, and/or other input) directed at dynamic waypoint complication 834, device 600 displays waypoint menu 841, as depicted FIG. 8K. In some embodiments, waypoint menu 841 is conditionally displayed based on the state of dynamic waypoint complication 834 as described herein. In some embodiments, in response to detecting input 850*r*3 (a touch input, air gesture, and/or other input) directed at navigation complication 808, device 600 displays navigational user interface 602. In some embodiments, static waypoint complication 832, dynamic waypoint complication 834, and navigation complication 808 are associated with the same navigation application. In some embodiments, static waypoint complication 832, dynamic waypoint complication 834, and navigation complication 808 are associated with different applications. In some embodiments, in response to detecting input 850*r*4 (a touch input, air gesture, and/or other input) directed at calendar complication 805, device 600 displays an interface of the calendar application.

At FIG. 8R, device 600 optionally detects different inputs to switch between day and night modes. In some embodiments, in response to detecting input 850*r*5 (e.g., rotation of rotational element 632 and/or a touch input on display 601, such as a swipe or tap and drag input), device 600 changes the state of watch user interface 802 (or, optionally, state of display 601) from a day mode to a night mode (e.g., a set colors from the UV spectrum are reduced on display 601). In some embodiments, in response to detecting input 850*r*5 (e.g., rotation of rotational element 632 and/or a touch input on display 601, such as a swipe or tap and drag input), device 600 reduces the display of one range of wavelengths on the UV spectrum while maintaining the display of other wavelengths. In some embodiments, the graphical elements of watch user interface 802 maintains the same appearance (e.g., size, shape, and/or symbol) but changes colors in response to changing from a day mode to a night mode.

At FIG. 8R, device 600 optionally detects a request to change watch user interface 802 from a time mode to a navigational mode. As depicted, watch user interface 802 of FIG. 8R is in the time mode. While in the time mode, bezel 845 includes time indicators (e.g., minute and/or hour indicators, such as tick marks and/or alphanumeric text) and hour and minute hands having a particular length. In some embodiments, the time indicators can be changed between minute indicators and hour indicators.

At FIG. 8R, while in the time mode, watch user interface 802 also includes calendar complication 805, which can be edited (e.g., changed to a different complication via complication edit interface 812). While displaying watch user interface 802 in a time mode, device 600 detects input 850*r*5 (e.g., a touch input, air gesture, and/or other input) directed at bezel 845. In response to detecting input 850*a*, device 600 displays watch user interface 802 in navigational mode, as depicted in FIG. 8S. In some embodiments, device 600 changes the modes of watch user interface 802 based on a location of the input. For example, device 600 does not change the mode of watch user interface 802 in response to detecting input 850*r*6 (e.g., a touch input, air gesture, and/or other input) since it is not directed at bezel 845. In some embodiments, device 600 changes the modes of watch user interface 802 in response to detecting input 850*r*6 (e.g., a touch input, air gesture, and/or other input) directed at a region inside of bezel 845.

At FIG. 8S, in response to detecting a request to change the mode of watch user interface 802 (e.g., input 850*r*5 or input 850*r*6), device 600 displays watch user interface 802 in the navigational mode. As depicted, calendar complication 805 is modified to include a current direction, as depicted by directional indicator 844 (e.g., "30° SE"). In some embodiments, directional indicator 844 is a fixed graphical element that cannot be modified by the user (e.g., cannot be changed to a different complication for the same watch face). For example, directional indicator 844 cannot be changed to include different information and/or a different complication for the same watch face. In some embodiments, directional indicator 844 is in the same location as (or, in some embodiments, overlaps with at least a portion of an area previously occupied by) calendar complication 805. In some embodiments, the directional indicator 844 is in a different location than the calendar complication 805. For example, in some embodiments, directional indicator 844 is in located in a first direction (e.g., above, below, right, and/or left) with respect to the location as calendar complication 805.

At FIG. 8S, device 600 updates the graphical elements of watch user interface 802. For example, bezel 845 has been updated to include a current direction, for example, using cardinal points ("N, E, S, W") and degrees (e.g., 30°, 90°, 120°, 150°, 210°, 240°, 300°, and/or) 330°. Additionally, watch user interface 802 includes a different size of clock hands while in navigational mode than while in time mode (e.g., watch user interface 802 of FIG. 8S includes shorter hour and minute hands than watch user interface 802 of FIG. 8R). As a further example, watch user interface 802 includes inner bezel 846 including a current latitude, longitude, and/or elevation. In some embodiments, watch user interface 802 of FIG. 8R includes inner bezel 846 with a different visual appearance (e.g., smaller, different color, different and/or no information is displayed).

At FIG. 8S, while displaying watch user interface 802 in navigational mode, device 600 detects change in orientation 850*s* (e.g., rotation and/or change in angle) of device 600, where device 600 turns around to face the lake of environment 630. In response to detecting change in orientation 850*s*, device 600 updates watch user interface 802, as depicted in FIG. 8T.

Figure 8T:
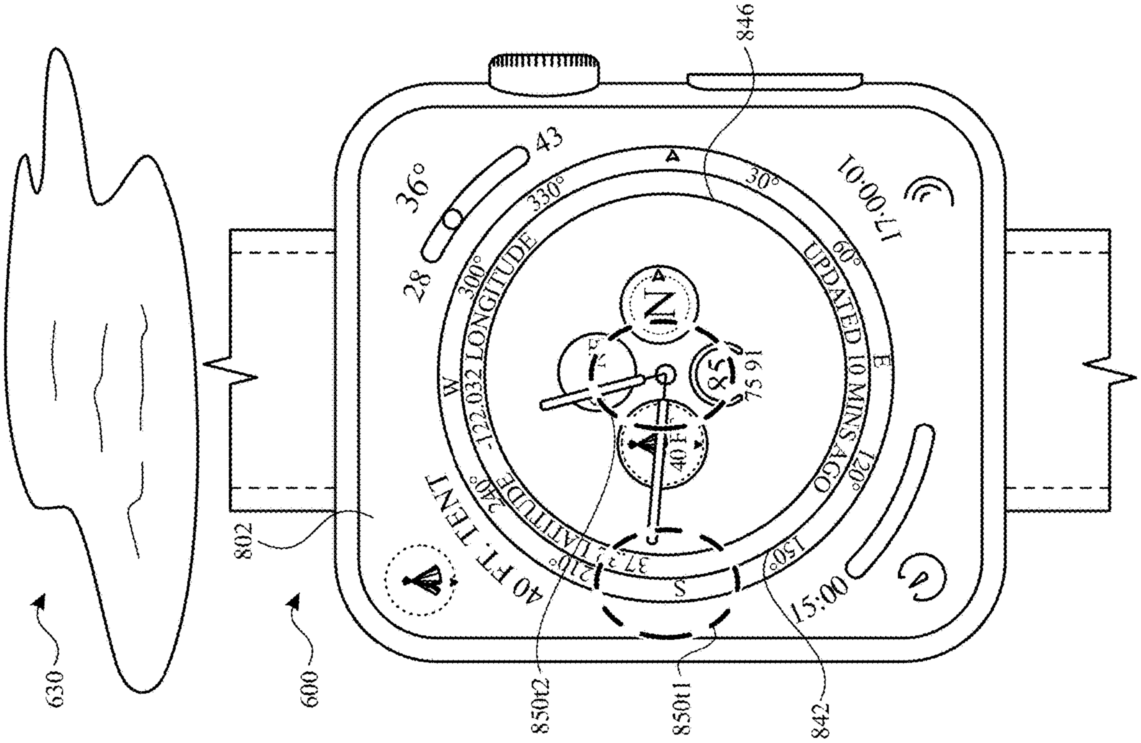

At FIG. 8T, bezel 845 rotates with respect to the other graphical elements of watch user interface 802 (e.g., hour hand, minute hand, and/or complications). As depicted, bezel 845 of FIG. 8T indicates device 600 is facing a different direction than what is indicated by bezel 845 of FIG. 8S. Device 600 also updates directional indicator 844 to indicate device 600 is facing a different direction (e.g., "330° NW") than what is indicate by directional indicator 844 of FIG. 8S.

At FIG. 8T, while displaying watch user interface 802 in navigational mode, device 600 detects input 850*t*1 (a touch input, air gesture, and/or other input) directed at bezel 845. In response to detecting input 850*t*1, device 600 changes the mode of watch user interface 802 back to time mode, as depicted in FIG. 8R. In some embodiments, device 600 detects a set of one or more inputs including input 850*t*2 (a touch input, air gesture, and/or other input) corresponding to a request to change watch user interface 802 to a different watch face (e.g., via watch face selection menu 810 of FIG. 8B). In response to detecting the set of one or more inputs corresponding to a request to change watch user interface 802 to a different watch face, device 600 displays watch face user interface 848, as depicted in FIG. 8R.

FIG. 8U illustrates a different watch face (as compared to the earlier figures) being displayed by device 600. At FIG. 8U, watch face user interface 848 includes static waypoint complication 832 and dynamic waypoint complication 834. As depicted, static waypoint complication 832 and dynamic waypoint complication 834 are similar to static waypoint complication 832 and dynamic waypoint complication 834 of watch user interface 802 of FIG. 8T. As depicted, watch face user interface 848 includes different graphical objects and/or a different layout as compared to watch user interface 802. For example, watch face user interface 848 includes digital indication of time and different complications. Thus, a user of device 600 can use static and dynamic waypoint complications for various watch faces.

FIG. 9 is a flow diagram illustrating a method for transitioning from displaying a watch face user interface in a first mode to displaying the watch face user interface in a second mode using a computer system in accordance with some embodiments. Method 900 is performed at a computer system (e.g., 100, 300, 500, and/or 600) (e.g., a smartwatch, a smartphone, a tablet, a laptop computer, and/or a head mounted device (e.g., a head mounted augmented reality and/or extended reality device)) that is in communication with a display generation component (e.g., 601) (e.g., a display controller, a touch-sensitive display system, a monitor, and/or a head mounted display system) and one or more input devices (e.g., 601) (e.g., a touch-sensitive surface, a keyboard, a controller, a rotatable input device, and/or a mouse). Some operations in method 900 are, optionally, combined, the orders of some operations are, optionally, changed, and some operations are, optionally, omitted.

As described below, method 900 provides an intuitive way for transitioning from displaying a watch face user interface in a first mode to displaying the watch face user interface in a second mode. The method reduces the cognitive burden on a user to cause the computer system to transition from displaying a watch face user interface in a first mode to displaying the watch face user interface in a second mode, thereby creating a more efficient human-machine interface. For battery-operated computing devices, enabling a user to cause the computer system to transition from displaying a watch face user interface in a first mode to displaying the watch face user interface in a second mode faster and more efficiently conserves power and increases the time between battery charges.

The computer system displays (902) a watch face user interface (e.g., 802) in a first mode (e.g., navigational mode as described with reference to FIG. 8S). Displaying the watch face user interface in the first mode includes displaying (904) an indication of current time (e.g., as indicated by the hour hand and minute hand in FIG. 8S) (e.g., an analog clock face (e.g., including one or more hands indicating a time (e.g., an hour hand, a minute hand, and/or a second hand)) and/or a digital clock face). Displaying the watch face user interface in the first mode includes displaying (906) one or more complications (e.g., 805, 806, 808, 832, and/or 834) (e.g., one or more corner complications, one or more center complications (e.g., inner-dial), and/or one or more bezel complications). In some embodiments, while the watch face user interface is in a first mode, the computer system displays the one or more complications at one or more respective areas (e.g., corner, center (e.g., inner-dial), and/or bezel) in the watch user interface. Displaying the watch face user interface in the first mode includes displaying (906) a first directional indicator (e.g., 844 and/or 845) (e.g., a cardinal point (e.g., North, East, West, and/or South), magnetic needle, degrees, or a bearing) representing a direction (e.g., as depicted in FIG. 8S) (e.g., orientation, such as with respect to cardinal directions, and/or degrees) of the computer system (e.g., an orientation of the computer system or a direction that the computer system is pointing). While displaying the watch face user interface in the first mode, the computer system detects (908), via the one or more input devices, a first input (e.g., **850*t*1) (optionally corresponding to a request to change watch face modes) (e.g., tap, swipe, and/or rotational input). In response to detecting the first input, the computer system transitions (912) from displaying the watch face user interface in the first mode to displaying the watch face user interface in a second mode (e.g., time mode as depicted in FIG. 8R) that is different from the first mode (in some embodiments, the watch face user interface transitions from the first mode to the second mode without displaying an intermediate user interface (e.g., a watch face editor and/or a watch face selector)). Transitioning to displaying the watch face user interface in the second mode includes ceasing to display (914) the first directional indicator (e.g., 844 and/or 845 are no longer displayed in FIG. 8R) (e.g., in a first complication area and/or in a first area of the display). Transitioning to displaying the watch face user interface in the second mode includes continuing to display (916) the indication of current time (e.g., as indicated by the hour hand and minute hand in FIG. 8R) (e.g., maintaining an analog clock face or digital clock face). Transitioning to displaying the watch face user interface in the second mode includes continuing to display (918) the one or more complications (e.g., 805, 832, and/or 834 as depicted in FIG. 8**R). In some embodiments, while the watch face user interface is in the second mode, the computer system continues to display the one or more complications at the one or more respective areas in the watch user interface. In some embodiments, the one or more complications displayed while in the first mode are the same one or more complications displayed while in the second mode. In some embodiments, the watch face user interface is a single watch face user interface that has a first mode and a second mode different from the first mode. In some embodiments, editing the one or more complications in the watch user interface is applied to both the first mode and the second mode of the watch user interface. In some embodiments, the first input does not include an input (e.g., a swipe and/or rotational input) to change between the watch face user interface and a user interface of a different watch face (e.g., the watch face user interface and the user interface of the different watch faces are separately editable). In some embodiments, the location, size, color, and/or other visual characteristics of at least one visual element of the watch user interface is maintained during the transition from the first mode to the second mode, such that both the first mode, the transition, and the second mode include the same location, size, color, and/or other visual characteristics for the at least one visual element. Changing from a first mode of a watch face to a second mode of the watch face, where a directional indicator (e.g., a compass) ceases to be displayed while a current time and one or more complications are continued to be displayed, enhances the user's interaction with the computer system because it provides visual feedback of detecting user input and what mode the computer system is in, thereby improving visual feedback. Additionally, it provides a single watch face having similar functions across two modes where additional navigational information is quickly accessible, thereby reducing the number of inputs needed to perform an operation (e.g., view navigational information) and/or improving visual feedback of the computer system's orientation and/or location.

In some embodiments, transitioning to displaying the watch face user interface in the second mode further includes displaying, via the display generation component, a first complication (e.g., 805) (e.g., that does not include directional information and/or for an application that is different from a navigational application) in at least a portion of an area (e.g., of the watch face user interface) that was previously occupied by the first directional indicator (e.g., 844). Displaying a first complication in at least a portion of an area that was previously occupied by the first directional when transitioning to the second mode enhances the user's interaction with the computer system because it indicates which mode the watch is in and/or that user input has been detected, thereby improving visual feedback.

In some embodiments, the first complication is user-editable (e.g., 805 is optionally changed to a different complication using complication edit interface 812) (e.g., a user can replace the first complication and/or select a different complication). In some embodiments, the first directional indicator is not user-editable (e.g., 844 cannot be changed to a different complication using complication edit interface 812) (e.g., a user cannot edit (e.g., remove or replace) the first directional indicator as part of the watch face user interface). Allowing a user to edit the first complication while not allowing the user to edit the first directional indicator enhances the user's interaction with the computer system because it allows a user to edit certain aspects of the watch face user interface without affecting the display of the first directional indicator, thereby improving visual feedback of what mode the computer system is in.

In some embodiments, displaying the watch face user interface in the first mode includes displaying location information (e.g., longitude, latitude, and/or coordinates) in a first area (e.g., latitude and longitude information in 846 of FIG. 8S) (e.g., a first ring-shaped area and/or an inner-ring) of the watch face user interface. In some embodiments, transitioning to displaying the watch face user interface in the second mode includes ceasing to display the location information in the first area (e.g., latitude and longitude information is not depicted in FIG. 8R). In some embodiments, transitioning to displaying the watch face user interface in the second mode includes modifying a size of (e.g., 846 is not depicted in FIG. 8R) (e.g., ceasing to display, decreasing a size of, and/or increasing a size of) the first area of the watch face user interface. Ceasing display of location information and modifying a size of the first area of the watch face user interface when the watch face user interface transitions to the second mode enhances the user's interaction with the computer system because it indicates which mode the watch is in provides visual feedback of receiving input, thereby improving visual feedback.

In some embodiments, displaying the watch face user interface in the first mode includes displaying a second directional indicator (e.g., directional information in 845 as depicted in FIG. 8S) (e.g., one or more cardinal points (e.g., North, East, West, and/or South), magnetic needle, degrees, or a bearing) in a second area (e.g., 845) (e.g., a second ring-shaped area and/or an outer ring). In some embodiments, transitioning to displaying the watch face user interface in the second mode includes ceasing to display the second directional indicator (e.g., directional information of 845 is not depicted in FIG. 8R). In some embodiments, transitioning to displaying the watch face user interface in the second mode includes displaying, via the display generation component, one or more time indicators (e.g., time indicators include tick marks in 845, as depicted in FIG. 8R) (e.g., minute tick marks, hour tick marks, alphanumeric text for minutes (e.g., 5, 10, and/or 15), or alphanumeric text for hours (e.g., 1, 2, and/or 3) in the second area). Ceasing to display a second directional indicator and displaying one or more time indicators when the watch face user interface transitions to the second mode provides the user with visual feedback about what mode the watch face is in and that input has been detected, which provides improved visual feedback.

In some embodiments, the computer system receives user input (e.g., a set of one or more inputs including a request to edit watch user interface 802, such as 850*b*, and an input to change the time indicators). In response to receiving the user input, the computer system changes the one or more time indicators from indicating a first time metric (e.g., hour tick marks instead of minute tick marks of FIG. 8A) (e.g., hours) to indicate a second time metric (e.g., minute tick marks of FIG. 8A) (e.g., minutes) that is different from the first time metric. In some embodiments, the one or more time indicators includes indications of hours around the perimeter of the watch face and the user input causes the computer system to cease displaying indications of hours and, instead, display indications of minutes. In some embodiments, a scale of the one or more time indicators are editable (e.g., a user can select between minute tick time indicators or hour time indicators). Allowing a user to change time indicators from indicating a first time metric to a second time metric enhances a user's interaction with the computer system because a user can customize a watch face, which provides additional control options.

In some embodiments, the indication of current time includes one or more clock hands (e.g., an hour hand, a minute hand, and/or a second hand). In some embodiments, transitioning to displaying the watch face user interface in the second mode includes modifying (e.g., reducing or enlarging) a size of at least one of the one or more clock hands (e.g., hour hand and minute hand are different sizes as depicted in FIGS. 8R-8S). In some embodiments, while the watch face user interface is in the first mode, the at least one of the one or more clock hands does not obscure (e.g., overlap or hide) location information in an outer ring of the watch face user interface. In some embodiments, while the watch face user interface is in the first mode, the at least one of the one or more clock hands does not obscure (e.g., overlap or hide) the location information (e.g., longitude and/or latitude) in an inner ring of the watch face user interface. In some embodiments, while the watch face user interface is in the second mode, the at least one of the one or more clock hands obscures (e.g., overlaps or hides) one or more time indicators (e.g., minute tick marks, hour tick marks, alphanumeric text for minutes (e.g., 5, 10, and/or 15), or alphanumeric text for hours (e.g., 1, 2, and/or 3)). Modifying a size of at least one of the clock hands provides the user with visual feedback about what mode the watch face is in and that input has been detected, which provides improved visual feedback. Additionally, modifying a size of at least one of the clock hands improves the watch face user interface since it declutters the user interface so that a user can see more of the watch face user interface while in particular modes.

In some embodiments, the first input corresponds to a tap input (e.g., 850*r*5 is a tap input) (e.g., single tap input). Using a tap input to change modes allows the user to switch between modes without displaying a button or affordance to perform the change, which provides additional control options without cluttering the user interface.

In some embodiments, detecting the first input includes detecting the first input in a predefined area of the watch face user interface (e.g., 850*r*5 is at bezel 845) (e.g., an outer ring and/or an area including one or more time indicators, such as minute and/or hour tick marks and/or alphanumeric text for minutes and/or hours). In some embodiments, in response to detecting an input outside of the predefined area, the computer system does not transition to the second mode (or, optionally performs a function other than transitioning to the second mode, such as opening an application associated with a selected complication). Limiting the first input to the predefined area prevents unwanted changes in the mode of the watch face user interface, which prevents accidental and/or faulty inputs.

In some embodiments, the computer system detects, via a rotatable input device (e.g., 832), a rotational input (e.g., 850*r*5) (e.g., while displaying the watch face user interface in the first mode or in the second mode). In some embodiments, in response to detecting the rotational input, the computer system modifies a state of the watch face user interface from a first state (e.g., a day mode or night mode) to a second state different from the first state (e.g., 802 changes states as described with reference to FIG. 8R) (e.g., a night mode or day mode). In some embodiments, in response to detecting a second rotational input (e.g., in direction that is opposite or the same as the rotational input), the computer system modifies the watch face user interface from the second state to the first state. In some embodiments, in response to detecting the rotational input device, the computer system modifies a state of the display generation component from a first display state to a second display state different from the first display state. In some embodiments, modifying the state of the display generation component includes modifying (e.g., decreasing and/or increasing) an amount of a predetermined wavelength (e.g., a range of wavelengths and/or "blue light" (e.g., a wavelength of between about 400 to 750 nanometers generated by the display generation component. Modifying the state of the user interface in response to detecting a rotational input allows the user to switch between modes (e.g., a day mode and/or night mode) without displaying a button or affordance to perform the change, which provides additional control options without cluttering the user interface.

In some embodiments, modifying the state of the watch face user interface from the first state (e.g., a day mode or night mode) to the second state includes modifying one or more colors of elements of the watch face user interface while maintaining the display of (e.g., maintaining the size, location, and shape of) the elements of the watch face user interface (e.g., a color of a complication and/or a color other graphical elements of watch user interface 802 is modified). In some embodiments, the watch face user interface in the first state includes a first set of colors (or, optionally, a first set of colors corresponding to a first set of predefined wavelengths), and the watch face user interface in the second state includes a second set of colors different from first set of colors (or, optionally, a second set of colors corresponding to a second set of predefined wavelengths different that the first set of predefined wavelengths). In some embodiments, the computer system maintains the content (e.g., same functions, complications and/or applications) of the watch face user interface across the first state and the second state (e.g., the content of the watch face user interface does not change despite the change from the first state to the second state). In some embodiments, modifying one or more colors of elements of the watch face user interface while maintaining the display of the elements of the watch face user interface in response to detecting a rotational input provides the user with visual feedback that input has been received and allows a user to quickly modify what colors are included in the watch face user interface, which provides improved visual feedback and provides additional control options.

In some embodiments, while in the first mode, the computer system detects a change in an orientation (e.g., 850*s*) (e.g., rotation and/or direction) of the computer system. In some embodiments, in response to detecting the change in the orientation of the computer system, the computer system updates the first directional indicator to indicate the change in the orientation of the computer system (e.g., as depicted in FIGS. 8S-8T). Updating the first directional indicator as the orientation of the computer system changes provides the user with visual feedback about what direction the computer system is facing, which provides improved visual feedback.

In some embodiments, updating the first directional indicator includes rotating the first directional indicator with respect to the indication of current time (e.g., 845 is rotated with respect to the clock hands, as depicted in FIGS. 8S-8T) (and/or other graphical user interface elements of the watch face (e.g., the one or more complications and/or an inner ring including location information)). Rotating the first directional indicator as the orientation of the computer system changes provides the user with visual feedback about what direction the computer system is facing, which provides improved visual feedback and improved navigational user interfaces.

In some embodiments, the one or more complications includes a second complication (e.g., 832 and/or 834) that includes a directional indicator (e.g., 838*a* and/or 838*b*) to a waypoint (e.g., 610*a*, 610*b*, 610*c*, 610*d*, 610*e*, 610*f*, 610*g*, and/or 610*h*). Displaying a complication that includes a directional indicator for a waypoint provides the user with visual feedback about what direction the computer system is facing and how to navigate a particular location, which provides improved visual feedback and improved navigational user interfaces.

In some embodiments, the second complication includes an indication of a location of the computer system with respect to the waypoint (e.g., 840*a*, and/or 840*b*) (e.g., distance between the computer system and the waypoint and/or distance to the waypoint). In some embodiments, in accordance with determination that a first type of data (e.g., 840*a*, and/or 840*b* is updated using satellite positioning data) (e.g., geolocation data (e.g., based on one or more global navigation satellite system signals (e.g., GPS, BeiDou, Galileo, GLONASS, IRNSS, NavIC, and/or QZSS)) is available, the computer system updates the indication of the location of the computer system with respect to the waypoint based on the first type of data at a first predetermined frequency (e.g., 1 minute, 3 minutes, and/or 5 minutes). In some embodiments, in accordance with determination that the first type of data is unavailable, the computer system updates the indication of the location of the computer system with respect to the waypoint based on a second type of data (e.g., 840*a*, and/or 840*b* is updated using accelerometer and/or gyroscope data) (e.g., estimated based on accelerometer data), different from the first type of data, at a second predetermined frequency (e.g., 10 seconds, 30 seconds, and/or 1 minute) that is different from the first predetermined frequency. In some embodiments, the first type of data is detected at a first predetermined frequency (e.g., every 5 minutes, every 10 minutes, and/or every 15 minutes). In some embodiments, the second type of data is detected at a second predetermined frequency (e.g., in real time and/or every 1 second) different from the first predetermined frequency. Updating directional indicator of the second complication using two types of data at two different intervals reduces the need to solely rely on data using power-hungry sensors (e.g., satellite positioning sensors) to update the location of the computer system with respect to the waypoint, which improves the battery life of the computer system. Updating with different intervals based on the different types of data being received allows the computer system to limit the frequency of location collection/display when using location technique that consumes more power.

Note that details of the processes described above with respect to method 900 (e.g., FIG. 9) are also applicable in an analogous manner to the methods described herein. For example, methods 700, 1000, and/or 1200 optionally include one or more of the characteristics of the various methods described above with reference to method 900. For example, various navigational user interfaces (e.g., targeted navigational user interface, navigational user interface including a waypoint region, and/or waypoint menus to target a waypoint) of method 700 are displayed in response to an input on the watch face user interface described in method 900. As a further example, navigation complications (including activated and deactivated states of a navigation complication) described in method 1000 are displayed in a watch face having different modes as described with reference method 900. For brevity, these details are not repeated herein.

FIG. 10 is a flow diagram illustrating a method for displaying a navigational complication for an application using a computer system in accordance with some embodiments. Method 1000 is performed at a computer system (e.g., 100, 300, 500, 600) (e.g., a smartwatch, a smartphone, a tablet, a laptop computer, and/or a head mounted device (e.g., a head mounted augmented reality and/or extended reality device)) that is in communication with a display generation component (e.g., 601) (e.g., a display controller, a touch-sensitive display system, a monitor, and/or a head mounted display system) (e.g., and, optionally, one or more input devices (e.g., a touch-sensitive surface, a keyboard, a controller, a rotatable input device, and/or a mouse)). Some operations in method 1000 are, optionally, combined, the orders of some operations are, optionally, changed, and some operations are, optionally, omitted.

As described below, method 1000 provides an intuitive way for displaying a navigational complication for an application. The method reduces the cognitive burden on a user view and/or manage a navigational complication for an application, thereby creating a more efficient human-machine interface. For battery-operated computing devices, enabling a user to view and/or manage a navigational complication for an application faster and more efficiently conserves power and increases the time between battery charges.

The computer system displays (1002) (e.g., while the computer system is not in a low power mode and/or when the computer system is awake), via the display generation component, a user interface (e.g., 802) (e.g., a watch face user interface that includes the time, a phone lock screen user interface, and/or another type of user interface) that includes a first navigational complication (e.g., 832 and/or 834) (e.g., a first waypoint complication and/or a complication for a first waypoint) for a first application (e.g., a navigation application associated with 832 and/or 834) (e.g., a navigation application and/or a compass application).

In accordance with a determination that a respective user interface (e.g., 694) (e.g., a navigational user interface and/or a user interface including navigational information to a geographic location) of the first application has not been displayed during a predetermined period of time (e.g., during a previous set amount of time (e.g., during the last 5 minutes, 1 hour, and/or 6 hours) and/or during a current time period (e.g., during the current day (since midnight), during the current week, or during the current month)), the computer system displays (1004), via the display generation component, the first navigational complication in a deactivated state (e.g., 832 and 834 are deactivated, as depicted in FIG. 8H) (e.g., a state in which the first navigational complication is not updated with information from the application and/or a state in which a navigational indicator (e.g., distance to and/or direction to) for a geographic location is not updated).

In accordance with a determination that the respective user interface of the first application has been displayed during the predetermined period of time, the computer system displays (1006), via the display generation component, the first navigational complication in an activated state (e.g., 832 and 834 are activated, as depicted in FIG. 8J) (e.g., a state in which the first navigational complication is updated (e.g., periodically and/or non-periodically) with information from the application and/or a state in which a navigational indicator (e.g., distance to and/or direction to) for a geographic location is updated). In some embodiments, the first navigational complication includes a first set of information (e.g., navigation information and/or distance information) while in the activated state. In some embodiments, the first navigational complication does not include the first set of information while in a deactivated state. In some embodiments, a complication for a second application different from the first application is active (e.g., the complication for the second application includes a second set of information and/or is updated based on information from the second application) while the first navigational complication for the first application (e.g., a navigation application and/or a compass application) is inactive. In some embodiments, the user interface includes a second navigational complication for the first application. In some embodiments, in accordance with a determination that the respective user interface of the application has not been displayed during the predetermined period of time, the computer system displays the second navigational complication in a deactivated state. In some embodiments, in accordance with a determination that the respective user interface of the application has been displayed during the predetermined period of time, the computer system displays the second navigational complication in an activated state. In some embodiments, the computer system detects an input corresponding to a selection of the first navigational complication while the first navigational complication is in a deactivated state (and/or activated state). In response to detecting the input corresponding to the selection of the first navigational complication while the first navigational complication is in the deactivated state (and/or activated state), the computer system displays a user interface (e.g., the respective user interface and/or a user interface different from the respective user interface) of the first application. Conditionally displaying the first navigational complication in an activated state based on whether the respective user interface of the first application has been displayed during the predetermined period of time improves computer system as it conserves battery life and performs an operation when a set of conditions has been met without requiring further user input.

In some embodiments, while displaying the first navigational complication in the deactivated state, the computer system detects a first input (e.g., 850*h* and/or 850*j*) (e.g., tap, mouse click, and/or air gesture) corresponding to a selection of the first navigational complication. In some embodiments, in response to detecting the first input and in accordance with a determination that the first navigational complication is a first type of navigational complication (e.g., 834) (e.g., a dynamic waypoint complication, a navigational complication that corresponds to more than one waypoint, a navigational complication that corresponds to a first waypoint and a second waypoint, and/or a non-static waypoint complication), the computer system displays, via the display generation component, a set of one or more selectable representations of (e.g., a list or an array of) waypoints (e.g., defined locations and/or locations corresponding to one or more coordinates). In some embodiments, in response to detecting the first input and in accordance with a determination that the first navigational complication is a second type of navigational complication (e.g., 832) (e.g., a static waypoint complication, a navigational complication that corresponds to a single waypoint, a navigational complication that corresponds to the first waypoint and does not correspond to the second waypoint, and/or a non-dynamic waypoint complication) different from the first type of navigational complication, the computer system forgoes display, via the display generation component, of the set of one or more selectable representations of waypoints. In some embodiments, the computer system displays the set of one or more selectable representations of waypoints independent from the state (e.g., activated or deactivated state) of the first type (e.g., a dynamic waypoint complication and/or a non-static waypoint complication) of navigational complication. In some embodiments, the computer system selectively displays the set of one or more selectable representations of waypoints based on the state of the first type (e.g., a dynamic waypoint complication and/or a non-static waypoint complication) of navigational complication. For example, in some embodiments, in response to detecting the first input and in accordance with a determination that the first type of navigational complication is in a deactivated state, the computer system displays the set of one or more selectable representations of waypoints. In some embodiments, in response to detecting the first input and in accordance with a determination that the first type of navigational complication is in an activated state, the computer system forgoes displaying the set of one or more selectable representations of waypoints. Conditionally displaying the set of one or more selectable representations of waypoints based on the type of the navigational complication improves the user interface as it performs an operation when a set of conditions has been met without requiring further user input.

In some embodiments, the computer system detects a second input (e.g., 850*j*) corresponding to a selection of the first navigational complication (e.g., while the first navigational complication is in the deactivated state or the first navigational complication is in the activated state). In some embodiments, in response to detecting the second input and in accordance with a determination that the first navigational complication is a third type (e.g., 834) (e.g., the same as and/or different from the first type) of navigational complication (e.g., a dynamic waypoint complication and/or a non-static waypoint complication), the computer system displays, via the display generation component, a set of one or more selectable representations of waypoints (e.g., 842*a*, 842*b*, 842*c*, and/or 691) (e.g., defined locations and/or locations corresponding to one or more coordinates), wherein selection of a respective representation of a respective waypoint (e.g., 842*c* and/or the Tent waypoint of FIG. 6X) of the set of one or more selectable representations of waypoints causes display of a navigational user interface (e.g., 694) (e.g., a targeted navigational user interface and/or a waypoint-specific navigational user interface) for the respective waypoint. In some embodiments, in response to detecting the second input and in accordance with a determination that the first navigational complication is a fourth type (e.g., 832) (e.g., the same as and/or different from the second type) of navigational complication (e.g., a static waypoint complication and/or a non-dynamic waypoint complication) different from the third type of navigational complication, the computer system displays, via the display generation component, a navigational user interface (e.g., 694) (e.g., a targeted navigational user interface and/or a waypoint-specific navigational user interface) for a waypoint (e.g., the Tent waypoint) corresponding to the first navigational complication without displaying the set of one or more selectable representations of waypoints. In some embodiments, the navigational user interface (e.g., the targeted navigational user interface and/or the waypoint-specific navigational user interface) includes navigational information for a single waypoint (e.g., a selected waypoint and/or the waypoint corresponding to the first navigational complication) (and, optionally, the navigational user interface excludes navigational information for a different waypoint (e.g., a non-selected waypoint and/or a waypoint other than the waypoint corresponding to the first navigational complication)). Conditionally displaying the set of one or more selectable representations of waypoints or a navigational user interface for a waypoint corresponding to the first navigational complication based on the type of the navigational complication improves the user interface as it performs an operation when a set of conditions has been met without requiring further user input.

In some embodiments, the respective user interface of the first application includes an indication of a location of a waypoint (e.g., 695) and an indication of a location of the computer system (e.g., 665). In some embodiments, the respective user interface of the first application includes an indication of a location of a single waypoint. In some embodiments, the respective user interface of the first application includes navigational information (e.g., bearing information, directional indicator, distance to waypoint, and/or position with respect to current device location) for the waypoint. Conditionally displaying the first navigational complication in an activated state based on whether a user interface that includes navigational information to the waypoint has been displayed improves computer system as it provides an indication of whether the user wants (or does not want) to view navigational information for a waypoint, thereby conserving battery life by limiting the use of power-hungry sensors.

In some embodiments, the computer system displays, via the display generation component, the respective user interface of the first application. In some embodiments, the computer system activates (e.g., in response to displaying the respective user interface of the first application and/or in response receiving input that causes display of the respective user interface of the first application), for the predetermined period of time and based on display of the respective user interface of the first application, the first navigational complication (e.g., 632) for a first waypoint (e.g., 610*a*, 610*b*, 610*c*, 610*d*, 610*e*, 610*f*, 610*g*, and/or 610*h*) and a second navigational complication (e.g., 634) for a second waypoint (e.g., 610*a*, 610*b*, 610*c*, 610*d*, 610*e*, 610*f*, 610*g*, and/or 610*h*) different from the first waypoint. In some embodiments, the respective user interface includes navigational information for the first waypoint. In some embodiments, the respective user interface does not include navigational information for the second waypoint. Activating navigational complications for a first waypoint and a second waypoint in response to detecting the display of the respective user interface improves the computer system as it reduces the number of inputs needed to perform an operation.

In some embodiments, the respective user interface corresponds to a navigational user interface for a respective waypoint (e.g., representation 843 is associated with the Lake waypoint) (e.g., a single waypoint). In some embodiments, displaying the first navigational complication includes, in accordance with a determination that the first navigational complication is a fifth type (e.g., the same as and/or different from the first type and/or the third type) of navigational complication (e.g., 834) (e.g., a dynamic waypoint complication and/or a non-static waypoint complication), displaying navigational information (e.g., bearing information, distance to waypoint, and/or position with respect to current device location) for the respective waypoint (e.g., 834 includes navigational information for the Lake waypoint in FIG. 8N) (e.g., a most recently targeted waypoint and/or a most recently viewed waypoint in a targeted navigational user interface) (e.g., without displaying navigational information for a first waypoint). In some embodiments, displaying the first navigational complication includes, in accordance with a determination that the first navigational complication is a sixth type (e.g., the same as and/or different from the second type and/or the fourth type) of navigational complication (e.g., 832) (e.g., a static waypoint complication and/or a non-dynamic waypoint complication) different from the fifth type, displaying navigational information for a first waypoint (e.g., 832 includes navigational information for the Tent waypoint in FIG. 8N) (e.g., a waypoint corresponding to the first navigational complication, a waypoint other than the most recently targeted waypoint and/or a waypoint other than the most recently viewed waypoint in a targeted navigational user interface) different from the respective waypoint (e.g., without displaying navigational information for the respective waypoint). In some embodiments, the fifth type of navigational complication includes navigational information for different waypoints at different points in time. In some embodiments, the fifth type of navigational complication is updated with navigational information for the most recently targeted waypoint. In some embodiments, the sixth type of navigational complication is not updated with navigational information for the most recently targeted waypoint (e.g., the sixth type of navigational complication does not include navigational information for different waypoints). Conditionally displaying navigational information for the respective waypoint or a different waypoint based on the type of navigational complication improves the computer system as it performs an operation when a set of conditions has been met without requiring further user input.

In some embodiments, the first navigational complication is displayed with a first visual characteristic (e.g., 832 and/or 834 are shaded in FIG. 8H) (e.g., a first set of one or more colors, a first set of one or more graphical elements, a first size, and/or without the second visual characteristic) while in the deactivated state, and wherein the first navigational complication is displayed with a second visual characteristic (e.g., 832 and/or 834 are not shaded in FIG. 8J) (e.g., a second set of one or more colors, a second set of one or more graphical elements, a second size, and/or without the first visual characteristic), different from the first visual characteristic, while in the activated state. Displaying the first navigational complication with different visual appearances based on being in an activated state and/or a deactivated state provides improved visual feedback about the state of the complication and/or the state of the computer system (e.g., whether the computer system is using power-hungry sensors to track the computer system's location so as to update the complication).

In some embodiments, the first visual characteristic is a first color (e.g., 832 of FIG. 8H is displayed in a gray color) and the second visual characteristic is a second color that is different from the first color (e.g., 832 of FIG. 8J is displayed in a color associated with the Tent waypoint, such as orange or red), and wherein other visual characteristics (e.g., the tent icon is consistent in 832 of FIGS. 8H and 8J) (e.g., icons, glyphs, and/or shapes) of the first navigational complication are not based on a state (activated and/or deactivated) of the first navigational complication. In some embodiments, a respective complication changes colors when activated or deactivated without changing other visual characteristics of the complication. In some embodiments, while the first navigational complication is in the deactivated state, the computer system detects a display of the respective user interface of the first application within the predetermined period of time. In some embodiments, in response to detecting the display of the respective user interface of the first application within the predetermined period of time, the computer system displays, via the display generation component and in the user interface, the first navigational complication in the activated state. In some embodiments, displaying the first navigational complication in the activated state includes, in accordance with a determination that the first navigational complication is a seventh type (e.g., the same as and/or different from the second, fourth, and/or sixth type) of navigational complication (e.g., a static waypoint complication and/or a non-dynamic waypoint complication), modifying (e.g., changing and/or updating) a set of one or more colors of the first navigational complication and maintains a graphical element (e.g., icon and/or glyph) for a waypoint of the first navigational complication. Modifying a color of the first navigational complication (and, optionally, while maintaining a graphical element for a waypoint for a specific type of navigational complication) improves the computer system as it provides visual feedback about the state of the complication and/or the state of the computer system (e.g., whether the computer system is using power-hungry sensors to track the computer system's location so as to update the complication) and further provides visual feedback as to what type of navigational complication is being displayed.

In some embodiments, the first visual characteristic is a first color (e.g., 834 of FIG. 8H is displayed in a gray color) and the second visual characteristic is a second color (e.g., 832 of FIG. 8J is displayed in a color associated with the Tent waypoint, such as orange or red) that is different from the first color, and wherein one or more non-color visual characteristics (e.g., the icon of 834 in FIG. 8H is different from the tent icon in 834 of FIG. 8H) (e.g., icons, glyphs, and/or shapes) of the first navigational complication are based on a state (activated and/or deactivated) of the first navigational complication. In some embodiments, a respective complication visually changes (in addition to a change in color) when activated or deactivated. In some embodiments, while the first navigational complication is in a deactivated state, the computer system detects a display of the respective user interface of the first application within the predetermined period of time. In some embodiments, in response to detecting the display of the respective user interface of the first application within the predetermined period of time, the computer system displays, via the display generation component and in the user interface, the first navigational complication in the activated state including, in accordance with a determination that the first navigational complication is a determination that the first navigational complication is an eighth type (e.g., the same as and/or different from the first, third, and/or fifth type) of navigational complication (e.g., a dynamic waypoint complication and/or a non-static waypoint complication), modifying (e.g., changing and/or updating) a set of one or more colors of the first navigational complication and modifying (e.g., changing and/or updating) a graphical element (e.g., icon and/or glyph) for a waypoint of the first navigational complication. Modifying colors and other non-color visual characteristics of the first navigational complication for a waypoint for a specific type of navigational complication improves the computer system as it provides visual feedback about the state of the complication and/or the state of the computer system (e.g., whether the computer system is using power-hungry sensors to track the computer system's location so as to update the complication) and further provides visual feedback as to what type of navigational complication is being displayed.

In some embodiments, displaying the first navigational complication in the activated state includes displaying an indication (e.g., a graphical element and/or a symbol) of a direction (e.g., the arrow in 832 and/or 834 of FIG. 8J) (e.g., bearing and/or not a bearing) to a waypoint (e.g., the Tent waypoint, as depicted in FIG. 8J). In some embodiments, displaying the first navigational complication in the deactivated state does not include displaying the indication of the direction to the waypoint (e.g., 832 and/or 834 of FIG. 8H does not include an arrow pointing to the Tent waypoint). Displaying an indication of a direction to a waypoint corresponding to the first navigational complication based on the state of the first navigational complication conserves battery life as the computer system does not use power-hungry sensors to track the computer system's location when direction information is not needed.

In some embodiments, while displaying the first navigational complication in the activated state, the computer system detects a change in orientation (e.g., **850*n*1) (e.g., rotation and/or direction) of the computer system. In some embodiments, in response to detecting the change in orientation of the computer system, the computer modifies (e.g., animates and/or updates) the indication of the direction to the waypoint (e.g., 838*a* and/or 838*b* of FIG. 8M are pointing in different directions than 838*a* and/or 838*b* of FIG. 8**N) (e.g., the geographical location of and/or geocoordinates for the waypoint). In some embodiments, the computer system changes indication of the direction is modified based on a magnitude of the change in the orientation of the computer system. Modifying the indication of the direction to the waypoint based on an orientation of the computer system with respect to a location corresponding to the waypoint improves the user interface as a user can view directions to a waypoint using the complication and without opening the application, which reduces the number of inputs needed to perform an operation.

In some embodiments, the computer system detects, via one or more sensors (e.g., a GPS sensor and/or a satellite positioning sensor), location data (e.g., geolocation data (e.g., based on one or more global navigation satellite system signals (e.g., GPS, BeiDou, Galileo, GLONASS, IRNSS, NavIC, and/or QZSS)) at a predetermined frequency (e.g., once every two, five, ten, and/or fifteen minutes) while the first navigational complication is in the activated state (e.g., device 600 detects GPS data using satellite positioning sensors once every 2 minutes when 832 and 834 are activated). In some embodiments, the computer system forgoes detecting location data while the first navigational complication is in a deactivated state. Detecting location data at a predetermined while the first navigational complication is in the activated state improves the computer system as it conserves battery life since power-hungry sensors are used at regular intervals.

In some embodiments, the computer system detects, via the one or more sensors (e.g., an accelerometer and/or gyroscope), a wrist raise (e.g., a user raises device 600 to look at the watch face) (e.g., based on a change in orientation of the computer system). In some embodiments, in response to detecting the wrist raise and in accordance with a determination that the first navigational complication is in the activated state, the computer system displays, via the display generation component, an indication (e.g., a graphical element and/or a symbol) of a direction (e.g., 838*a* and/or 838*b*) (e.g., bearing and/or not a bearing) to a waypoint (e.g., the Tent waypoint and/or the Lake waypoint as depicted in FIG. 8N). In some embodiments, in response to detecting the wrist raise and in accordance with a determination that the first navigational complication is in the deactivated state, the computer system forgoes display, via the display generation component, of the indication of the direction to the waypoint (e.g., 832 and/or 834 do not include 838*a* and/or 838*b*, as depicted in FIG. 8H). Conditionally displaying the indication of the direction to the waypoint based on whether the first navigational complication is in a activated or deactivated state improves the user interface because the computer system performs an operation when a set of conditions has been met without requiring further user input.

In some embodiments, the computer system detects, via the one or more sensors (e.g., an accelerometer and/or gyroscope), a wrist raise (e.g., a user raises device 600 to look at the watch face) (e.g., based on a change in orientation of the computer system). In some embodiments, in response to detecting the wrist raise (e.g., and while displaying the respective user interface) and in accordance with a determination that the first navigational complication is in the activated state, the computer system displays, via the display generation component, an indication (e.g., alphanumeric text, a graphical element, and/or a symbol) of a distance (e.g., 840*a* and/or 840*b*) (e.g., 5 feet, 10 feet, and/or 50 feet) to a waypoint (e.g., the Tent waypoint and/or the Lake waypoint as depicted in FIG. 8N). In some embodiments, in response to detecting the wrist raise (e.g., and while displaying the respective user interface) and in accordance with a determination that the first navigational complication is in the deactivated state, the computer system forgoes display of the indication of the distance to the waypoint (e.g., 832 and/or 834 do not include 840*a* and/or 840*b*, as depicted in FIG. 8H). Conditionally displaying the indication of the distance to the waypoint based on whether the first navigational complication is in a activated or deactivated state improves the user interface because the computer system performs an operation when a set of conditions has been met without requiring further user input.

In some embodiments, subsequent to (e.g., while and/or after) displaying the first navigational complication in the activated state (e.g., after 832 and 834 are activated as depicted in FIG. 8J), the computer system determines that the predetermined period of time has ended (e.g., device 600 detects the predetermined period of time has ended). In some embodiments, in response to determining that the predetermined period of time has ended, the computer system deactivates the first navigational complication (e.g., 832 and 834 are deactivated as depicted in FIG. 8H) (e.g., such that when displayed, the first navigational complication is displayed in the deactivated state) (and/or displaying the first navigational complication in the deactivated state). In some embodiments, the predetermined period of time ends at midnight. In some embodiments, in accordance with a determination that a current time corresponds to (e.g., or is past) a predetermined time (e.g., noon and/or midnight), deactivating the first navigational complication. In some embodiments the predetermined time is a predefined time of day. Deactivating the first navigational complication when the predetermined period of time has ended improves the computer system because it limits the use of power-hungry sensors which conserves the battery life.

In some embodiments, the predetermined period of time ends at midnight (e.g., device 600 detects the current time is 12:00 AM). In some embodiments, once activated, navigational complications stay activated for the day and then become deactivated at midnight. Deactivating the first navigational complication at midnight improves the computer system because it limits the use of power-hungry sensors which conserves the battery life.

In some embodiments, displaying the first navigational complication while the first navigational complication is in the deactivated state includes displaying the first navigational complication with a first visual characteristic (e.g., 832 and/or 834 of FIG. 8H are displayed as having a gray color) (e.g., a first set of one or more colors, a first set of one or more graphical elements, a first size, and/or without the second visual characteristic). In some embodiments, displaying the first navigational complication while in the activated state includes, in accordance with a determination that the computer system is in a first mode (e.g., user has not performed a wrist raise gesture to look at device 600) (e.g., a low power mode and/or a dimmed display state), displaying the first navigational complication with a second visual characteristic (e.g., 832 and/or 834 are displayed with a first shade of color) (e.g., a second set of one or more colors, a second set of one or more graphical elements, a second size, and/or without the first visual characteristic) that is different from the first visual characteristic. In some embodiments, displaying the first navigational complication while in the activated state includes, in accordance with a determination that the computer system is in a second mode (e.g., user has performed a wrist raise gesture to look at device 600) (e.g., a non-low power mode and/or a non-dimmed display state) different from the first mode, displaying the first navigational complication with the first visual characteristic (e.g., 832 and/or 834 are displayed as having the gray color) (e.g., a first set of one or more colors, a first set of one or more graphical elements, a first size, and/or without the second visual characteristic). In some embodiments, the computer system is a smart watch. In some embodiments, activated navigational complications on the smart watch look the same, when the user has not raised their wrist to look at the watch, as deactivated navigational complications (independent of whether the user's wrist is raised). In some embodiments, activated navigational complications on the smart watch look different, when the user has raised their wrist to look at the watch, from deactivated navigational complications (independent of whether the user's wrist is raised). In some embodiments, while the computer system is in a first mode (e.g., a low power mode and/or a dimmed display state) and in accordance with a determination that the first navigational complication is in the activated state, the computer system displays, via the display generation component, the first navigational complication with a third visual characteristic (e.g., a third set of one or more colors, a third set of one or more graphical elements, and/or a third size). In some embodiments, the computer system detects a change from the first mode to a second mode (e.g., a non-low power mode and/or a non-dimmed display state) different from the first mode. In some embodiments, in response to detecting the change from the first mode to the second mode and in accordance with a determination that the first navigational complication is in the activated state, the computer system displays the first navigational complication with a fourth visual characteristic (e.g., a fourth set of one or more colors, a fourth set of one or more graphical elements, and/or a fourth size) different from the third visual characteristic. In some embodiments, the computer system changes from the first mode to the second mode in response to detecting, via one or more sensors (e.g., an accelerometer and/or gyroscope), a wrist raise (e.g., based on a change in orientation of the computer system). Conditionally displaying the first navigational complication with different visual characteristics based on the mode of the computer system improves the computer system because it performs an operation when a set of conditions has been met without requiring further user input and it provides visual feedback regarding the state of the computer system (e.g., what mode the computer system is in).

In some embodiments, the first navigational complication includes a user-selected icon (e.g., 832 and/or 834 include a tent icon and/or lake icon, as depicted in FIG. 8N) (e.g., graphical element, symbol, and/or glyph). In some embodiments, the computer system displays the user-selected icon while the first navigational complication is in the activated state and does not display the user-selected icon while the first navigational complication is in the deactivated state (e.g., when the first navigational complication is a dynamic complication). In some embodiments, the computer system displays the user-selected icon while the first navigational complication is in the activated state and in the deactivated state (e.g., when the first navigational complication is a static complication). Including a user-selected icon in the first navigational complication provides visual feedback about which waypoint is being tracked or navigated to via the first navigational complication, which improves visual feedback about the state of the navigational complication and improves how a user navigates through the wilderness using navigational complications.

In some embodiments, while the first navigational complication is in the activated state, the computer system displays, as part of the first navigational complication, navigational information (e.g., 838*a*, 838*b*, 840*a*, and/or 840*b* of FIG. 8N) (e.g., bearing information, distance to waypoint, and/or position with respect to current device location) for a waypoint (e.g., the Tent waypoint of 832 and/or the Lake waypoint of 834 as depicted in FIG. 8N). In some embodiments, the computer system updates the navigational information for the waypoint. In some embodiments, updating the navigational information for the waypoint includes, in accordance with a determination that a set of criteria is satisfied (e.g., a threshold amount of time has passed, a first predetermined time interval has lapsed, and/or satellite positioning data is available), updating, at a first frequency (e.g., every 5 minutes or every 8 minutes), the navigational information for the waypoint using a first type of location data (e.g., device 600 uses GPS data to update 838*a*, 838*b*, 840*a*, and/or 840*b* of FIG. 8N) (e.g., actual location data and/or data from a first sensor type (e.g., GPS sensor)) (e.g., without using the second type of location data). In some embodiments, updating the navigational information for the waypoint includes, in accordance with a determination that the set of criteria is not satisfied, updating, at a second frequency that is different from the first frequency, the navigational information for the waypoint using a second type of location data (e.g., device 600 uses accelerometer and/or gyroscope data to update 838*a*, 838*b*, 840*a*, and/or 840*b* of FIG. 8N) (e.g., estimated location data and/or based on data from a second sensor type (e.g., accelerometer sensors) different from the first sensor type) different from the first type of location data (e.g., without using the first type of location data). In some embodiments, the computer system detects the first type of location data at a first frequency (e.g., every 2 minutes, every 5 minutes, and/or every 15 minutes). In some embodiments, the computer system detects the second type of location data at a second frequency (e.g., different that the first frequency and/or the same as the first frequency). In some embodiments, the second frequency is every 0.1 second, every 0.5 second, and/or every 1 second. In some embodiments the second type of location data is captured in real time. Conditionally updating the navigational information for a waypoint using different types of location data based on whether a set of criteria is satisfied improves the computer system because it performs an operation when a set of conditions has been met without requiring further user input and improves the battery life of the computer system since different sensors can be used to update the navigational complication (e.g., power-hungry sensors can be used less frequently).

Note that details of the processes described above with respect to method 1000 (e.g., FIG. 10) are also applicable in an analogous manner to the methods described herein. For example, methods 700, 900, and/or 1200 optionally includes one or more of the characteristics of the various methods described above with reference to method 1000. For example, methods 700 and/or 900 includes techniques to activate a navigational complication and/or what navigational information is displayed in a navigational complication as described with reference to method 1000. As a further example, user interfaces of methods 700 and/or 900 are optionally displayed in response to detecting an input on the user interface described in method 1000. For brevity, these details are not repeated herein.

FIGS. 11A-11Q illustrate exemplary user interfaces for transitioning among different views of indications of locations, in accordance with some embodiments. The user interfaces in these figures are used to illustrate the processes described below, including the processes in FIG. 12.

At FIG. 11A, device 600 displays, on display 601, home screen user interface 1102 that includes a plurality of icons, each of which, when activated (e.g., via a tap input) cause device 600 to display a user interface for a respective corresponding application. At FIG. 11A, device 600 detects tap input 1150A (e.g., via a touch-sensitive surface that is part of display 601) on compass icon 1102A, which corresponds to a compass application. In response to detecting tap input 1150A on compass icon 1102A, device 600 displays a high-visibility view 1110 of the compass application, as shown in FIG. 11B.

Figure 11B:
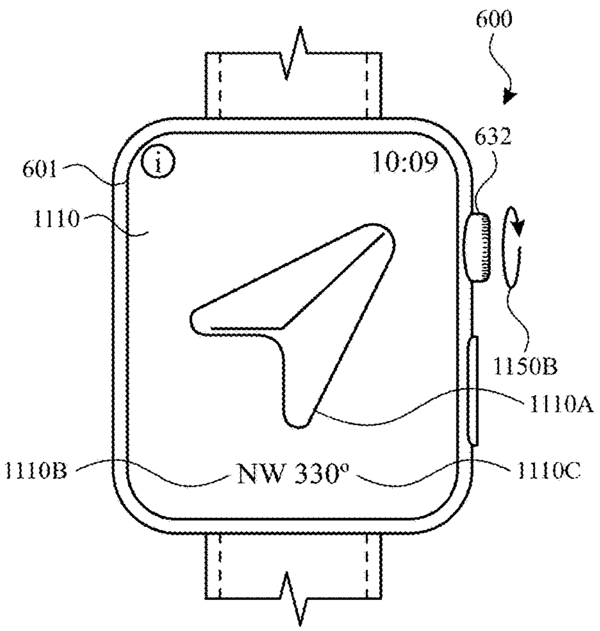

At FIG. 11B, high-visibility view 1110 includes arrow 1110A, textual direction indicator 1110B, and numeric direction indicator 1110C. Arrow 1110A operates like a compass needle and points to north, updating on the display as device 600 rotates so that arrow 1110A continues pointing north. Textual direction indicator 1110B indicates a cardinal or ordinal direction (e.g., N, S, W, E, NE, SE, SW, and/or NW) to which device 600 is point (e.g., as the device is worn on a hand of a user). Numeric direction indicator 1110C indicates numeric degree to which device 600 is pointing. High-visibility view 1110 does not include an indication of the current location of device 600 or indications for other locations. At FIG. 11B, device 600 detects rotation 1150B (e.g., a clockwise rotation) of rotational element 632 (e.g., a rotatable input mechanism and/or a crown). In response to detecting rotational 1150B, device 600 transitions from displaying high-visibility view 1110 to displaying hybrid view 1112, as shown in FIG. 11C.

Figure 11C:
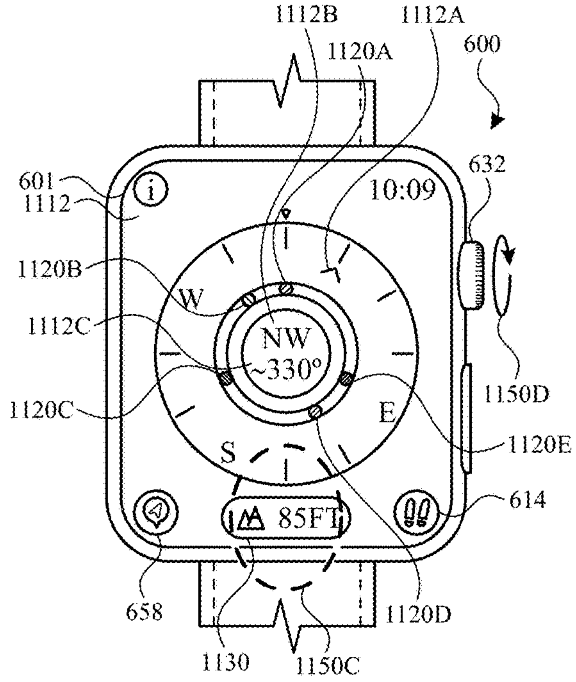

At FIG. 11C, hybrid view 1112 includes arrow 1112A, textual direction indicator 1110B, numeric direction indicator 1110C, location indicators 1120A-1120E, current elevation option 1130, and backtrack affordance 614. Hybrid view 1112 includes many of the same features as described above with respect to navigational user interface 602, such as in FIG. 6D. Arrow 1112A operates like a compass needle and points to north, updating on the display as device 600 rotates so that arrow 1112A continues pointing north. Textual direction indicator 1112B indicates a cardinal or ordinal direction (e.g., N, S, W, E, NE, SE, SW, and/or NW) to which device 600 is point (e.g., as the device is worn on a hand of a user). Numeric direction indicator 1112C indicates numeric degree to which device 600 is pointing. Location indicators 1120A-1120E each correspond to a different location (e.g., a historical location at which the user has placed a waypoint marker and/or a location of significance (e.g., last known cell service and/or where the user's car is parked)). In hybrid view 1112, location indicators 1120A-1120E are distributed around a circle, with each of their locations representing the direction in which a corresponding respective physical location (e.g., a campground, last known cell service location, and/or the user's vehicle) is located. Thus, while hybrid view 1112 provides the user with information about the direction of the various locations with respect to the current location of device 600, hybrid view 1112 does not provide information about the distances to the various locations and does not provide information about (absolute or relative) elevations of the various locations. Current elevation option 1130 indicates the current elevation of device 600 in relation to sea level (e.g., 85 feet above sea level). Backtrack affordance 614, when activated, causes device 600 to display information about a path that device 600 traversed to arrive at the current location (e.g., as described in greater detail with respect to historic location indicator 628, above). New waypoint affordance 658, when activated, initiates a process to add a new waypoint, as described in detail above (e.g., with respect to FIG. 6N). In some embodiments, device 600 detects tap input 1150C on current elevation option 1130 and, in response, device 600 displays elevation view 1116, as shown in FIG. 6G. In some embodiments, device 600 detects rotation 1150D (e.g., a clockwise rotation) of rotational element 632 (e.g., a rotatable input mechanism and/or a crown). In response to detecting rotational 1150D, device 600 transitions from displaying hybrid view 1112 to displaying distance view 1114, as shown in FIG. 11D.

In some embodiments, device 600 detects a user input (e.g., a two-finger tap-and-hold on display 601) (e.g., while displaying high-visibility view 1110, hybrid view 1112, distance view 1114, elevation view 1116, and/or targeted navigational interface 694) and, in response, device 600 outputs audio (e.g., spoken audio) that includes a current location of device 600, a current direction of device 600, and/or a heading.

Figure 11D:
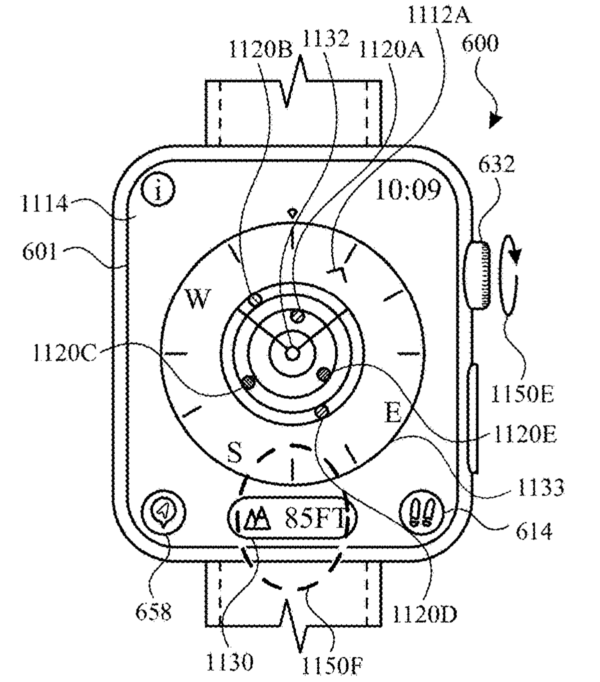
Figure 11E:
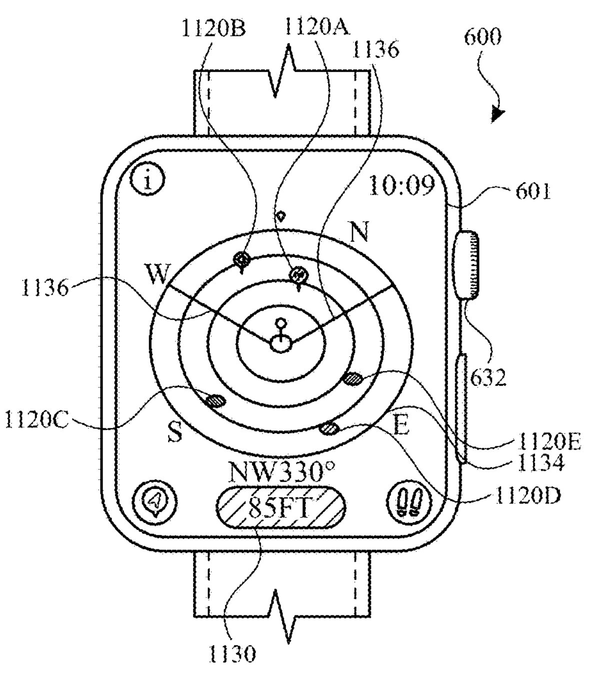
Figure 11F:
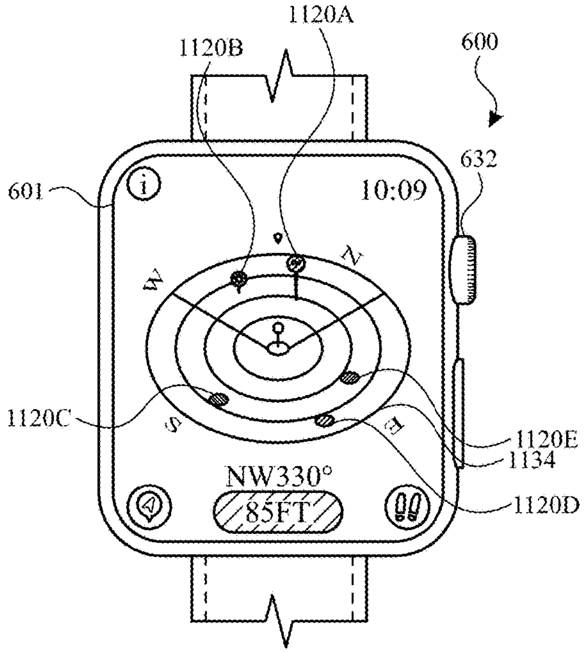

At FIG. 11D, distance view 1114 includes arrow 1112A, location indicators 1120A-1120E, current elevation option 1130, and backtrack affordance 614. Distance view 1114 includes many of the same features as described above with respect to navigational user interface 602 (e.g., including 604, 608, and/or 644), such as in FIG. 6E. In distance view 1114, the positions of location indicators 1120A-1120E indicate the directions and distances (e.g., from the current location of device 600) of the locations corresponding to location indicators 1120A-1120E. In some embodiments, in distance view 1114, the positions of location indicators 1120A-1120E indicate the directions and distances among the locations corresponding to location indicators 1120A-1120E and the directions and distances to the locations from the current location. Current location indicator 1132 represents the current location of device 600. Thus, distance view 1114 provides the user with information about the distance and direction of the various locations represented by location indicators 1120A-1120E and the current location of device 600. In distance view 1114, the positions of location indicators 1120A-1120E do not indicate the elevations (e.g., with respect to sea level and/or in relation to the current elevation of device 600) of the locations corresponding to location indicators 1120A-1120E. In some embodiments, at FIG. 11D, device 600 detects rotation 1150E of rotational element 632 (e.g., a rotatable input mechanism and/or a crown). In response to detecting rotation 1150E and in accordance with a determination that the rotation is a counterclockwise rotation, device 600 transitions from displaying distance view 1114 to displaying hybrid view 1112, as shown in FIG. 11C. In response to detecting rotation 1150E and in accordance with a determination that the rotation is a clockwise rotation, device 600 changes a scale (e.g., zooms out) of distance view 1114 (e.g., as discussed in greater detail above with respect to FIGS. 6F-6G). In some embodiments, at FIG. 11D, device 600 detects tap input 1150F on current elevation option 1130 and, in response, device 600 transitions from displaying distance view 1114 to displaying elevation view 1116, as shown in FIG. 11G.

Figure 11G:
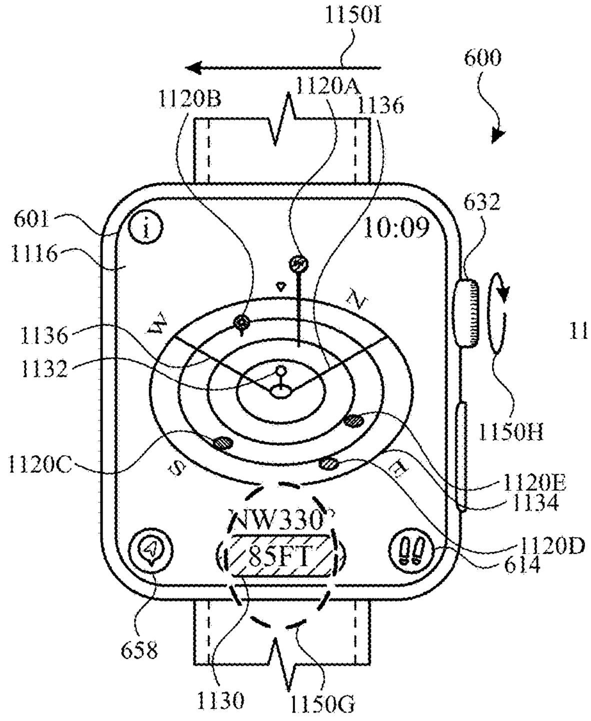

As shown in FIG. 11G, in some embodiments, elevation view 1116 is a simulated three-dimensional view and/or a perspective view that includes location indicators 1120A-1120E. In elevation view 1116, the positions of location indicators 1120A-1120E and current location indication 1132 indicate the elevations (e.g., with respect to the lowest elevation among the locations and device 600, with respect to sea level, and/or in relation to the current elevation of device 600) of the locations corresponding to location indicators 1120A-1120E and the current location of device 600. In addition, in elevation view 1116, the positions of location indicators 1120A-1120E indicate the directions and distances among the locations corresponding to location indicators 1120A-1120E and the directions and distances to the locations from the current location. Thus, elevation view 1116 provides the user with information about the distance, direction, and elevation of the various locations represented by location indicators 1120A-1120E and the current location of device 600.

In some embodiments, in transitioning from distance view 1114 to elevation view 1116, device 600 displays an animation that tilts circle 1133 into a perspective view to represent base plane 1134, as shown in FIGS. 11D-11G. In some embodiments, in transitioning from distance view 1114 to elevation view 1116, device 600 displays an animation that raises respective indicators of locations (e.g., 1120A and 1120B) that are within an area defined by (between) 1136 and optionally raises current location indicator 1132, as shown in FIGS. 11D-11G. In some embodiments, the respective indicators of locations and current location indicator 1132 are raised a respective amount that is based on an elevation of the respective locations corresponding to the indicators. For example, at FIG. 11E, location indicator 1120A and location indicator 1120B have raised the same amount, and at FIGS. 11F-11G, location indicator 1120A has ceased rising and location indicator 1120B has raised up further, indicating that location indicator 1120B corresponds to a location that is at a higher elevation than the location that corresponds to location indicator 1120A. In some embodiments, the various location indicators rise at the same level, but for different durations (and thus rise different distances) based on the respective elevations of the locations corresponding to the various location indicators. In some embodiments, base plane 1134 represents a base plane with an elevation that is based on (equal to) the lowest elevation from among the current location and the locations represented by location indicators that are contained within the area defined by (between) 1136. In some embodiments, the elevation (e.g., relative to sea level and/or another elevation) of respective indications (e.g., 1120A, 1120B, and/or 1132 in FIG. 11G) are represented by respective lines (e.g., vertical lines) that extend from base plane 1134 and the length of the lines are in proportion to the elevations (e.g., relative elevations) of the locations corresponding to the respective indications.

At FIG. 11G, in elevation view 1116, device 600 displays direction and distance information about the locations corresponding to location indicators 1120C-1120E, without raising location indicators 1120C-1120E to show corresponding elevation information (e.g., because location indicators 1120C-1120E are not within the area defined by 1136). In some embodiments, at FIG. 11G, device 600 detects tap input 1150G on current elevation option 1130 and, in response, device 600 transitions from displaying elevation view 1116 to displaying distance view 1114 (e.g., reverses the animation of FIGS. 11D-11G), as shown in FIG. 11D. In some embodiments, device 600 detects rotation 1150H and, in response, changes a scale (e.g., zooms in or out, based on direction of rotation) of elevation view 1116. In some embodiments, changing a scale of elevation view 1116 causes additional location indicators to be displayed (e.g., within area defined by (between) 1136) and/or causes some location indicators to no longer be displayed.

Figure 11H:
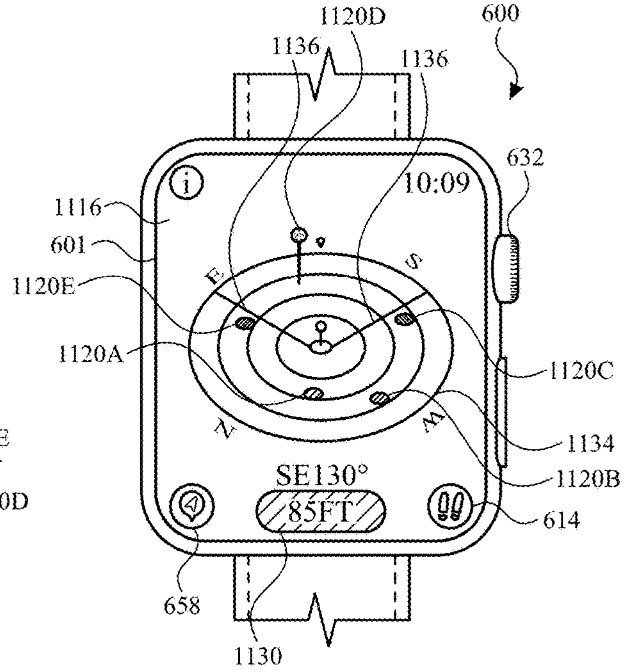
Figure 11I:
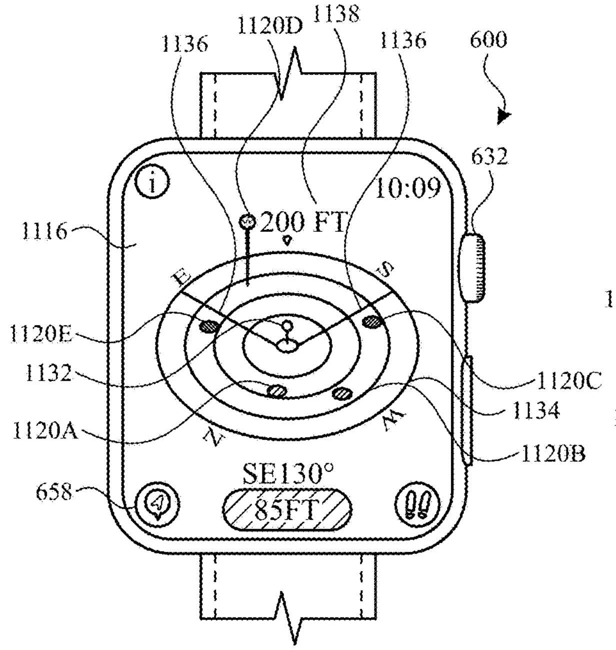

At FIG. 11G, device 600 detects rotation 1150I of device 600, causing device 600 to go from pointing to northwest to pointing to southeast. In response to detecting rotation 1150I of device 600, device 600 updates the positions of location indicators 1120A-1120E in elevation view 1116, which moves location indicators 1120A and 1120B out of the area defined by 1136 and brings location indicator 1120D into the area defined by 1136, as shown in FIG. 11I. As a result, device 600 lowers location indicators 1120A and 1120B to base plane 1134 and optionally raises location indication 1120D above base plane 1134 to represent the elevation of the location corresponding to location indication 1120D, as shown in the animation at FIGS. 11G-11I. Base plane 1134 represents the lowest of elevations of the current location and the locations with indicators within the area defined by 1136 (e.g., in FIG. 11H the elevation of base plane 1134 correspond to the lower of the elevations of the current location of device 600 and the elevation of the location corresponding to location indication 1120D). Thus, in some embodiments, the elevation of base plane 1134 changes when device 600 rotates and/or when the scale of elevation view 1116 changes.

Figure 11J:
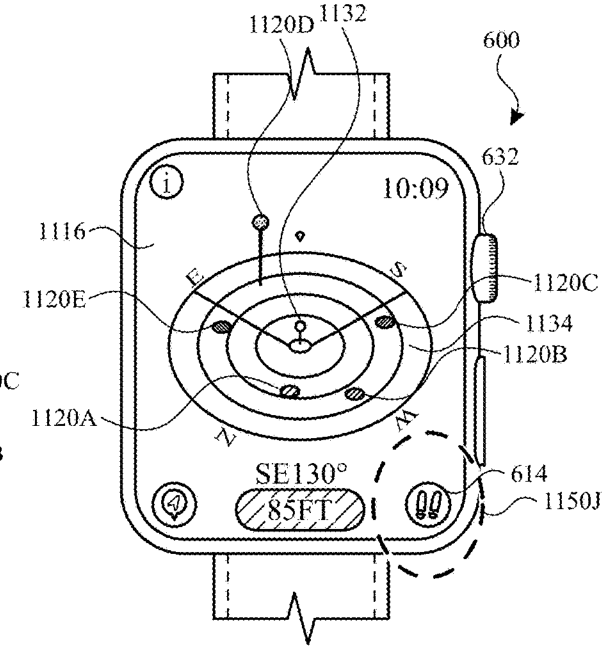
Figure 11K:
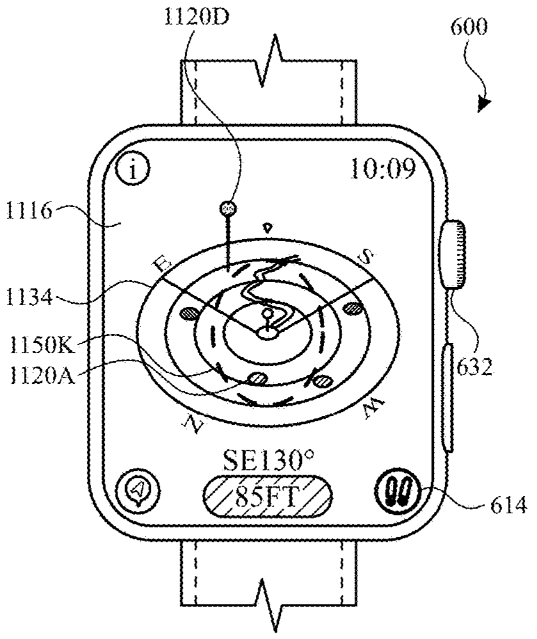

At FIG. 11I, because the elevation of location indicator 1120D is newly displayed, device 600 displays (for a predetermined amount of time) (on display 601 adjacent to 1120D) numeric indication 1138 (e.g., "200 ft") of the elevation (e.g., above sea level) of the location corresponding to location indicator 1120D. At FIG. 11J, after the predetermined amount of time, device 600 ceases to display numeric indication 1138. At FIG. 11J, device 600 detects tap input 1150J on backtrack affordance 614. In response to detecting tap input 1150J on backtrack affordance 614, device 600 displays path 1140 (e.g., similar to 628 in FIG. 6L) that shows the path that device 600 traveled to arrive at the current location. As shown in FIG. 11K, location indicator 1120D corresponds to a location at which cellular service was last available, and device 600 automatically added location indicator 1120D corresponding to the location at which cellular service was last available as a waypoint, thereby allowing the user to backtrack to that location to make a call (e.g., an emergency call).

Figure 11L:
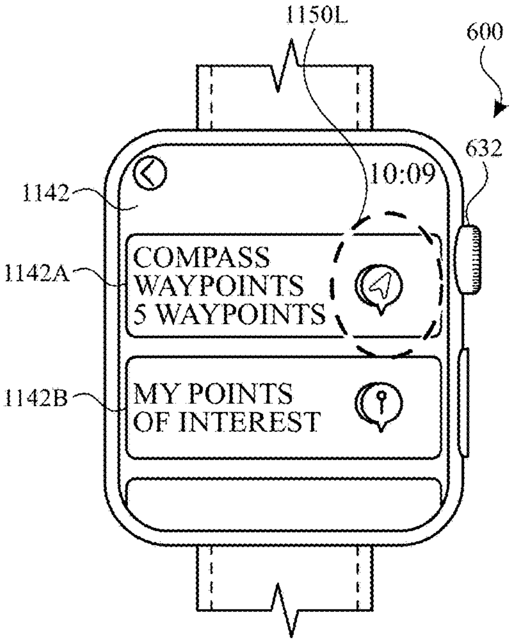
Figure 11M:
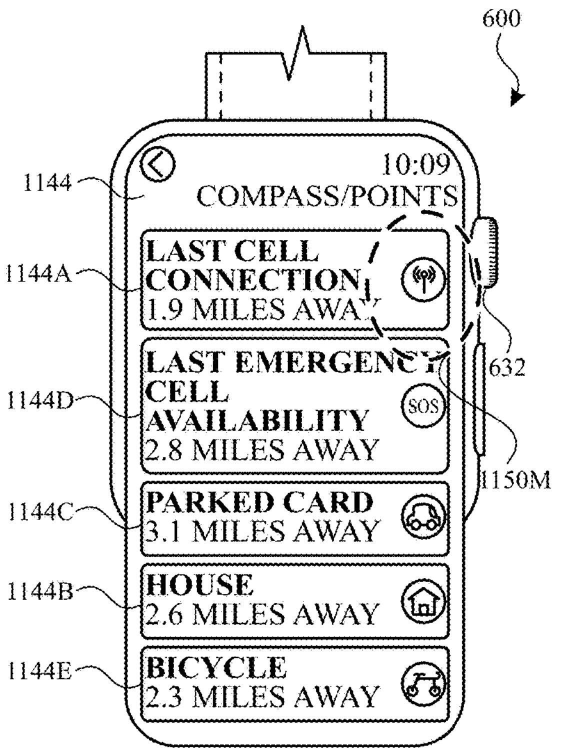

At FIG. 11K, device 600 detects tap input 1150K on base plane 1134 (and/or on a displayed location indicator (e.g., 1120A)) and, in response, displays waypoints menu 1142, as shown in FIG. 11L. At FIG. 11L, waypoints menu 1142 includes first option 1142A that corresponds to waypoints (e.g., user selected and automatically added, such as last location of cellular service) and second option 1142B that corresponds to nearby (e.g., within a threshold distance) points of interest. At FIG. 11L, device 600 detects tap input 1150L on first option 1142A and, in response, device 600 displays (e.g., scrollable) list 1144 of locations (waypoints) that correspond to location indicators 1120A-1120E. At FIG. 11M, list 1144 includes items 1144A-1144E. Device 600 detects tap input 1150M on item 1144A and, in response, displays a targeted navigational interface 694 for navigating to the location corresponding to item 1144A, as shown in FIG. 11N.

Figure 11N:
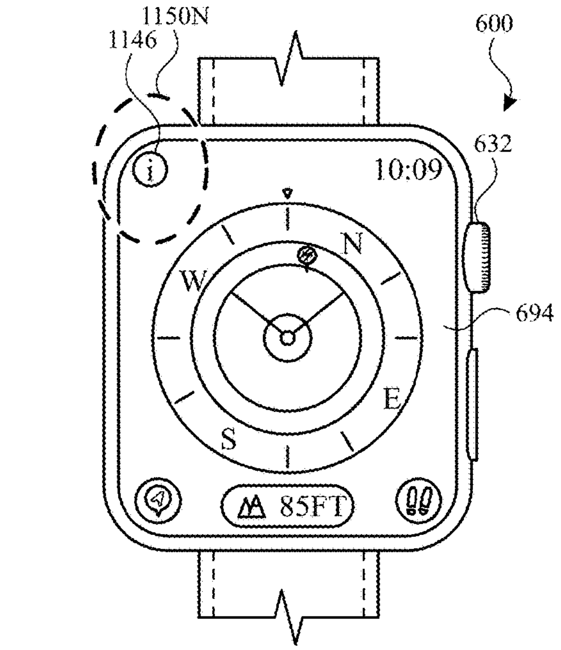
Figure 11O:
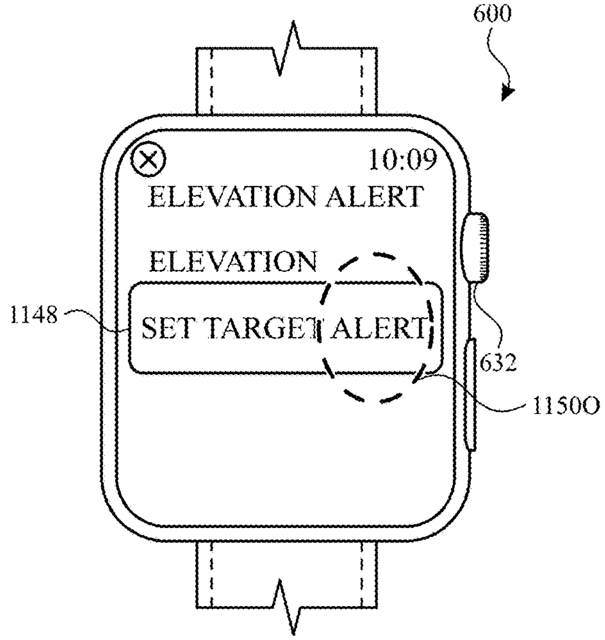

At FIG. 11N, device 600 detects one or more inputs (e.g., including tap input 1150N on information object 1146) and, in response, displays option 1148 for setting an elevation alert, as shown in FIG. 11O. At FIG. 11O, device 600 detects tap input 1150O on option 1148, which displays elevation setting user interface 1160. At FIG. 11P, device 600 receives inputs 1150P and 1150Q to set a target elevation of 300 feet. Subsequently, device 600 monitors the current elevation of device 600. At FIG. 11Q, device 600 detects that device 600 has reached (or crossed) the target elevation and, in response, outputs alert 1162 indicating that the target elevation has been reached.

FIG. 12 is a flow diagram illustrating methods of transitioning among different views of indications of locations, in accordance with some embodiments. Method 1200 is performed at a computer system (e.g., 100, 300, 500, and/or 600) (e.g., a smartwatch, a smartphone, a tablet, a laptop computer, and/or a head mounted device (e.g., a head mounted augmented reality and/or extended reality device)) that is in communication with a display generation component (e.g., 601) (e.g., a display controller, a touch-sensitive display system, a monitor, and/or a head mounted display system) and one or more input devices (e.g., 601 and/or 632) (e.g., a touch-sensitive surface, a keyboard, a rotatable input mechanism, and/or a mouse). Some operations in method 1000 are, optionally, combined, the orders of some operations are, optionally, changed, and some operations are, optionally, omitted.

As described below, method 1200 provides an intuitive way for transitioning among different views of indications of locations. The method reduces the cognitive burden on a user that views indications of locations, thereby creating a more efficient human-machine interface. For battery-operated computing devices, enabling a user to view indications of locations faster and more efficiently conserves power and increases the time between battery charges.

The computer system (e.g., 600) displays (1202), via the display generation component (e.g., 601), a first view (e.g., 1114 at FIG. 11D) (e.g., a two-dimensional view) that concurrently includes one or more indications (e.g., 1120A-1120E at FIG. 11D) of one or more locations (e.g., indications of one or a plurality of historic locations that the computer system has been and/or indications of waypoints and/or a first indication for a first location and a second indication for a second location) and an indication (e.g., 1132 at FIG. 11D) of a current location of the computer system.

The displayed relationships (1204) (e.g., distances between and/or relative positions of) in the first view (e.g., 1114 at FIG. 11D) among the one or more indications (e.g., 1120A-1120E at FIG. 11D) of the one or more locations (e.g., a location of a parked car, a location of a trail head, and/or a location of a point of interest) and the indication (e.g., 1132 at FIG. 11D) of the current location correspond to (e.g., are based on and/or are to scale with) distance relationships and relative position relationships (e.g., based on location data (e.g., geographic location data, either estimated (e.g., based on data from one sensor type (e.g., gyroscope or accelerometer sensors)) or actual (e.g., based a different sensor type (e.g., GPS sensor)))) among the one or more locations and the current location of the computer system (e.g., 600) without the displayed relationships in the first view (e.g., 1114 at FIG. 11D) corresponding to elevation relationships among the one or more locations and the current location of the computer system. In some embodiments, the first view is a two-dimensional view that includes indications of various locations. The indications are arranged to show the relative distances between the various locations and to show the relative positions of the various positions of the locations with respect to each other. In some embodiments, in the first view, the indications are not arranged in a manner to reflect/disclose elevations of the various locations (e.g., absolute elevations or elevations relative to each other).

While displaying the first view (e.g., 1114 at FIG. 11D), the computer system (e.g., 600) detects (1206), via the one or more input devices, a first input (e.g., 1150F and/or 1150E).

In response to detecting the first input (e.g., 1150F and/or 1150E), the computer system (e.g., 600) transitions (1208) (e.g., FIGS. 11D-11G) from displaying the first view (e.g., 1114 at FIG. 11D) to displaying, via the display generation component, a second view (e.g., 1116 at FIG. 11G) that concurrently includes the one or more indications (e.g., 1120A-1120E at FIG. 11G) of the one or more locations (e.g., indications of one or a plurality of historic locations that the computer system has been and/or indications of waypoints) and the indication (e.g., 1132 at FIG. 11G) of the current location of the computer system.

The displayed relationships (1210) (e.g., distances between, relative positions of, and elevations) in the second view (e.g., 1116 at FIG. 11G) among the one or more indications (e.g., 1120A-1120E at FIG. 11G) of the one or more locations and the indication (e.g., 1132 at FIG. 11G) of the current location correspond to (e.g., are based on and/or are to scale with) distance relationships, relative position relationships, and elevation relationships (e.g., based on location data (e.g., geographic location data, either estimated (e.g., based on data from one sensor type (e.g., gyroscope or accelerometer sensors)) or actual (e.g., based a different sensor type (e.g., GPS sensor)))) among the one or more locations and the current location of the computer system. Displaying the second view that includes elevation relationships provides the user with visual feedback about the relative elevations among the various locations, thereby providing improved visual feedback.

In some embodiments, transitioning from displaying the first view (e.g., 1114 at FIG. 11D) to the second view (e.g., 1116 at FIG. 11G) includes animating raising at least one of the one or more indications (e.g., 1120A and 1120B in FIGS. 11E-11G) of the one or more locations and the indication (e.g., 1132 at FIGS. 11E-11G) of the current location of the computer system (e.g., raise a location indication 1120A and/or the indication of the current location) in relation to a (e.g., displayed or not displayed) base plane (e.g., 1133 and/or 1134) (e.g., the one or more indication of the one or more locations and/or the indication of the current location are located on the base plane while in the first view). In some embodiments, the first view is a two-dimensional view and the second view is a three-dimensional view (e.g., a perspective view). In some embodiments, in the first view the indications of the various locations (one or more locations and current location) are displayed on a single plane and in the second view the indications of the various locations are displayed in different planes (e.g., the planes are based on the altitude of the respective locations). In some embodiments, the animation from the first view to the second view includes indications of various locations rising above the base plane to their respective planes (based on their altitude). Animating the indications rising to show respective elevations provides the user with visual feedback that the placement of the indications represent elevations, thereby providing improved visual feedback.

In some embodiments, the base plane (e.g., 1133 and/or 1134) represents an elevation that is the lowest elevation of the one or more locations and the current location. In some embodiments, when the current location has a lower elevation as compared to the one or more locations, the base plane represents the elevation of the current location and the indication of the current location is represented on the base plane. In some embodiments, when a first location of the one or more locations has an elevation that is lower than the current location (and the other one or more locations), the base plane represents the elevation of the first location and the indication of the first location is represented on the base plane (and the location of the current location is represented to appear to be above the base plane). The base plane representing the lowest elevation from among the various locations enables indications of all other locations to be displayed above the base plane and thus not obscured by the base plane, thereby providing improved visual feedback.

In some embodiments, the animation (e.g., at FIGS. 11D-11G) of raising a respective indication (e.g., 1120A and/or 1120B) (e.g., an indication of the one or more indications and/or the indication of the current location) includes raising the respective indication an amount that is based on a difference of the elevation of a location corresponding to the respective indication and the elevation represented by the base plane (e.g., 1133 and/or 1134). Raising the respective indications above the base plane provides the user with visual feedback about how much higher in elevation the respective corresponding locations are, thereby providing improved feedback.

In some embodiments, the second view (e.g., 1116 at FIG. 11G) includes, concurrently with the one or more indications (e.g., 1120A-1120B) of the one or more locations and the indication of the current location of the computer system, a plurality of other indications (e.g., 1120C-1120E) of a plurality of other locations. In some embodiments, the displayed relationships (e.g., distances between, relative positions of, and elevations) in the second view among the plurality of other indications (e.g., 1120C-1120E) of the plurality of other locations correspond to (e.g., are based on and/or are to scale with) distance relationships and relative position relationships without the displayed relationships in the second view corresponding to elevation relationships among the plurality of other indications. In some embodiments, the second view includes indications of a plurality of other locations that show the distance and relative positions of the other locations, but that does not show the relative elevations of the plurality of locations. Showing distance and direction relationship information for some points without showing the elevation relationship for those points helps to not clutter the user interface, thereby enabling the user to better recognize the elevation differences of the points that are of interest, thus providing improved visual feedback.

In some embodiments, computer system (e.g., 600) detects (e.g., via a magnetometer) a rotation (e.g., 11501) of the computer system (e.g., detecting that the computer system has rotated with respect to North). In response to detecting the rotation of the computer system: the computer system (e.g., 600) raises (by animating an update of the second view) a first respective indication (e.g., 1120D at FIGS. 11H-11I) of the plurality of other indications in relation to a base plane (e.g., 1133 and/or 1134) based on an altitude of a first respective location corresponding to the first respective indication; and the computer system (e.g., 600) lowers (by animating an update of the second view) a second respective indication (e.g., 1120A at FIG. 11H) of the one or more indications to the base plane (e.g., 1133 and/or 1134) independent of the altitude of a second respective location corresponding to the second respective indication. In some embodiments, a direction indicator is displayed that overlaps a portion of the base plane, and indications that are within the direction indicator are raised to show their altitude while indications that are not within the direction indicator are displayed on the base plane (not showing their altitude). In some embodiments, the raising of indications coming into the direction indicator and the lowering of indications leaving the direction indictor happens concurrently. Rotating the device to show the elevation for some indications allows the user to specify for which points the elevations should be displayed, thereby providing the user with more control and improved feedback.

In some embodiments, in response to detecting the rotation (e.g., 11501) of the computer system (e.g., 600), the computer system displays, via the display generation component (e.g., adjacent to the second respective indication) for an amount (e.g., a predefined amount) of time (e.g., before ceasing to display without requiring additional user input), a textual representation (e.g., 1138 at FIG. 11I) of an altitude (e.g., an absolute amount, 300 feet, 350 feet, or 654 feet above sea level) of the first respective location. In some embodiments, the computer system temporarily shows textual elevations next to points that come within the direction indicator (e.g., that raise up). Temporarily showing textual elevation information next to indications provides the user with precise feedback about the elevation (e.g., above sea level) for the corresponding location, thereby providing improved visual feedback.

In some embodiments, the computer system (e.g., 600) displays, via the display generation component (e.g., 601) and concurrently with the first view (e.g., 1112 at FIG. 11C), a textual representation (e.g., 1130) of a current elevation (e.g., 65 feet, 102 feet, or 322 feet above sea level) of the computer system. In some embodiments, the elevations of the one or more locations is not displayed in the first view. Displaying text of the current elevation of the computer system provides the user with precise feedback about the device's current elevation, thereby providing improved feedback.

In some embodiments, detecting, via the one or more input devices, the first input includes detecting a touch input (e.g., 1150C) (e.g., a tap or a tap-and-hold) at a location corresponding to the textual representation (e.g., 1130) of the current elevation of the computer system. Displaying the second view that includes elevation relationships provides the user with visual feedback about the relative elevations among the various locations, thereby providing improved visual feedback.

In some embodiments, while displaying the second view (e.g., 1116 at FIG. 11G), the computer system (e.g., 600) detects, via the one or more input devices, a second input (e.g., 1150G) (e.g., a tap input on a textual representation of the current elevation of the computer system). In response to detecting the second input (e.g., 1150G), the computer system (e.g., 600) transitions (e.g., including an animation) from the second view (e.g., 1116 at FIG. 11G) to the first view (e.g., 1114 at FIG. 11D). Displaying the first view that does not include elevation relationships provides the user with a simplified view about the distances and positions of the various locations, thereby providing improved visual feedback.

In some embodiments, prior to displaying the first view (e.g., 1114 at FIG. 11D), the computer system (e.g., 600) displays, via the display generation component, a third view (e.g., 1112 at FIG. 11C) (e.g., a two-dimensional view) that concurrently includes the one or more indications of the one or more locations (e.g., indications of one or a plurality of historic locations that the computer system has been and/or indications of waypoints and/or a first indication for a first location and a second indication for a second location) and the indication of the current location of the computer system. The displayed relationships (e.g., distances between and/or relative positions of) in the third view among the one or more indications (e.g., 1120A-1120E) of the one or more locations and the indication of the current location correspond to (e.g., are based on and/or are to scale with) relative position relationships (e.g., based on location data (e.g., geographic location data, either estimated (e.g., based on data from one sensor type (e.g., gyroscope or accelerometer sensors)) or actual (e.g., based a different sensor type (e.g., GPS sensor)))) among the one or more locations and the current location of the computer system without the displayed relationships in the first view corresponding to distance relationships and elevation relationships among the one or more locations and the current location of the computer system. In some embodiments, the third view is a two-dimensional view that includes indications of various locations. The indications are arranged to show the relative positions of the various positions of the locations with respect to each other. In some embodiments, in the third view, the indications are not arranged in a manner to reflect/disclose distances and/or elevations (e.g., absolute elevations or elevations relative to each other) among the various locations. In some embodiments, the computer system receives a user input (e.g., a tap input on a textual representation of the current elevation of the computer system) and, in response transitions from the third view to the first view. Displaying the first view that does not include elevation relationships and distance relationships provides the user with a simplified view about the positions of the various locations, thereby providing improved visual feedback.

In some embodiments, prior to displaying the third view (e.g., 1112), the computer system (e.g., 600) displays, via the display generation component, a fourth view (e.g., 1110) (e.g., a two-dimensional view) that includes a current bearing (e.g., 1110A) of the computer system (e.g., 600) and that does not include the one or more indications of the one or more locations (e.g., indications of one or a plurality of historic locations that the computer system has been and/or indications of waypoints and/or a first indication for a first location and a second indication for a second location). In some embodiments, the fourth view does not include direction/distance/elevation relationships among the various points/locations. In some embodiments, the computer system receives a user input (e.g., a tap input on a textual representation of the current elevation of the computer system and/or rotation of a rotatable input mechanism) and, in response transitions from the fourth view to the third view. Showing the current bearing without showing any relationships to the various locations provides the user with a simplified view about the bearing of the computer system, thereby providing improved visual feedback.

In some embodiments, while displaying the second view (e.g., 1116 at FIG. 11K), the computer system (e.g., 600) detects, via the one or more input devices, a set of one or more inputs that includes an input (e.g., 1150K, 1150L, and/or 1150M) directed to (e.g., a tap input on) a respective indication that corresponds to a respective location. In response to detecting the input directed to the respective indication, the computer system (e.g., 600) displays, via the display generation component, a textual distance (e.g., 100 meters, 0.3 miles, and/or 1.21 miles) from the current location to the respective location (e.g., in 1144A at FIG. 11M) and a textual elevation (e.g., in 1144A at FIG. 11M) (e.g., up 300 feet, up 33 feet, or down 120 feet) difference between the current location and the respective location. In some embodiments, the computer system detects a tap input on the respective indication and, in response, displays a list that corresponds to the one or more indications. In response to detecting a tap input on a respective item in the list that corresponds to the respective location, the computer system displays the textual distance and textual elevation. Enabling the user to select a specific location to see additional details about the location provides the user with additional feedback about that location, thereby providing improved feedback.

Figure 11P:
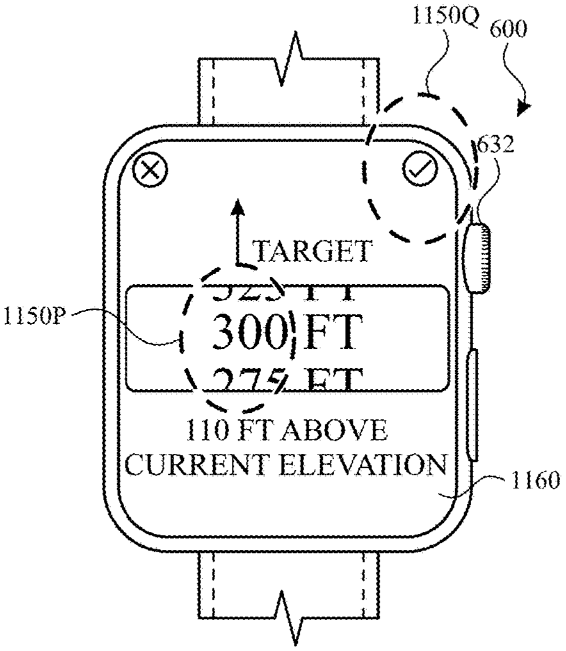

In some embodiments, the computer system (e.g., 600) receives user input (e.g., 11500, 1150P, and/or 1150Q) selecting a target elevation (e.g., as in FIG. 11P). The computer system (e.g., 600) detects that the computer system has reached the target elevation (e.g., the user wearing the computer system has hiked down or hiked up to the target elevation). In response to detecting that the computer system (e.g., 600) has reached the target elevation, the computer system (e.g., 600) outputs (e.g., audio, visual, and/or tactile) an alert (e.g., 1160 at FIG. 11P) (e.g., that indicates that the target elevation has been reached). Getting an alert that the computer system has reached the target elevation provides the user with feedback about the elevation of the computer system, thereby providing improved feedback.

In some embodiments, while displaying the second view (e.g., 1116 at FIG. 11K), the computer system (e.g., 600) detects, via a rotatable input device of the one or more input devices, a rotational input. In response to detecting the rotational input, the computer system changes a scale of distances among the one or more indications of the one or more locations and the indication of the current location (and, optionally showing an indication of scale (e.g., on the base plane)). Changing a scale of the second view provides the user with additional feedback about additional locations and/or provides the user with more granular feedback about fewer locations, thereby providing improved visual feedback.

In some embodiments, the computer system (e.g., 600) detects that the computer system is no longer in communication range of a cellular service provider of the computer system. In response to detecting that the computer system is no longer in communication range of the cellular service provider of the computer system, the computer system adds an indication (e.g., 1120D), as part of the first view and/or the second view, corresponding to a last location that the computer system was in communication range of the cellular service provider. In some embodiments, when the computer system goes out of cellular connection range of the service provider, the first view and/or second view automatically show a point corresponding to a location of the last place a cellular connection was available (of the service provider, even though other service provides are available and in communication range of the computer system). Automatically show an indication corresponding to last cellular connection (e.g., of the device's cellular service provider) when out of cellular connection range provides the user with feedback about where to go back to to get cellular service (e.g., in case of an emergency).

In some embodiments, the computer system (e.g., 600) detects that the computer system is no longer in communication range of any cellular service provider. In response to detecting that the computer system is no longer in communication range of any cellular service providers, the computer system (e.g., 600) adds an indication (e.g., 1120D), as part of the first view and/or the second view, corresponding to a last location that the computer system was in communication range of any cellular service provider. In some embodiments, when the computer system goes out of cellular connection range of all cellular service providers, the first view and/or second view automatically show a point corresponding to the location of the last place where a cellular connection (of any service provider) was available. Automatically show an indication corresponding to last emergency cellular communication connection (e.g., of any cellular service provider that works with the computer system) when out of cellular connection range provides the user with feedback about where to go back to to get cellular service (e.g., in case of an emergency).

Note that details of the processes described above with respect to method 1000 (e.g., FIG. 10) are also applicable in an analogous manner to the methods described herein. For example, methods 700, 900, and/or 1000 optionally includes one or more of the characteristics of the various methods described above with reference to method 1200. For example, methods 700 and/or 900 includes techniques to activate a navigational complication and/or what navigational information is displayed in a navigational complication as described with reference to method 1000. As a further example, user interfaces of methods 700 and/or 900 are optionally displayed in response to detecting an input on the user interface described in method 1000. For brevity, these details are not repeated herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of navigational information. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver navigational information. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of navigational services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, navigational information can be selected and delivered to users by inferring preferences based on non-personal information data or a bare minimum amount of personal information, such as the content being requested by the device associated with a user, other non-personal information available to the navigational services, or publicly available information.

What is claimed is:

1. A computer system configured to communicate with a display generation component, comprising:

one or more processors; and memory storing one or more programs configured to be executed by the one or more processors, the one or more programs including instructions for:

without displaying a calculated route, concurrently displaying, via the display generation component:

one or more indications of a plurality of historic locations of the computer system;

an indication of a current location of the computer system; and an indication of a current direction of the computer system, wherein displayed relationships among the one or more indications of the plurality of historic locations and the indication of the current location corresponds to geographical relationships among the plurality of historic locations and the current location of the computer system; and while concurrently displaying the one or more indications of the plurality of historic locations of the computer system, the indication of the current location of the computer system, and the indication of the current direction of the computer system:

in accordance with a determination that the computer system is in a first mode, adding an additional historic location to the one or more indications of the plurality of historic locations; and in accordance with a determination that the computer system is not in the first mode, forgoing adding an additional historic location to the one or more indications of the plurality of historic locations.

2. The computer system of claim 1, wherein displaying the one or more indications of the plurality of historic locations of the computer system includes:

in accordance with a determination that a first indication of the one or more indications of the plurality of historic locations is based on a first data type, displaying, via the display generation component, a graphical object with a first visual characteristic for the first indication; and in accordance with a determination that the first indication of the one or more indications of the plurality of historic locations is based on a second data type different from the first data type, displaying, via the display generation component, a graphical object with a second visual characteristic, different from the first visual characteristic, for the first indication.

3. The computer system of claim 1, the one or more programs further including instructions for:

in accordance with a determination that the current direction of the computer system is toward a geographic location of a respective historic location of the plurality of historic locations, displaying, via the display generation component, the indication of the current direction of the computer system as visually overlapping an indication of the respective historic location; and in accordance with a determination that the current direction of the computer system is not toward the geographic location of the respective historic location of the plurality of historic locations, displaying, via the display generation component, the indication of the current direction of the computer system as not overlapping the indication of the respective historic location.

4. The computer system of claim 1, the one or more programs further including instructions for:

in accordance with a determination that a first type of wireless signal is not detected, automatically determining and storing current locations of the computer system; and in accordance with a determination that the first type of wireless signal is detected, forgoing storing current locations of the computer system.

5. The computer system of claim 1, wherein the one or more indications of the plurality of historic locations of the computer system, the indication of the current location, and the indication of the current direction of the computer system are concurrently displayed without displaying elements of a map.

6. The computer system of claim 1, the one or more programs further including instructions for:

detecting a change in the current location of the computer system; and in response to detecting the change in the current location of the computer system:

modifying the displayed relationships among the one or more indications of the plurality of historic locations and the indication of the current location of the computer system.

7. The computer system of claim 1, the one or more programs further including instructions for:

detecting a change in an orientation of the computer system; and in response to detecting the change in the orientation of the computer system, maintaining the displayed relationships among at least two indications of the one or more indications of the plurality of historic locations.

8. The computer system of claim 1, the one or more programs further including instructions for:

detecting a change in an orientation of the computer system; and in response to detecting the change in the orientation of the computer system:

maintaining a display position of the indication of the current direction of the computer system; and moving a position of the one or more indications of the plurality of historic locations.

9. The computer system of claim 1, the one or more programs further including instructions for:

determining current locations of the computer system at a defined frequency.

10. The computer system of claim 1, wherein location data the plurality of historic locations is captured based on satisfying a set of criteria, wherein the set of criteria includes a first criterion that is satisfied based on a location of the computer system being outside of a defined area.

11. The computer system of claim 1, the one or more programs further including instructions for:

displaying, via the display generation component, an indication of a first waypoint, wherein displayed relationships among the indication of the first waypoint, the one or more indications of the plurality of historic locations, and the indication of the current location corresponds to geographical relationships among the first waypoint, the plurality of historic locations, and the current location of the computer system.

12. The computer system of claim 11, the one or more programs further including instructions for:

while concurrently displaying the indication of the first waypoint, the one or more indications of the plurality of historic locations of the computer system, and the indication of the current location of the computer system, detecting, via one or more input devices, an input; and in response to detecting the input:

ceasing to display the one or more indications of the plurality of history locations; and displaying, via the display generation component, a watch face user interface including one or more complications, wherein the one or more complications includes a first complication having a directional indicator pointing toward the first waypoint.

13. The computer system of claim 11, the one or more programs further including instructions for:

while concurrently displaying the indication of the first waypoint, the one or more indications of the plurality of historic locations of the computer system, and the indication of the current location of the computer system, detecting, via one or more input devices, an input; and in response to detecting the input, displaying, via the display generation component, a first graphical user interface including a plurality of affordances for a plurality of waypoints that, when selected, causes display of a second graphical user interface for a respective waypoint.

14. The computer system of claim 1, wherein the one or more indications of the plurality of historic locations of the computer system, the indication of the current location of the computer system, and the indication of the current direction of the computer system are concurrently displayed in a first navigational graphical user interface, the one or more programs further including instructions for:

while displaying the first navigational graphical user interface, detecting, via a rotatable input device, a rotational input in a first direction; and in response to detecting the rotational input in the first direction:

ceasing display of the first navigational graphical user interface; and displaying, via the display generation component, a second navigational graphical user interface different from the first navigational graphical user interface, the second navigational graphical user interface including the one or more indications of the plurality of historic locations of the computer system, the indication of the current location of the computer system, and the indication of the current direction of the computer system.

15. The computer system of claim 14, the one or more programs further including instructions for:

in response to detecting the rotational input in the first direction, modifying the one or more indications of the plurality of historic locations of the computer system.

16. The computer system of claim 14, the one or more programs further including instructions for:

detecting a second rotational input in the first direction; and in response to detecting the second rotational input in the first direction:

ceasing display of the second navigational graphical user interface; and displaying, via the display generation component, a third navigational graphical user interface different from the first navigational graphical user interface and the second navigational graphical user interface, the third navigational graphical user interface including the one or more indications of the plurality of historic locations of the computer system, the indication of the current location of the computer system, and the indication of the current direction of the computer system.

17. A non-transitory computer-readable storage medium storing one or more programs configured to be executed by one or more processors of a computer system that is in communication with a display generation component, the one or more programs including instructions for:

without displaying a calculated route, concurrently displaying, via the display generation component:

one or more indications of a plurality of historic locations of the computer system;

an indication of a current location of the computer system; and an indication of a current direction of the computer system, wherein displayed relationships among the one or more indications of the plurality of historic locations and the indication of the current location corresponds to geographical relationships among the plurality of historic locations and the current location of the computer system; and while concurrently displaying the one or more indications of the plurality of historic locations of the computer system, the indication of the current location of the computer system, and the indication of the current direction of the computer system:

in accordance with a determination that the computer system is in a first mode, adding an additional historic location to the one or more indications of the plurality of historic locations; and in accordance with a determination that the computer system is not in the first mode, forgoing adding an additional historic location to the one or more indications of the plurality of historic locations.

18. A method, comprising:

at a computer system that is in communication with a display generation component:

without displaying a calculated route, concurrently displaying, via the display generation component:

one or more indications of a plurality of historic locations of the computer system;

an indication of a current location of the computer system; and an indication of a current direction of the computer system, wherein displayed relationships among the one or more indications of the plurality of historic locations and the indication of the current location corresponds to geographical relationships among the plurality of historic locations and the current location of the computer system; and while concurrently displaying the one or more indications of the plurality of historic locations of the computer system, the indication of the current location of the computer system, and the indication of the current direction of the computer system:

in accordance with a determination that the computer system is in a first mode, adding an additional historic location to the one or more indications of the plurality of historic locations; and in accordance with a determination that the computer system is not in the first mode, forgoing adding an additional historic location to the one or more indications of the plurality of historic locations.

19. The non-transitory computer-readable storage medium of claim 17, wherein displaying the one or more indications of the plurality of historic locations of the computer system includes:

in accordance with a determination that a first indication of the one or more indications of the plurality of historic locations is based on a first data type, displaying, via the display generation component, a graphical object with a first visual characteristic for the first indication; and in accordance with a determination that the first indication of the one or more indications of the plurality of historic locations is based on a second data type different from the first data type, displaying, via the display generation component, a graphical object with a second visual characteristic, different from the first visual characteristic, for the first indication.

20. The non-transitory computer-readable storage medium of claim 17, the one or more programs further including instructions for:

in accordance with a determination that the current direction of the computer system is toward a geographic location of a respective historic location of the plurality of historic locations, displaying, via the display generation component, the indication of the current direction of the computer system as visually overlapping an indication of the respective historic location; and in accordance with a determination that the current direction of the computer system is not toward the geographic location of the respective historic location of the plurality of historic locations, displaying, via the display generation component, the indication of the current direction of the computer system as not overlapping the indication of the respective historic location.

21. The non-transitory computer-readable storage medium of claim 17, the one or more programs further including instructions for:

in accordance with a determination that a first type of wireless signal is not detected, automatically determining and storing current locations of the computer system; and in accordance with a determination that the first type of wireless signal is detected, forgoing storing current locations of the computer system.

22. The non-transitory computer-readable storage medium of claim 17, wherein the one or more indications of the plurality of historic locations of the computer system, the indication of the current location, and the indication of the current direction of the computer system are concurrently displayed without displaying elements of a map.

23. The non-transitory computer-readable storage medium of claim 17, the one or more programs further including instructions for:

detecting a change in the current location of the computer system; and in response to detecting the change in the current location of the computer system:

modifying the displayed relationships among the one or more indications of the plurality of historic locations and the indication of the current location of the computer system.

24. The non-transitory computer-readable storage medium of claim 17, the one or more programs further including instructions for:

detecting a change in an orientation of the computer system; and in response to detecting the change in the orientation of the computer system, maintaining the displayed relationships among at least two indications of the one or more indications of the plurality of historic locations.

25. The non-transitory computer-readable storage medium of claim 17, the one or more programs further including instructions for:

detecting a change in an orientation of the computer system; and in response to detecting the change in the orientation of the computer system:

maintaining a display position of the indication of the current direction of the computer system; and moving a position of the one or more indications of the plurality of historic locations.

26. The non-transitory computer-readable storage medium of claim 17, the one or more programs further including instructions for:

determining current locations of the computer system at a defined frequency.

27. The non-transitory computer-readable storage medium of claim 17, wherein location data the plurality of historic locations is captured based on satisfying a set of criteria, wherein the set of criteria includes a first criterion that is satisfied based on a location of the computer system being outside of a defined area.

28. The non-transitory computer-readable storage medium of claim 17, the one or more programs further including instructions for:

displaying, via the display generation component, an indication of a first waypoint, wherein displayed relationships among the indication of the first waypoint, the one or more indications of the plurality of historic locations, and the indication of the current location corresponds to geographical relationships among the first waypoint, the plurality of historic locations, and the current location of the computer system.

29. The non-transitory computer-readable storage medium of claim 28, the one or more programs further including instructions for:

while concurrently displaying the indication of the first waypoint, the one or more indications of the plurality of historic locations of the computer system, and the indication of the current location of the computer system, detecting, via one or more input devices, an input; and in response to detecting the input:

ceasing to display the one or more indications of the plurality of history locations; and displaying, via the display generation component, a watch face user interface including one or more complications, wherein the one or more complications includes a first complication having a directional indicator pointing toward the first waypoint.

30. The non-transitory computer-readable storage medium of claim 28, the one or more programs further including instructions for:

while concurrently displaying the indication of the first waypoint, the one or more indications of the plurality of historic locations of the computer system, and the indication of the current location of the computer system, detecting, via one or more input devices, an input; and in response to detecting the input, displaying, via the display generation component, a first graphical user interface including a plurality of affordances for a plurality of waypoints that, when selected, causes display of a second graphical user interface for a respective waypoint.

31. The non-transitory computer-readable storage medium of claim 17, wherein the one or more indications of the plurality of historic locations of the computer system, the indication of the current location of the computer system, and the indication of the current direction of the computer system are concurrently displayed in a first navigational graphical user interface, the one or more programs further including instructions for:

while displaying the first navigational graphical user interface, detecting, via a rotatable input device, a rotational input in a first direction; and in response to detecting the rotational input in the first direction:

ceasing display of the first navigational graphical user interface; and displaying, via the display generation component, a second navigational graphical user interface different from the first navigational graphical user interface, the second navigational graphical user interface including the one or more indications of the plurality of historic locations of the computer system, the indication of the current location of the computer system, and the indication of the current direction of the computer system.

32. The non-transitory computer-readable storage medium of claim 31, the one or more programs further including instructions for:

in response to detecting the rotational input in the first direction, modifying the one or more indications of the plurality of historic locations of the computer system.

33. The non-transitory computer-readable storage medium of claim 31, the one or more programs further including instructions for:

detecting a second rotational input in the first direction; and in response to detecting the second rotational input in the first direction:

ceasing display of the second navigational graphical user interface; and displaying, via the display generation component, a third navigational graphical user interface different from the first navigational graphical user interface and the second navigational graphical user interface, the third navigational graphical user interface including the one or more indications of the plurality of historic locations of the computer system, the indication of the current location of the computer system, and the indication of the current direction of the computer system.

34. The method of claim 18, wherein displaying the one or more indications of the plurality of historic locations of the computer system includes:

in accordance with a determination that a first indication of the one or more indications of the plurality of historic locations is based on a first data type, displaying, via the display generation component, a graphical object with a first visual characteristic for the first indication; and in accordance with a determination that the first indication of the one or more indications of the plurality of historic locations is based on a second data type different from the first data type, displaying, via the display generation component, a graphical object with a second visual characteristic, different from the first visual characteristic, for the first indication.

35. The method of claim 18, further comprising:

in accordance with a determination that the current direction of the computer system is toward a geographic location of a respective historic location of the plurality of historic locations, displaying, via the display generation component, the indication of the current direction of the computer system as visually overlapping an indication of the respective historic location; and in accordance with a determination that the current direction of the computer system is not toward the geographic location of the respective historic location of the plurality of historic locations, displaying, via the display generation component, the indication of the current direction of the computer system as not overlapping the indication of the respective historic location.

36. The method of claim 18, further comprising:

in accordance with a determination that a first type of wireless signal is not detected, automatically determining and storing current locations of the computer system; and in accordance with a determination that the first type of wireless signal is detected, forgoing storing current locations of the computer system.

37. The method of claim 18, wherein the one or more indications of the plurality of historic locations of the computer system, the indication of the current location, and the indication of the current direction of the computer system are concurrently displayed without displaying elements of a map.

38. The method of claim 18, further comprising:

detecting a change in the current location of the computer system; and in response to detecting the change in the current location of the computer system:

modifying the displayed relationships among the one or more indications of the plurality of historic locations and the indication of the current location of the computer system.

39. The method of claim 18, further comprising:

detecting a change in an orientation of the computer system; and in response to detecting the change in the orientation of the computer system, maintaining the displayed relationships among at least two indications of the one or more indications of the plurality of historic locations.

40. The method of claim 18, further comprising:

detecting a change in an orientation of the computer system; and in response to detecting the change in the orientation of the computer system:

maintaining a display position of the indication of the current direction of the computer system; and moving a position of the one or more indications of the plurality of historic locations.

41. The method of claim 18, further comprising:

determining current locations of the computer system at a defined frequency.

42. The method of claim 18, wherein location data the plurality of historic locations is captured based on satisfying a set of criteria, wherein the set of criteria includes a first criterion that is satisfied based on a location of the computer system being outside of a defined area.

43. The method of claim 18, further comprising:

displaying, via the display generation component, an indication of a first waypoint, wherein displayed relationships among the indication of the first waypoint, the one or more indications of the plurality of historic locations, and the indication of the current location corresponds to geographical relationships among the first waypoint, the plurality of historic locations, and the current location of the computer system.

44. The method of claim 43, further comprising:

while concurrently displaying the indication of the first waypoint, the one or more indications of the plurality of historic locations of the computer system, and the indication of the current location of the computer system, detecting, via one or more input devices, an input; and in response to detecting the input:

ceasing to display the one or more indications of the plurality of history locations; and displaying, via the display generation component, a watch face user interface including one or more complications, wherein the one or more complications includes a first complication having a directional indicator pointing toward the first waypoint.

45. The method of claim 43, further comprising:

while concurrently displaying the indication of the first waypoint, the one or more indications of the plurality of historic locations of the computer system, and the indication of the current location of the computer system, detecting, via one or more input devices, an input; and in response to detecting the input, displaying, via the display generation component, a first graphical user interface including a plurality of affordances for a plurality of waypoints that, when selected, causes display of a second graphical user interface for a respective waypoint.

46. The method of claim 18, wherein the one or more indications of the plurality of historic locations of the computer system, the indication of the current location of the computer system, and the indication of the current direction of the computer system are concurrently displayed in a first navigational graphical user interface, the method further comprising:

while displaying the first navigational graphical user interface, detecting, via a rotatable input device, a rotational input in a first direction; and in response to detecting the rotational input in the first direction:

ceasing display of the first navigational graphical user interface; and displaying, via the display generation component, a second navigational graphical user interface different from the first navigational graphical user interface, the second navigational graphical user interface including the one or more indications of the plurality of historic locations of the computer system, the indication of the current location of the computer system, and the indication of the current direction of the computer system.

47. The method of claim 46, further comprising:

in response to detecting the rotational input in the first direction, modifying the one or more indications of the plurality of historic locations of the computer system.

48. The method of claim 46, further comprising:

detecting a second rotational input in the first direction; and in response to detecting the second rotational input in the first direction:

ceasing display of the second navigational graphical user interface; and displaying, via the display generation component, a third navigational graphical user interface different from the first navigational graphical user interface and the second navigational graphical user interface, the third navigational graphical user interface including the one or more indications of the plurality of historic locations of the computer system, the indication of the current location of the computer system, and the indication of the current direction of the computer system.

* * * * *